US012301979B2

United States Patent
O'Leary et al.

(10) Patent No.: US 12,301,979 B2
(45) Date of Patent: *May 13, 2025

(54) USER INTERFACES FOR WIDE ANGLE VIDEO CONFERENCE

(71) Applicant: Apple Inc., Cupertino, CA (US)

(72) Inventors: Fiona Paula O'Leary, Palo Alto, CA (US); Guillaume Ardaud, San Francisco, CA (US); Jae Woo Chang, Cupertino, CA (US); Johnnie B. Manzari, San Francisco, CA (US); Julian Missig, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,348

(22) Filed: Apr. 24, 2023

(65) Prior Publication Data

US 2023/0262317 A1 Aug. 17, 2023

Related U.S. Application Data

(63) Continuation of application No. 17/482,977, filed on Sep. 23, 2021, now Pat. No. 11,671,697.

(Continued)

(51) Int. Cl.
*H04N 23/62* (2023.01)
*G06F 3/04845* (2022.01)
(Continued)

(52) U.S. Cl.
CPC ......... *H04N 23/62* (2023.01); *G06F 3/04845* (2013.01); *G06F 3/04883* (2013.01); *G06T 7/20* (2013.01); *G10L 21/0208* (2013.01); *H04L 65/403* (2013.01); *H04N 5/2621* (2013.01); *H04N 5/2628* (2013.01); *H04N 5/272* (2013.01); *H04N 23/611* (2023.01);
(Continued)

(58) Field of Classification Search
CPC .......... H04N 5/23216; H04N 5/23219; H04N 5/23245; H04N 5/23296; H04N 5/2621; H04N 5/2628; H04N 5/272; G06F 3/04845; G05F 3/04883; G06T 7/20; G10L 21/0208; H04L 65/403
USPC ............................................... 348/14.02–14.9
See application file for complete search history.

(56) References Cited

U.S. PATENT DOCUMENTS

| 102,663 A | 5/1870 | Dillen |
| 5,617,526 A | 4/1997 | Oran et al. |

(Continued)

FOREIGN PATENT DOCUMENTS

| AU | 2015100713 A4 | 6/2015 |
| CA | 2845537 A1 | 9/2014 |

(Continued)

OTHER PUBLICATIONS

Corrected Notice of Allowance received for U.S. Appl. No. 17/732,204, mailed on Jan. 18, 2024, 5 pages.

(Continued)

*Primary Examiner* — Maria El-Zoobi
(74) *Attorney, Agent, or Firm* — DLA Piper LLP (US)

(57) ABSTRACT

The present disclosure generally relates to embodiments for video communication interfaces for automatically adjusting a displayed representation of a field-of-view of a camera in response to detecting a change in a scene.

52 Claims, 80 Drawing Sheets

Related U.S. Application Data

(60) Provisional application No. 63/176,811, filed on Apr. 19, 2021, provisional application No. 63/143,881, filed on Jan. 31, 2021.

(51) Int. Cl.

| | |
|---|---|
| *G06F 3/04883* | (2022.01) |
| *G06T 7/20* | (2017.01) |
| *G10L 21/0208* | (2013.01) |
| *H04L 65/403* | (2022.01) |
| *H04N 5/262* | (2006.01) |
| *H04N 5/272* | (2006.01) |
| *H04N 23/611* | (2023.01) |
| *H04N 23/667* | (2023.01) |
| *H04N 23/69* | (2023.01) |
| *G06F 3/04842* | (2022.01) |

(52) U.S. Cl.
CPC ........... *H04N 23/667* (2023.01); *H04N 23/69* (2023.01); *G06F 3/04842* (2013.01); *G06T 2207/10016* (2013.01); *G06T 2207/30196* (2013.01)

(56) References Cited

U.S. PATENT DOCUMENTS

| | | | |
|---|---|---|---|
| 6,025,871 | A | 2/2000 | Kantor et al. |
| 6,346,962 | B1 | 2/2002 | Goodridge |
| 6,726,094 | B1 | 4/2004 | Rantze et al. |
| 6,728,784 | B1 | 4/2004 | Mattaway |
| 6,731,308 | B1 | 5/2004 | Tang et al. |
| 7,102,663 | B2 | 9/2006 | Crook |
| 7,148,911 | B1 | 12/2006 | Mitsui et al. |
| 7,185,054 | B1 | 2/2007 | Ludwig et al. |
| 7,571,014 | B1 | 8/2009 | Lambourne et al. |
| 7,801,971 | B1 | 9/2010 | Amidon et al. |
| 7,876,996 | B1 | 1/2011 | Herz |
| 7,903,171 | B2 | 3/2011 | Takabatake et al. |
| 7,982,762 | B2 | 7/2011 | Chatting et al. |
| 8,169,463 | B2 | 5/2012 | Enstad et al. |
| RE43,462 | E | 6/2012 | Washino et al. |
| 8,274,544 | B2 | 9/2012 | Kurtz et al. |
| 8,370,448 | B2 | 2/2013 | Galchev |
| 8,462,961 | B1 | 6/2013 | Bywaters et al. |
| 8,502,856 | B2 | 8/2013 | Jeong et al. |
| 8,624,952 | B2 | 1/2014 | Currivan et al. |
| 8,725,880 | B2 | 5/2014 | Santamaria et al. |
| 8,856,105 | B2 | 10/2014 | Gargi |
| 8,914,752 | B1 | 12/2014 | Spiegel |
| 9,080,736 | B1 | 7/2015 | Salzinger et al. |
| 9,185,062 | B1 | 11/2015 | Yang et al. |
| 9,253,531 | B2 | 2/2016 | Relyea et al. |
| 9,380,264 | B1 | 6/2016 | Vakalapudi |
| 9,445,048 | B1 | 9/2016 | Nariyawala et al. |
| 9,462,017 | B1 | 10/2016 | Siracusano, Jr. |
| 9,592,428 | B2 | 3/2017 | Binder |
| 9,635,314 | B2 | 4/2017 | Barkley et al. |
| 9,787,938 | B2 | 10/2017 | Cranfill et al. |
| 9,800,951 | B1 | 10/2017 | Carlson et al. |
| 9,819,877 | B1 | 11/2017 | Faulkner et al. |
| 9,819,912 | B2 | 11/2017 | Maruta |
| 9,992,450 | B1 | 6/2018 | Yuan et al. |
| 10,091,411 | B2 | 10/2018 | Ha et al. |
| 10,157,040 | B2 | 12/2018 | Ballinger et al. |
| 10,194,189 | B1 | 1/2019 | Goetz et al. |
| 10,270,983 | B1 | 4/2019 | Van Os et al. |
| 10,284,812 | B1 | 5/2019 | Van Os et al. |
| 10,300,394 | B1 | 5/2019 | Evans et al. |
| 10,339,769 | B2 | 7/2019 | Mixter et al. |
| 10,353,532 | B1 | 7/2019 | Holz et al. |
| 10,362,272 | B1 | 7/2019 | Van Os et al. |
| 10,386,994 | B2 | 8/2019 | Singal et al. |
| 10,389,977 | B1 | 8/2019 | Van Os et al. |
| 10,410,426 | B2 | 9/2019 | Kamini et al. |
| 10,523,625 | B1 | 12/2019 | Allen et al. |
| 10,523,976 | B2 | 12/2019 | Hemmati et al. |
| 10,638,058 | B2 | 4/2020 | Matsunaga |
| 10,645,294 | B1 | 5/2020 | Manzari et al. |
| 10,757,366 | B1 | 8/2020 | Kwatra et al. |
| 10,771,740 | B1 | 9/2020 | Reynolds et al. |
| 10,771,741 | B1 | 9/2020 | Reynolds et al. |
| 10,783,883 | B2 | 9/2020 | Mixter et al. |
| 10,909,586 | B2 | 2/2021 | Avedissian et al. |
| 10,924,446 | B1 | 2/2021 | Paul |
| 10,929,099 | B2 | 2/2021 | Querze et al. |
| 10,963,145 | B1 | 3/2021 | Voss et al. |
| 10,972,655 | B1 | 4/2021 | Ostap et al. |
| 11,012,575 | B1 | 5/2021 | Leblang et al. |
| 11,024,303 | B1 | 6/2021 | Devaraj et al. |
| 11,064,256 | B1 | 7/2021 | Voss et al. |
| 11,079,913 | B1 | 8/2021 | Kim et al. |
| 11,120,528 | B1 | 9/2021 | Seely et al. |
| 11,144,885 | B2 | 10/2021 | Rosenberg |
| 11,164,113 | B2 | 11/2021 | Howard |
| 11,164,580 | B2 | 11/2021 | Kraker |
| 11,176,940 | B1 | 11/2021 | Zhong et al. |
| 11,212,449 | B1 | 12/2021 | Manzari et al. |
| 11,258,619 | B2 | 2/2022 | Libin |
| 11,283,916 | B2 | 3/2022 | Coffman et al. |
| 11,290,687 | B1 | 3/2022 | Becchetti |
| 11,316,709 | B2 | 4/2022 | Brown et al. |
| 11,343,613 | B2 | 5/2022 | Gordon et al. |
| 11,350,026 | B1 | 5/2022 | Manzari et al. |
| 11,360,634 | B1 | 6/2022 | Chang et al. |
| 11,418,699 | B1 | 8/2022 | Manzari et al. |
| 11,449,188 | B1 | 9/2022 | Chang et al. |
| 11,523,166 | B1 | 12/2022 | Tu et al. |
| 11,539,876 | B2 | 12/2022 | Manzari et al. |
| 11,621,979 | B1 | 4/2023 | Slotznick |
| 11,671,697 | B2 | 6/2023 | O'Leary et al. |
| 11,726,647 | B2 | 8/2023 | Kim |
| 11,770,600 | B2 | 9/2023 | O'Leary et al. |
| 11,778,339 | B2 | 10/2023 | Manzari et al. |
| 12,014,118 | B2 | 6/2024 | Gruber et al. |
| 12,085,421 | B2 | 9/2024 | Yedid et al. |
| 2001/0030597 | A1 | 10/2001 | Inoue et al. |
| 2001/0041007 | A1 | 11/2001 | Aoki |
| 2002/0070945 | A1 | 6/2002 | Kage |
| 2002/0093531 | A1 | 7/2002 | Barile |
| 2002/0101446 | A1 | 8/2002 | Tang et al. |
| 2003/0112938 | A1 | 6/2003 | Kanakubo et al. |
| 2003/0158886 | A1 | 8/2003 | Walls et al. |
| 2003/0160861 | A1 | 8/2003 | Barlow et al. |
| 2003/0225836 | A1 | 12/2003 | Lee et al. |
| 2004/0003040 | A1 | 1/2004 | Beavers et al. |
| 2004/0048601 | A1 | 3/2004 | Lee et al. |
| 2004/0048612 | A1 | 3/2004 | Virtanen et al. |
| 2004/0102225 | A1 | 5/2004 | Furuta et al. |
| 2004/0218035 | A1 | 11/2004 | Crook |
| 2004/0239763 | A1 | 12/2004 | Notea et al. |
| 2005/0015286 | A1 | 1/2005 | Rudnik et al. |
| 2005/0099492 | A1 | 5/2005 | Orr |
| 2005/0124365 | A1 | 6/2005 | Balasuriya et al. |
| 2005/0144247 | A1 | 6/2005 | Christensen et al. |
| 2005/0233780 | A1 | 10/2005 | Jani et al. |
| 2006/0002315 | A1 | 1/2006 | Theurer et al. |
| 2006/0002523 | A1 | 1/2006 | Bettis et al. |
| 2006/0056837 | A1 | 3/2006 | Vapaakoski |
| 2006/0098085 | A1 | 5/2006 | Nichols et al. |
| 2006/0098634 | A1 | 5/2006 | Umemoto et al. |
| 2006/0149399 | A1 | 7/2006 | Norhammar et al. |
| 2006/0158730 | A1 | 7/2006 | Kira |
| 2006/0256188 | A1 | 11/2006 | Mock et al. |
| 2007/0004389 | A1 | 1/2007 | Wallace et al. |
| 2007/0040898 | A1 | 2/2007 | Lee et al. |
| 2007/0064112 | A1 | 3/2007 | Chatting et al. |
| 2007/0115349 | A1 | 5/2007 | Currivan et al. |
| 2007/0124783 | A1 | 5/2007 | Ahiska et al. |
| 2007/0177025 | A1 | 8/2007 | Kopet et al. |
| 2007/0211141 | A1 | 9/2007 | Christiansen |
| 2007/0264977 | A1 | 11/2007 | Zinn et al. |
| 2007/0279482 | A1 | 12/2007 | Oswald et al. |
| 2007/0291736 | A1 | 12/2007 | Furlong et al. |

(56) References Cited

U.S. PATENT DOCUMENTS

| | | |
|---|---|---|
| 2008/0032704 A1 | 2/2008 | Oneil et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0165388 A1 | 7/2008 | Serlet |
| 2008/0246778 A1 | 10/2008 | Ham et al. |
| 2008/0313278 A1 | 12/2008 | Hochberg |
| 2008/0316295 A1 | 12/2008 | King et al. |
| 2009/0005011 A1 | 1/2009 | Christie et al. |
| 2009/0007017 A1 | 1/2009 | Anzures et al. |
| 2009/0046075 A1* | 2/2009 | Kim .................. H04M 1/72403 345/173 |
| 2009/0049446 A1 | 2/2009 | Merten et al. |
| 2009/0109276 A1 | 4/2009 | Kim |
| 2009/0117936 A1 | 5/2009 | Maeng |
| 2009/0164322 A1 | 6/2009 | Khan et al. |
| 2009/0164587 A1 | 6/2009 | Gavita et al. |
| 2009/0174763 A1 | 7/2009 | Bengtsson et al. |
| 2009/0183125 A1 | 7/2009 | Magal et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0249244 A1 | 10/2009 | Robinson et al. |
| 2009/0256780 A1 | 10/2009 | Small et al. |
| 2009/0262200 A1 | 10/2009 | Takabatake et al. |
| 2009/0262206 A1 | 10/2009 | Park |
| 2009/0287790 A1 | 11/2009 | Upton et al. |
| 2009/0305679 A1 | 12/2009 | Kim |
| 2009/0309897 A1 | 12/2009 | Morita et al. |
| 2010/0009719 A1 | 1/2010 | Oh et al. |
| 2010/0011065 A1 | 1/2010 | Scherpa et al. |
| 2010/0039498 A1 | 2/2010 | Liu et al. |
| 2010/0040292 A1 | 2/2010 | Clarkson |
| 2010/0053212 A1 | 3/2010 | Kang et al. |
| 2010/0073454 A1 | 3/2010 | Lovhaugen et al. |
| 2010/0073455 A1 | 3/2010 | Iwabuchi et al. |
| 2010/0085416 A1 | 4/2010 | Hegde et al. |
| 2010/0087230 A1 | 4/2010 | Peh et al. |
| 2010/0097438 A1 | 4/2010 | Ujii |
| 2010/0121636 A1 | 5/2010 | Burke et al. |
| 2010/0162171 A1 | 6/2010 | Felt et al. |
| 2010/0169435 A1 | 7/2010 | Osullivan et al. |
| 2010/0177156 A1 | 7/2010 | Kim et al. |
| 2010/0189096 A1 | 7/2010 | Flynn et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0262714 A1 | 10/2010 | Hiie |
| 2010/0309284 A1 | 12/2010 | Samadani et al. |
| 2010/0318928 A1 | 12/2010 | Neuman et al. |
| 2010/0318939 A1 | 12/2010 | Moon |
| 2011/0030324 A1 | 2/2011 | Higgins |
| 2011/0032324 A1 | 2/2011 | George et al. |
| 2011/0085017 A1 | 4/2011 | Robinson et al. |
| 2011/0107216 A1 | 5/2011 | Bi |
| 2011/0115875 A1 | 5/2011 | Sadwick et al. |
| 2011/0115876 A1 | 5/2011 | Khot et al. |
| 2011/0117898 A1 | 5/2011 | Pereira et al. |
| 2011/0126148 A1 | 5/2011 | Krishnaraj et al. |
| 2011/0161836 A1 | 6/2011 | Mu et al. |
| 2011/0164032 A1 | 7/2011 | Shadmi |
| 2011/0193995 A1 | 8/2011 | Goh et al. |
| 2011/0205333 A1 | 8/2011 | Wu et al. |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0252146 A1 | 10/2011 | Santamaria et al. |
| 2011/0273526 A1 | 11/2011 | Mehin et al. |
| 2011/0296163 A1 | 12/2011 | Abernethy et al. |
| 2012/0002001 A1 | 1/2012 | Prentice |
| 2012/0019610 A1 | 1/2012 | Hornyak et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0092436 A1 | 4/2012 | Pahud et al. |
| 2012/0114108 A1 | 5/2012 | Katis et al. |
| 2012/0173383 A1 | 7/2012 | Badawiyeh et al. |
| 2012/0182381 A1 | 7/2012 | Abate et al. |
| 2012/0185355 A1 | 7/2012 | Kilroy |
| 2012/0188394 A1 | 7/2012 | Park et al. |
| 2012/0201479 A1 | 8/2012 | Zhang et al. |
| 2012/0206619 A1 | 8/2012 | Nitta et al. |
| 2012/0229591 A1 | 9/2012 | Lee |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0320141 A1 | 12/2012 | Bowen et al. |
| 2013/0055113 A1 | 2/2013 | Chazin et al. |
| 2013/0061155 A1 | 3/2013 | Hon |
| 2013/0070046 A1 | 3/2013 | Wolf et al. |
| 2013/0088413 A1 | 4/2013 | Raffle et al. |
| 2013/0111603 A1 | 5/2013 | Sakai et al. |
| 2013/0124207 A1 | 5/2013 | Sarin et al. |
| 2013/0132865 A1 | 5/2013 | Li |
| 2013/0151623 A1 | 6/2013 | Weiser et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0282180 A1 | 10/2013 | Layton |
| 2013/0325949 A1 | 12/2013 | Virani et al. |
| 2013/0328770 A1 | 12/2013 | Parham |
| 2013/0332856 A1 | 12/2013 | Sanders et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0043424 A1 | 2/2014 | Gava et al. |
| 2014/0063176 A1 | 3/2014 | Modai et al. |
| 2014/0099004 A1 | 4/2014 | Dibona et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0125830 A1 | 5/2014 | Takahashi |
| 2014/0201126 A1 | 7/2014 | Zadeh et al. |
| 2014/0201632 A1 | 7/2014 | Kunigita et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0317532 A1 | 10/2014 | Ma et al. |
| 2014/0331149 A1 | 11/2014 | Labey |
| 2014/0349754 A1 | 11/2014 | Kaneoka et al. |
| 2014/0354759 A1 | 12/2014 | Cranfill et al. |
| 2014/0364228 A1 | 12/2014 | Rimon |
| 2014/0368547 A1 | 12/2014 | Elings |
| 2014/0368600 A1 | 12/2014 | Do et al. |
| 2014/0368719 A1 | 12/2014 | Kaneko et al. |
| 2014/0373081 A1 | 12/2014 | Dodson et al. |
| 2014/0375747 A1 | 12/2014 | Martinez et al. |
| 2015/0033149 A1 | 1/2015 | Kuchoor |
| 2015/0040012 A1 | 2/2015 | Faaborg et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0078726 A1 | 3/2015 | Shakib et al. |
| 2015/0085057 A1 | 3/2015 | Ouyang et al. |

(56) References Cited

U.S. PATENT DOCUMENTS

| | | |
|---|---|---|
| 2015/0095804 A1 | 4/2015 | Grossman et al. |
| 2015/0106720 A1 | 4/2015 | Backer |
| 2015/0116353 A1 | 4/2015 | Miura et al. |
| 2015/0116363 A1 | 4/2015 | Monte et al. |
| 2015/0130892 A1 | 5/2015 | Whynot et al. |
| 2015/0135098 A1 | 5/2015 | Geppert et al. |
| 2015/0172552 A1 | 6/2015 | Kim |
| 2015/0177914 A1 | 6/2015 | Coyner et al. |
| 2015/0193196 A1 | 7/2015 | Lin et al. |
| 2015/0206529 A1 | 7/2015 | Kwon et al. |
| 2015/0242982 A1 | 8/2015 | Choi et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-natal et al. |
| 2015/0304413 A1 | 10/2015 | Park |
| 2015/0319006 A1 | 11/2015 | Plummer et al. |
| 2015/0319144 A1 | 11/2015 | Barton et al. |
| 2015/0334140 A1 | 11/2015 | Singh et al. |
| 2015/0334313 A1 | 11/2015 | Chougle et al. |
| 2015/0350143 A1 | 12/2015 | Lemay et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0365587 A1 | 12/2015 | Ha et al. |
| 2015/0370426 A1 | 12/2015 | Carrigan et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0021155 A1 | 1/2016 | Sawato |
| 2016/0029004 A1 | 1/2016 | Campbell et al. |
| 2016/0057173 A1 | 2/2016 | Singman et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0098094 A1 | 4/2016 | Minkkinen |
| 2016/0099901 A1 | 4/2016 | Allen et al. |
| 2016/0099987 A1 | 4/2016 | Shamma |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0219212 A1 | 7/2016 | Shoji |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0261653 A1 | 9/2016 | Kim |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0330384 A1 | 11/2016 | Park et al. |
| 2016/0335041 A1 | 11/2016 | Wachter et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |
| 2017/0094019 A1 | 3/2017 | Ahmed et al. |
| 2017/0097621 A1 | 4/2017 | Ackmann et al. |
| 2017/0111587 A1 | 4/2017 | Herbst et al. |
| 2017/0111595 A1* | 4/2017 | Soni .................. H04N 21/43072 |
| 2017/0126592 A1 | 5/2017 | El Ghoul |
| 2017/0134807 A1 | 5/2017 | Shaw et al. |
| 2017/0150904 A1 | 6/2017 | Park et al. |
| 2017/0206779 A1 | 7/2017 | Lee et al. |
| 2017/0220212 A1 | 8/2017 | Yang et al. |
| 2017/0230585 A1 | 8/2017 | Nash et al. |
| 2017/0230705 A1 | 8/2017 | Pardue et al. |
| 2017/0244932 A1* | 8/2017 | Pistilli .................. G16H 40/67 |
| 2017/0280098 A1 | 9/2017 | Sethuraman et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0353508 A1 | 12/2017 | Yoakum |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0367484 A1 | 12/2017 | Salvoni et al. |
| 2017/0371496 A1 | 12/2017 | Denoue et al. |
| 2017/0373868 A1 | 12/2017 | Deets, Jr. |
| 2018/0013799 A1 | 1/2018 | Davies |
| 2018/0013949 A1 | 1/2018 | Han |
| 2018/0020530 A1 | 1/2018 | Scordato et al. |
| 2018/0047200 A1 | 2/2018 | O'hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0103074 A1 | 4/2018 | Rosenberg |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0139374 A1 | 5/2018 | Yu |
| 2018/0150433 A1 | 5/2018 | Sowden et al. |
| 2018/0157455 A1 | 6/2018 | Troy et al. |
| 2018/0160072 A1 | 6/2018 | Cranfill et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0213396 A1 | 7/2018 | Segal et al. |
| 2018/0227341 A1 | 8/2018 | Rizzi |
| 2018/0228003 A1 | 8/2018 | O'driscoll et al. |
| 2018/0228006 A1 | 8/2018 | Baker et al. |
| 2018/0249047 A1 | 8/2018 | Marlatt |
| 2018/0253152 A1 | 9/2018 | Forsblom et al. |
| 2018/0267774 A1 | 9/2018 | Williams et al. |
| 2018/0278837 A1 | 9/2018 | Lee et al. |
| 2018/0286395 A1 | 10/2018 | Li et al. |
| 2018/0288104 A1 | 10/2018 | Padilla et al. |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0343383 A1 | 11/2018 | Ito et al. |
| 2018/0348764 A1 | 12/2018 | Zhang et al. |
| 2018/0349008 A1 | 12/2018 | Manzari et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-natal et al. |
| 2019/0005419 A1 | 1/2019 | Howard |

(56) References Cited

U.S. PATENT DOCUMENTS

| | | |
|---|---|---|
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0037173 A1 | 1/2019 | Lee et al. |
| 2019/0065027 A1 | 2/2019 | Hauenstein et al. |
| 2019/0068670 A1 | 2/2019 | Adam et al. |
| 2019/0102049 A1 | 4/2019 | Anzures et al. |
| 2019/0102145 A1 | 4/2019 | Wilberding et al. |
| 2019/0110087 A1 | 4/2019 | Parasseeri et al. |
| 2019/0124021 A1 | 4/2019 | Demattei |
| 2019/0138951 A1 | 5/2019 | Brownhill et al. |
| 2019/0149768 A1 | 5/2019 | Mcardle |
| 2019/0149887 A1 | 5/2019 | Williams et al. |
| 2019/0173939 A1 | 6/2019 | Lewis et al. |
| 2019/0199963 A1 | 6/2019 | Ahn et al. |
| 2019/0199993 A1 | 6/2019 | Babu et al. |
| 2019/0205861 A1 | 7/2019 | Bace |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0279634 A1 | 9/2019 | Tak et al. |
| 2019/0289271 A1 | 9/2019 | Paulus et al. |
| 2019/0297039 A1 | 9/2019 | Rodriguez et al. |
| 2019/0303861 A1 | 10/2019 | Mathias et al. |
| 2019/0332400 A1 | 10/2019 | Spoor et al. |
| 2019/0339769 A1 | 11/2019 | Cox et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0369862 A1 | 12/2019 | De Vries |
| 2019/0370805 A1 | 12/2019 | Van Os et al. |
| 2020/0005539 A1 | 1/2020 | Hwang et al. |
| 2020/0034033 A1 | 1/2020 | Chaudhri et al. |
| 2020/0050502 A1 | 2/2020 | Ghafourifar et al. |
| 2020/0055515 A1 | 2/2020 | Herman et al. |
| 2020/0059628 A1 | 2/2020 | Cranfill et al. |
| 2020/0106952 A1 | 4/2020 | Missig et al. |
| 2020/0106965 A1 | 4/2020 | Malia et al. |
| 2020/0112690 A1 | 4/2020 | Harrison et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0186576 A1 | 6/2020 | Gopal et al. |
| 2020/0195887 A1 | 6/2020 | Van Os et al. |
| 2020/0213530 A1 | 7/2020 | Ahn |
| 2020/0226896 A1 | 7/2020 | Robertson et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0312318 A1 | 10/2020 | Olson et al. |
| 2020/0335187 A1 | 10/2020 | Lefkofsky et al. |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0096703 A1 | 4/2021 | Anzures et al. |
| 2021/0097695 A1 | 4/2021 | Lundberg et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0201953 A1 | 7/2021 | Takahashi et al. |
| 2021/0203878 A1 | 7/2021 | Lee et al. |
| 2021/0217106 A1 | 7/2021 | Hauser et al. |
| 2021/0265032 A1 | 8/2021 | Burgess et al. |
| 2021/0266274 A1 | 8/2021 | Liu et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360192 A1 | 11/2021 | Cranfill et al. |
| 2021/0360199 A1 | 11/2021 | Oz et al. |
| 2021/0373672 A1 | 12/2021 | Schwarz et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0021680 A1 | 1/2022 | Roedel et al. |
| 2022/0044459 A1 | 2/2022 | Zacharia et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0100362 A1 | 3/2022 | Kim |
| 2022/0103784 A1 | 3/2022 | Pollefeys |
| 2022/0122089 A1 | 4/2022 | Bonilla Kuhlmann et al. |
| 2022/0124250 A1 | 4/2022 | Wisnia et al. |
| 2022/0180862 A1 | 6/2022 | Sharifi et al. |
| 2022/0244836 A1 | 8/2022 | O'leary et al. |
| 2022/0247587 A1 | 8/2022 | Rolin et al. |
| 2022/0247918 A1 | 8/2022 | O'leary et al. |
| 2022/0247919 A1 | 8/2022 | O'leary et al. |
| 2022/0253136 A1 | 8/2022 | Holder et al. |
| 2022/0254074 A1 | 8/2022 | Berliner et al. |
| 2022/0269882 A1 | 8/2022 | Proschowsky et al. |
| 2022/0278992 A1 | 9/2022 | Baker et al. |
| 2022/0286314 A1 | 9/2022 | Meyer et al. |
| 2022/0303150 A1 | 9/2022 | Jensen et al. |
| 2022/0343569 A1 | 10/2022 | Karri et al. |
| 2022/0353425 A1 | 11/2022 | Manzari et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2023/0004264 A1 | 1/2023 | Anzures et al. |
| 2023/0020616 A1 | 1/2023 | Manzari et al. |
| 2023/0041125 A1 | 2/2023 | Kim et al. |
| 2023/0094453 A1 | 3/2023 | O'leary et al. |
| 2023/0098395 A1 | 3/2023 | O'leary et al. |
| 2023/0109787 A1 | 4/2023 | O'leary et al. |
| 2023/0143275 A1 | 5/2023 | Opara et al. |
| 2023/0188674 A1 | 6/2023 | Van Os et al. |
| 2023/0209199 A1 | 6/2023 | Chen |
| 2023/0213764 A1 | 7/2023 | Arngren et al. |
| 2023/0246857 A1 | 8/2023 | Boucheron et al. |
| 2023/0262196 A1 | 8/2023 | Cranfill et al. |
| 2023/0319413 A1 | 10/2023 | Manzari et al. |
| 2023/0370507 A1 | 11/2023 | Chang et al. |
| 2023/0388665 A1 | 11/2023 | Manzari et al. |
| 2024/0036804 A1 | 2/2024 | Chang et al. |
| 2024/0064270 A1 | 2/2024 | Van Os et al. |
| 2024/0064395 A1 | 2/2024 | O'Leary et al. |
| 2024/0103677 A1 | 3/2024 | Mckenzie et al. |
| 2024/0104819 A1 | 3/2024 | Chand et al. |
| 2024/0118793 A1 | 4/2024 | Triverio et al. |
| 2024/0259669 A1 | 8/2024 | Missig et al. |

(56) References Cited

U.S. PATENT DOCUMENTS

| | | |
|---|---|---|
| 2024/0259687 A1 | 8/2024 | Tackin et al. |
| 2024/0377922 A1 | 11/2024 | Rajam et al. |

FOREIGN PATENT DOCUMENTS

| | | |
|---|---|---|
| CN | 1473430 A | 2/2004 |
| CN | 1689327 A | 10/2005 |
| CN | 1801926 A | 7/2006 |
| CN | 1890996 A | 1/2007 |
| CN | 1985319 A | 6/2007 |
| CN | 101075173 A | 11/2007 |
| CN | 101296356 A | 10/2008 |
| CN | 101431564 A | 5/2009 |
| CN | 101566866 A | 10/2009 |
| CN | 101682622 A | 3/2010 |
| CN | 101853132 A | 10/2010 |
| CN | 101854247 A | 10/2010 |
| CN | 101854261 A | 10/2010 |
| CN | 101917529 A | 12/2010 |
| CN | 102215217 A | 10/2011 |
| CN | 102572369 A | 7/2012 |
| CN | 102594990 A | 7/2012 |
| CN | 102625036 A | 8/2012 |
| CN | 102651731 A | 8/2012 |
| CN | 103039064 A | 4/2013 |
| CN | 103222247 A | 7/2013 |
| CN | 103237191 A | 8/2013 |
| CN | 103384235 A | 11/2013 |
| CN | 103442774 A | 12/2013 |
| CN | 103458215 A | 12/2013 |
| CN | 103649985 A | 3/2014 |
| CN | 103702029 A | 4/2014 |
| CN | 103718152 A | 4/2014 |
| CN | 103748610 A | 4/2014 |
| CN | 104010158 A | 8/2014 |
| CN | 104081335 A | 10/2014 |
| CN | 104270597 A | 1/2015 |
| CN | 104427288 A | 3/2015 |
| CN | 104469143 A | 3/2015 |
| CN | 104602133 A | 5/2015 |
| CN | 104869046 A | 8/2015 |
| CN | 104980578 A | 10/2015 |
| CN | 105094957 A | 11/2015 |
| CN | 105141498 A | 12/2015 |
| CN | 105204846 A | 12/2015 |
| CN | 105210018 A | 12/2015 |
| CN | 105264473 A | 1/2016 |
| CN | 105308634 A | 2/2016 |
| CN | 105389173 A | 3/2016 |
| CN | 105391778 A | 3/2016 |
| CN | 105554429 A | 5/2016 |
| CN | 105578111 A | 5/2016 |
| CN | 105900376 A | 8/2016 |
| CN | 106210855 A | 12/2016 |
| CN | 106303648 A | 1/2017 |
| CN | 106412706 A | 2/2017 |
| CN | 106471793 A | 3/2017 |
| CN | 106534619 A | 3/2017 |
| CN | 106575149 A | 4/2017 |
| CN | 106664389 A | 5/2017 |
| CN | 106713946 A | 5/2017 |
| CN | 106843626 A | 6/2017 |
| CN | 107066523 A | 8/2017 |
| CN | 107122049 A | 9/2017 |
| CN | 107491257 A | 12/2017 |
| CN | 107533417 A | 1/2018 |
| CN | 107534656 A | 1/2018 |
| CN | 107613283 A | 1/2018 |
| CN | 107704177 A | 2/2018 |
| CN | 107728876 A | 2/2018 |
| CN | 104025538 B | 4/2018 |
| CN | 107992248 A | 5/2018 |
| CN | 108353126 A | 7/2018 |
| CN | 108712609 A | 10/2018 |
| CN | 108769562 A | 11/2018 |
| CN | 108933965 A | 12/2018 |
| CN | 109196825 A | 1/2019 |
| CN | 110456971 A | 11/2019 |
| CN | 110784615 A | 2/2020 |
| CN | 111095165 A | 5/2020 |
| CN | 111108740 A | 5/2020 |
| CN | 111580671 A | 8/2020 |
| CN | 111601065 A | 8/2020 |
| CN | 111784615 A | 10/2020 |
| CN | 111901475 A | 11/2020 |
| CN | 111901476 A | 11/2020 |
| CN | 111913630 A | 11/2020 |
| CN | 111917980 A | 11/2020 |
| CN | 112004136 A | 11/2020 |
| CN | 112088530 A | 12/2020 |
| CN | 112154658 A | 12/2020 |
| CN | 112214275 A | 1/2021 |
| CN | 112261338 A | 1/2021 |
| CN | 112291627 A | 1/2021 |
| CN | 112416223 A | 2/2021 |
| CN | 112598677 A | 4/2021 |
| CN | 112637477 A | 4/2021 |
| EP | 1903791 A2 | 3/2008 |
| EP | 1986431 A2 | 10/2008 |
| EP | 2056568 A1 | 5/2009 |
| EP | 2237536 A1 | 10/2010 |
| EP | 2600584 A1 | 6/2013 |
| EP | 2446619 B1 | 10/2015 |
| EP | 3038427 A1 | 6/2016 |
| EP | 3120217 A1 | 1/2017 |
| EP | 2761582 B1 | 3/2017 |
| EP | 2258103 B1 | 5/2018 |
| EP | 3120217 B1 | 4/2020 |
| EP | 3163866 B1 | 5/2020 |
| EP | 3787285 A1 | 3/2021 |
| EP | 3839715 A1 | 6/2021 |
| EP | 4109891 A1 | 12/2022 |
| HK | 40022327 A | 11/2020 |
| IN | 1038MUM2005 | 6/2007 |
| JP | 6-113297 A | 4/1994 |
| JP | 6-276335 A | 9/1994 |
| JP | 6-276515 A | 9/1994 |
| JP | 7-135594 A | 5/1995 |
| JP | 9-182046 A | 7/1997 |
| JP | 9-233384 A | 9/1997 |
| JP | 9-247655 A | 9/1997 |
| JP | 9-265457 A | 10/1997 |
| JP | 2001-67099 A | 3/2001 |
| JP | 2001-169166 A | 6/2001 |
| JP | 2002-251365 A | 9/2002 |
| JP | 2002-320140 A | 10/2002 |
| JP | 2002-351802 A | 12/2002 |
| JP | 2003-101981 A | 4/2003 |
| JP | 2003-134382 A | 5/2003 |
| JP | 2003-189168 A | 7/2003 |
| JP | 2003-274376 A | 9/2003 |
| JP | 2003-299050 A | 10/2003 |
| JP | 2003-348444 A | 12/2003 |
| JP | 2004-187273 A | 7/2004 |
| JP | 2004-193860 A | 7/2004 |
| JP | 2004-221738 A | 8/2004 |
| JP | 2005-94696 A | 4/2005 |
| JP | 2005-159567 A | 6/2005 |
| JP | 2005-260289 A | 9/2005 |
| JP | 2005-286445 A | 10/2005 |
| JP | 2005-303736 A | 10/2005 |
| JP | 2006-135495 A | 5/2006 |
| JP | 2006-166414 A | 6/2006 |
| JP | 2006-222822 A | 8/2006 |
| JP | 2006-245732 A | 9/2006 |
| JP | 2006-246019 A | 9/2006 |
| JP | 2006-254350 A | 9/2006 |
| JP | 2006-319742 A | 11/2006 |
| JP | 2007-88630 A | 4/2007 |
| JP | 2007-140060 A | 6/2007 |
| JP | 2007-150877 A | 6/2007 |
| JP | 2007-150921 A | 6/2007 |
| JP | 2007-200329 A | 8/2007 |
| JP | 2007-201727 A | 8/2007 |

(56) References Cited

FOREIGN PATENT DOCUMENTS

| | | |
|---|---|---|
| JP | 2007-274034 A | 10/2007 |
| JP | 2007-282263 A | 10/2007 |
| JP | 2007-300452 A | 11/2007 |
| JP | 2008-28586 A | 2/2008 |
| JP | 2008-99330 A | 4/2008 |
| JP | 2008-125105 A | 5/2008 |
| JP | 2008-136119 A | 6/2008 |
| JP | 2008-533838 A | 8/2008 |
| JP | 2008-289014 A | 11/2008 |
| JP | 2009-502048 A | 1/2009 |
| JP | 2009-159253 A | 7/2009 |
| JP | 2009-188975 A | 8/2009 |
| JP | 2009-232290 A | 10/2009 |
| JP | 2009-265692 A | 11/2009 |
| JP | 2009-296583 A | 12/2009 |
| JP | 2010-15239 A | 1/2010 |
| JP | 2010-541398 A | 12/2010 |
| JP | 2012-244340 A | 12/2012 |
| JP | 2013-524683 A | 6/2013 |
| JP | 2014-71835 A | 4/2014 |
| JP | 2014-87126 A | 5/2014 |
| JP | 2014-170982 A | 9/2014 |
| JP | 2014-225797 A | 12/2014 |
| JP | 2015-11507 A | 1/2015 |
| JP | 2015-170234 A | 9/2015 |
| JP | 2015-201087 A | 11/2015 |
| JP | 2016-1446 A | 1/2016 |
| JP | 2016-24557 A | 2/2016 |
| JP | 2016-38615 A | 3/2016 |
| JP | 2016-53929 A | 4/2016 |
| JP | 2016-157292 A | 9/2016 |
| JP | 2016-167806 A | 9/2016 |
| JP | 2016-174282 A | 9/2016 |
| JP | 2017-532645 A | 11/2017 |
| JP | 2017-228843 A | 12/2017 |
| JP | 2017-229060 A | 12/2017 |
| JP | 2018-7158 A | 1/2018 |
| JP | 2018-56719 A | 4/2018 |
| JP | 2018-136828 A | 8/2018 |
| JP | 2018-200624 A | 12/2018 |
| JP | 2019-114282 A | 7/2019 |
| JP | 2020-510929 A | 4/2020 |
| JP | 2021-40300 A | 3/2021 |
| KR | 1997-0031883 A | 6/1997 |
| KR | 1999-0044201 A | 6/1999 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0064326 A | 6/2006 |
| KR | 10-2006-0116902 A | 11/2006 |
| KR | 10-2007-0111270 A | 11/2007 |
| KR | 10-2008-0096042 A | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0042499 A | 4/2009 |
| KR | 10-0891449 B1 | 4/2009 |
| KR | 10-2009-0122805 A | 12/2009 |
| KR | 10-2009-0126516 A | 12/2009 |
| KR | 10-2016-0092820 A | 8/2016 |
| KR | 10-2017-0128498 A | 11/2017 |
| KR | 10-2018-0085931 A | 7/2018 |
| KR | 10-2019-0033082 A | 3/2019 |
| KR | 10-1989433 B1 | 6/2019 |
| KR | 10-2020-0039030 A | 4/2020 |
| TW | 1321955 B | 3/2010 |
| WO | 2001/18665 A1 | 3/2001 |
| WO | 02/37848 A1 | 5/2002 |
| WO | 2003/077553 A1 | 9/2003 |
| WO | 2004/032507 A1 | 4/2004 |
| WO | 2005/060501 A2 | 7/2005 |
| WO | 2005/086159 A2 | 9/2005 |
| WO | 2006/063343 A2 | 6/2006 |
| WO | 2007/008321 A2 | 1/2007 |
| WO | 2007/063922 A1 | 6/2007 |
| WO | 2008/040566 A1 | 4/2008 |
| WO | 2009/005914 A1 | 1/2009 |
| WO | 2009/042579 A1 | 4/2009 |
| WO | 2010/001672 A1 | 1/2010 |
| WO | 2010/137513 A1 | 12/2010 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/037170 A1 | 3/2012 |
| WO | 2012/170118 A1 | 12/2012 |
| WO | 2013/114821 A1 | 8/2013 |
| WO | 2014/052871 A1 | 4/2014 |
| WO | 2014/058937 A1 | 4/2014 |
| WO | 2014/077987 A1 | 5/2014 |
| WO | 2014/168616 A1 | 10/2014 |
| WO | 2014/185028 A1 | 11/2014 |
| WO | 2014/200730 A1 | 12/2014 |
| WO | 2015/152953 A1 | 10/2015 |
| WO | 2016/046589 A1 | 3/2016 |
| WO | 2016/168154 A1 | 10/2016 |
| WO | 2016/172619 A1 | 10/2016 |
| WO | 2017/164716 A1 | 9/2017 |
| WO | 2017/218143 A1 | 12/2017 |
| WO | 2017/218153 A1 | 12/2017 |
| WO | 2018/012831 A1 | 1/2018 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2019/217009 A1 | 11/2019 |
| WO | 2019/217477 A1 | 11/2019 |
| WO | 2020/227386 A2 | 11/2020 |
| WO | 2021/112983 A1 | 6/2021 |
| WO | 2022/027906 A1 | 2/2022 |
| WO | 2022/231869 A1 | 11/2022 |

OTHER PUBLICATIONS

Office Action received for Australian Patent Application No. 2023204396, mailed on Jan. 8, 2024, 5 pages.
Applicant-Initiated Interview Summary received for U.S. Appl. No. 17/684,843, mailed on Oct. 5, 2023, 4 pages.
Corrected Notice of Allowance received for U.S. Appl. No. 17/872,736, mailed on Oct. 13, 2023, 3 pages.
Corrected Notice of Allowance received for U.S. Appl. No. 17/950,922, mailed on Oct. 2, 2023, 3 pages.
International Search Report and Written Opinion received for PCT Patent Application No. PCT/US2023/017280, mailed on Jun. 26, 2023, 20 pages.
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 17/479,897, mailed on Oct. 3, 2023, 5 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Corrected Notice of Allowance received for U.S. Appl. No. 17/740,104, mailed on Jan. 2, 2024, 2 pages.
Office Action received for Chinese Patent Application No. 202211073034.4, mailed on Nov. 22, 2023, 14 pages (9 pages of English Translation and 5 pages of Official Copy).
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.

(56) References Cited

OTHER PUBLICATIONS

Non-Final Office Action received for U.S. Appl. No. 17/484,899, mailed on Mar. 21, 2024, 42 pages.
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Jiutian Technology, "Windows 8 Chinese version from entry to proficiency", Jan. 1, 2014, 5 pages, Cited by Chinese Patent Office in an Office Action for related Patent Application No. 202110328601.5 on Mar. 24, 2023.
Song, Jianhua, "Guidelines for Network", Feb. 29, 2008, 11 pages, Cited by Chinese Patent Office in an Office Action for related Patent Application No. 202110328601.5 on Mar. 24, 2023.
"6. Voice chat with friends through QQ", Online available at: https://v.qq.com/x/page/a0166p7xrt0.html, Sep. 22, 2015, 1 page, Cited by Chinese Patent Office in an Office Action for related Patent Application No. 202110328601.5 on Mar. 24, 2023.
Applicant-Initiated Interview Summary received for U.S. Appl. No. 17/483,542, mailed on May 22, 2023, 3 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,679, mailed on May 19, 2023, 3 pages.
Applicant-Initiated Interview Summary received for U.S. Appl. No. 17/950,900, mailed on Jan. 26, 2023, 5 pages.
Brief Communication Regarding Oral Proceedings received for European Patent Application No. 20205496.1, mailed on Apr. 19, 2023, 1 page.
Corrected Notice of Allowance received for U.S. Appl. No. 17/950,900, mailed on Apr. 14, 2023, 2 pages.
Corrected Notice of Allowance received for U.S. Appl. No. 17/950,922, mailed on Apr. 14, 2023, 2 pages.
Decision to Refuse received for European Patent Application No. 20205496.1, mailed on May 12, 2023, 16 pages.
Dolan, Tim, "How to Make a Laptop Webcam into a Document Camera—IPEVO Mirror-Cam Review", Retrieved from the internet: URL:https://www.youtube.com/watch?v=-K8jyZ1hbbg, Aug. 29, 2020, 1 page.
Final Office Action received for U.S. Appl. No. 17/479,897, mailed on Jan. 10, 2023, 15 pages.
Final Office Action received for U.S. Appl. No. 17/483,564, mailed on May 25, 2023, 26 pages.
Final Office Action received for U.S. Appl. No. 17/950,900, mailed on Jan. 23, 2023, 14 pages.
International Search Report and Written Opinion received for PCT Patent Application No. PCT/US2022/044592, mailed on Mar. 14, 2023, 22 pages.
Invitation to Pay Additional Fees received for PCT Patent Application No. PCT/US2022/044592, mailed on Jan. 16, 2023, 21 pages.
Jiutian Technology, "Windows 8 Chinese version from entry to proficiency", Jan. 1, 2014, 5 pages (Official Copy Only) (See Communication Under Rule 37 CFR § 1.98(a) (3)).
Larson, Tom, "How to Turn your Webcam into a Document Camera", Retrieved from the Internet: URL: https://www.youtube.com/watchv=UlaW22FxRZM, 1 page.
Minutes of the Oral Proceedings received for European Patent Application No. 20205496.1, mailed on May 9, 2023, 7 pages.
Non-Final Office Action received for U.S. Appl. No. 17/476,404, mailed on Mar. 30, 2023, 29 pages.
Non-Final Office Action received for U.S. Appl. No. 17/479,897, mailed on Apr. 25, 2023, 14 pages.
Non-Final Office Action received for U.S. Appl. No. 17/483,542, mailed on Jan. 31, 2023, 14 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,900, mailed on Dec. 1, 2022, 14 pages.
Notice of Allowance received for Japanese Patent Application No. 2021-206121, mailed on May 15, 2023, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2021-7017731, mailed on Feb. 28, 2023, 5 pages (2 pages of English Translation and 3 pages of Official Copy).
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Office Action received for Australian Patent Application No. 2022228207, mailed on Apr. 28, 2023, 3 pages.
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110328601.5, mailed on Mar. 24, 2023, 25 pages (15 pages of English Translation and 10 pages of Official Copy).
Office Action received for Chinese Patent Application No. 202110328602.X, mailed on Dec. 1, 2022, 28 pages (17 pages of English Translation 11 pages of Official Copy).
Office Action received for Chinese Patent Application No. 202111652452.4, mailed on Feb. 11, 2023, 28 pages (13 pages of English Translation and 15 pages of Official Copy).
Office Action received for European Patent Application No. 21728781.2, mailed on Mar. 1, 2023, 13 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2021-206121, mailed on Feb. 20, 2023, 7 pages (3 pages of English Translation and 4 pages of Official Copy).
Result of Consultation received for European Patent Application No. 20205496.1, mailed on Apr. 18, 2023, 3 pages.
Song, Jianhua, "Guidelines for Network", Feb. 29, 2008, 11 pages (Official Copy Only) (See Communication Under Rule 37 CFR § 1.98(a) (3)).
6. Voice chat with friends through QQ, online available at: https://v.qq.com/x/page/a0166p7xrt0.html, Sep. 22, 2015, 1 page (Official Copy Only) (See Communication Under Rule 37 CFR § 1.98(a) (3)).
Corrected Notice of Allowance received for U.S. Appl. No. 18/228,591, mailed on Apr. 16, 2024, 5 pages.
International Preliminary Report on Patentability received for PCT Patent Application No. PCT/US2022/044592, mailed on Apr. 4, 2024, 21 pages.
Non-Final Office Action received for U.S. Appl. No. 17/970,417, mailed on Apr. 10, 2024, 16 pages.
Notice of Allowance received for Korean Patent Application No. 10-2023-7044044, mailed on Mar. 14, 2024, 7 pages (2 pages of English Translation and 5 pages of Official Copy).
Notice of Allowance received for U.S. Appl. No. 17/903,946, mailed on Apr. 10, 2024, 7 pages.
Notice of Allowance received for U.S. Appl. No. 18/228,591, mailed on Apr. 5, 2024, 10 pages.
Corrected Notice of Allowance received for U.S. Appl. No. 17/684,843, mailed on Mar. 4, 2024, 2 pages.
Notice of Allowance received for Korean Patent Application No. 10-2023-7039382, mailed on Feb. 13, 2024, 6 pages (2 pages of English Translation and 4 pages of Official Copy).

(56) References Cited

OTHER PUBLICATIONS

Notice of Allowance received for Korean Patent Application No. 10-2024-7000870, mailed on Feb. 13, 2024, 5 pages (2 pages of English Translation and 3 pages of Official Copy).
Applicant-Initiated Interview Summary received for U.S. Appl. No. 17/476,404, mailed on Oct. 31, 2023, 4 pages.
Office Action received for Australian Patent Application No. 2023248185, mailed on Oct. 20, 2023, 3 pages.
Office Action received for European Patent Application No. 22722604.0, mailed on Oct. 13, 2023, 11 pages.
Applicant-Initiated Interview Summary received for U.S. Appl. No. 18/067,350, mailed on Sep. 11, 2023, 4 pages.
Corrected Notice of Allowance received for U.S. Appl. No. 17/732,204, mailed on Nov. 16, 2023, 6 pages.
Extended European Search Report received for European Patent Application No. 23172038.4, mailed on Oct. 11, 2023, 10 pages.
Final Office Action received for U.S. Appl. No. 17/484,899, mailed on Nov. 6, 2023, 39 pages.
International Preliminary Report on Patentability received for PCT Patent Application No. PCT/US2022/024964, mailed on Nov. 9, 2023, 11 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 18/067,350, mailed on Aug. 3, 2023, 41 pages.
Office Action received for European Patent Application No. 20166552.8, mailed on Nov. 3, 2023, 3 pages.
Office Action received for Korean Patent Application No. 10-2023-0001668, mailed on Nov. 3, 2023, 5 pages (2 pages of English Translation and 3 pages of Official Copy).
Applicant-Initiated Interview Summary received for U.S. Appl. No. 18/067,350, mailed on Mar. 13, 2024, 4 pages.
Office Action received for Chinese Patent Application No. 201910704856.X, mailed on Mar. 8, 2024, 13 pages (7 pages of English Translation and 6 pages of Official Copy).
Office Action received for Chinese Patent Application No. 202211072958.2, mailed on Jan. 27, 2024, 19 pages (8 pages of English Translation and 11 pages of Official Copy).
Office Action received for Korean Patent Application No. 10-2023-7018775, mailed on Feb. 28, 2024, 9 pages (4 pages of English Translation and 5 pages of Official Copy).
Extended European Search Report received for European Patent Application No. 23203414.0, mailed on Jan. 26, 2024, 10 pages.
Notice of Acceptance received for Australian Patent Application No. 2023248185, mailed on Jan. 23, 2024, 3 pages.
Abdulezer et al., "Skype for Dummies", Available Online at: https://ixn.es/Skype%20For%20Dummies.pdf, 2007, 361 pages.
Advisory Action received for U.S. Appl. No. 17/483,679, mailed on Sep. 20, 2022, 8 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Applicant Initiated Interview Summary received for U.S. Appl. No. 16/790,619, mailed on Jul. 28, 2020, 3 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,907, mailed on Jan. 10, 2022, 2 pages.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/482,977, mailed on Apr. 24, 2023, 3 pages.

(56) References Cited

OTHER PUBLICATIONS

Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Search Report and Opinion received for Danish Patent Application No. PA201870364, mailed on Sep. 5, 2018, 13 pages.
Decision to Grant received for Danish Patent Application No. PA201870362, mailed on May 15, 2020, 2 pages.
Decision to Grant received for European Patent Application No. 19729395.4, mailed on Dec. 9, 2021, 2 pages.
Ex Parte Quayle Action received for U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner-Initiated Interview Summary received for U.S. Appl. No. 17/027,373, mailed on Mar. 31, 2022, 4 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 17/476,404, mailed on May 5, 2022, 30 pages.
Final Office Action received for U.S. Appl. No. 17/483,564, mailed on Apr. 18, 2022, 23 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 19729395.4, mailed on Jul. 23, 2021, 10 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Search Fees received for European Patent Application No. 21728781.2, mailed on Dec. 2, 2022, 3 pages.
Minutes of the Oral Proceedings received for European Patent Application No. 19729395.4, mailed on Jul. 21, 2021, 6 pages.
Non-Final Office Action received for U.S. Appl. No. 16/035,422, mailed on Nov. 30, 2018, 13 Pages.
Non-Final Office Action received for U.S. Appl. No. 17/157,166, mailed on Jul. 9, 2021, 12 pages.
Non-Final Office Action received for U.S. Appl. No. 17/476,404, mailed on Feb. 8, 2022, 26 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/476,404, mailed on Sep. 14, 2022, 31 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Sep. 22, 2022, 18 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,564, mailed on Nov. 28, 2022, 24 pages.

(56) References Cited

OTHER PUBLICATIONS

Non-Final Office Action received for U.S. Appl. No. 17/483,679, mailed on Dec. 9, 2022, 31 pages.
Non-Final Office Action received for U.S. Appl. No. 17/483,679, mailed on Feb. 1, 2022, 19 pages.
Non-Final Office Action received for U.S. Appl. No. 17/484,899, mailed on Jan. 24, 2022, 24 pages.
Non-Final Office Action received for U.S. Appl. No. 17/484,907, mailed on Nov. 19, 2021, 24 pages.
Notice of Acceptance received for Australian Patent Application No. 2019266225, mailed on Dec. 23, 2020, 3 pages.
Notice of Acceptance received for Australian Patent Application No. 2020239711, mailed on Dec. 16, 2021, 3 pages.
Notice of Acceptance received for Australian Patent Application No. 2021200789, mailed on Feb. 26, 2021, 3 pages.
Notice of Acceptance received for Australian Patent Application No. 2021203903, mailed on May 25, 2022, 3 pages.
Notice of Allowance received for Chinese Patent Application No. 201910400179.2, mailed on Oct. 9, 2022, 4 pages.
Notice of Allowance received for Chinese Patent Application No. 201880056514.5, mailed on Jan. 11, 2021, 2 pages.
Notice of Allowance received for Chinese Patent Application No. 201910400180.5, mailed on Nov. 5, 2020, 2 pages.
Notice of Allowance received for Chinese Patent Application No. 202011243876.0, mailed on Sep. 8, 2021, 4 pages.
Notice of Allowance received for Japanese Patent Application No. 2018-183504, mailed on Sep. 27, 2019, 4 pages.
Notice of Allowance received for Japanese Patent Application No. 2019-194597, mailed on Nov. 19, 2021, 4 pages.
Notice of Allowance received for Japanese Patent Application No. 2020-159840, mailed on Jul. 8, 2022, 4 pages.
Notice of Allowance received for Korean Patent Application No. 10-2020-0123805, mailed on Jun. 19, 2022, 5 pages.
Notice of Allowance received for Korean Patent Application No. 10-2020-7032110, mailed on Mar. 8, 2021, 4 pages.
Notice of Allowance received for Korean Patent Application No. 10-2022-0091730, mailed on Oct. 4, 2022, 5 pages.
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 17/157,166, mailed on Nov. 16, 2021, 6 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/121,610, mailed on Mar. 11, 2022, 5 pages.
Notice of Allowance received for U.S. Appl. No. 17/157,166, mailed on Mar. 30, 2022, 6 pages.
Notice of Allowance received for U.S. Appl. No. 17/482,977, mailed on Jan. 24, 2023, 10 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/483,549, mailed on Apr. 15, 2022, 10 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Office Action received for Australian Patent Application No. 2019100499, mailed on Jun. 28, 2019., 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021203903, mailed on Feb. 24, 2022, 3 pages.
Office Action received for Australian Patent Application No. 2022201532, mailed on Dec. 19, 2022, 5 pages.
Office Action received for Chinese Patent Application No. 201880056514.5, mailed on Sep. 2, 2020, 7 pages.
Office Action received for Chinese Patent Application No. 201910400179.2, mailed on Dec. 27, 2021, 32 pages.
Office Action received for Chinese Patent Application No. 201910400180.5, mailed on Jun. 1, 2020, 11 pages.
Office Action received for Chinese Patent Application No. 201910704856.X, mailed on Apr. 6, 2021, 13 pages.
Office Action received for Chinese Patent Application No. 201910704856.X, mailed on Dec. 9, 2020, 23 pages.
Office Action received for Chinese Patent Application No. 201910704856.X, mailed on May 27, 2020, 26 pages.
Office Action received for Chinese Patent Application No. 202010126661.4, mailed on Feb. 3, 2021, 16 pages.
Office Action received for Chinese Patent Application No. 202010126661.4, mailed on Jun. 2, 2022, 11 pages.
Office Action received for Chinese Patent Application No. 202010126661.4, mailed on Mar. 4, 2022, 13 pages.
Office Action received for Chinese Patent Application No. 202011243876.0, mailed on Apr. 6, 2021, 11 pages.
Office Action received for Chinese Patent Application No. 202110327012.5, mailed on Apr. 29, 2022, 17 pages.
Office Action received for Chinese Patent Application No. 202110327012.5, mailed on Nov. 28, 2022, 16 pages.
Office Action received for Chinese Patent Application No. 202110328597.2, mailed on Apr. 15, 2022, 18 pages.
Office Action received for Chinese Patent Application No. 202110328597.2, mailed on Oct. 10, 2022, 13 pages.
Office Action received for Chinese Patent Application No. 202110328601.5, mailed on Apr. 27, 2022, 25 pages.

(56) References Cited

OTHER PUBLICATIONS

Office Action received for Chinese Patent Application No. 202110328601.5, mailed on Nov. 2, 2022, 29 pages.
Office Action received for Chinese Patent Application No. 202110328602.X, mailed on Mar. 24, 2022, 6 pages.
Office Action received for Chinese Patent Application No. 202111652452.4, mailed on Aug. 29, 2022, 23 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action received for European Patent Application No. 18779093.6, mailed on Dec. 11, 2020, 4 pages.
Office Action received for European Patent Application No. 18779093.6, mailed on Mar. 17, 2022, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for European Patent Application No. 20205496.1, mailed on Nov. 10, 2021, 5 pages.
Office Action received for Indian Patent Application No. 201814036860, mailed on Jul. 29, 2021, 8 pages.
Office Action received for Indian Patent Application No. 202014041529, mailed on Dec. 6, 2021, 6 pages.
Office Action received for Japanese Patent Application No. 2019-194597, mailed on Jan. 18, 2021, 10 pages.
Office Action received for Japanese Patent Application No. 2020-159840, mailed on Dec. 10, 2021, 13 pages.
Office Action received for Japanese Patent Application No. 2020-159840, mailed on Mar. 28, 2022, 6 pages.
Office Action received for Korean Patent Application No. 10-2020-7032110, mailed on Dec. 15, 2020, 6 pages.
Office Action received for Korean Patent Application No. 10-2021-7017731, mailed on May 30, 2022, 5 pages.
QQ, "Method of QQ voice chat", Online Available at: https://www.taodocs.com/p-47909082.html, May 25, 2016, 3 pages.
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Summons to Attend Oral Proceedings received for European Patent Application No. 20205496.1, mailed on Sep. 8, 2022, 9 pages.
Applicant-Initiated Interview Summary received for U.S. Appl. No. 17/483,679, mailed on Dec. 18, 2023, 2 pages.
Intention to Grant received for European Patent Application No. 21728781.2, mailed on Dec. 12, 2023, 9 pages.
Notice of Allowance received for U.S. Appl. No. 17/483,542, mailed on Dec. 20, 2023, 6 pages.
Office Action received for European Patent Application No. 22184853.4, mailed on Dec. 11, 2023, 4 pages.
Summons to Attend Oral Proceedings received for European Patent Application No. 22184844.3, mailed on Dec. 11, 2023, 9 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/483,564, mailed on Jun. 21, 2023, 4 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/872,736, mailed on Jul. 25, 2023, 2 pages.
Corrected Notice of Allowance received for U.S. Appl. No. 17/479,897, mailed on Aug. 17, 2023, 2 pages.
Corrected Notice of Allowance received for U.S. Appl. No. 17/483,684, mailed on Aug. 24, 2022, 6 pages.
Corrected Notice of Allowance received for U.S. Appl. No. 17/484,279, mailed on Feb. 15, 2022, 2 pages.
Corrected Notice of Allowance received for U.S. Appl. No. 17/484,279, mailed on Feb. 28, 2022, 2 pages.
Corrected Notice of Allowance received for U.S. Appl. No. 17/484,307, mailed on Apr. 20, 2022, 2 pages.
Corrected Notice of Allowance received for U.S. Appl. No. 17/484,307, mailed on Feb. 10, 2022, 7 pages.
Corrected Notice of Allowance received for U.S. Appl. No. 17/484,321, mailed on Mar. 24, 2022, 2 pages.
Corrected Notice of Allowance received for U.S. Appl. No. 17/944,765, mailed on Jul. 27, 2023, 5 pages.
Corrected Notice of Allowance received for U.S. Appl. No. 17/944,765, mailed on Jun. 1, 2023, 5 pages.
Corrected Notice of Allowance received for U.S. Appl. No. 17/950,900, mailed on Jun. 30, 2023, 2 pages.
European Search Report received for European Patent Application No. 22184844.3, mailed on Nov. 4, 2022, 4 pages.
European Search Report received for European Patent Application No. 22184853.4, mailed on Nov. 14, 2022, 5 pages.
Examiner Interview Summary received for U.S. Appl. No. 17/903,946, mailed on Jun. 28, 2023, 2 pages.
Ex-Parte Quayle Action received for U.S. Appl. No. 17/903,946, mailed on Aug. 4, 2023, 4 pages.
Final Office Action received for U.S. Appl. No. 17/483,679, mailed on Jun. 13, 2023, 33 pages.
Garrison DR., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Intention to Grant received for European Patent Application No. 20166552.8, mailed on Jun. 29, 2023, 8 pages.
Intention to Grant received for European Patent Application No. 21728781.2, mailed on Jul. 28, 2023, 9 pages.
International Preliminary Report on Patentability received for PCT Patent Application No. PCT/US2022/014271, mailed on Aug. 10, 2023, 17 pages.
International Search Report and Written Opinion received for PCT Patent Application No. PCT/US2022/024964, mailed on Aug. 4, 2022, 17 pages.
Non-Final Office Action received for U.S. Appl. No. 17/484,899, mailed on Jun. 14, 2023, 41 pages.
Non-Final Office Action received for U.S. Appl. No. 17/684,843, mailed on Aug. 11, 2023, 23 pages.

(56) References Cited

OTHER PUBLICATIONS

Non-Final Office Action received for U.S. Appl. No. 17/732,204, mailed on Aug. 4, 2023, 18 pages.
Non-Final Office Action received for U.S. Appl. No. 17/740,104, mailed on Aug. 2, 2023, 15 pages.
Non-Final Office Action received for U.S. Appl. No. 17/944,765, mailed on Jan. 18, 2023, 9 pages.
Notice of Acceptance received for Australian Patent Application No. 2022201532, mailed on May 22, 2023, 3 pages.
Notice of Allowance received for Australian Patent Application No. 2022228207, mailed on Jul. 3, 2023, 3 pages.
Notice of Allowance received for Chinese Patent Application No. 202110328601.5, mailed on Jul. 5, 2023, 5 pages (1 page of English Translation and 4 pages of Official Copy).
Notice of Allowance received for U.S. Appl. No. 17/479,897, mailed on Jul. 26, 2023, 7 pages.
Notice of Allowance received for U.S. Appl. No. 17/483,542, mailed on Aug. 11, 2023, 9 pages.
Notice of Allowance received for U.S. Appl. No. 17/483,564, mailed on Jul. 17, 2023, 46 pages.
Notice of Allowance received for U.S. Appl. No. 17/483,684, mailed on Apr. 27, 2022, 10 pages.
Notice of Allowance received for U.S. Appl. No. 17/483,684, mailed on Aug. 16, 2022, 9 pages.
Notice of Allowance received for U.S. Appl. No. 17/483,684, mailed on Oct. 24, 2022, 9 pages.
Notice of Allowance received for U.S. Appl. No. 17/484,279, mailed on Jan. 26, 2022, 12 pages.
Notice of Allowance received for U.S. Appl. No. 17/484,279, mailed on May 13, 2022, 9 pages.
Notice of Allowance received for U.S. Appl. No. 17/484,307, mailed on Mar. 8, 2022, 11 pages.
Notice of Allowance received for U.S. Appl. No. 17/484,307, mailed on Nov. 30, 2021, 11 pages.
Notice of Allowance received for U.S. Appl. No. 17/484,321, mailed on Nov. 30, 2021, 10 pages.
Notice of Allowance received for U.S. Appl. No. 17/872,736, mailed on Aug. 21, 2023, 6 pages.
Notice of Allowance received for U.S. Appl. No. 17/944,765, mailed on Apr. 5, 2023, 9 pages.
Notice of Allowance received for U.S. Appl. No. 17/950,900, mailed on Jun. 16, 2023, 6 pages.
Office Action received for Chinese Patent Application No. 202110328597.2, mailed on Jul. 18, 2023, 21 pages (6 pages of English Translation and 15 pages of Official Copy).
Office Action received for Chinese Patent Application No. 202110328597.2, mailed on May 15, 2023, 13 pages (6 pages of English Translation and 7 pages of Official Copy).
Office Action received for Chinese Patent Application No. 202110328602.X, mailed on Jun. 29, 2023, 27 pages (18 pages of English Translation and 9 pages of Official Copy).
Office Action received for Chinese Patent Application No. 202111652452.4, mailed on May 19, 2023, 15 pages (8 pages of English Translation and 7 pages of Official Copy).
Office Action received for Chinese Patent Application No. 202211072261.5, mailed on Apr. 29, 2023, 17 pages (9 pages of English Translation and 8 pages of Official Copy).
Office Action received for Chinese Patent Application No. 202211072958.2, mailed on Apr. 5, 2023, 11 pages (6 pages of English Translation and 5 pages of Official Copy).
Office Action received for Chinese Patent Application No. 202211072958.2, mailed on Jun. 20, 2023, 48 pages (24 pages of English Translation and 24 pages of Official Copy).
Office Action received for Chinese Patent Application No. 202211073034.4, mailed on May 30, 2023, 21 pages (10 pages of English Translation and 11 pages of Official Copy).
Office Action received for European Patent Application No. 18779093.6, mailed on Jun. 28, 2023, 4 pages.
Office Action received for European Patent Application No. 22184844.3, mailed on Apr. 26, 2023, 5 pages.
Office Action received for European Patent Application No. 22184844.3, mailed on Nov. 16, 2022, 7 pages.
Office Action received for European Patent Application No. 22184853.4, mailed on Apr. 26, 2023, 4 pages.
Office Action received for European Patent Application No. 22184853.4, mailed on Nov. 25, 2022, 7 pages.
Result of Consultation received for European Patent Application No. 22184844.3, mailed on Feb. 1, 2023, 3 pages.
Supplemental Notice of Allowance received for U.S. Appl. No. 17/484,321, mailed on Mar. 1, 2022, 6 pages.
Shangmeng Li, "The Design and Implementation of Mobile Terminal System of Multimedia Conference Based on Symbian Operating System", China Academic Journal Electronic Publishing House, Online available at: http://www.cnki.net, 2011, 66 pages (Official Copy only) {See Communication Under Rule 37 CFR § 1.98(a)(3)}.
Applicant-Initiated Interview Summary received for U.S. Appl. No. 17/484,899, mailed on Sep. 12, 2023, 6 pages.
Final Office Action received for U.S. Appl. No. 17/476,404, mailed on Sep. 12, 2023, 30 pages.
Non-Final Office Action received for U.S. Appl. No. 17/483,679, mailed on Sep. 13, 2023, 32 pages.
Notice of Allowance received for U.S. Appl. No. 17/950,922, mailed on Sep. 20, 2023, 6 pages.
Notice of Hearing received for Indian Patent Application No. 201814036860, mailed on Sep. 8, 2023, 2 pages.
Corrected Notice of Allowance received for U.S. Appl. No. 17/483,542, mailed on Aug. 25, 2023, 3 pages.
Notice of Allowance received for U.S. Appl. No. 17/872,736, mailed on Aug. 30, 2023, 4 pages.
Result of Consultation received for European Patent Application No. 22184844.3, mailed on Aug. 28, 2023, 3 pages.
Corrected Notice of Allowance received for U.S. Appl. No. 17/732,204, mailed on Dec. 4, 2023, 5 pages.
Final Office Action received for U.S. Appl. No. 18/067,350, mailed on Dec. 13, 2023, 44 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2023/020569, mailed on Nov. 13, 2023, 23 pages.
Office Action received for Australian Patent Application No. 2023248185, mailed on Nov. 22, 2023, 2 pages.
Applicant-Initiated Interview Summary received for U.S. Appl. No. 17/484,899, mailed on Feb. 14, 2024, 8 pages.
Corrected Notice of Allowance received for U.S. Appl. No. 17/483,542, mailed on Feb. 5, 2024, 3 pages.
Decision to Grant received for European Patent Application No. 21728781.2, mailed on Feb. 8, 2024, 3 pages.
Final Office Action received for U.S. Appl. No. 17/483,679, mailed on Feb. 6, 2024, 45 pages.
Notice of Allowance received for U.S. Appl. No. 17/684,843, mailed on Feb. 14, 2024, 8 pages.
Office Action received for Chinese Patent Application No. 202211072261.5, mailed on Dec. 28, 2023, 22 pages (14 pages of English Translation and 8 pages of Official Copy).
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/970,417, mailed on Jun. 26, 2024, 2 pages.
Cosmic Mook,"Line laboratory, New Function Exhaustive Coverage! Line 120% Application Guide, Inc.", Jan. 24, 2018, 7 pages (Official Copy Only) {See Communication Under Rule 37 CFR § 1.98(a) (3)}.

(56) References Cited

OTHER PUBLICATIONS

Examiner Initiated Interview Summary received for U.S. Appl. No. 17/950,868, mailed on Jul. 5, 2024, 2 pages.
Myoko, Mori, "Line Perfect Guidebook [Revised Version]", Sotec Co. Ltd., Dec. 31, 2013, 5 pages (Official Copy Only) {See Communication Under Rule 37 CFR § 1.98(a) (3)}.
Octoba, "Enjoy free calls with Line! Part 2", retrieved from: https://web.archive.org/web/20170923013859/https://octoba.net/archives/line-call2.html, Sep. 23, 2017, 13 pages (Official Copy Only) {See Communication Under Rule 37 CFR § 1.98(a) (3)}.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2024-003876, mailed on Jul. 2, 2024, 3 pages (1 page of English Translation and 2 pages of Official Copy).
Anonymous, "dji Osmo Mobile 6—User Manual", online available at: https://dl.djicdn.com/downloads/DJI_Osmo_Mobile_6/Osmo_Mobile_6_User_Manual_v1.0_en.pdf, Sep. 30, 2022, 19 pages.
Corrected Notice of Allowance received for U.S. Appl. No. 17/903,946, mailed on Apr. 22, 2024, 2 pages.
Non-Final Office Action received for U.S. Appl. No. 17/950,868, mailed on Apr. 24, 2024, 16 pages.
Notice of Acceptance received for Australian Patent Application No. 2023204396, mailed on Apr. 15, 2024, 3 pages.
Office Action received for European Patent Application No. 22184853.4, mailed on Apr. 29, 2024, 5 pages.
Avery et al., "Kinect", Wikipedia, Feb. 26, 2015, 14 pages.
Corrected Notice of Allowance received for U.S. Appl. No. 18/228,591, mailed on May 28, 2024, 5 pages.
Extended European Search Report received for European Patent Application No. 24160234.1, mailed on May 28, 2024, 6 pages.
Non-Final Office Action received for U.S. Appl. No. 18/067,350, mailed on May 28, 2024, 43 pages.
Notice of Acceptance received for Australian Patent Application No. 2024202768, mailed on Jun. 4, 2024, 3 pages.
Notice of Allowance received for U.S. Appl. No. 17/684,843, mailed on Jun. 5, 2024, 5 pages.
Office Action received for Chinese Patent Application No. 202211072261.5, mailed on Apr. 28, 2024, 19 pages (13 pages of English Translation and 6 pages of Official Copy).
Office Action received for European Patent Application No. 22705232.1, mailed on May 27, 2024, 7 pages.
Office Action received for Japanese Patent Application No. 2023-571161, mailed on May 28, 2024, 4 pages (2 pages of English Translation and 2 pages of Official Copy).
Intention to Grant received for European Patent Application No. 22722604.0, mailed on May 14, 2024, 9 pages.
Notice of Allowance received for Chinese Patent Application No. 202311042451.7, mailed on May 15, 2024, 4 pages (1 page of English Translation and 3 pages of Official Copy).
Notice of Allowance received for U.S. Appl. No. 18/228,591, mailed on May 16, 2024, 5 pages.
Office Action received for Chinese Patent Application No. 202211073034.4, mailed on Mar. 26, 2024, 14 pages (9 pages of English Translation and 5 pages of Official Copy).
Cosmic Mook,"Line laboratory, new function Exhaustive Coverage! Line 120% Application Guide, Inc.", Jan. 24, 2018, 7 pages, Cited by the Japanese Patent Office in an Office Action for related Patent Application No. 2023-097196 on Jun. 7, 2024.
Myoko, Mori, "Line Perfect Guidebook [Revised Version]", Sotec Co. Ltd., Dec. 31, 2013, 5 pages, Cited by the Japanese Patent Office in an Office Action for related Patent Application No. 2023-097196 on Jun. 7, 2024.
Octoba, "Enjoy free calls with Line! Part 2", retrieved from: https://web.archive.org/web/20170923013859/https://octoba.net/archives/line-call2.html, Sep. 23, 2017, 13 pages, Cited by the Japanese Patent Office in an Office Action for related Patent Application No. 2023-097196 on Jun. 7, 2024.
Applicant-Initiated Interview Summary received for U.S. Appl. No. 17/484,899, mailed on Jun. 24, 2024, 4 pages.
Corrected Notice of Allowance received for U.S. Appl. No. 18/228,591, mailed on Jun. 13, 2024, 5 pages.
Notice of Allowance received for Korean Patent Application No. 10-2023-0001668, mailed on May 22, 2024, 6 pages (2 pages of English Translation and 4 pages of Official Copy).
Office Action received for Chinese Patent Application No. 201910704856.X, mailed on Jun. 11, 2024, 33 pages (1 page of English Translation and 32 pages of Official Copy).
Applicant-Initiated Interview Summary received for U.S. Appl. No. 18/067,350, mailed on Jul. 29, 2024, 3 pages.
Corrected Notice of Allowance received for U.S. Appl. No. 18/228,591, mailed on Aug. 5, 2024, 5 pages.
Extended European Search Report received for European Patent Application No. 24159026.4, mailed on Jul. 10, 2024, 9 pages.
International Search Report and Written Opinion received for PCT Patent Application No. PCT/US2024/010547, mailed on Jun. 19, 2024, 19 pages.
Invitation to Pay Additional Fees and Partial International Search Report received for PCT Patent Application No. PCT/US2024/010547, mailed on Apr. 29, 2024, 11 pages.
Invitation to Pay Additional Fees received for PCT Patent Application No. PCT/US2024/017017, mailed on May 15, 2024, 3 pages.
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for U.S. Appl. No. 18/228,591, mailed on Jul. 29, 2024, 8 pages.
Office Action received for Japanese Patent Application No. 2023-571312, mailed on Jul. 16, 2024, 4 pages (2 pages of English Translation and 2 pages of Official Copy).
Office Action received for Korean Patent Application No. 10-2024-7019962, mailed on Jul. 16, 2024, 6 pages (2 pages of English Translation and 4 pages of Official Copy).
Applicant-Initiated Interview Summary received for U.S. Appl. No. 17/950,868, mailed on Jul. 19, 2024, 2 pages.
Non-Final Office Action received for U.S. Appl. No. 18/380,116, mailed on Jul. 18, 2024, 16 pages.
Notice of Allowance received for Korean Patent Application No. 10-2023-7040599, mailed on Jun. 26, 2024, 7 pages (2 pages of English Translation and 5 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Applicant-Initiated Interview Summary received for U.S. Appl. No. 17/950,868, mailed on Sep. 10, 2024, 3 pages.
Corrected Notice of Allowance received for U.S. Appl. No. 17/903,946, mailed on Sep. 3, 2024, 2 pages.
Decision to Grant received for Japanese Patent Application No. 2023-571312, mailed on Aug. 29, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Final Office Action received for U.S. Appl. No. 17/950,868, mailed on Aug. 29, 2024, 13 pages.
International Search Report and Written Opinion received for PCT Patent Application No. PCT/US2024/017017, mailed on Aug. 2, 2024, 27 pages.
Non-Final Office Action received for U.S. Appl. No. 18/389,655, mailed on Aug. 23, 2024, 23 pages.
Notice of Allowance received for U.S. Appl. No. 17/484,899, mailed on Aug. 26, 2024, 21 pages.

(56) References Cited

OTHER PUBLICATIONS

Notice of Allowance received for U.S. Appl. No. 17/903,946, mailed on Aug. 27, 2024, 5 pages.
Office Action received for Chinese Patent Application No. 202410030102.1, mailed on Jul. 23, 2024, 18 pages (9 pages of English Translation and 9 pages of Official Copy).
Office Action received for Japanese Patent Application No. 2023-028786, mailed on Aug. 23, 2024, 10 pages (5 pages of English Translation and 5 pages of Official Copy).
Office Action received for European Patent Application No. 22705232.1, mailed on Sep. 26, 2024, 8 pages.
Office Action received for Korean Patent Application No. 10-2024-7019962, mailed on Sep. 25, 2024, 7 pages (2 pages of English Translation and 5 pages of Official Copy).
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Advisory Action received for U.S. Appl. No. 17/950,868, mailed on Sep. 24, 2024, 3 pages.
Advisory Action received for U.S. Appl. No. 17/970,417, mailed on Dec. 12, 2024, 7 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/140,449, mailed on Nov. 26, 2024, 2 pages.
Applicant-Initiated Interview Summary received for U.S. Appl. No. 18/389,655, mailed on Sep. 20, 2024, 6 pages.
Baudisch et al., "Back-of-device interaction allows creating very small touch devices", Chi 2009—Digital Life, New World: Conference Proceedings And Extended Abstracts; The 27th Annual Chi Conference On Human Factors In Computing Systems Available online at <http://dx.doi.org/10.1145/1518701.1518995>, Apr. 9, 2009, pp. 1923-1932.
Brief Communication Regarding Oral Proceedings received for European Patent Application No. 22184844.3, mailed on Oct. 2, 2024, 15 pages.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Notice of Allowance received for U.S. Appl. No. 16/666,073, mailed on Apr. 26, 2021, 4 pages.
Notice of Allowance received for U.S. Appl. No. 16/666,073, mailed on Feb. 22, 2021, 3 pages.
Notice of Allowance received for U.S. Appl. No. 16/666,073, mailed on Mar. 11, 2021, 3 pages.
Notice of Allowance received for U.S. Appl. No. 17/684,843, mailed on Oct. 7, 2024, 2 pages.
Notice of Allowance received for U.S. Appl. No. 17/745,680, mailed on Nov. 20, 2024, 2 pages.
Notice of Allowance received for U.S. Appl. No. 17/950,868, mailed on Nov. 27, 2024, 3 pages.
On Appeal received for Korean Patent Application No. 10-2020-7034959, mailed on Jul. 25, 2022, 28 pages (5 pages of English Translation and 23 pages of Official Copy).
To Grant received for European Patent Application No. 10763539.3, mailed on Jul. 19, 2018, 3 pages.
To Grant received for European Patent Application No. 18188433.9, mailed on Aug. 13, 2020, 3 pages.
To Refuse received for Japanese Patent Application No. 2013-503731, mailed on Jun. 23, 2014, 4 pages (2 pages of English Translation and 2 pages of Official Copy).
Pre-Review Report received for Japanese Patent Application No. 2014-212867, mailed on Nov. 4, 2016, 5 pages (2 pages of English Translation and 3 pages of Official Copy).
European Search Report received for European Patent Application No. 18188433.9, mailed on Oct. 29, 2018, 8 pages.
Office Action received for U.S. Appl. No. 12/794,766, mailed on Nov. 26, 2012, 23 pages.
Office Action received for U.S. Appl. No. 14/263,889, mailed on Jan. 4, 2016, 9 pages.
Office Action received for U.S. Appl. No. 15/725,868, mailed on Sep. 27, 2018, 25 pages.
Office Action received for U.S. Appl. No. 16/666,073, mailed on Apr. 17, 2020, 18 pages.
Office Action received for U.S. Appl. No. 17/332,829, mailed on Feb. 6, 2023, 19 pages.
Final Office Action received for U.S. Appl. No. 17/970,417, mailed on Sep. 18, 2024, 24 pages.
Final Office Action Action received for U.S. Appl. No, 18/067,350, mailed on Oct. 31, 2024, 44 pages.
Final Office Action received for U.S. Appl. No. 18/140,449, mailed on Oct. 18, 2024, 11 pages.
To Grant received for European Patent Application No. 10763539.3, mailed on Mar. 15, 2018, 6 pages.
To Grant received for European Patent Application No. 18188433.9, mailed on Apr. 6, 2020, 9 pages.
To Grant received for European Patent Application No. 22184844.3, mailed on Oct. 29, 2024, 9 pages.
To Grant received for European Patent Application No. 22184853.4, mailed on Oct. 4, 2024, 9 pages.
To Grant received for European Patent Application No. 22722604.0, mailed on Sep. 26, 2024, 9 pages.
To Grant received for European Patent Application No. 22734711.9, mailed on Sep. 13, 2024, 7 pages.
To Grant received for European Patent Application No. 24160234.1, mailed on Nov. 4, 2024, 9 pages.
Preliminary Report on Patentability received for PCT Patent Application No. PCT/US2010/050311, mailed on Oct. 18, 2012, 11 pages.
Preliminary Report on Patentability received for PCT Patent Application No. PCT/US2023/017280, mailed on Oct. 17, 2024, 15 pages.
Preliminary Report on Patentability received for PCT Patent Application No. PCT/US2023/020569, mailed on Nov. 21, 2024, 16 pages.
Search Report and Written Opinion received for PCT Patent Application No. PCT/US2010/050311, mailed on Aug. 24, 2011, 15 pages.
Search Report and Written Opinion received for PCT Patent Application No. PCT/US2024/023231, mailed on Oct. 23, 2024, 24 pages.
To Pay Additional Fees and Partial International Search Report received for PCT Patent Application No. PCT/US2010/050311, mailed on Dec. 21, 2010, 6 pages.
To Pay Additional Fees and Partial International Search Report received for PCT Patent Application No. PCT/US2024/023231, mailed on Aug. 29, 2024, 17 pages.
Koyama Kaori, "Mac Fan Macintosh Master Book Mac OS X v10.4 "Tiger" & iLife", '06 version, Mainichi Communications Inc. Nobuyuki NAKAGAWA, Jul. 9, 2007, 4 pages (Official Copy Only) {See Communication Under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.

(56) References Cited

OTHER PUBLICATIONS

Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Office Action received for U.S. Appl. No. 14/263,889, mailed on Jul. 26, 2016, 11 pages.
Office Action received for U.S. Appl. No. 15/725,868, mailed on Apr. 27, 2018, 17 pages.
Office Action received for U.S. Appl. No. 15/725,868, mailed on Feb. 12, 2019, 26 pages.
Office Action received for U.S. Appl. No. 16/666,073, mailed on Dec. 10, 2019, 16 pages.
Office Action received for U.S. Appl. No. 17/332,829, mailed on Aug. 1, 2022, 17 pages.
Office Action received for U.S. Appl. No. 18/140,449, mailed on May 24, 2024, 19 pages.
Of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2021, 3 pages (1 page of English Translation and 2 pages of Official Copy).
Of Allowance received for Chinese Patent Application No. 201010602653.9, mailed on Nov. 15, 2014, 2 pages (1 page of English Translation and 1 page of Official Copy).
Of Allowance received for Chinese Patent Application No. 2010106600623.4, mailed on Aug. 11, 2014, 4 pages (1 page of English Translation and 3 pages of Official Copy).
Of Allowance received for Chinese Patent Application No. 201410575145.4, mailed on May 10, 2018, 3 pages (1 page of English Translation and 2 pages of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 18/389,655, mailed on Jan. 21, 2021, 11 pages.
Notice of Allowance received for U.S. Appl. No. 17/483,679, mailed on Nov. 21, 2024, 8 pages.
Notice of Allowance received for U.S. Appl. No. 17/684,843, mailed on Sep. 17, 2024, 5 pages.
Notice of Allowance received for U.S. Appl. No. 17/745,680, mailed on Dec. 12, 2024, 2 pages.
Notice of Allowance received for U.S. Appl. No. 17/745,680, mailed on Nov. 12, 2024, 8 pages.
Notice of Allowance received for U.S. Appl. No. 17/950,868, mailed on Oct. 23, 2024, 10 pages.
Notice of Allowance received for U.S. Appl. No. 18/389,655, mailed on Nov. 27, 2024, 8 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).

(56) References Cited

OTHER PUBLICATIONS

Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106606623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for European Patent Application No. 10763539.3, mailed on Jun. 13, 2016, 5 pages.
Office Action received for European Patent Application No. 22733778.9, mailed on Oct. 22, 2024, 6 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-560225, mailed on Nov. 15, 2024, 11 pages (5 pages of English Translation and 6 pages of Official Copy).
Office Action received for Japanese Patent Application No. 2023-572748, mailed on Jul. 29, 2024, 4 pages (2 pages of English Translation and 2 pages of Official Copy).
Office Action received for Japanese Patent Application No. 2024-146741, mailed on Nov. 25, 2024, 12 pages (6 pages of English Translation and 6 pages of Official Copy).
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).

(56) References Cited

OTHER PUBLICATIONS

Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Result of Consultation received for European Patent Application No. 22184844.3, mailed on Oct. 9, 2024, 3 pages.
Sharf et al., "SnapPaste:an interactive technique for easy mesh composition", The Visual Computer; International Journal Of Computer Graphics, Springer, Berlin, De, vol. 22, No. 9-11 Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
That Guy who Loves Metv and Ssbb Mods, "Kinect Party Gameplay", Available online at: https://youtu.be/bkbOlzfyLzc?si=QAAKh_V4aqY0iegL, Oct. 20, 2021, 2 pages.
Xbox, "Kinect Tips, Part 3: Gesture Controls", Available online at: https://youtu.be/VXhhE-196qQ?si=gLmHbp9jOm-wOfNW, May 7, 2014, 3 pages.
Office Action received for Chinese Patent Application No. 202410924550.6, mailed on Mar. 1, 2025, 12 pages (5 pages of English Translation and 7 pages of Official Copy).
Corrected Notice of Allowance received for U.S. Appl. No. 17/970,417, mailed on Feb. 20, 2025, 2 pages.
Corrected Notice of Allowance received for U.S. Appl. No. 18/389,655, mailed on Feb. 24, 2025, 2 pages.
Decision to Grant received for Japanese Patent Application No. 2024-173274, mailed on Feb. 10, 2025, 3 pages (1 page of English Translation and 2 pages of Official Copy).
Examiner-Initiated Interview Summary received for U.S. Appl. No. 18/499,848, mailed on Feb. 14, 2025, 3 pages.
Intention to Grant received for European Patent Application No. 22792995.7, mailed on Feb. 17, 2025, 9 pages.
Non-Final Office Action received for U.S. Appl. No. 17/745,680, mailed on Feb. 20, 2025, 28 pages.
Notice of Allowance received for U.S. Appl. No. 17/950,868, mailed on Feb. 12, 2025, 6 pages.
Office Action received for Chinese Patent Application No. 202410030102.1, mailed on Jan. 22, 2025, 14 pages (8 pages of English Translation and 6 pages of Official Copy).
Office Action received for European Patent Application No. 22705232.1, mailed on Feb. 4, 2025, 10 pages.
Office Action received for European Patent Application No. 24160234.1, mailed on Feb. 20, 2025, 3 pages.
Office Action received for Chinese Patent Application No. 202410924556.3, mailed on Feb. 28, 2025, 11 pages (5 pages of English Translation and 6 pages of Official Copy).
Office Action received for Chinese Patent Application No. 202110327012.5, mailed on Feb. 10, 2025, 22 pages (13 pages of English Translation and 9 pages of Official Copy).
Office Action received for European Patent Application No. 22733778.9, mailed on Feb. 20, 2025, 4 pages.
Result of Consultation received for European Patent Application No. 22705232.1, mailed on Mar. 26, 2025, 3 pages.

\* cited by examiner

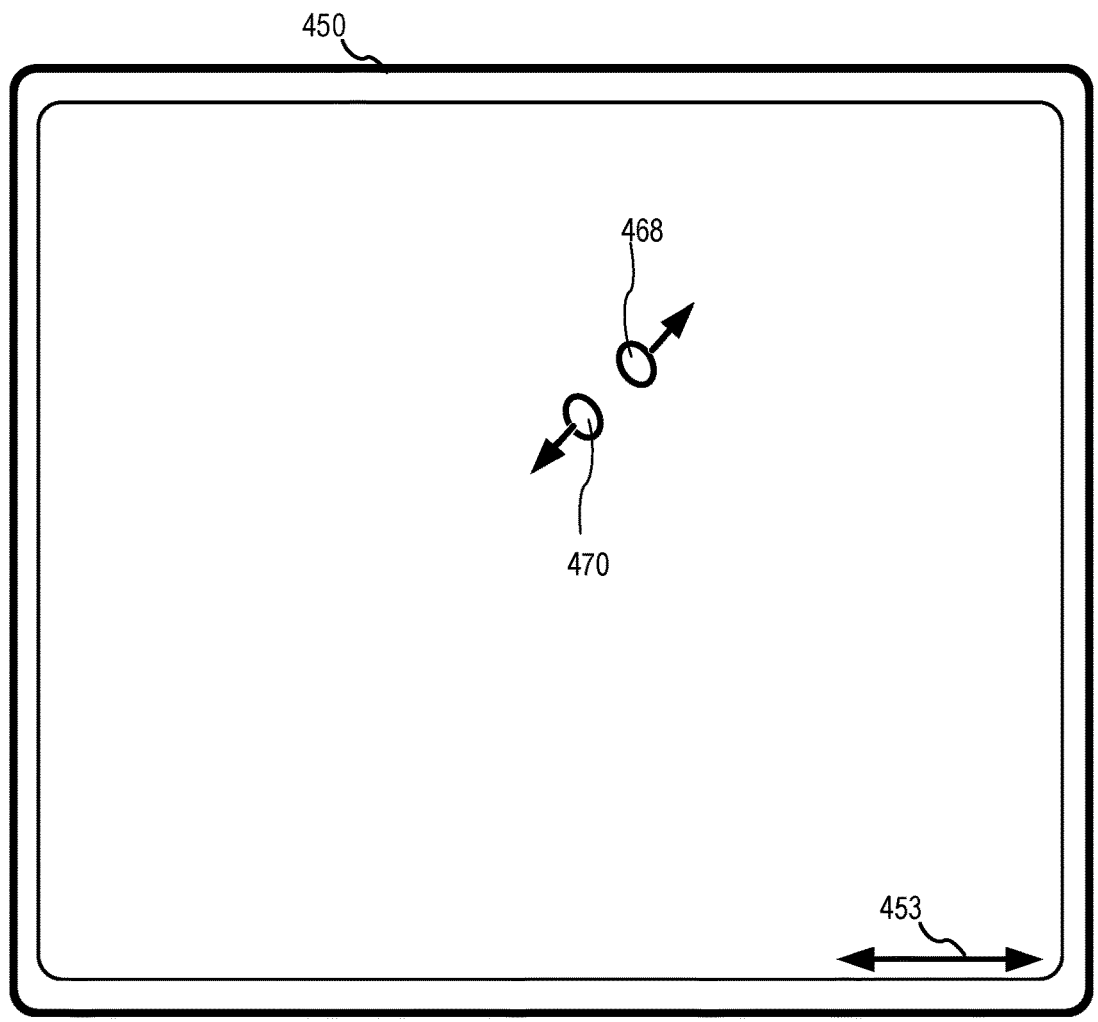
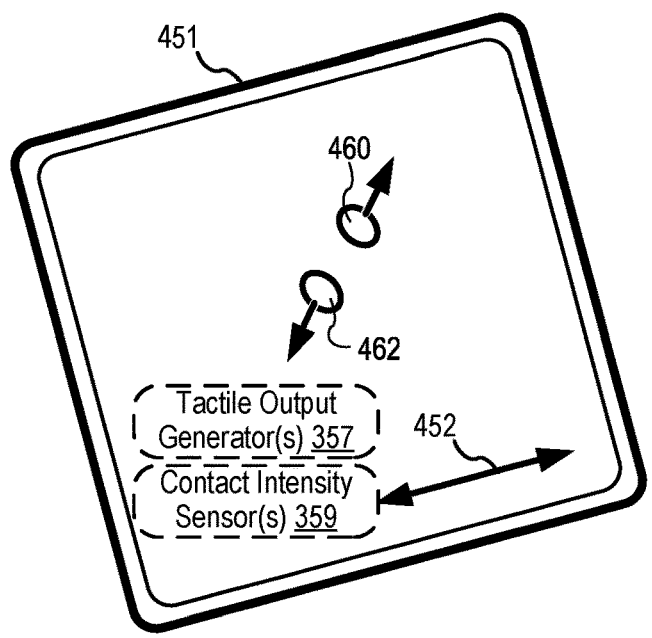
FIG. 4B

700

702
Display a communication request interface that includes:

704
A first selectable graphical user interface object associated with a process for joining a live video communication session.

706
A second selectable graphical user interface object associated with a process for selecting between using a first camera mode for the one or more cameras and using a second camera mode for the one or more cameras during a live video communication session.

708
While displaying the communication request interface, receive a set of one or more inputs that includes a selection of the first selectable graphical user interface object.

710
In response to receiving the set of one or more inputs that includes a selection of the first selectable graphical user interface object, display a live video communication interface for the live video communication session.

712
While displaying the live video communication interface, detect a change in a scene in the field-of-view of the one or more cameras.

714
In response to detecting the change in the scene in the field-of-view of the one or more cameras:

716
In accordance with a determination that the first camera mode is selected for use, adjust a representation of the field-of-view of the one or more cameras during the live video communication session based on the detected change in the scene in the field-of-view of the one or more cameras.

718
In accordance with a determination that the second camera mode is selected for use, forgo adjusting a representation of the field-of-view of the one or more cameras during the live video communication session.

902
Display a live video communication interface for a live video communication session, the live video communication interface including concurrently displaying:

904
A representation of one or more participants in the live video communication session other than participants visible via the one or more cameras.

906
A representation of a field-of-view of the one or more cameras that is visually associated with a visual indication of an option to change the representation of the field-of-view of the one or more cameras during the live video communication session.

908
While displaying the live video communication interface for the live video communication session, detect a set of one or more inputs that corresponds to a request to initiate a process for adjusting the representation of the field-of-view of the one or more cameras during the live video communication session.

910
In response to detecting the set of one or more inputs, initiate the process for adjusting the representation of the field-of-view of the one or more cameras during the live video communication session.

*FIG. 9*

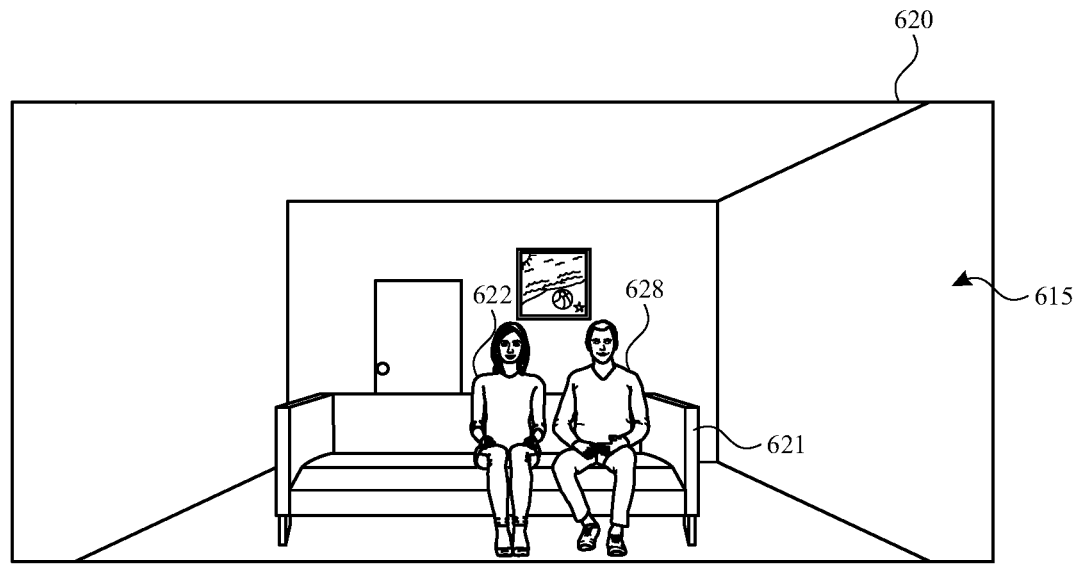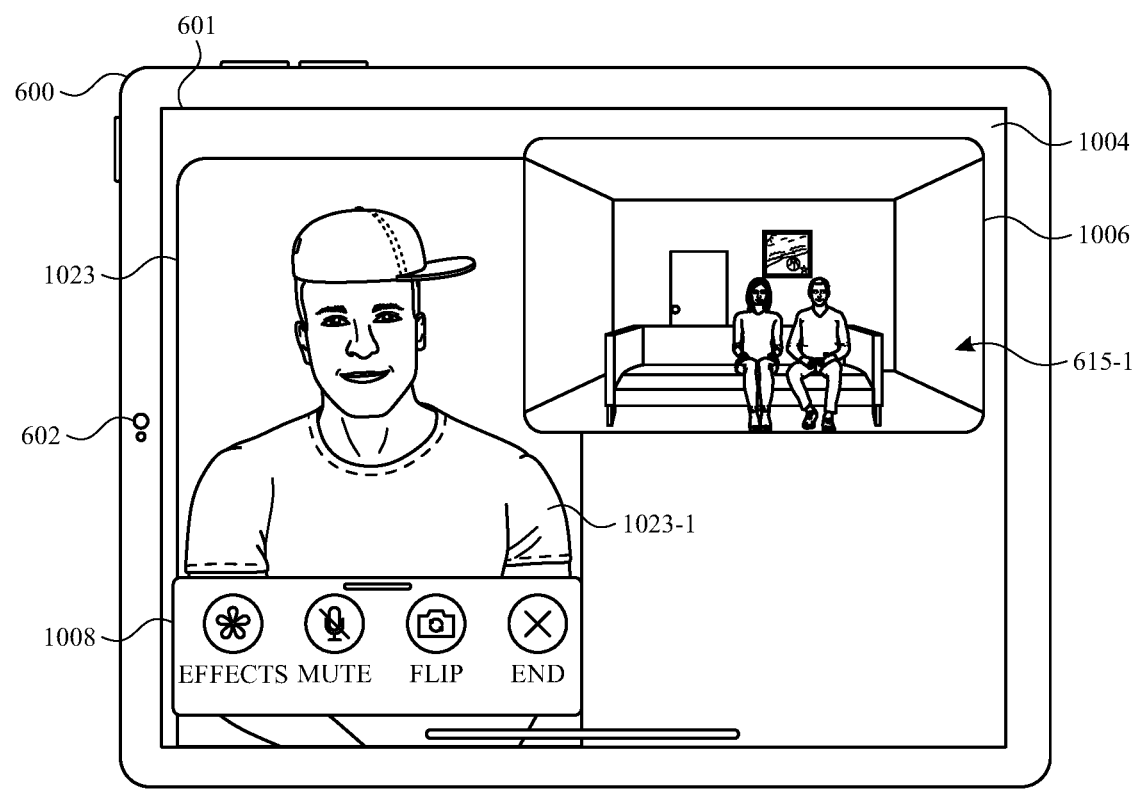
FIG. 10A

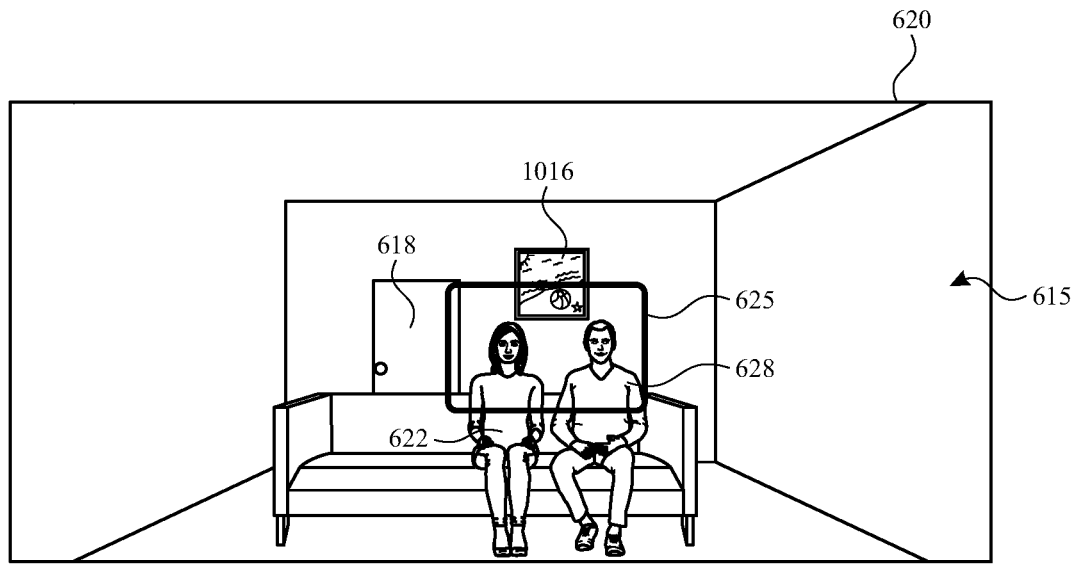
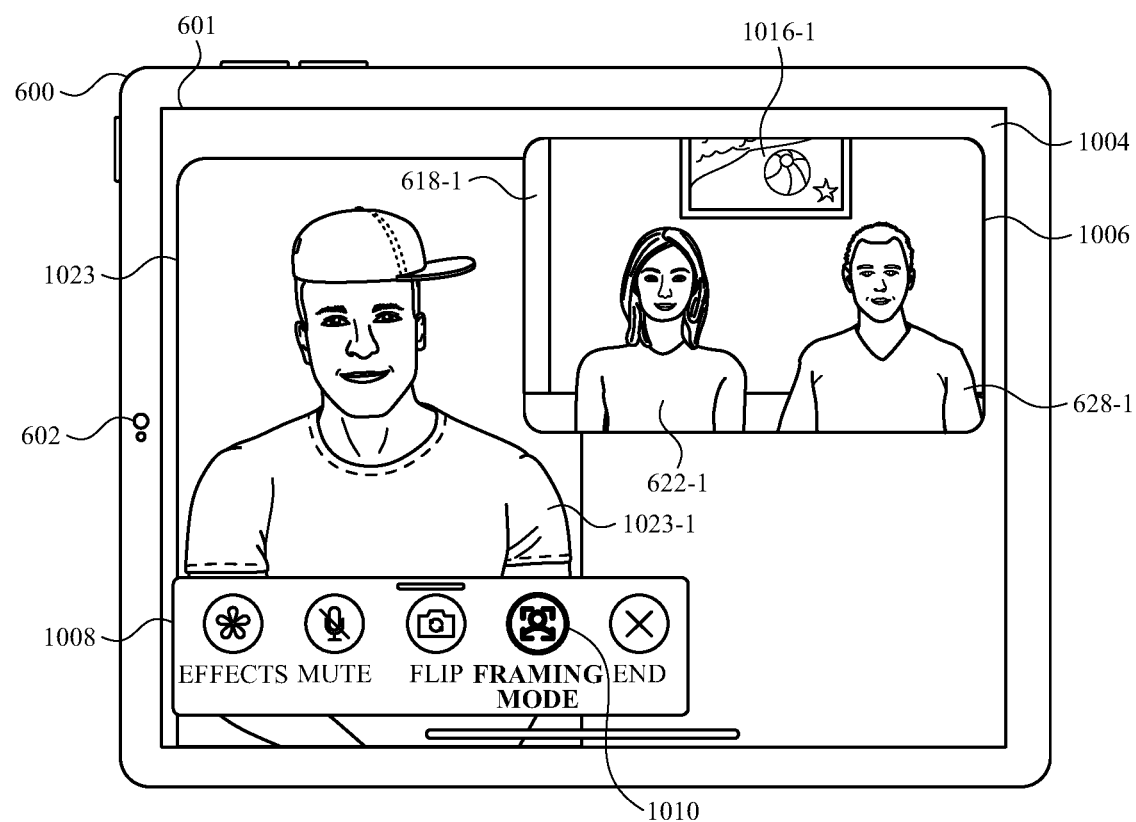
FIG. 10B

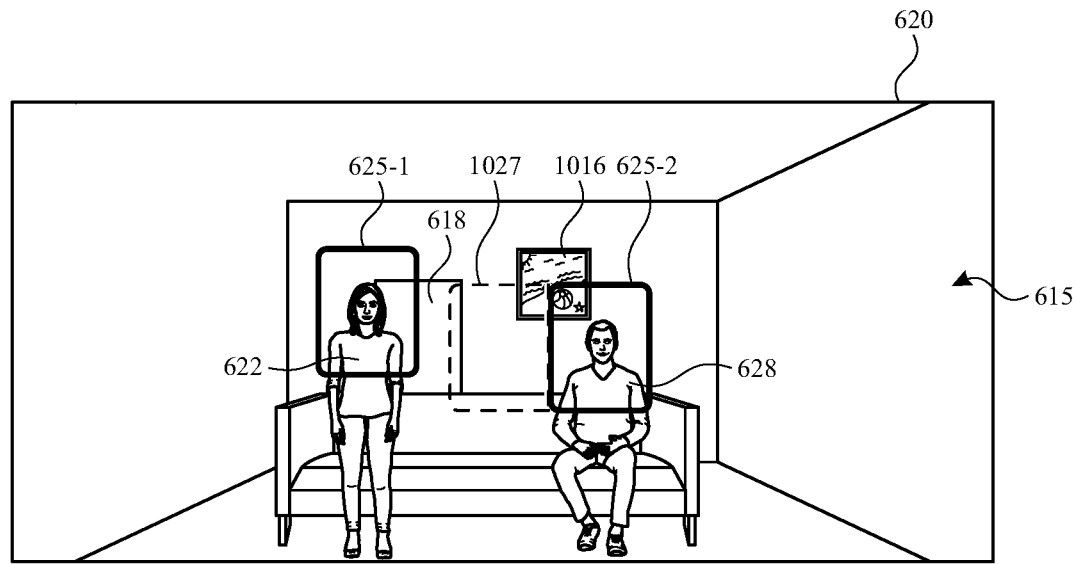
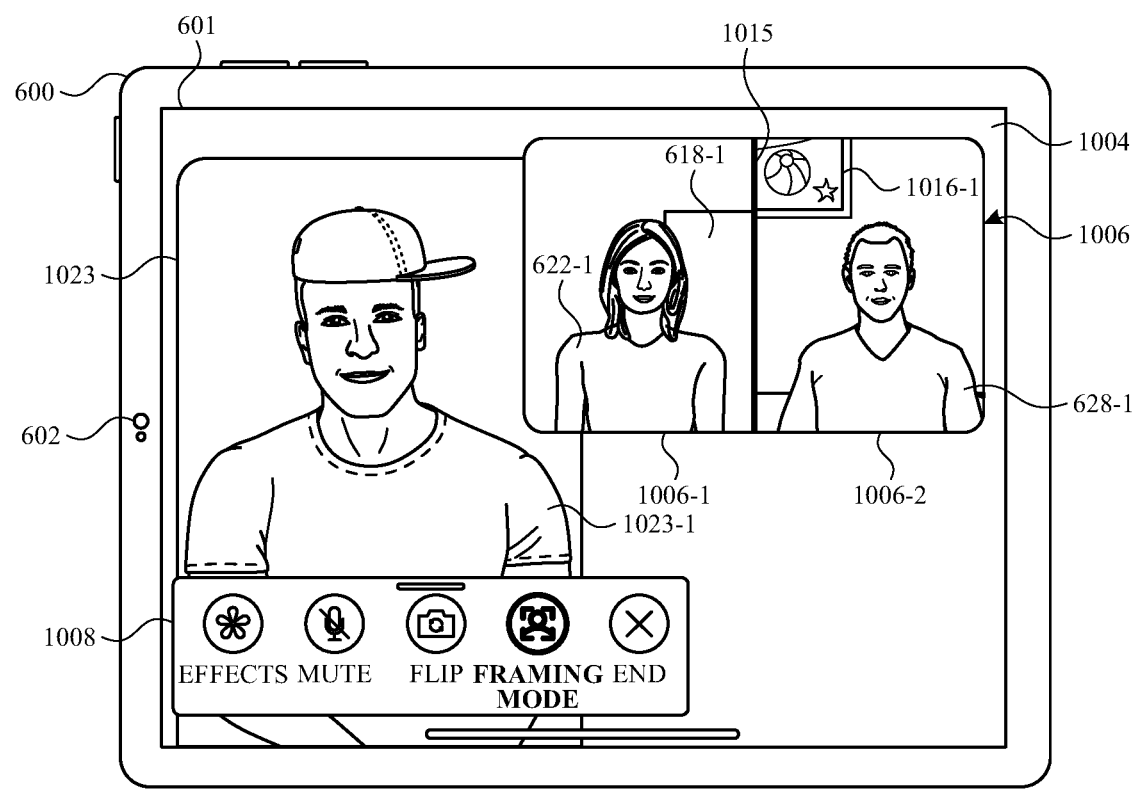
FIG. 10C

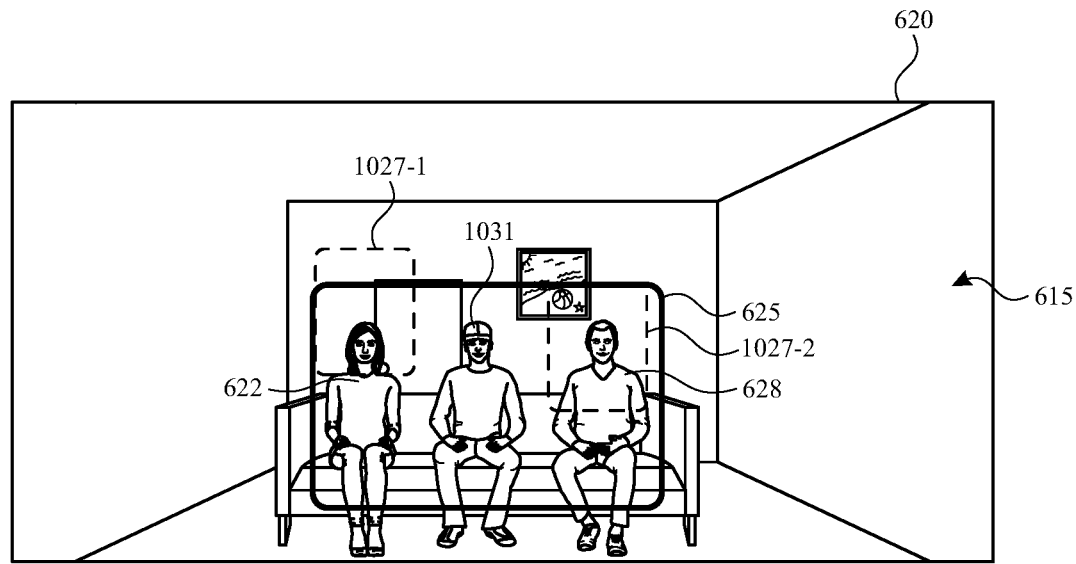
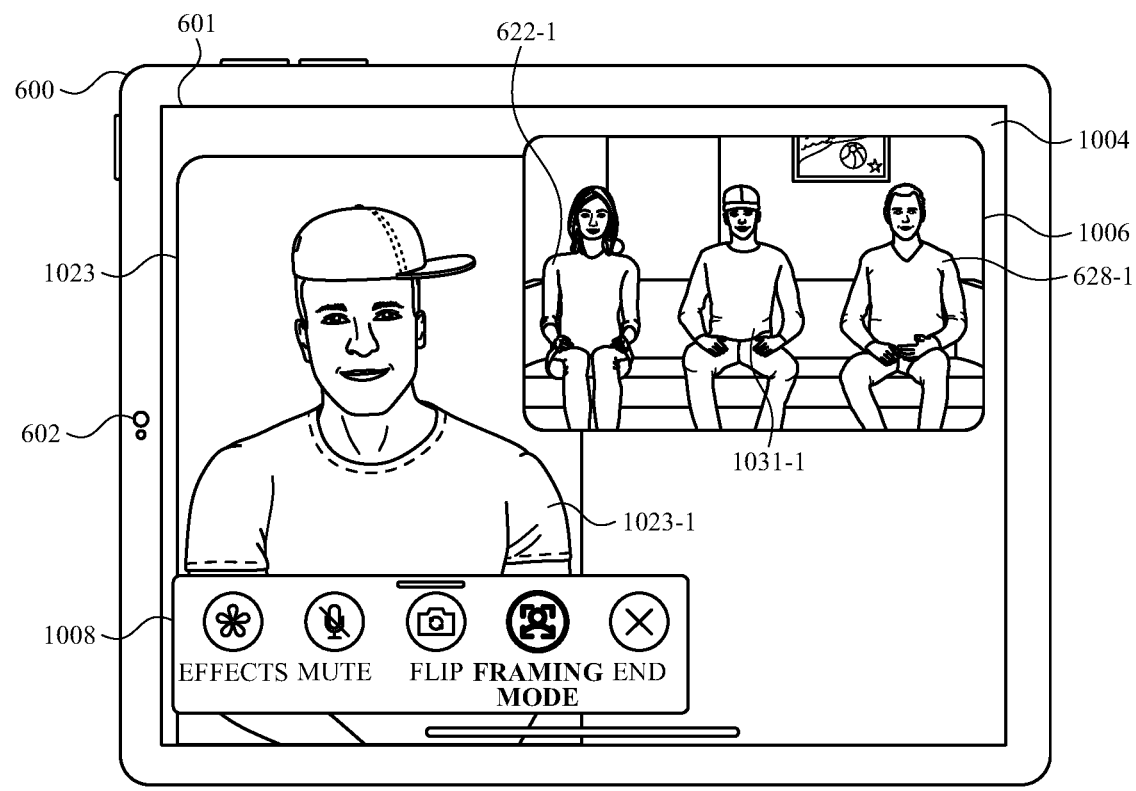
FIG. 10D

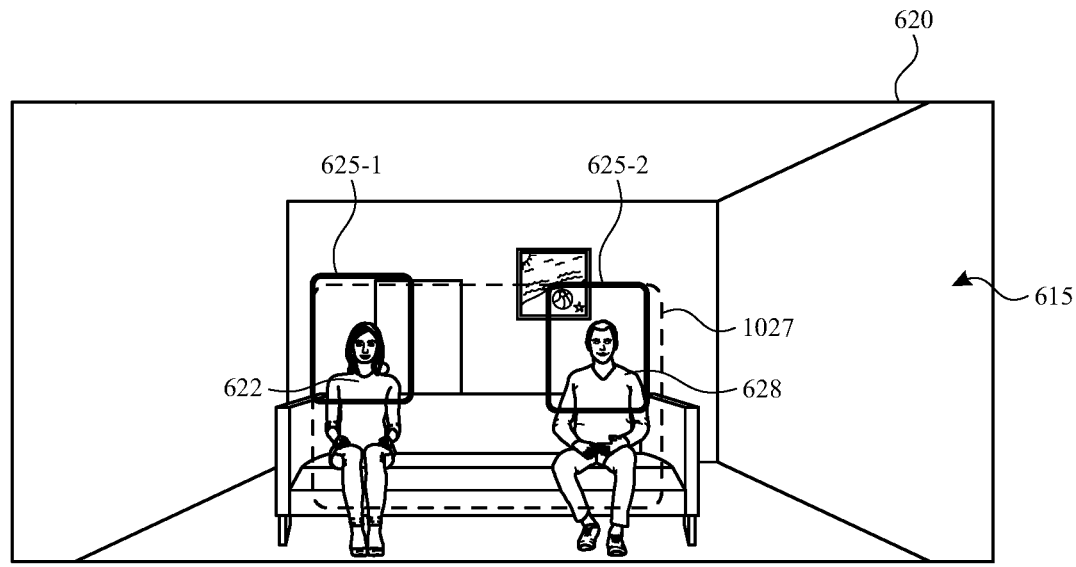
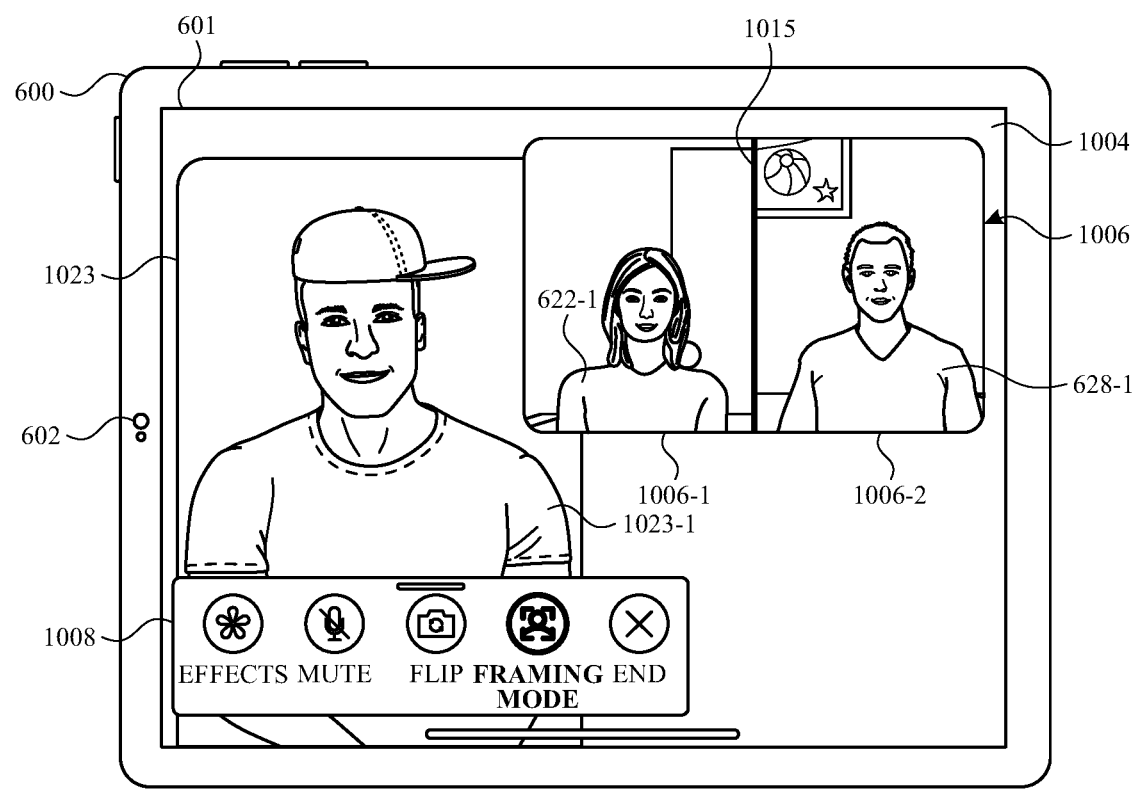
FIG. 10E

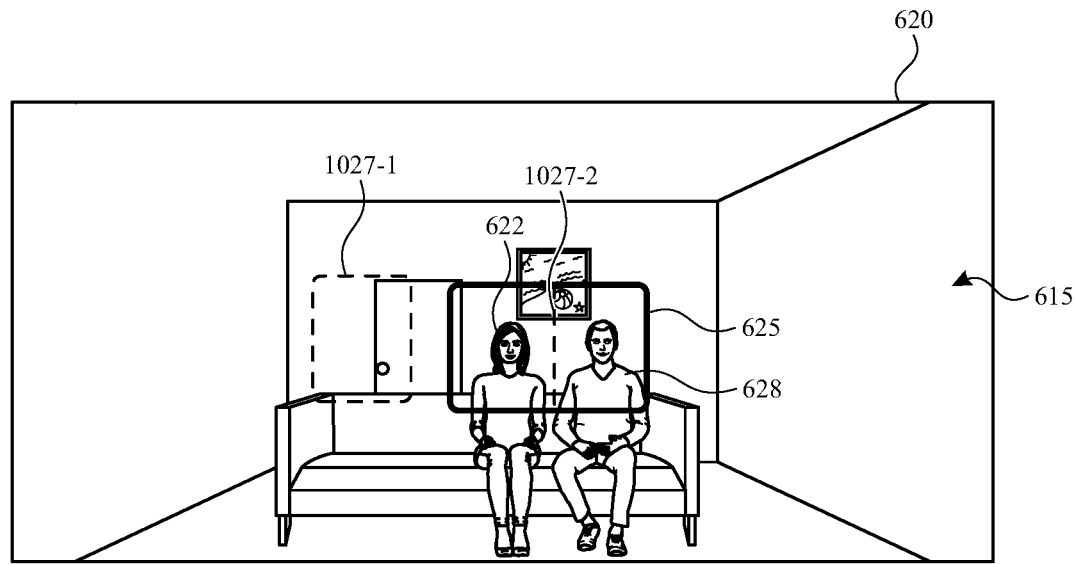
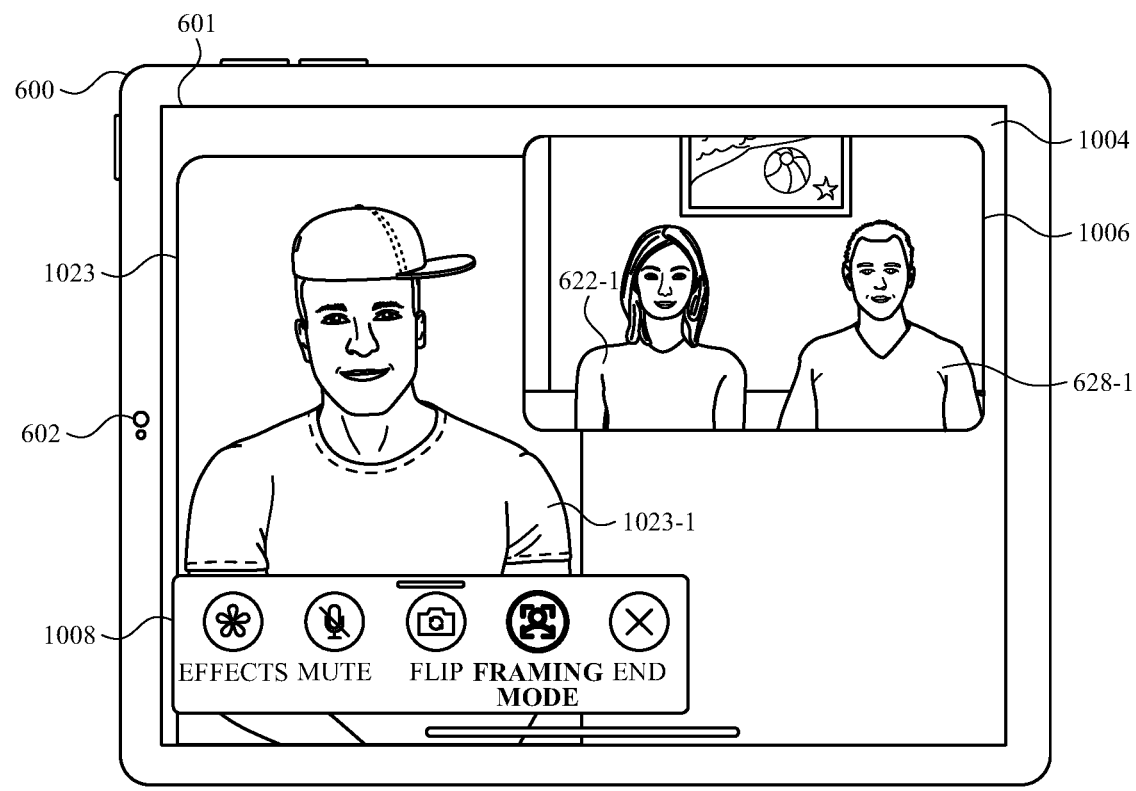
FIG. 10F

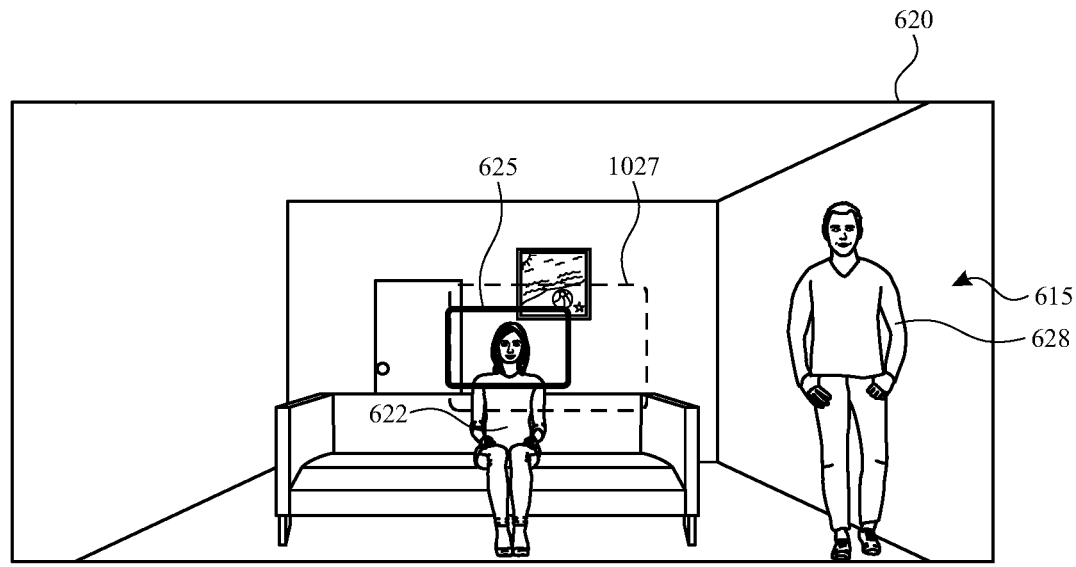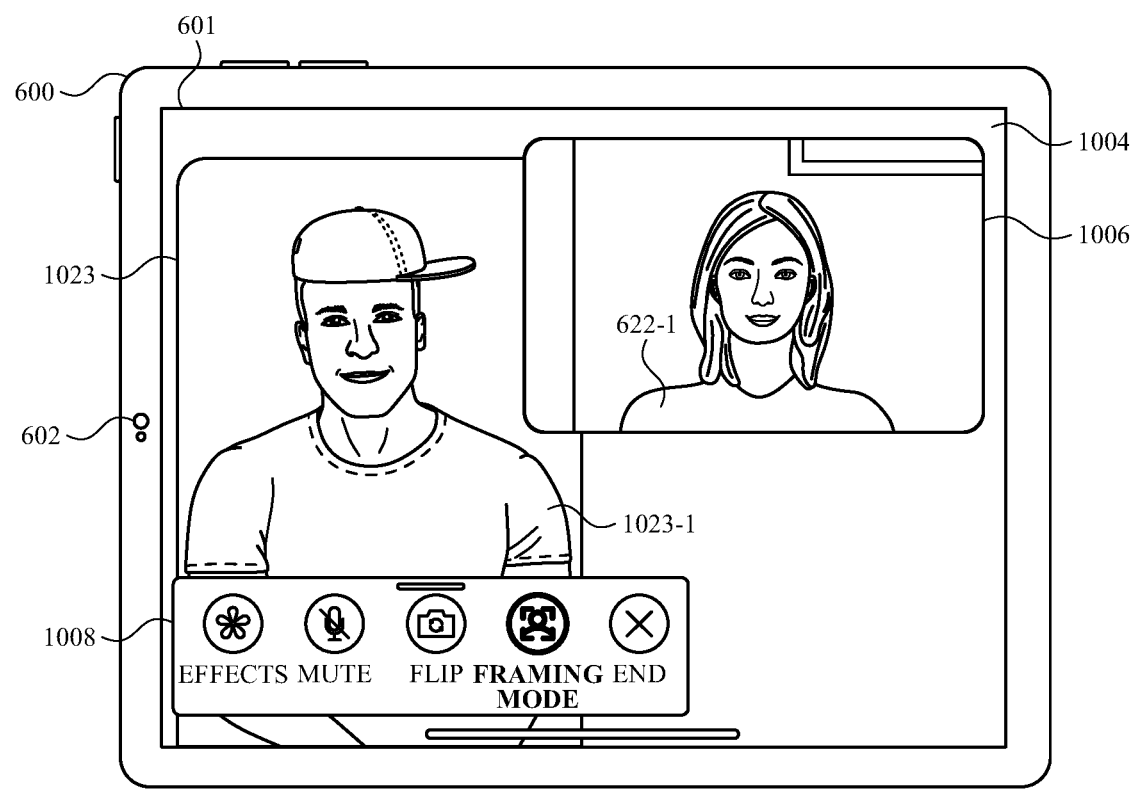
FIG. 10G

1100 ↘

1102
Display a live video communication interface for a live video communication session, the live video communication interface including one or more representations of a field-of-view of the one or more cameras.

1104
While the live video communication session is active, capture image data for the live video communication session.

1106
In accordance with a determination, based on the image data for the live video communication session captured via the one or more cameras, that an amount of separation between a first participant and a second participant meets separation criteria, concurrently display:

1108
A representation of a first portion of the field-of-view of the one or more cameras at a first region of the live video communication interface.

1110
A representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras.

1112
In accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

1302
Detect, via the one or more input devices, a request to display a system interface.

1304
In response to detecting the request to display the system interface, displaying, via one or more output components, the system interface that includes a plurality of concurrently displayed controls for controlling different system functions of the computer system, including:

1306
In accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions.

1308
In accordance with a determination that a media communication session has not been active within the predetermined amount of time, the plurality of concurrently displayed controls are displayed without the set of one or more media communication controls.

1310
While displaying the system interface having the set of one or more media communication controls, detect, via the one or more input devices, a set of one or more inputs including an input directed to the set of one or more media communication controls.

1312
In response to detecting the set of one or more inputs including the input directed to the set of one or more media communication controls when a respective media communication session has been active within the predetermined amount of time, adjust the media communication settings for the respective media communication session.

1402
Display, via one or more output generation components, a live video communication interface for a live video communication session, wherein displaying the live video communication interface includes concurrently displaying:

1404
A representation of a field-of-view of one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session.

1406
A representation of one or more participants in the live video communication session that is different from the representation of the field-of-view of the one or more cameras of the computer system.

1408
While displaying the live video communication interface for the live video communication session, detect, via the one or more input devices, a set of one or more inputs that corresponds to a request to change an appearance of a portion of the representation of the field-of-view of the one or more cameras other than a subject that is displayed in the representation of the field-of-view of the one or more cameras.

1410
In response to detecting the set of one or more inputs, change the appearance of the portion of the representation of the field-of-view of the one or more cameras other than a subject that is displayed in the representation of the field-of-view of the one or more cameras.

*FIG. 14*

USER INTERFACES FOR WIDE ANGLE VIDEO CONFERENCE

CROSS-REFERENCE TO RELATED APPLICATIONS

This application is a continuation of U.S. patent application Ser. No. 17/482,977, entitled "USER INTERFACES FOR WIDE ANGLE VIDEO CONFERENCE", filed Sep. 23, 2021, which claims priority to U.S. Provisional Patent Application No. 63/176,811, entitled "USER INTERFACES FOR WIDE ANGLE VIDEO CONFERENCE," filed Apr. 19, 2021, and U.S. Provisional Patent Application No. 63/143,881, entitled "USER INTERFACES FOR WIDE ANGLE VIDEO CONFERENCE," filed Jan. 31, 2021, the contents of each of which are hereby incorporated by reference in their entireties for all purposes.

FIELD

The present disclosure relates generally to computer user interfaces, and more specifically to techniques for managing a live video communication session.

BACKGROUND

Computer systems can include hardware and/or software for displaying an interface for a live video communication session.

BRIEF SUMMARY

Some techniques for managing a live video communication session using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing a live video communication session. Such methods and interfaces optionally complement or replace other methods for managing a live video communication session. Such methods and interfaces reduce the cognitive burden on a user and produce a more efficient human-machine interface. For battery-operated computing devices, such methods and interfaces conserve power and increase the time between battery charges.

Example methods are described herein. An example method includes, at a computer system that is in communication with a display generation component, one or more cameras, and one or more input devices: displaying, via the display generation component, a communication request interface that includes: a first selectable graphical user interface object associated with a process for joining a live video communication session; and a second selectable graphical user interface object associated with a process for selecting between using a first camera mode for the one or more cameras and using a second camera mode for the one or more cameras during a live video communication session; while displaying the communication request interface, receiving, via the one or more input devices, a set of one or more inputs that includes a selection of the first selectable graphical user interface object; in response to receiving the set of one or more inputs that includes a selection of the first selectable graphical user interface object, displaying, via the display generation component, a live video communication interface for the live video communication session; while displaying the live video communication interface, detecting a change in a scene in the field-of-view of the one or more cameras; and in response to detecting the change in the scene in the field-of-view of the one or more cameras: in accordance with a determination that the first camera mode is selected for use, adjusting a representation of the field-of-view of the one or more cameras during the live video communication session based on the detected change in the scene in the field-of-view of the one or more cameras; and in accordance with a determination that the second camera mode is selected for use, forgoing adjusting a representation of the field-of-view of the one or more cameras during the live video communication session.

Example non-transitory computer-readable storage media are described herein. An example non-transitory computer-readable storage medium stores one or more programs configured to be executed by one or more processors of a computer system that is in communication with a display generation component, one or more cameras, and one or more input devices. The one or more programs include instructions for: displaying, via the display generation component, a communication request interface that includes: a first selectable graphical user interface object associated with a process for joining a live video communication session; and a second selectable graphical user interface object associated with a process for selecting between using a first camera mode for the one or more cameras and using a second camera mode for the one or more cameras during a live video communication session; while displaying the communication request interface, receiving, via the one or more input devices, a set of one or more inputs that includes a selection of the first selectable graphical user interface object; in response to receiving the set of one or more inputs that includes a selection of the first selectable graphical user interface object, displaying, via the display generation component, a live video communication interface for the live video communication session; while displaying the live video communication interface, detecting a change in a scene in the field-of-view of the one or more cameras; and in response to detecting the change in the scene in the field-of-view of the one or more cameras: in accordance with a determination that the first camera mode is selected for use, adjusting a representation of the field-of-view of the one or more cameras during the live video communication session based on the detected change in the scene in the field-of-view of the one or more cameras; and in accordance with a determination that the second camera mode is selected for use, forgoing adjusting a representation of the field-of-view of the one or more cameras during the live video communication session.

Example transitory computer-readable storage media are described herein. An example non-transitory computer-readable storage medium stores one or more programs configured to be executed by one or more processors of a computer system that is in communication with a display generation component, one or more cameras, and one or more input devices. The one or more programs include instructions for: displaying, via the display generation component, a communication request interface that includes: a first selectable graphical user interface object associated with a process for joining a live video communication session; and a second selectable graphical user interface object associated with a process for selecting between using a first camera mode for the one or more cameras and using a second camera mode for the one or more cameras during a live video communication session; while displaying the communication request interface, receiving, via the one or more input devices, a set of one or more inputs that includes a selection of the first selectable graphical user interface object; in response to receiving the set of one or more inputs that includes a selection of the first selectable graphical user interface object, displaying, via the display generation component, a live video communication interface for the live video communication session; while displaying the live video communication interface, detecting a change in a scene in the field-of-view of the one or more cameras; and in response to detecting the change in the scene in the field-of-view of the one or more cameras: in accordance with a determination that the first camera mode is selected for use, adjusting a representation of the field-of-view of the one or more cameras during the live video communication session based on the detected change in the scene in the field-of-view of the one or more cameras; and in accordance with a determination that the second camera mode is selected for use, forgoing adjusting a representation of the field-of-view of the one or more cameras during the live video communication session.

Example computer systems are described herein. An example computer system includes: a display generation component; one or more cameras; one or more input devices; one or more processors; and memory storying one or more programs configured to be executed by the one or more processors. The one or more programs include instructions for: displaying, via the display generation component, a communication request interface that includes: a first selectable graphical user interface object associated with a process for joining a live video communication session; and a second selectable graphical user interface object associated with a process for selecting between using a first camera mode for the one or more cameras and using a second camera mode for the one or more cameras during a live video communication session; while displaying the communication request interface, receiving, via the one or more input devices, a set of one or more inputs that includes a selection of the first selectable graphical user interface object; in response to receiving the set of one or more inputs that includes a selection of the first selectable graphical user interface object, displaying, via the display generation component, a live video communication interface for the live video communication session; while displaying the live video communication interface, detecting a change in a scene in the field-of-view of the one or more cameras; and in response to detecting the change in the scene in the field-of-view of the one or more cameras: in accordance with a determination that the first camera mode is selected for use, adjusting a representation of the field-of-view of the one or more cameras during the live video communication session based on the detected change in the scene in the field-of-view of the one or more cameras; and in accordance with a determination that the second camera mode is selected for use, forgoing adjusting a representation of the field-of-view of the one or more cameras during the live video communication session.

An example computer system includes: a display generation component; one or more cameras; one or more input devices; means for displaying, via the display generation component, a communication request interface that includes: a first selectable graphical user interface object associated with a process for joining a live video communication session; and a second selectable graphical user interface object associated with a process for selecting between using a first camera mode for the one or more cameras and using a second camera mode for the one or more cameras during a live video communication session; means for, while displaying the communication request interface, receiving, via the one or more input devices, a set of one or more inputs that includes a selection of the first selectable graphical user interface object; means for, in response to receiving the set of one or more inputs that includes a selection of the first selectable graphical user interface object, displaying, via the display generation component, a live video communication interface for the live video communication session; means for, while displaying the live video communication interface, detecting a change in a scene in the field-of-view of the one or more cameras; and means for in response to detecting the change in the scene in the field-of-view of the one or more cameras: in accordance with a determination that the first camera mode is selected for use, adjusting a representation of the field-of-view of the one or more cameras during the live video communication session based on the detected change in the scene in the field-of-view of the one or more cameras; and in accordance with a determination that the second camera mode is selected for use, forgoing adjusting a representation of the field-of-view of the one or more cameras during the live video communication session.

An example method includes, at a computer system that is in communication with a display generation component, one or more cameras, and one or more input devices: displaying, via the display generation component, a live video communication interface for a live video communication session, the live video communication interface including concurrently displaying: a representation of one or more participants in the live video communication session other than participants visible via the one or more cameras; and a representation of a field-of-view of the one or more cameras that is visually associated with a visual indication of an option to change the representation of the field-of-view of the one or cameras during the live video communication session; and while displaying the live video communication interface for the live video communication session, detecting, via the one or more input devices, a set of one or more inputs that corresponds to a request to initiate a process for adjusting the representation of the field-of-view of the one or more cameras during the live video communication session; and in response to detecting the set of one or more inputs, initiating the process for adjusting the representation of the field-of-view of the one or more cameras during the live video communication session.

An example non-transitory computer-readable storage medium stores one or more programs configured to be executed by one or more processors of a computer system that is in communication with a display generation component, one or more cameras, and one or more input devices. The one or more programs include instructions for: displaying, via the display generation component, a live video communication interface for a live video communication session, the live video communication interface including concurrently displaying: a representation of one or more participants in the live video communication session other than participants visible via the one or more cameras; and a representation of a field-of-view of the one or more cameras that is visually associated with a visual indication of an option to change the representation of the field-of-view of the one or cameras during the live video communication session; and while displaying the live video communication interface for the live video communication session, detecting, via the one or more input devices, a set of one or more inputs that corresponds to a request to initiate a process for adjusting the representation of the field-of-view of the one or more cameras during the live video communication session; and in response to detecting the set of one or more inputs, initiating the process for adjusting the representation of the field-of-view of the one or more cameras during the live video communication session.

An example transitory computer-readable storage medium stores one or more programs configured to be executed by one or more processors of a computer system that is in communication with a display generation component, one or more cameras, and one or more input devices. The one or more programs include instructions for: displaying, via the display generation component, a live video communication interface for a live video communication session, the live video communication interface including concurrently displaying: a representation of one or more participants in the live video communication session other than participants visible via the one or more cameras; and a representation of a field-of-view of the one or more cameras that is visually associated with a visual indication of an option to change the representation of the field-of-view of the one or cameras during the live video communication session; and while displaying the live video communication interface for the live video communication session, detecting, via the one or more input devices, a set of one or more inputs that corresponds to a request to initiate a process for adjusting the representation of the field-of-view of the one or more cameras during the live video communication session; and in response to detecting the set of one or more inputs, initiating the process for adjusting the representation of the field-of-view of the one or more cameras during the live video communication session.

An example computer system includes: a display generation component; one or more cameras; one or more input devices; one or more processors; and memory storying one or more programs configured to be executed by the one or more processors. The one or more programs include instructions for: displaying, via the display generation component, a live video communication interface for a live video communication session, the live video communication interface including concurrently displaying: a representation of one or more participants in the live video communication session other than participants visible via the one or more cameras; and a representation of a field-of-view of the one or more cameras that is visually associated with a visual indication of an option to change the representation of the field-of-view of the one or cameras during the live video communication session; and while displaying the live video communication interface for the live video communication session, detecting, via the one or more input devices, a set of one or more inputs that corresponds to a request to initiate a process for adjusting the representation of the field-of-view of the one or more cameras during the live video communication session; and in response to detecting the set of one or more inputs, initiating the process for adjusting the representation of the field-of-view of the one or more cameras during the live video communication session.

An example computer system includes: a display generation component; one or more cameras; one or more input devices; means for displaying, via the display generation component, a live video communication interface for a live video communication session, the live video communication interface including concurrently displaying: a representation of one or more participants in the live video communication session other than participants visible via the one or more cameras; and a representation of a field-of-view of the one or more cameras that is visually associated with a visual indication of an option to change the representation of the field-of-view of the one or cameras during the live video communication session; and means for, while displaying the live video communication interface for the live video communication session, detecting, via the one or more input devices, a set of one or more inputs that corresponds to a request to initiate a process for adjusting the representation of the field-of-view of the one or more cameras during the live video communication session; and means for, in response to detecting the set of one or more inputs, initiating the process for adjusting the representation of the field-of-view of the one or more cameras during the live video communication session.

An example method includes, at a computer system that is in communication with a display generation component and one or more cameras: displaying, via the display generation component, a live video communication interface for a live video communication session, the live video communication interface including one or more representations of a field-of-view of the one or more cameras; while the live video communication session is active, capturing, via the one or more cameras, image data for the live video communication session; in accordance with a determination, based on the image data for the live video communication session captured via the one or more cameras, that an amount of separation between a first participant and a second participant meets separation criteria, concurrently displaying, via the display generation component: a representation of a first portion of the field-of-view of the one or more cameras at a first region of the live video communication interface; and a representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras; and in accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

An example non-transitory computer-readable storage medium stores one or more programs configured to be executed by one or more processors of a computer system that is in communication with a display generation component and one or more cameras. The one or more programs include instructions for: displaying, via the display generation component, a live video communication interface for a live video communication session, the live video communication interface including one or more representations of a field-of-view of the one or more cameras; while the live video communication session is active, capturing, via the one or more cameras, image data for the live video communication session; in accordance with a determination, based on the image data for the live video communication session captured via the one or more cameras, that an amount of separation between a first participant and a second participant meets separation criteria, concurrently displaying, via the display generation component: a representation of a first portion of the field-of-view of the one or more cameras at a first region of the live video communication interface; and a representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras; and in accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

An example transitory computer-readable storage medium stores one or more programs configured to be executed by one or more processors of a computer system that is in communication with a display generation component and one or more cameras. The one or more programs include instructions for: displaying, via the display generation component, a live video communication interface for a live video communication session, the live video communication interface including one or more representations of a field-of-view of the one or more cameras; while the live video communication session is active, capturing, via the one or more cameras, image data for the live video communication session; in accordance with a determination, based on the image data for the live video communication session captured via the one or more cameras, that an amount of separation between a first participant and a second participant meets separation criteria, concurrently displaying, via the display generation component: a representation of a first portion of the field-of-view of the one or more cameras at a first region of the live video communication interface; and a representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras; and in accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

An example computer system includes: a display generation component; one or more cameras; one or more processors; and memory storying one or more programs configured to be executed by the one or more processors. The one or more programs include instructions for: displaying, via the display generation component, a live video communication interface for a live video communication session, the live video communication interface including one or more representations of a field-of-view of the one or more cameras; while the live video communication session is active, capturing, via the one or more cameras, image data for the live video communication session; in accordance with a determination, based on the image data for the live video communication session captured via the one or more cameras, that an amount of separation between a first participant and a second participant meets separation criteria, concurrently displaying, via the display generation component: a representation of a first portion of the field-of-view of the one or more cameras at a first region of the live video communication interface; and a representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras; and in accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

An example computer system includes: a display generation component; one or more cameras; means for displaying, via the display generation component, a live video communication interface for a live video communication session, the live video communication interface including one or more representations of a field-of-view of the one or more cameras; means for, while the live video communication session is active, capturing, via the one or more cameras, image data for the live video communication session; means for, in accordance with a determination, based on the image data for the live video communication session captured via the one or more cameras, that an amount of separation between a first participant and a second participant meets separation criteria, concurrently displaying, via the display generation component: a representation of a first portion of the field-of-view of the one or more cameras at a first region of the live video communication interface; and a representation of a second portion of the field-of-view of the one or more cameras at a second region of the live video communication interface that is distinct from the first region, wherein the representation of the first portion of the field-of-view of the one or more cameras and the representation of the second portion of the field-of-view of the one or more cameras are displayed without displaying a representation of a third portion of the field-of-view of the one or more cameras that is in between the first portion of the field-of-view of the one or more cameras and the second portion of the field-of-view of the one or more cameras; and means for, in accordance with a determination, based on the image data for the live video communication session captured via the one or more cameras, that the amount of separation between the first participant and the second participant does not meet the separation criteria, displaying, via the display generation component, a representation of a fourth portion of the field-of-view of the one or more cameras that includes the first participant and the second participant while maintaining display of a portion of the field-of-view of the one or more cameras that is in between the first participant and the second participant.

In accordance with some embodiments, a method performed at a computer system that is in communication with one or more output generation components and one or more input devices is described. The method comprises: detecting, via the one or more input devices, a request to display a system interface; in response to detecting the request to display the system interface, displaying, via the one or more output generation components, the system interface that includes a plurality of concurrently displayed controls for controlling different system functions of the computer system, including: in accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions; and in accordance with a determination that a media communication session has not been active within the predetermined amount of time, the plurality of concurrently displayed controls are displayed without the set of one or more media communication controls; while displaying the system interface having the set of one or more media communication controls, detecting, via the one or more input devices, a set of one or more inputs including an input directed to the set of one or more media communication controls; and in response to detecting the set of one or more inputs including the input directed to the set of one or more media communication controls when a respective media communication session has been active within the predetermined amount of time, adjusting the media communication settings for the respective media communication session.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: detecting, via the one or more input devices, a request to display a system interface; in response to detecting the request to display the system interface, displaying, via the one or more output generation components, the system interface that includes a plurality of concurrently displayed controls for controlling different system functions of the computer system, including: in accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions; and in accordance with a determination that a media communication session has not been active within the predetermined amount of time, the plurality of concurrently displayed controls are displayed without the set of one or more media communication controls; while displaying the system interface having the set of one or more media communication controls, detecting, via the one or more input devices, a set of one or more inputs including an input directed to the set of one or more media communication controls; and in response to detecting the set of one or more inputs including the input directed to the set of one or more media communication controls when a respective media communication session has been active within the predetermined amount of time, adjusting the media communication settings for the respective media communication session.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: detecting, via the one or more input devices, a request to display a system interface; in response to detecting the request to display the system interface, displaying, via the one or more output generation components, the system interface that includes a plurality of concurrently displayed controls for controlling different system functions of the computer system, including: in accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions; and in accordance with a determination that a media communication session has not been active within the predetermined amount of time, the plurality of concurrently displayed controls are displayed without the set of one or more media communication controls; while displaying the system interface having the set of one or more media communication controls, detecting, via the one or more input devices, a set of one or more inputs including an input directed to the set of one or more media communication controls; and in response to detecting the set of one or more inputs including the input directed to the set of one or more media communication controls when a respective media communication session has been active within the predetermined amount of time, adjusting the media communication settings for the respective media communication session.

In accordance with some embodiments, a computer system is described. The computer system comprises: one or more output generation components; one or more input devices; one or more processors; and memory storing one or more programs configured to be executed by the one or more processors, the one or more programs including instructions for: detecting, via the one or more input devices, a request to display a system interface; in response to detecting the request to display the system interface, displaying, via the one or more output generation components, the system interface that includes a plurality of concurrently displayed controls for controlling different system functions of the computer system, including: in accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions; and in accordance with a determination that a media communication session has not been active within the predetermined amount of time, the plurality of concurrently displayed controls are displayed without the set of one or more media communication controls; while displaying the system interface having the set of one or more media communication controls, detecting, via the one or more input devices, a set of one or more inputs including an input directed to the set of one or more media communication controls; and in response to detecting the set of one or more inputs including the input directed to the set of one or more media communication controls when a respective media communication session has been active within the predetermined amount of time, adjusting the media communication settings for the respective media communication session.

In accordance with some embodiments, a computer system is described. The computer system comprises: one or more output generation components; one or more input components; means for detecting, via the one or more input devices, a request to display a system interface; means, responsive to detecting the request to display the system interface, for displaying, via the one or more output generation components, the system interface that includes a plurality of concurrently displayed controls for controlling different system functions of the computer system, including: in accordance with a determination that a media communication session has been active within a predetermined amount of time, the plurality of concurrently displayed controls includes a set of one or more media communication controls, wherein the media communication controls provide access to media communication settings that determine how media is handled by the computer system during media communication sessions; and in accordance with a determination that a media communication session has not been active within the predetermined amount of time, the plurality of concurrently displayed controls are displayed without the set of one or more media communication controls; means, while displaying the system interface having the set of one or more media communication controls, for detecting, via the one or more input devices, a set of one or more inputs including an input directed to the set of one or more media communication controls; and means, responsive to detecting the set of one or more inputs including the input directed to the set of one or more media communication controls when a respective media communication session has been active within the predetermined amount of time, for adjusting the media communication settings for the respective media communication session.

In accordance with some embodiments, a method performed at a computer system that is in communication with one or more output generation components, one or more cameras, and one or more input devices is described. The method comprises: displaying, via the one or more output generation components, a live video communication interface for a live video communication session, wherein displaying the live video communication interface includes concurrently displaying: a representation of a field-of-view of the one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session; and a representation of one or more participants in the live video communication session that is different from the representation of the field-of-view of the one or more cameras of the computer system; and while displaying the live video communication interface for the live video communication session, detecting, via the one or more input devices, a set of one or more inputs that corresponds to a request to change an appearance of a portion of the representation of the field-of-view of the one or more cameras other than a subject that is displayed in the representation of the field-of-view of the one or more cameras; and in response to detecting the set of one or more inputs, changing the appearance of the portion of the representation of the field-of-view of the one or more cameras other than a subject that is displayed in the representation of the field-of-view of the one or more cameras.

In accordance with some embodiments, a non-transitory computer-readable storage medium is described. The non-transitory computer-readable storage medium stores one or more programs configured to be executed by one or more processors of a computer system that is in communication with one or more output generation components, one or more cameras, and one or more input devices, the one or more programs including instructions for: displaying, via the one or more output generation components, a live video communication interface for a live video communication session, wherein displaying the live video communication interface includes concurrently displaying: a representation of a field-of-view of the one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session; and a representation of one or more participants in the live video communication session that is different from the representation of the field-of-view of the one or more cameras of the computer system; and while displaying the live video communication interface for the live video communication session, detecting, via the one or more input devices, a set of one or more inputs that corresponds to a request to change an appearance of a portion of the representation of the field-of-view of the one or more cameras other than a subject that is displayed in the representation of the field-of-view of the one or more cameras; and in response to detecting the set of one or more inputs, changing the appearance of the portion of the representation of the field-of-view of the one or more cameras other than a subject that is displayed in the representation of the field-of-view of the one or more cameras.

In accordance with some embodiments, a transitory computer-readable storage medium is described. The transitory computer-readable storage medium stores one or more programs configured to be executed by one or more processors of a computer system that is in communication with one or more output generation components, one or more cameras, and one or more input devices, the one or more programs including instructions for: displaying, via the one or more output generation components, a live video communication interface for a live video communication session, wherein displaying the live video communication interface includes concurrently displaying: a representation of a field-of-view of the one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session; and a representation of one or more participants in the live video communication session that is different from the representation of the field-of-view of the one or more cameras of the computer system; and while displaying the live video communication interface for the live video communication session, detecting, via the one or more input devices, a set of one or more inputs that corresponds to a request to change an appearance of a portion of the representation of the field-of-view of the one or more cameras other than a subject that is displayed in the representation of the field-of-view of the one or more cameras; and in response to detecting the set of one or more inputs, changing the appearance of the portion of the representation of the field-of-view of the one or more cameras other than a subject that is displayed in the representation of the field-of-view of the one or more cameras.

In accordance with some embodiments, a computer system is described. The computer system comprises: one or more output generation components; one or more cameras; one or more input devices; one or more processors; and memory storing one or more programs configured to be executed by the one or more processors, the one or more programs including instructions for: displaying, via the one or more output generation components, a live video communication interface for a live video communication session, wherein displaying the live video communication interface includes concurrently displaying: a representation of a field-of-view of the one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session; and a representation of one or more participants in the live video communication session that is different from the representation of the field-of-view of the one or more cameras of the computer system; and while displaying the live video communication interface for the live video communication session, detecting, via the one or more input devices, a set of one or more inputs that corresponds to a request to change an appearance of a portion of the representation of the field-of-view of the one or more cameras other than a subject that is displayed in the representation of the field-of-view of the one or more cameras; and in response to detecting the set of one or more inputs, changing the appearance of the portion of the representation of the field-of-view of the one or more cameras other than a subject that is displayed in the representation of the field-of-view of the one or more cameras.

In accordance with some embodiments, a computer system is described. The computer system comprises: one or more output generation components; one or more cameras; one or more input devices; and means for displaying, via the one or more output generation components, a live video communication interface for a live video communication session, wherein displaying the live video communication interface includes concurrently displaying: a representation of a field-of-view of the one or more cameras of the computer system, wherein the representation of the field-of-view of the one or more cameras is visually associated with an indication of an option to initiate a process for changing an appearance of a portion of the representation of the field-of-view of the one or more cameras other than a subject that is displayed in the representation of the field-of-view of the one or more cameras during the live video communication session; and a representation of one or more participants in the live video communication session that is different from the representation of the field-of-view of the one or more cameras of the computer system; and means, while displaying the live video communication interface for the live video communication session, for detecting, via the one or more input devices, a set of one or more inputs that corresponds to a request to change an appearance of a portion of the representation of the field-of-view of the one or more cameras other than a subject that is displayed in the representation of the field-of-view of the one or more cameras; and means, responsive to detecting the set of one or more inputs, for changing the appearance of the portion of the representation of the field-of-view of the one or more cameras other than a subject that is displayed in the representation of the field-of-view of the one or more cameras.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a live video communication session, thereby increasing the effectiveness, efficiency, and user satisfaction with such devices. Such methods and interfaces may complement or replace other methods for managing a live video communication session.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B depict a flow diagram illustrating a method for managing a live video communication session, in accordance with some embodiments.

FIG. 9 is a flow diagram illustrating a method for managing a live video communication session, in accordance with some embodiments.

FIGS. 10A-10J illustrate exemplary user interfaces for managing a live video communication session, in accordance with some embodiments.

FIG. 11 is a flow diagram illustrating a method for managing a live video communication session, in accordance with some embodiments.

FIG. 13 is a flow diagram illustrating a method for managing a live video communication session, in accordance with some embodiments.

FIG. 14 is a flow diagram illustrating a method for managing a live video communication session, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a live video communication session. Such techniques can reduce the cognitive burden on a user who participates in a video communication session, thereby enhancing productivity. Further, such techniques can reduce processor and battery power otherwise wasted on redundant user inputs.

Figure 8A:
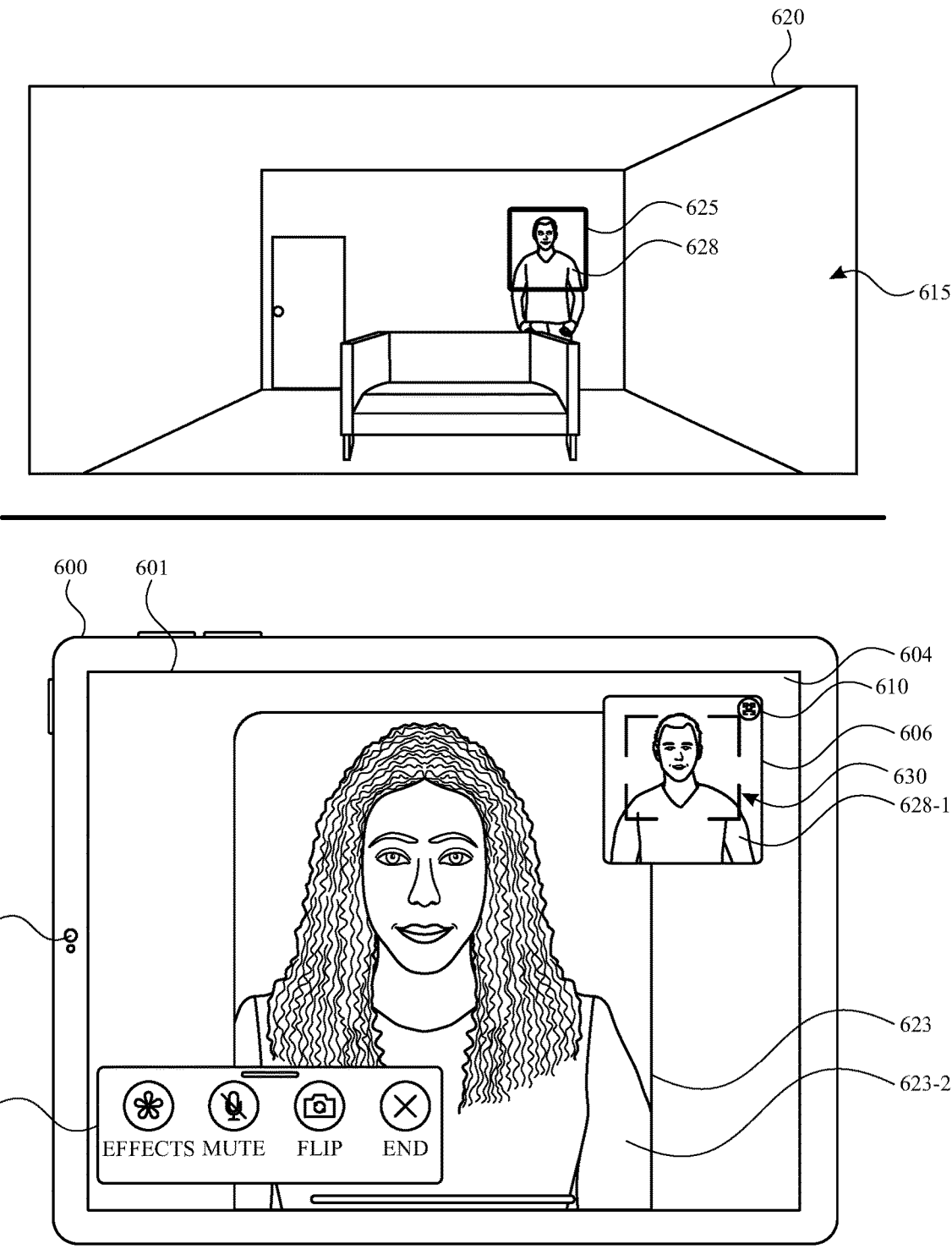
FIGS. 8A-8R illustrate exemplary user interfaces for managing a live video communication session, in accordance with some embodiments.
Figure 12A:
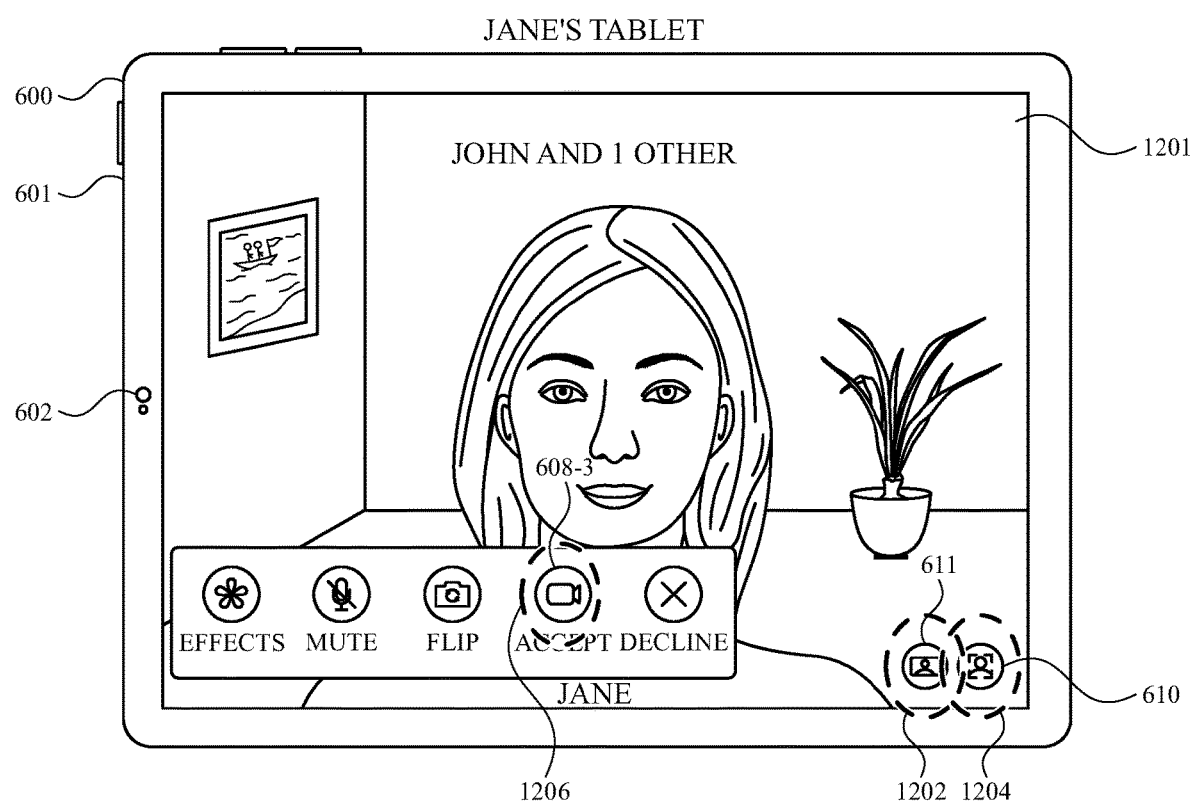
FIGS. 12A-12U illustrate exemplary user interfaces for managing a live video communication session, in accordance with some embodiments.
Figure 12B:
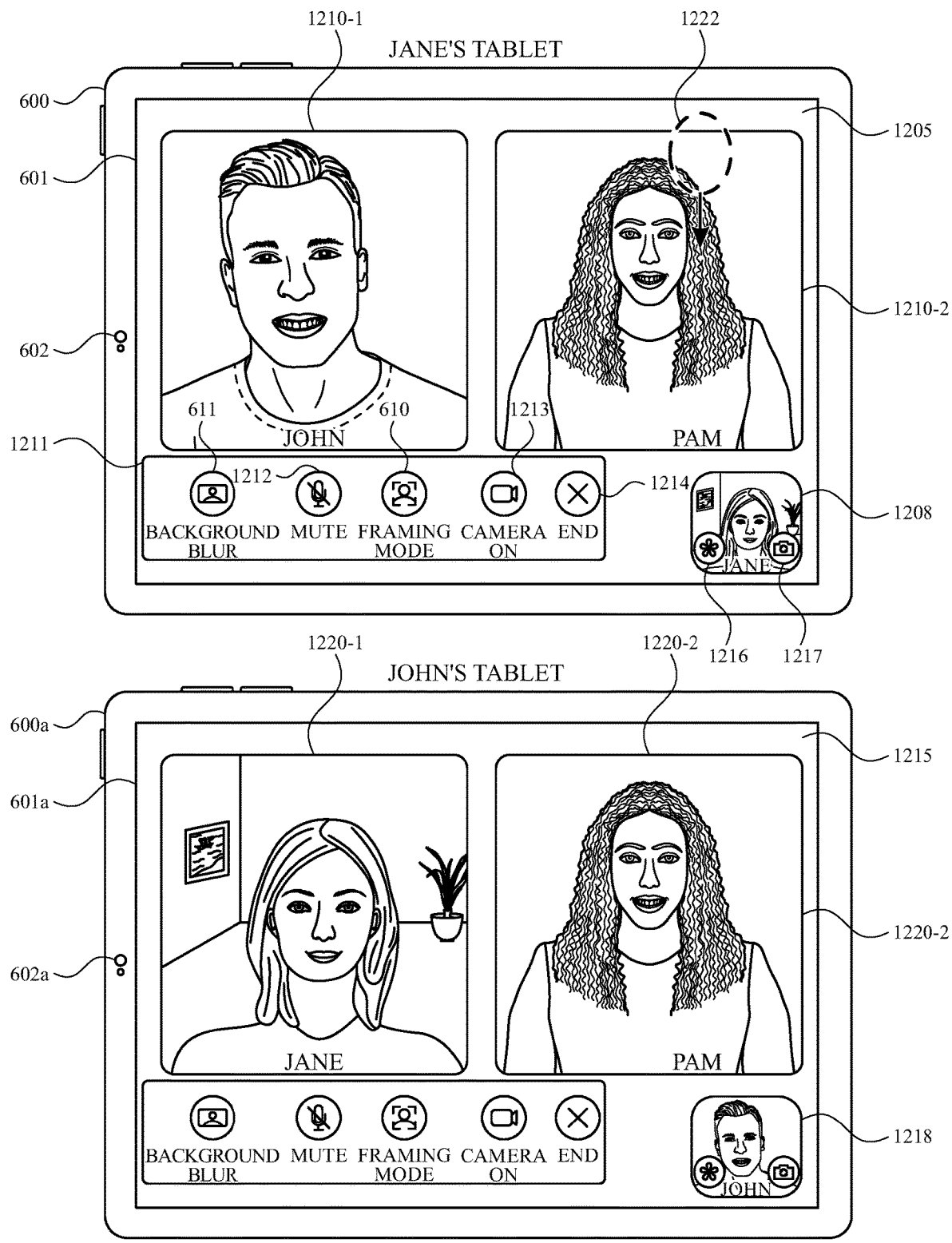
Figure 12C:
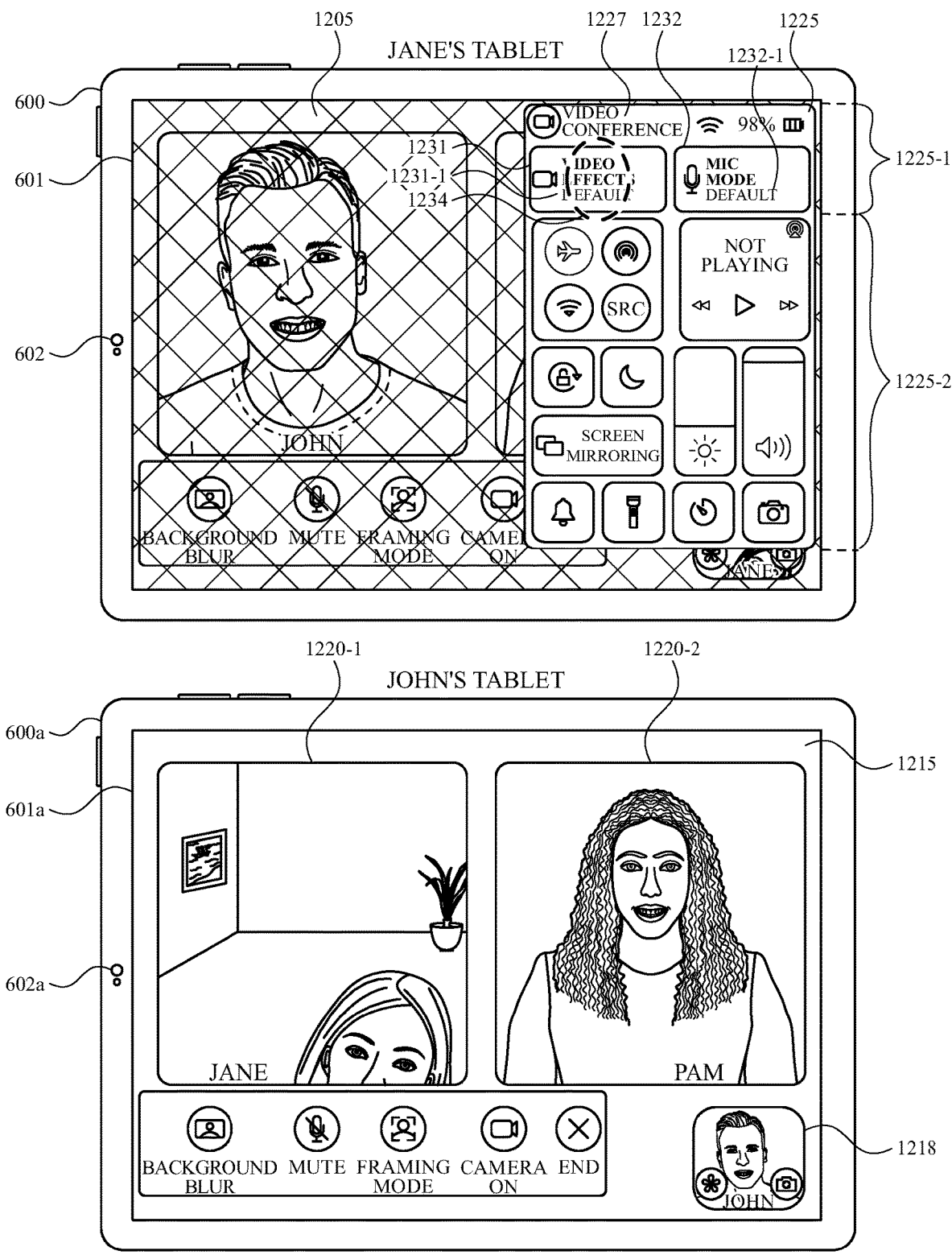
Figure 12D:
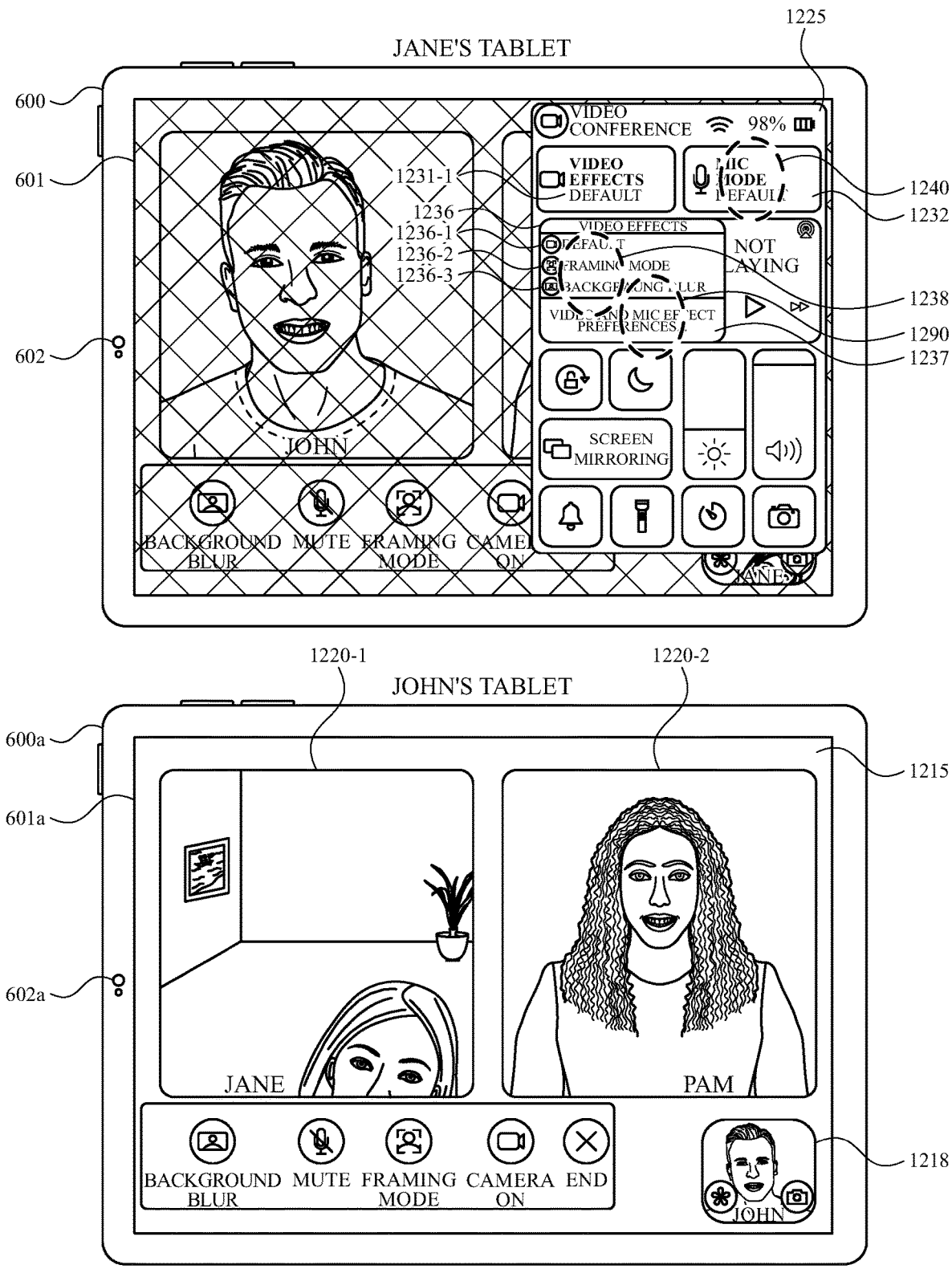
Figure 12E:
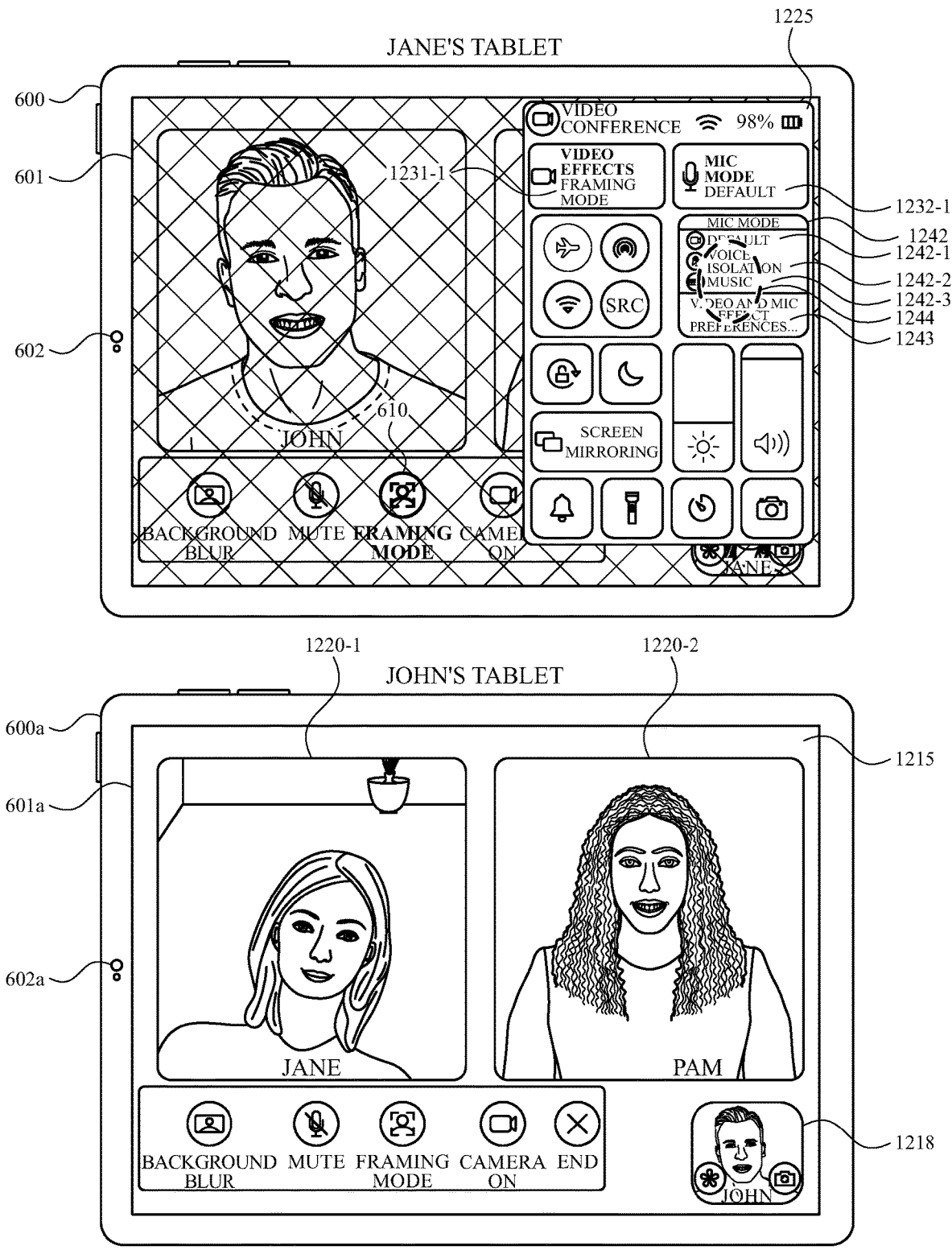
Figure 12F:
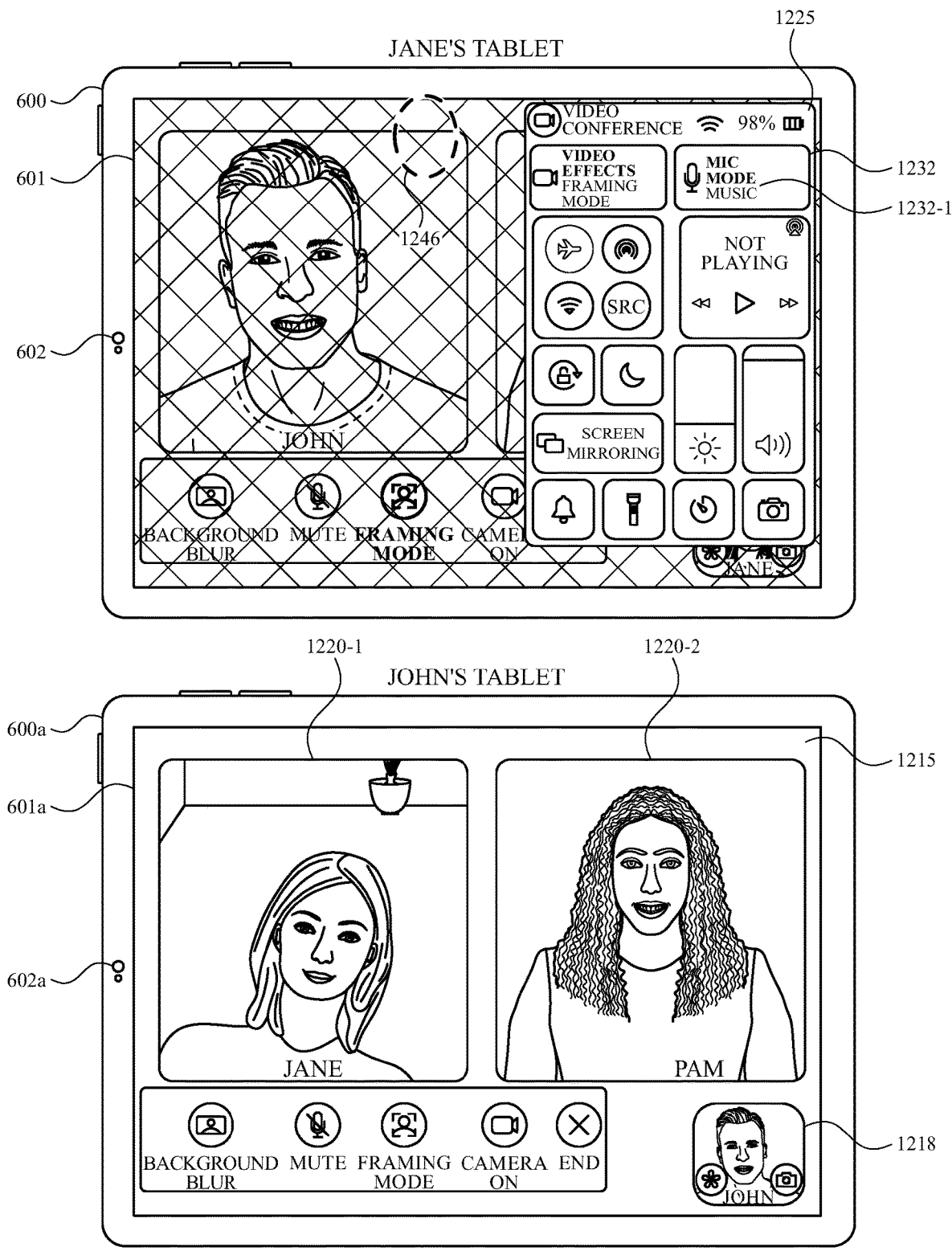
Figure 12G:
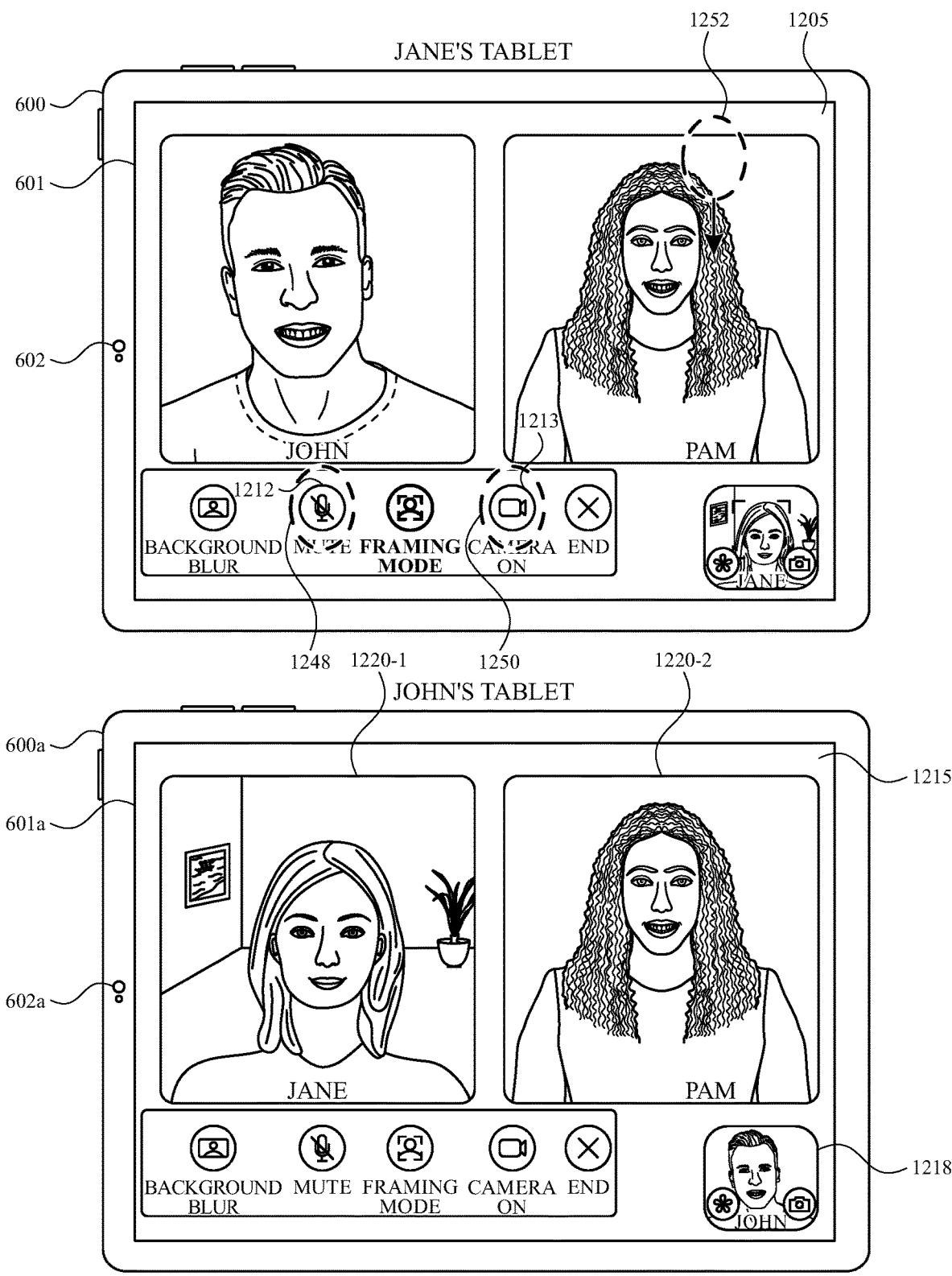
Figure 12H:
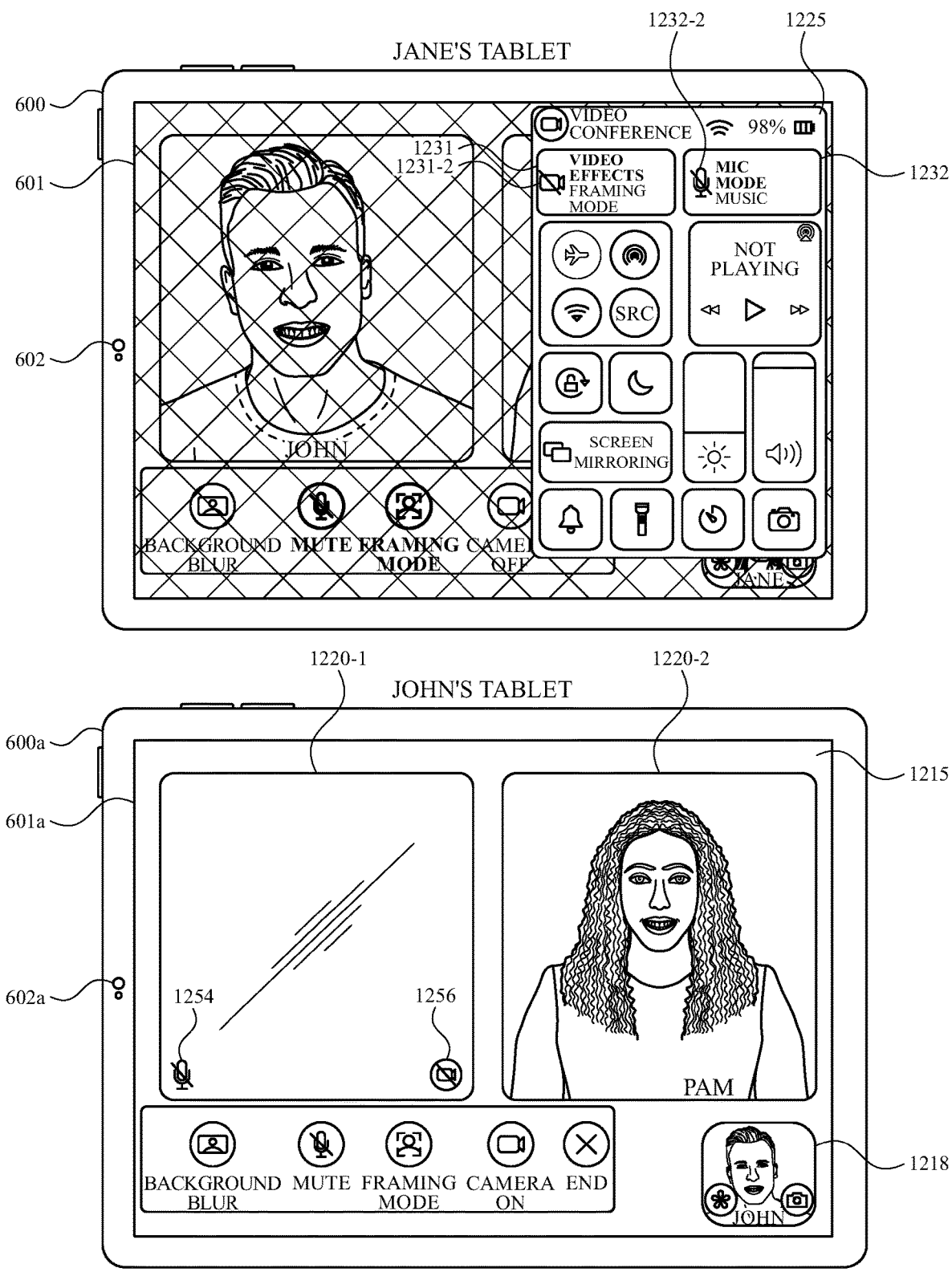
Figure 12I:
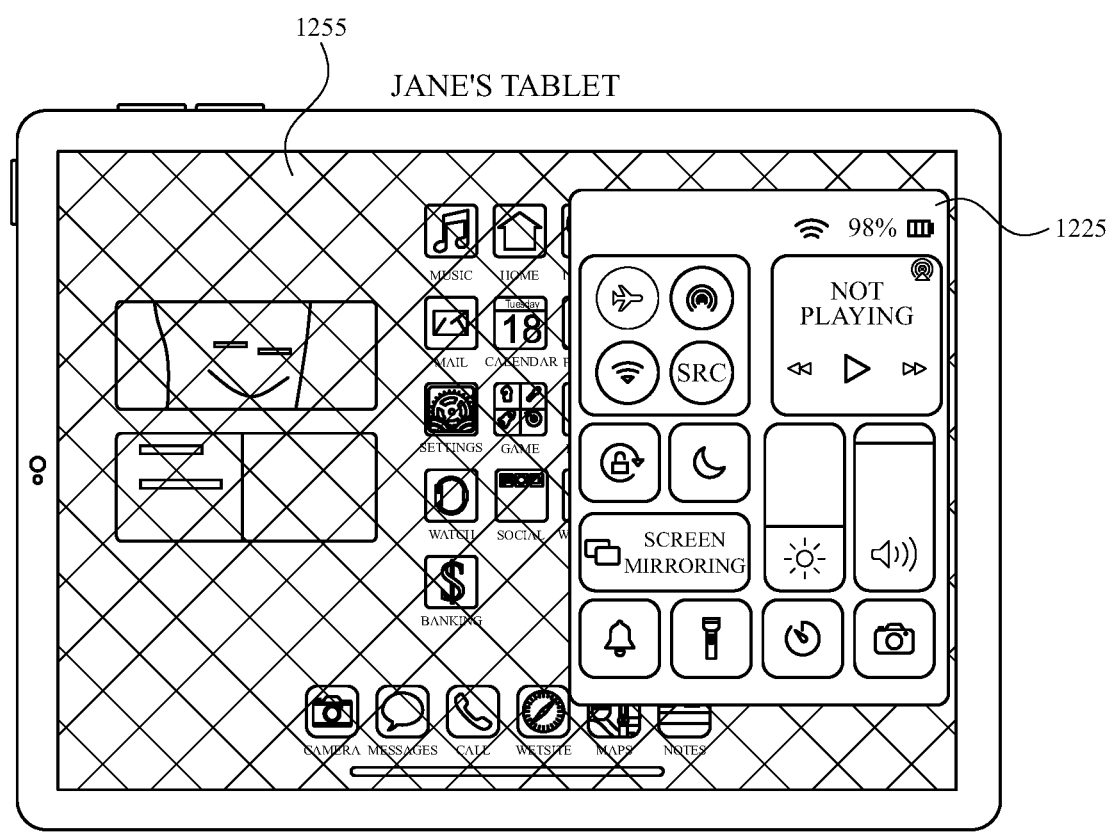
Figure 12J:
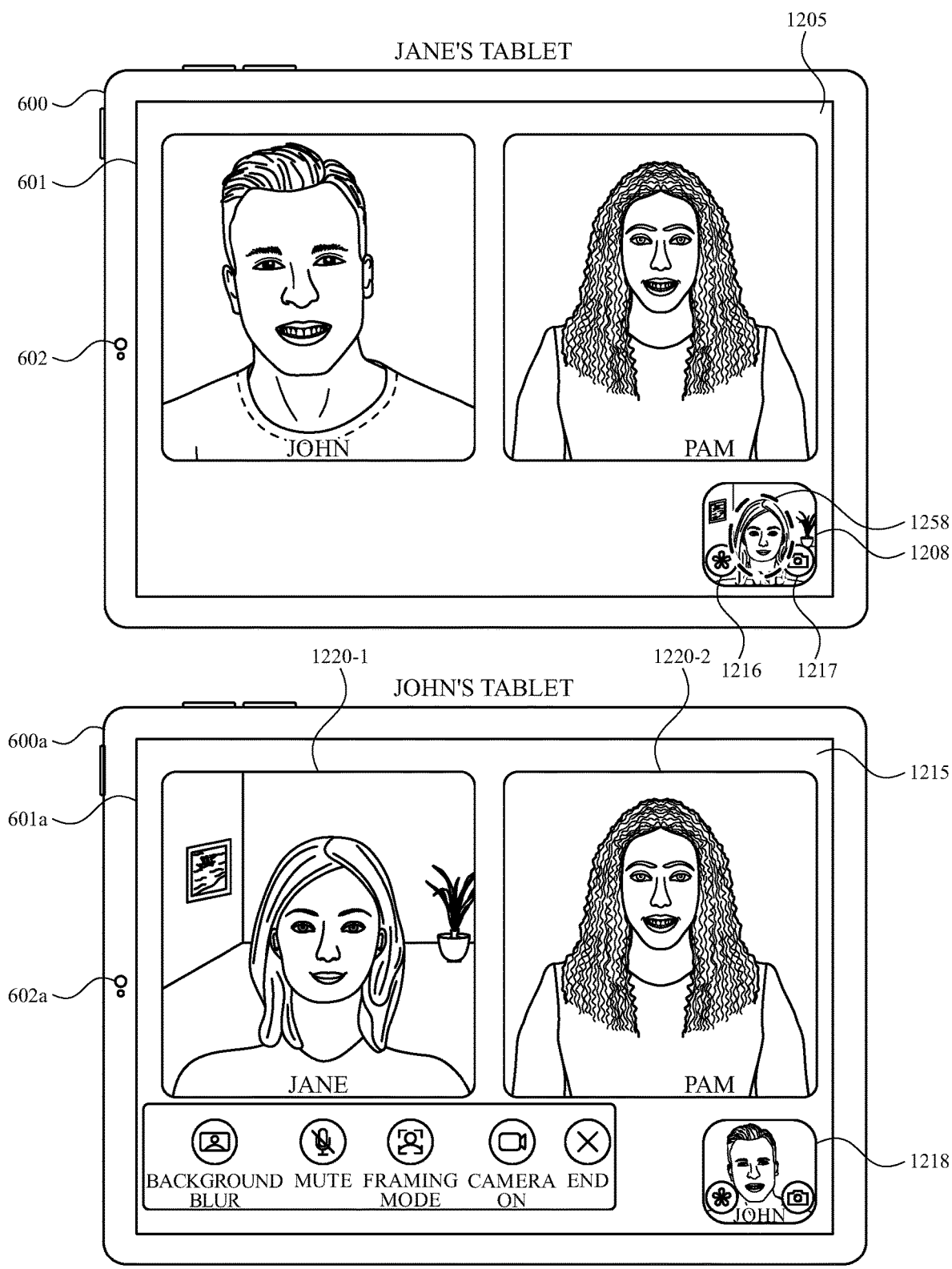
Figure 12K:
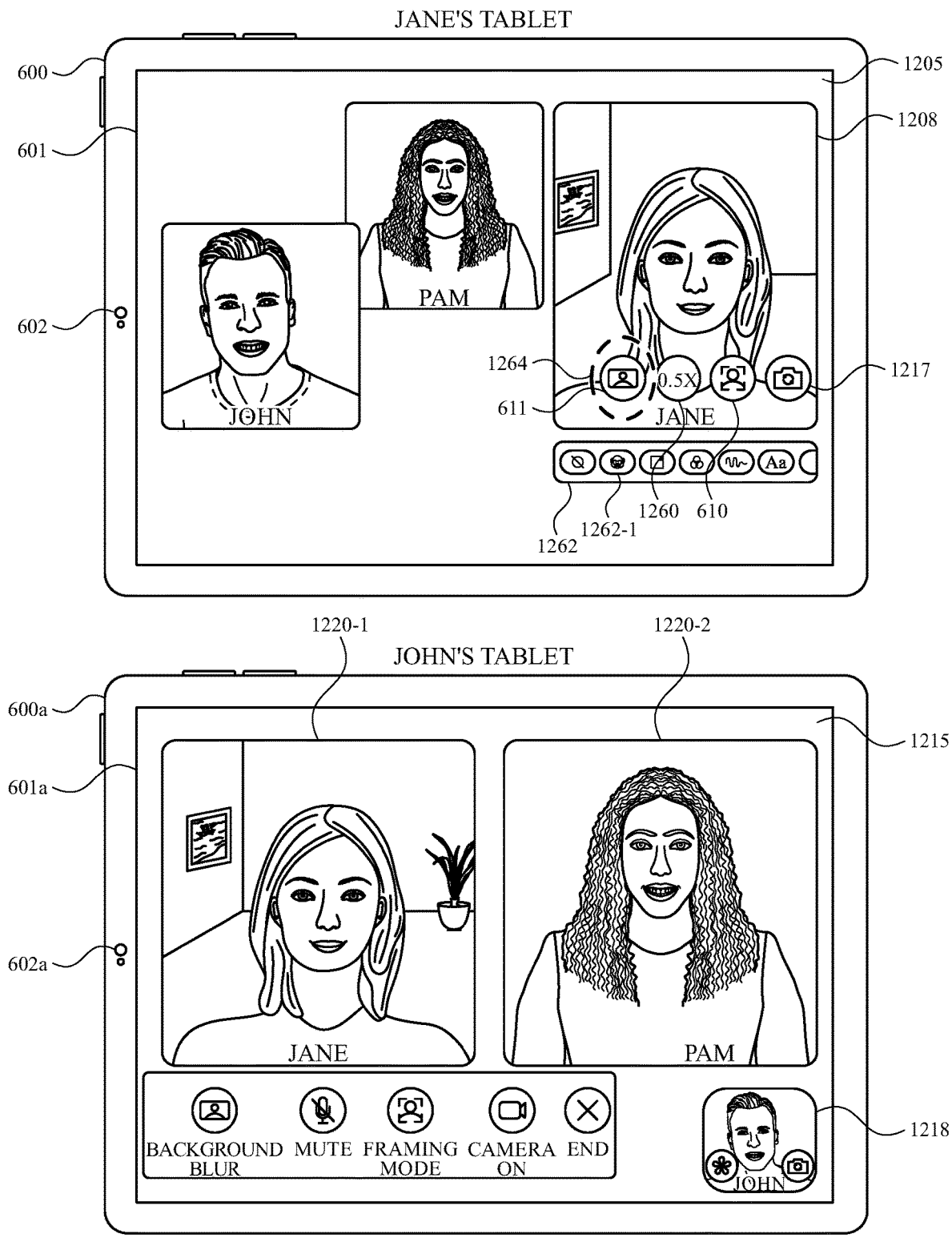

Below, FIGS. 1A-1B, 2, 3, 4A-4B, and 5A-5C provide a description of exemplary devices for performing the techniques for managing a live video communication session. FIGS. 6A-6Q illustrate exemplary user interfaces for managing a live video communication session. FIGS. 7A-7B depict a flow diagram illustrating methods of managing a live video communication session in accordance with some embodiments. The user interfaces in FIGS. 6A-6Q are used to illustrate the processes described below, including the processes in FIGS. 7A-7B. FIGS. 8A-8R illustrate exemplary user interfaces for managing a live video communication session. FIG. 9 is a flow diagram illustrating methods of managing a live video communication session in accordance with some embodiments. The user interfaces in FIGS. 8A-8R are used to illustrate the processes described below, including the processes in FIG. 9. FIGS. 10A-10J illustrate exemplary user interfaces for managing a live video communication session. FIG. 11 is a flow diagram illustrating methods of managing a live video communication session in accordance with some embodiments. The user interfaces in FIGS. 10A-10J are used to illustrate the processes described below, including the processes in FIG. 11. FIGS. 12A-12U illustrate exemplary user interfaces for managing a live video communication session. FIGS. 13 and 14 are flow diagrams illustrating methods of managing a live video communication session in accordance with some embodiments. The user interfaces in FIGS. 12A-12U are used to illustrate the processes described below, including the processes in FIGS. 13 and 14.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
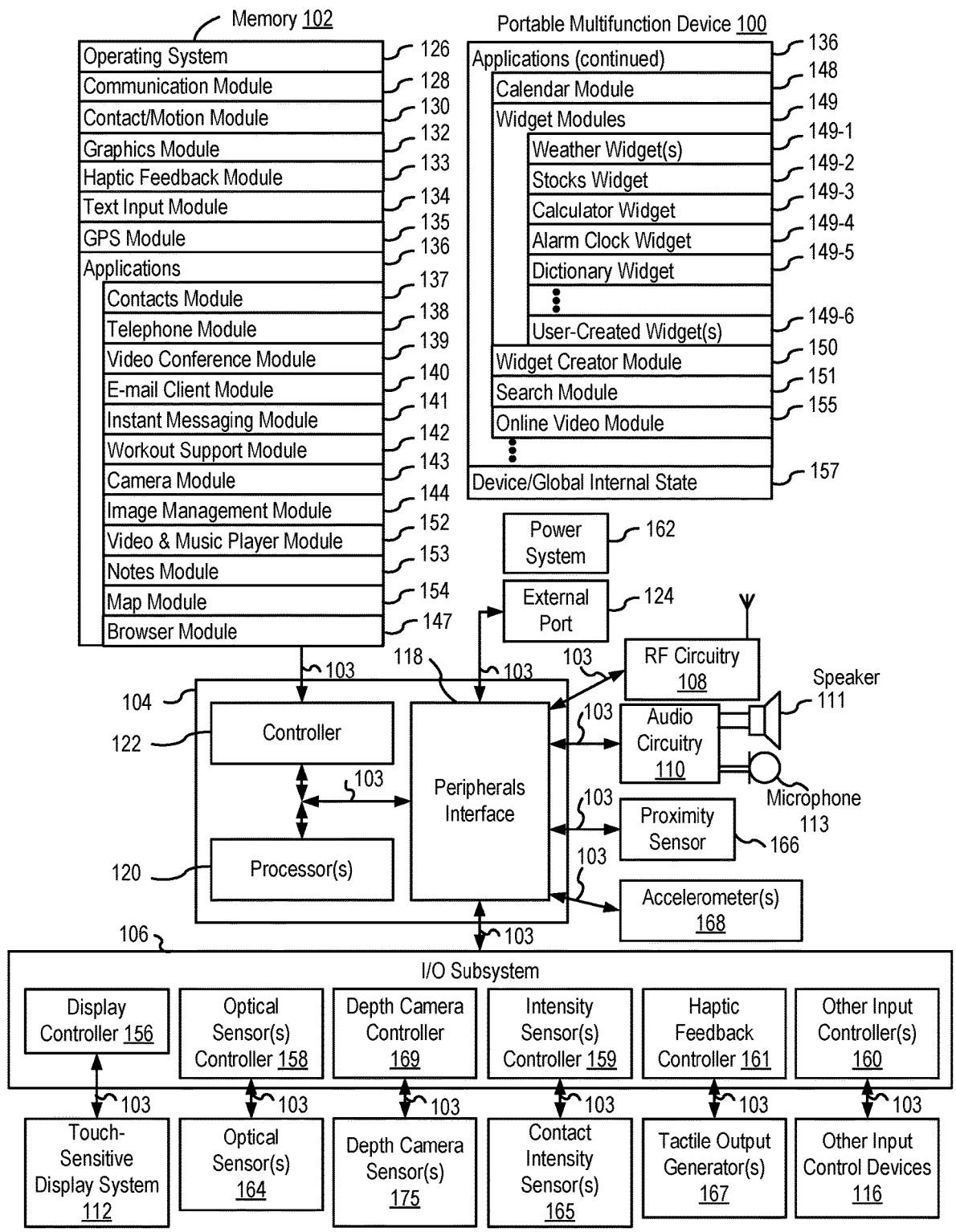
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
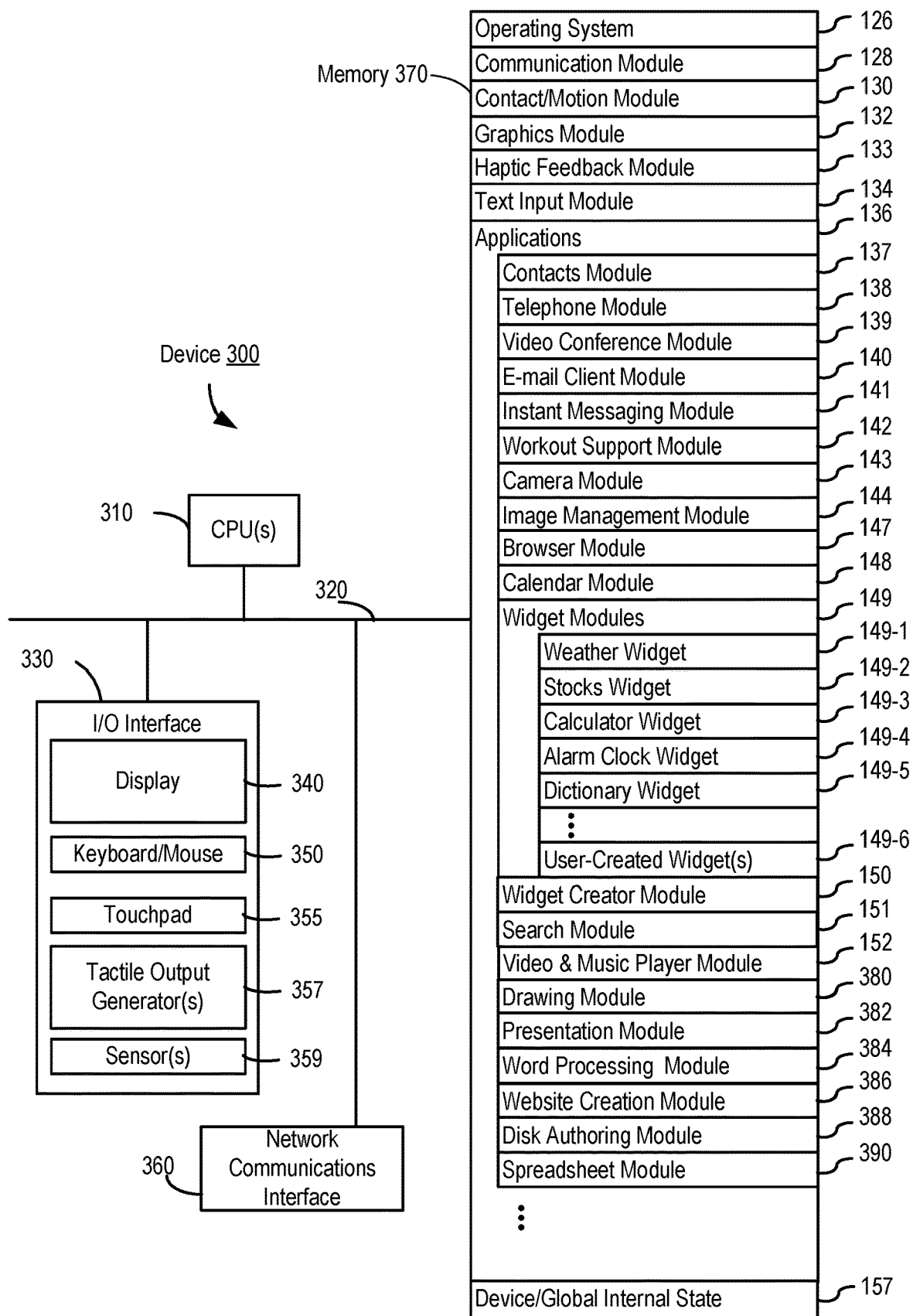
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
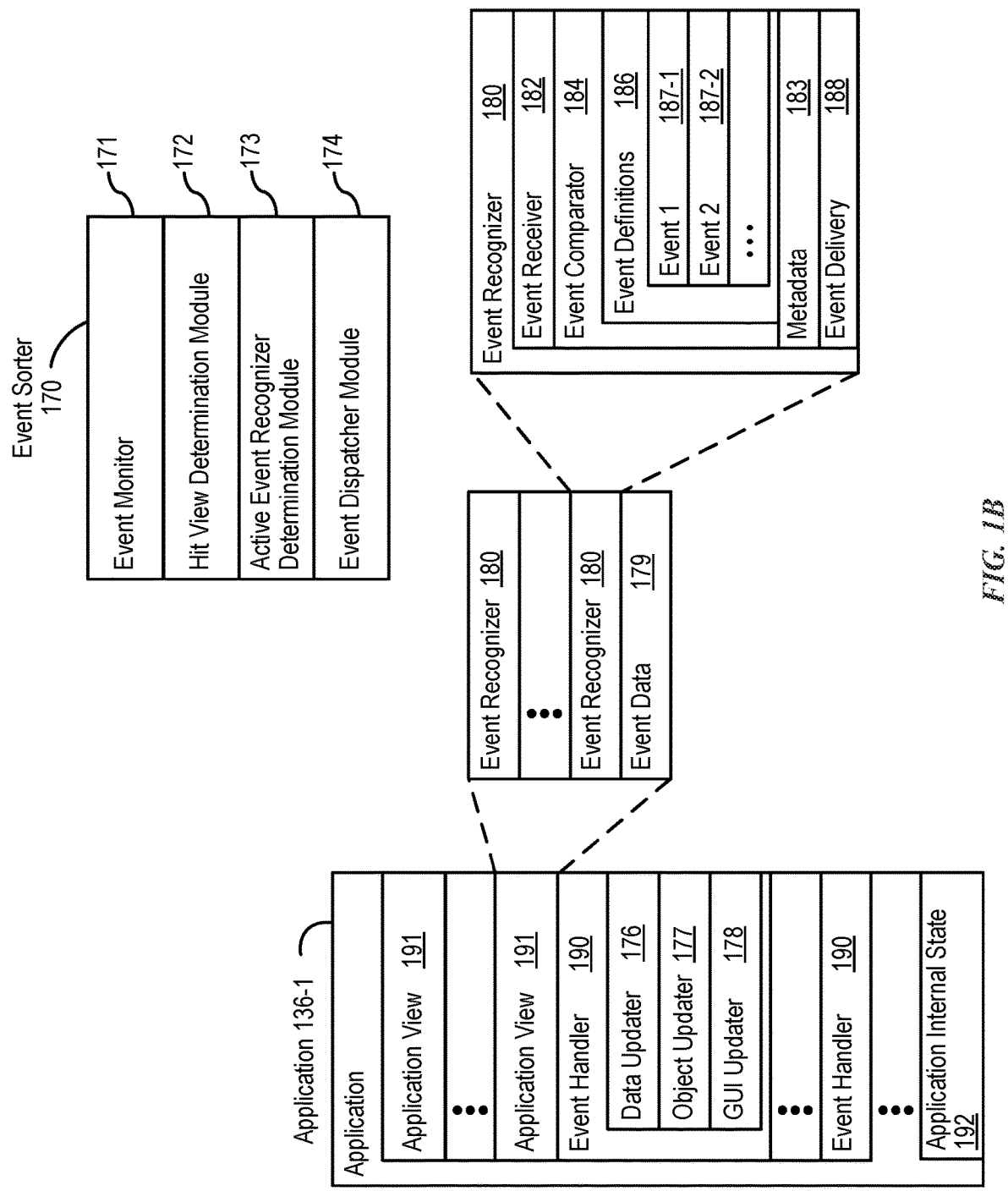
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
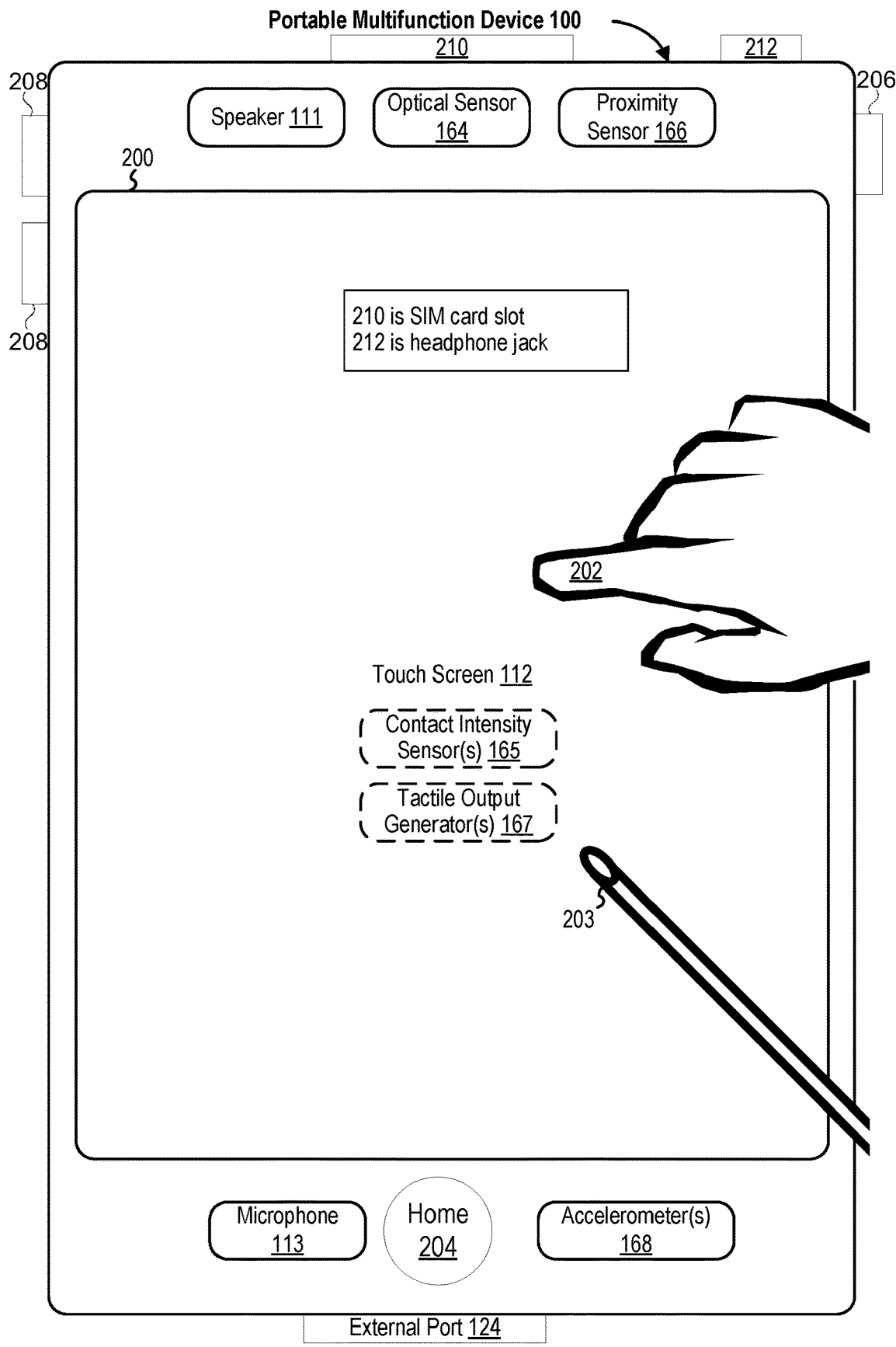
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
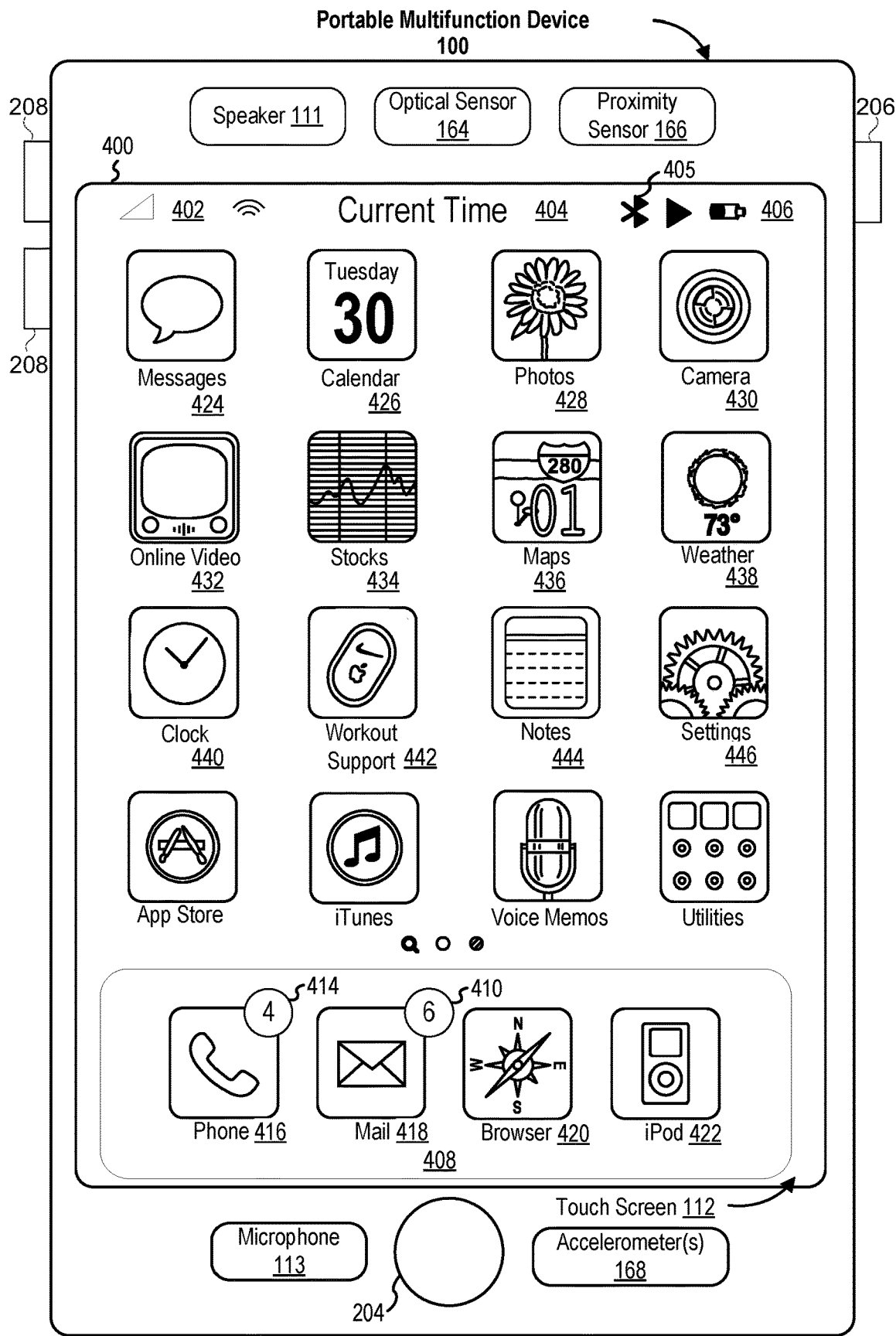
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
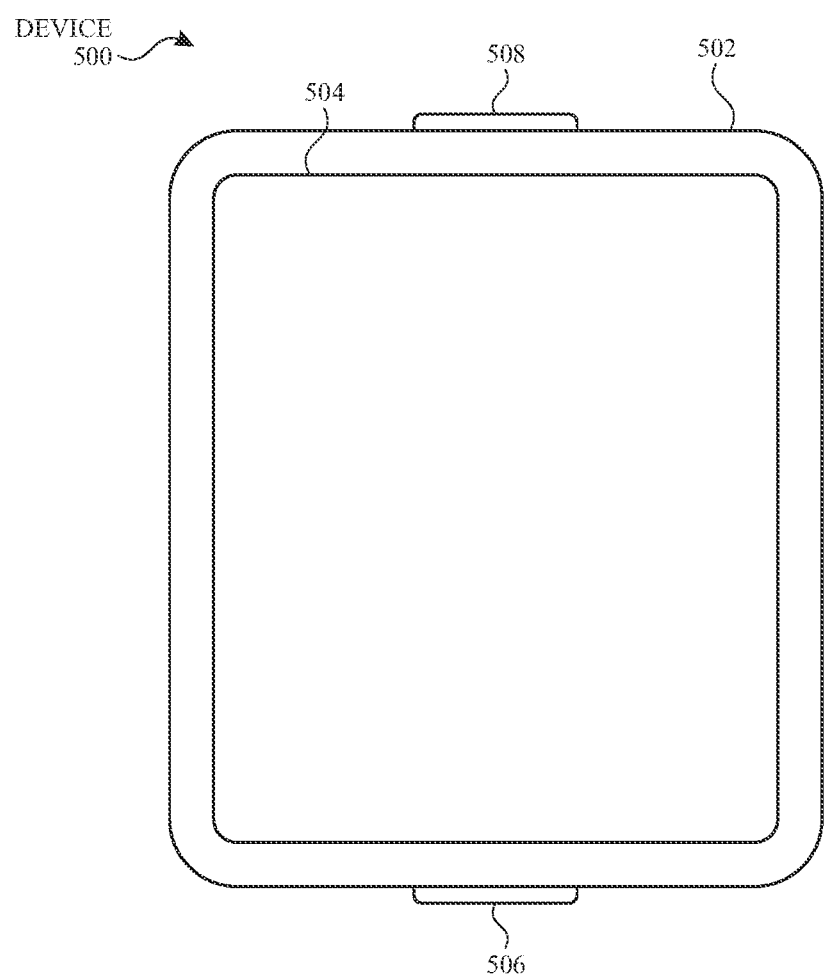
FIG. 5A illustrates a personal electronic device in accordance with some embodiments.
Figure 6A:
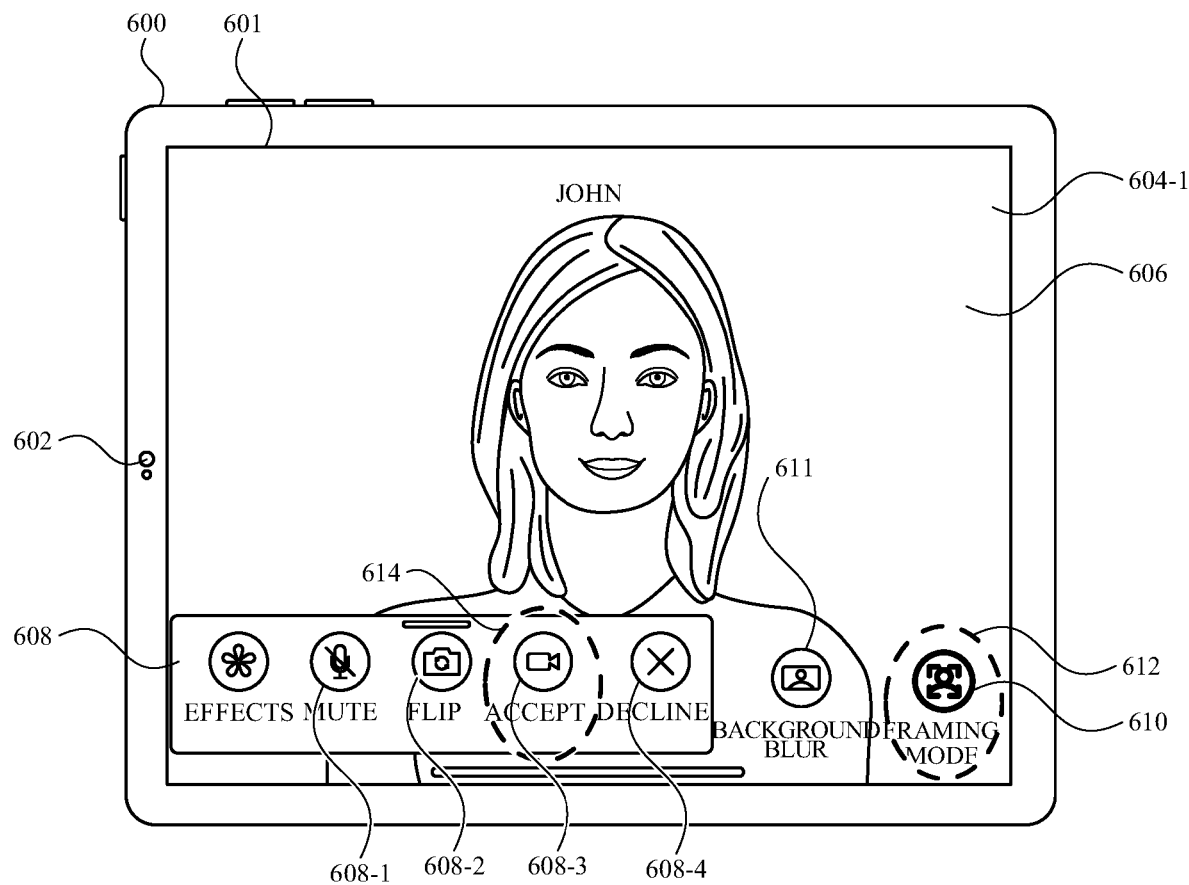
FIGS. 6A-6Q illustrate exemplary user interfaces for managing a live video communication session, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
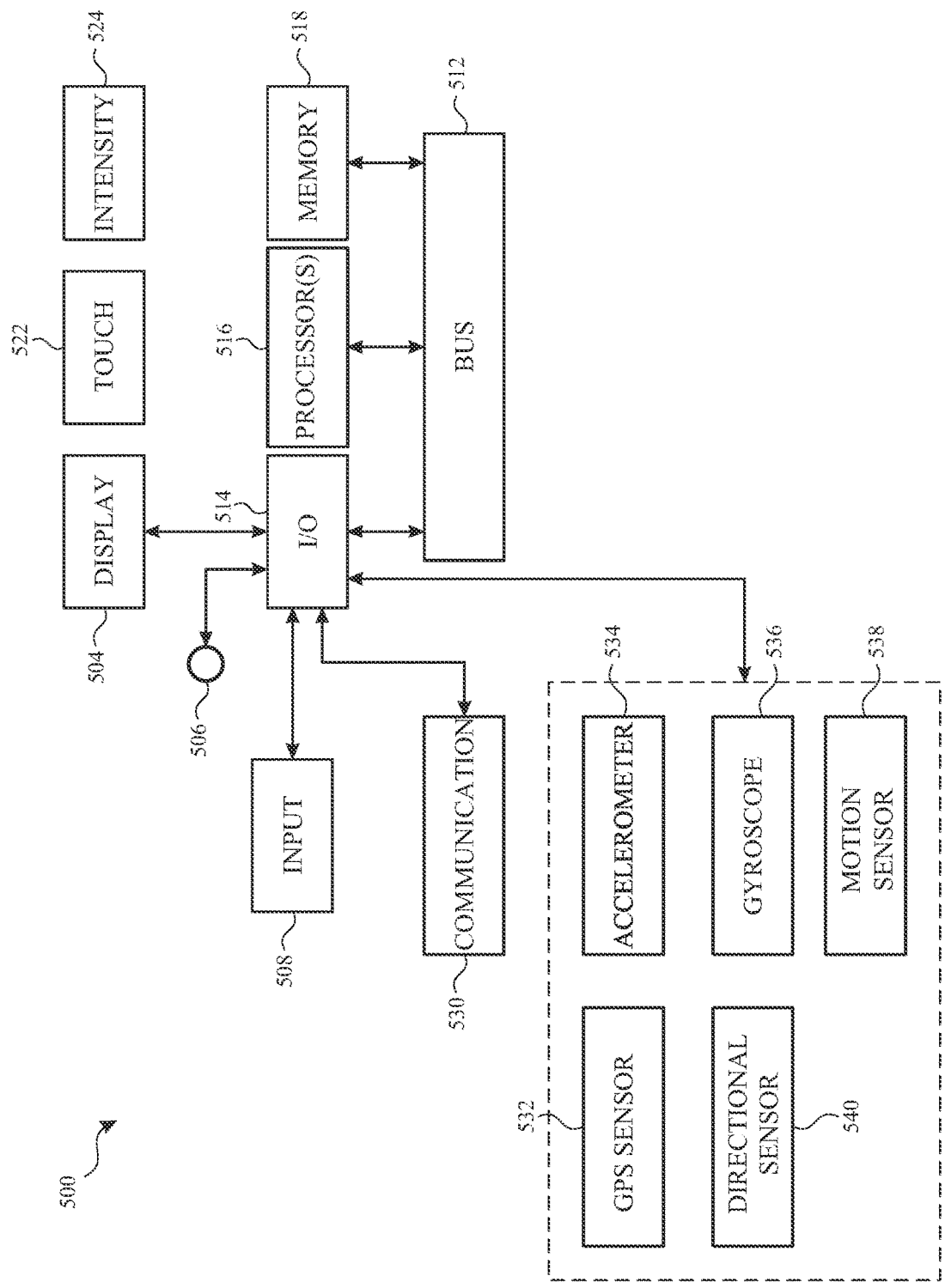
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1400 (FIGS. 7A, 7B, 9, 11, 13, and 14). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used herein, the term "affordance" refers to a user-interactive graphical user interface object that is, optionally, displayed on the display screen of devices 100, 300, and/or 500 (FIGS. 1A, 3, and 5A-5C). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UP") and associated processes that are implemented on an electronic device, such as portable multifunction device 100, device 300, or device 500.

Figure 5C:
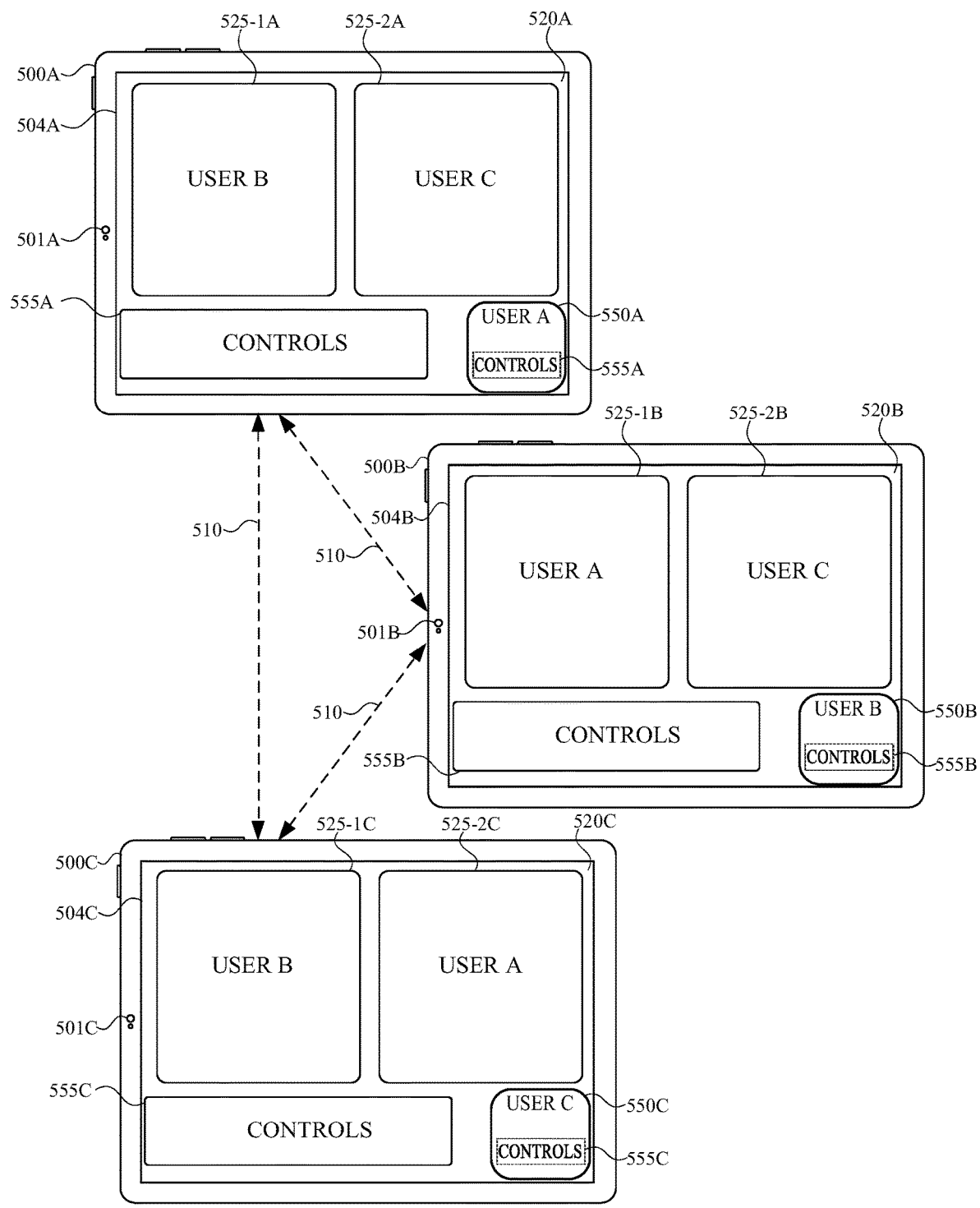
FIG. 5C illustrates an exemplary diagram of a communication session between electronic devices, in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A.

Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6Q, 8A-8R, 10A-10J, and 12A-12U. In some embodiments, the communication session depicted in FIGS. 6A-6Q, 8A-8R, 10A-10J, and 12A-12U includes two or more electronic devices, even if the other electronic devices participating in the communication session are not depicted in the figures.

FIGS. 6A-6Q illustrate exemplary user interfaces for managing a live video communication session (e.g., a video conference), in accordance with some embodiments. The user interfaces in these figures are used to illustrate the processes described below, including the processes in FIGS. 7A and 7B.

FIGS. 6A-6Q illustrate device 600 displaying user interfaces on display 601 (e.g., a display device or display generation component) for managing a live video communication session. FIGS. 6A-6Q depict various embodiments in which device 600 automatically reframes a displayed portion of a camera field-of-view based on conditions detected in a scene that is within the field-of-view of the camera while an automatic framing mode is enabled. One or more of the embodiments discussed below with respect to FIGS. 6A-6Q can be combined with one or more of the embodiments discussed with respect to FIGS. 8A-8R, FIGS. 10A-10J, and FIGS. 12A-12U.

Device 600 includes one or more cameras 602 (e.g., front-facing cameras) for capturing image data and, optionally, depth data of a scene that is within the field-of-view of the camera. In some embodiments, camera 602 is a wide angle camera (e.g., a camera that includes a wide angle lens, or a lens that has a relatively short focal length and wide field-of-view). In some embodiments, device 600 includes one or more features of devices 100, 300, or 500.

In FIG. 6A, device 600 displays video conference request interface 604-1 depicting an incoming request from "John" to participate in a live video conference. Video conference request interface 604-1 includes camera preview 606, options menu 608, framing mode affordance 610, and background blur affordance 611. Camera preview 606 is a real time representation of the video feed from camera 602 that is enabled for output for the video conference session (should the incoming request be accepted). In FIG. 6A, camera 602 is currently enabled, and camera preview 606 depicts a representation of "Jane," who is currently positioned in front of device 600 and within the field-of-view of camera 602.

Options menu 608 includes various selectable options for controlling one or more aspects of the video conference. For example, mute option 608-1 is selectable to mute the transmission of any audio detected by device 600. Flip option 608-2 is selectable to switch the camera being used for the video conference between camera 602 and one or more different cameras, such as a camera on the opposite side of device 600 from camera 602 (e.g., a rear-facing camera). Accept option 608-3 is selectable to accept the request to participate in the live video conference. Decline option 608-4 is selectable to decline the request to participate in the live video conference.

Background blur affordance 611 is selectable to enable or disable a background blur mode for the video conference session. In the embodiment depicted in FIG. 6A, the background blur mode is disabled by default when device 600 receives or initiates a request to participate in a video conference. Background blur affordance 611 is, therefore, depicted having an unselected state, as indicated by the lack of bolding of the affordance in FIG. 6A. In some embodiments, the background blur mode is enabled by default when device 600 receives or initiates a request to participate in a video conference (e.g., and the affordance is bolded). The background blur feature is discussed in greater detail with respect to FIGS. 12A-12U.

Framing mode affordance 610 is selectable to enable or disable an automatic framing mode for the video conference session. In the embodiment depicted in FIG. 6A, the automatic framing mode is enabled by default when device 600 receives or initiates a request to participate in a video conference. Framing mode affordance 610 is, therefore, depicted having a selected state, as indicated by bolding of the affordance in FIG. 6A. In some embodiments, the automatic framing mode is disabled by default when device 600 receives or initiates a request to participate in a video conference (e.g., and there is no bolding of the affordance).

When the automatic framing mode is enabled, device 600 detects conditions of a scene that is within the field-of-view of the enabled camera (e.g., camera 602) (e.g., the presence and/or position of one or more subjects within the field-of-view of the camera), and, in real time, adjusts the field-of-view of the video output for the video conference session (as represented in the camera preview) (e.g., without moving camera 602 or device 600), based on the conditions of the scene or changes detected in the scene within the field-of-view of the camera (e.g., changes in the position and/or movement of subject(s) during the video conference session). Various embodiments of the automatic framing mode are discussed throughout the present disclosure.

For example, in the embodiments depicted in FIGS. 6A-6Q, device 600 automatically adjusts (e.g., reframes) the displayed output video feed field-of-view to maintain display of one or more subjects (e.g., Jane) within the field-of-view of the camera (e.g., camera 602). Because device 600 automatically adjusts the displayed portion of the camera's field-of-view to include display of Jane, Jane is able to move about the scene while participating in the video conference, without having to manually adjust the perspective of the outgoing video feed to account for her movement or other changes in the scene. As a result, participants of the video conference require less interaction with device 600 because device 600 automatically reframes the outgoing video feed so that the remote participants, who receive the video feed from device 600, are able to continuously view Jane as she moves about her environment. Other benefits of the automatic framing mode are noted in the disclosure below. Various features of the automatic framing mode are discussed with respect to the embodiments depicted in FIGS. 6A-6Q, FIGS. 8A-8R, and FIGS. 10A-10J. One or more of these features can be combined with other features of the automatic framing mode, as discussed herein.

Figure 6B:
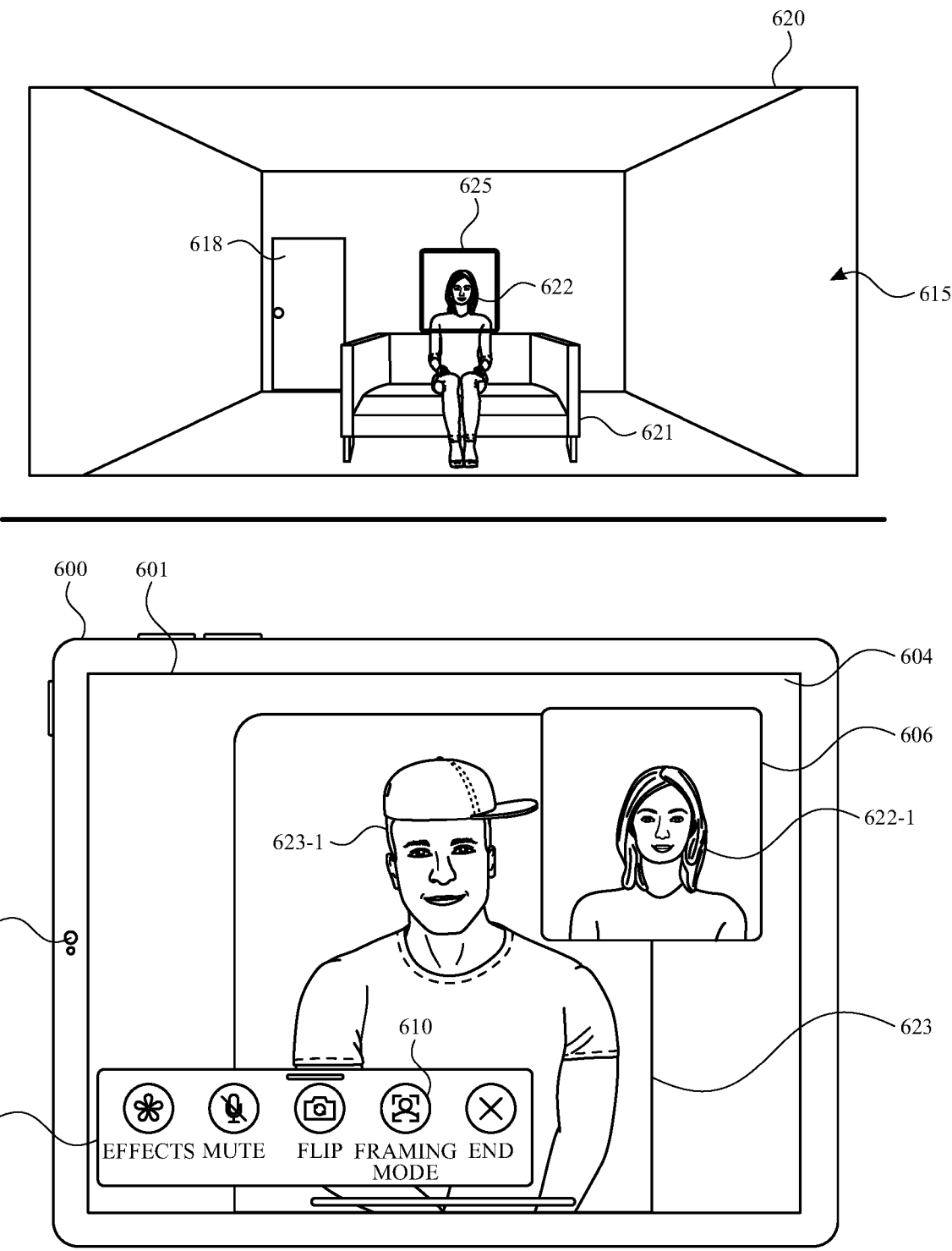
Figure 6C:
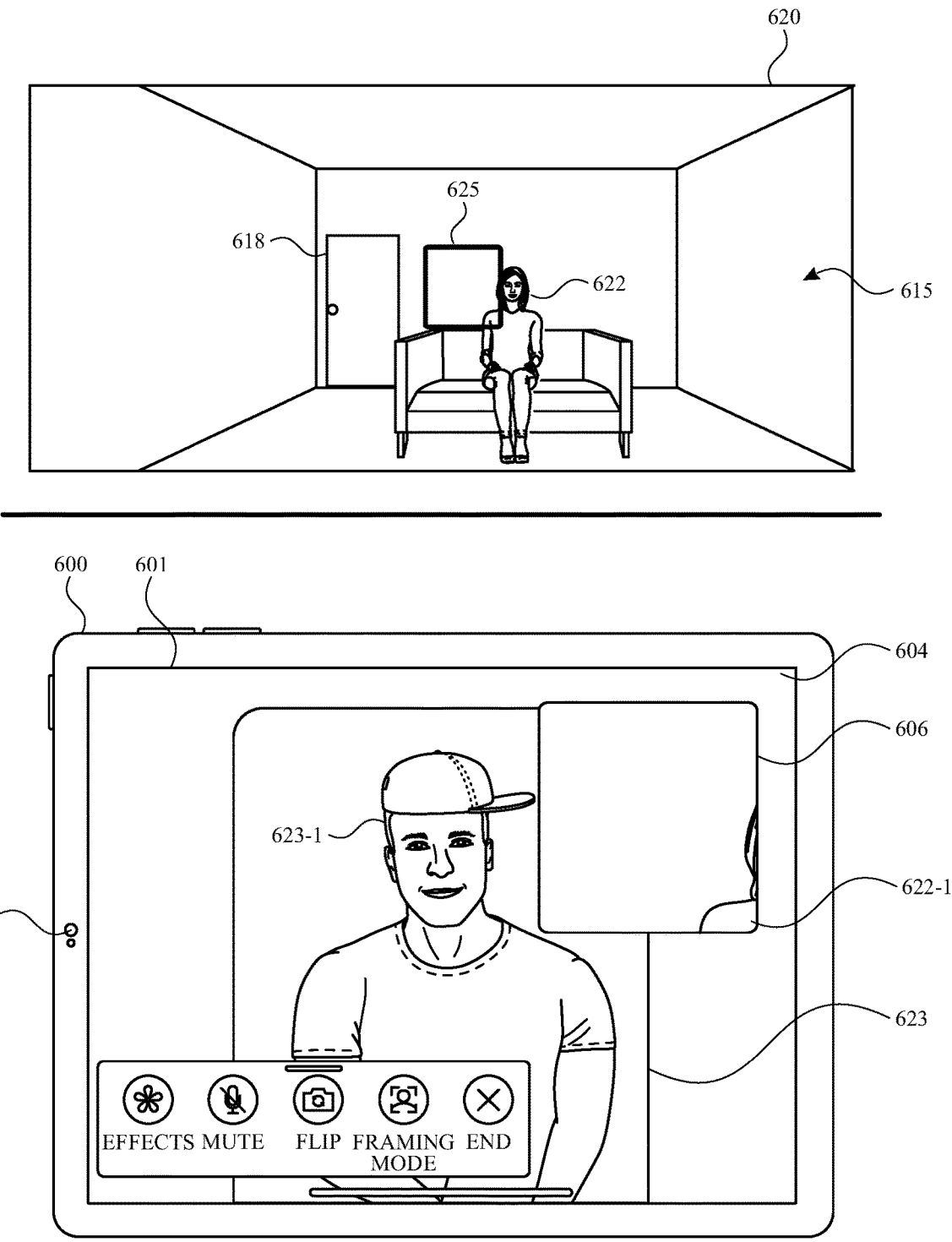
Figure 6D:
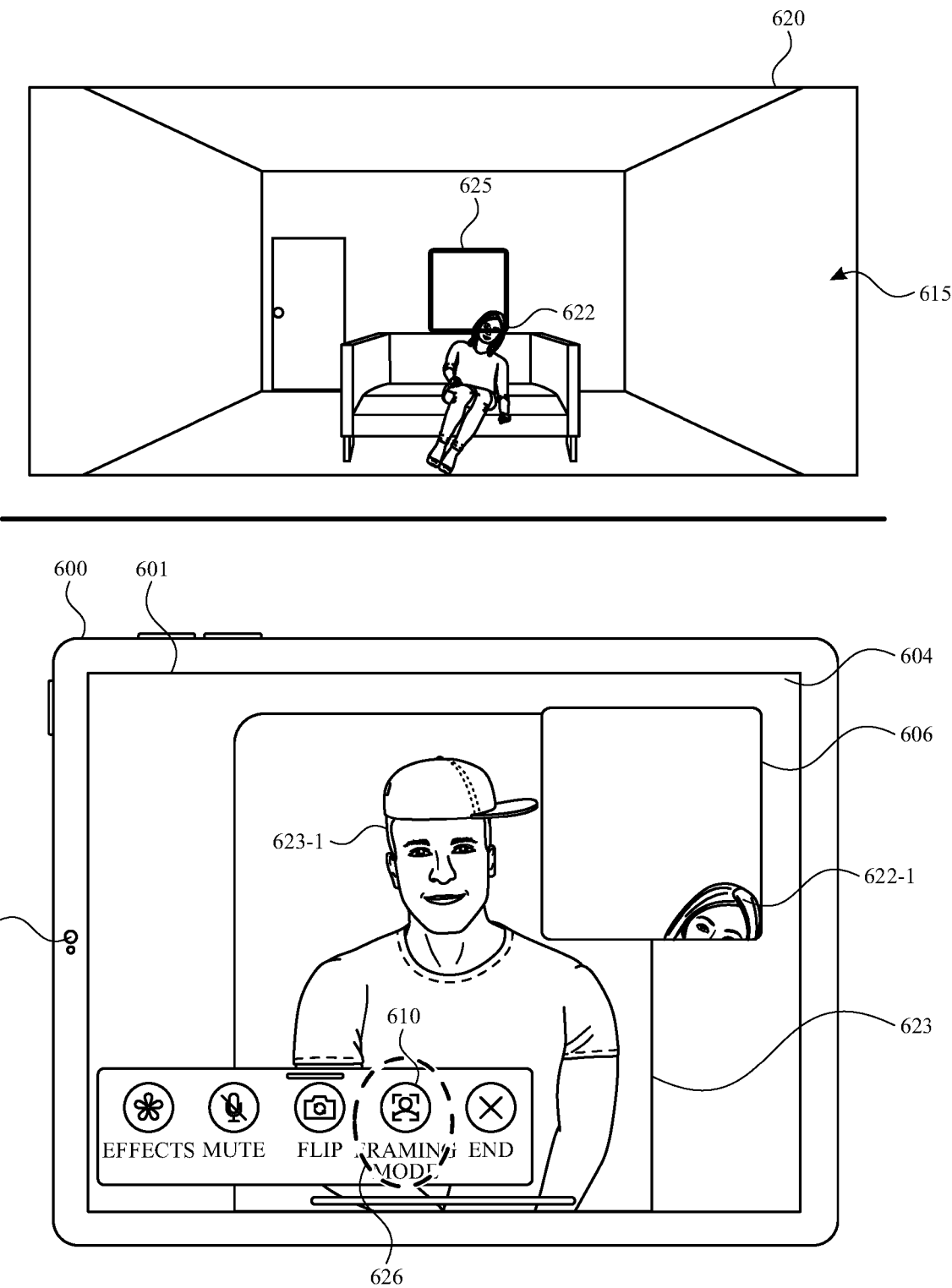
Figure 6E:
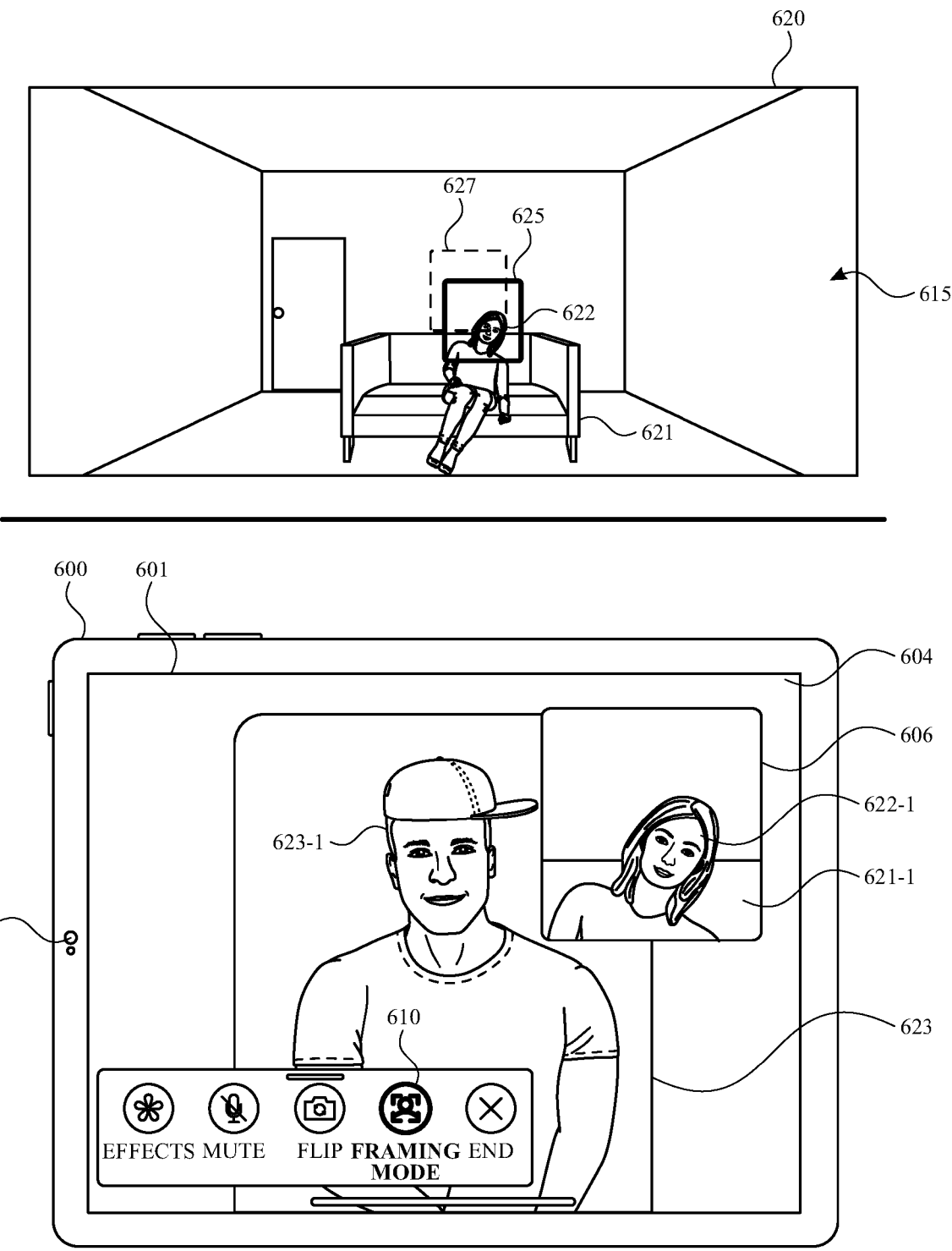
Figure 6F:
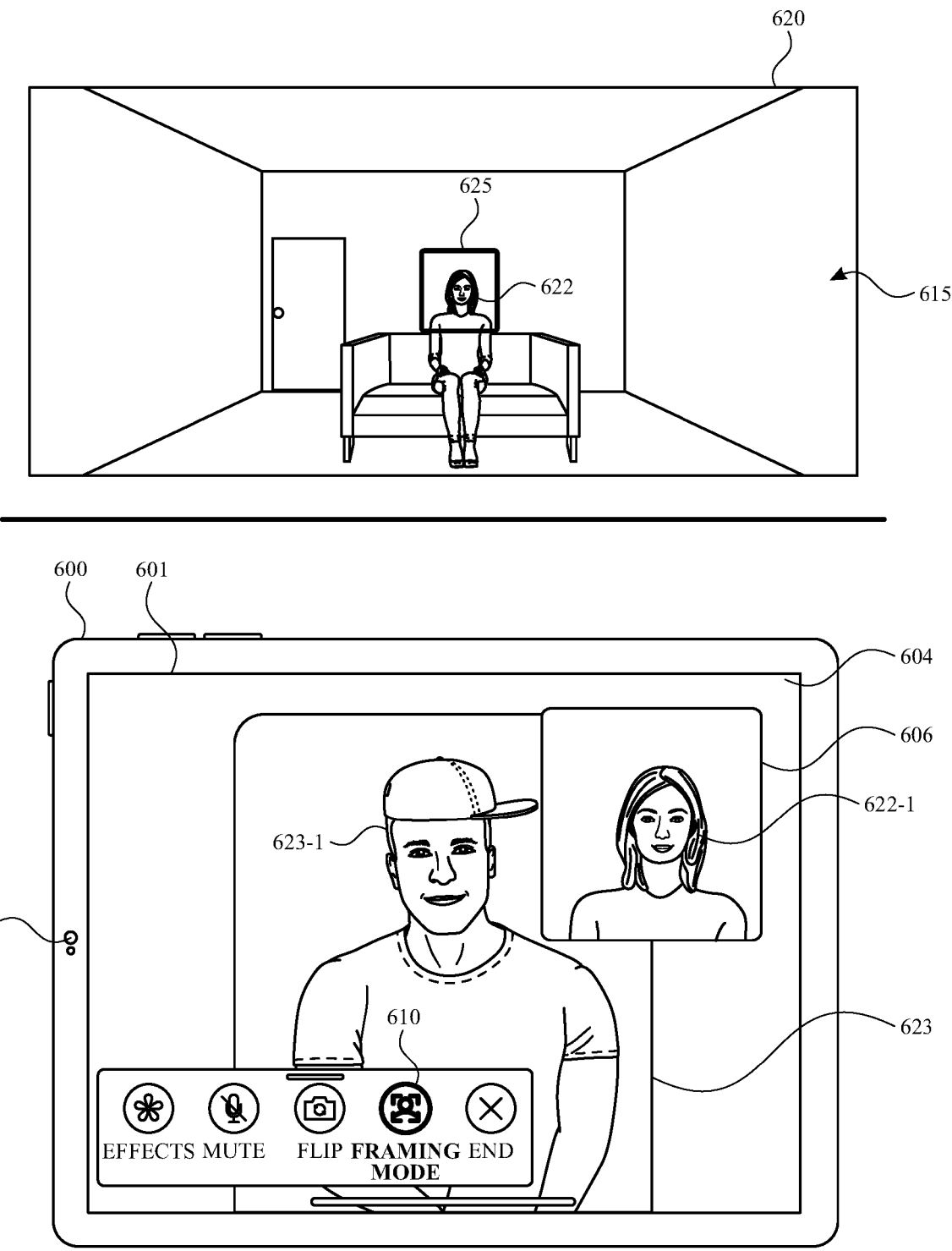

FIG. 6A depicts input 612 (e.g., a tap input) on framing mode affordance 610 and input 614 on accept option 608-3. In response to detecting input 612, device 600 disables the automatic framing mode. In response to detecting input 614 after input 612, device 600 accepts the video conference call and joins the video conference session with the automatic framing mode disabled, as depicted in FIG. 6B. If device 600 does not detect input 612, or if input 612 is an input to enable the automatic framing mode (e.g., framing mode affordance 610 was unselected when input 612 was received), device 600 accepts the video conference call in response to input 614 and joins the video conference session with the automatic framing mode enabled, as depicted in FIG. 6F.

FIG. 6B depicts scene 615, which is the physical environment within field-of-view 620 of camera 602. In the embodiment depicted in FIG. 6B, Jane 622 is sitting on couch 621 with device 600 positioned in front of her (e.g., on a table) with door 618 in the background. Field-of-view 620 represents the field-of-view of camera 602 (e.g., a maximum field-of-view of camera 602 or the wide angle field-of-view of camera 602), which encompasses scene 615. Portion 625 indicates a portion of field-of-view 620 that is currently outputted (or selected for output) for the video conference session (e.g., portion 625 represents the displayed portion of the camera field-of-view). As such, portion 625 indicates the portion of scene 615 that is currently represented in the displayed video feed depicted in camera preview 606. Field-of-view 620 is sometimes referred to herein as the available field-of-view, entire field-of-view, or the camera field-of-view, and portion 625 is sometimes referred to herein as the video feed field-of-view.

When the incoming video conference request is accepted, video conference request interface 604-1 transitions to video conference interface 604, as depicted in FIG. 6B. Video conference interface 604 is similar to video conference request interface 604-1, but is updated, for example, to depict incoming video feed 623, which includes the video data received at device 600 for a remote participant of the video conference. Video feed 623 includes representation 623-1 of John, who is the remote participant in the video conference with Jane 622. Camera preview 606 is now reduced in size, compared to FIG. 6A, and shifted toward the upper-right corner of display 601. Camera preview 606 includes representation 622-1 of Jane and a representation of the environment that is captured within portion 625 (e.g., the video feed field-of-view). Options menu 608 is updated to include framing mode affordance 610. In some embodiments, framing mode affordance 610 is displayed in camera preview 606, as illustrated in FIG. 6O, for example. As shown in FIG. 6B, framing mode affordance 610 is shown in an unselected state, indicating that the automatic framing mode is disabled.

In some embodiments, when the automatic framing mode is disabled, device 600 outputs a predetermined portion of the available field-of-view of camera 602 as the video feed field-of-view. An example of such an embodiment is depicted in FIGS. 6B-6D, where portion 625 represents a predetermined portion of the available field-of-view of camera 602 that is located in the center of field-of-view 620. In some embodiments, when the automatic framing mode is disabled, device 600 outputs the entire field-of-view 620 as the video feed field-of-view. An example of such an embodiment is depicted in FIG. 10A.

In FIG. 6B, Jane is participating in a video conference with John using device 600. Similarly, John is participating in the video conference with Jane using a device that includes one or more features of devices 100, 300, 500, or 600. For example, John is using a tablet similar to device 600 (e.g., John's tablet 600a in FIGS. 10H-10J and 12B-12N). Accordingly, John's device displays a video conference interface similar to video conference interface 604, except that the camera preview on John's device displays the video feed captured from John's device (what is currently depicted in video feed 623 in FIG. 6B), and the incoming video feed on John's device displays the video feed output from Jane's device 600 (what is currently depicted in camera preview 606 in FIG. 6B).

In FIG. 6C, device 600 is moved with respect to scene 615 and, as a result, field-of-view 620, and portion 625, pivot with device 600. Because the automatic framing mode is disabled, device 600 does not automatically adjust the video feed field-of-view to remain fixed on Jane's position within field-of-view 620. Instead, the perspective of the video feed moves with device 600, and Jane 622 is no longer centered in the video feed field-of-view, as indicated by portion 625 and depicted in camera preview 606, which shows the background of scene 615 and a portion of representation 622-1 of Jane. In the embodiment depicted in FIG. 6C, the movement of device 600 is a pivot, however, the movement of field-of-view 620 and portion 625 could be caused by other movements such as tilting, rotating, and/or moving (e.g., forward, backward, and/or side-to-side) device 600 in a manner such that Jane 622 does not remain located within portion 625.

In FIG. 6D, device 600 is returned to its original position, and Jane 622 is bending down, moving out of portion 625. Again, because the automatic framing mode is disabled, device 600 does not automatically adjust the video feed field-of-view to follow Jane's movement as she moves out of portion 625. The video feed field-of-view remains stationary while Jane 622 moves, and representation 622-1 of Jane is mostly out of frame in camera preview 606.

In FIG. 6D, device 600 detects input 626 (e.g., a tap input) on framing mode affordance 610. In response, device 600 bolds framing mode affordance 610 (to indicate its selected/enabled state) and enables the automatic framing mode, as shown in FIG. 6E. When automatic framing mode is enabled, device 600 automatically adjusts the displayed video feed field-of-view based on conditions detected within scene 615. In the embodiment depicted in FIG. 6E, device 600 adjusts the displayed video feed field-of-view to center on Jane's face. Accordingly, device 600 updates camera preview 606 to include representation 622-1 of Jane centered in the frame and, in the background, representation 621-1 of the couch upon which she is sitting. Field-of-view 620 remains fixed because the position of camera 602 remains unchanged. However, the position of Jane's face within field-of-view 620 does change. As a result, device 600 adjusts (e.g., repositions) the displayed portion of field-of-view 620 so that Jane remains positioned within camera preview 606. This is represented in FIG. 6E by the repositioning of portion 625 so that it is centered on Jane's face. In FIG. 6E, portion 627 corresponds to the prior location of portion 625 and, thus, represents the portion of field-of-view 620 that was previously displayed in camera preview 606 (before the adjustment resulting from enabling automatic framing mode).

FIG. 6F depicts scene 615 and device 600 when the automatic framing mode is enabled in response to input 614 to accept the incoming request to join the video conference while the automatic framing mode is enabled (or, alternatively, in response to input 626 to enable the automatic framing mode). Accordingly, device 600 displays representation 622-1 of Jane centered in camera preview 606.

Figure 6G:
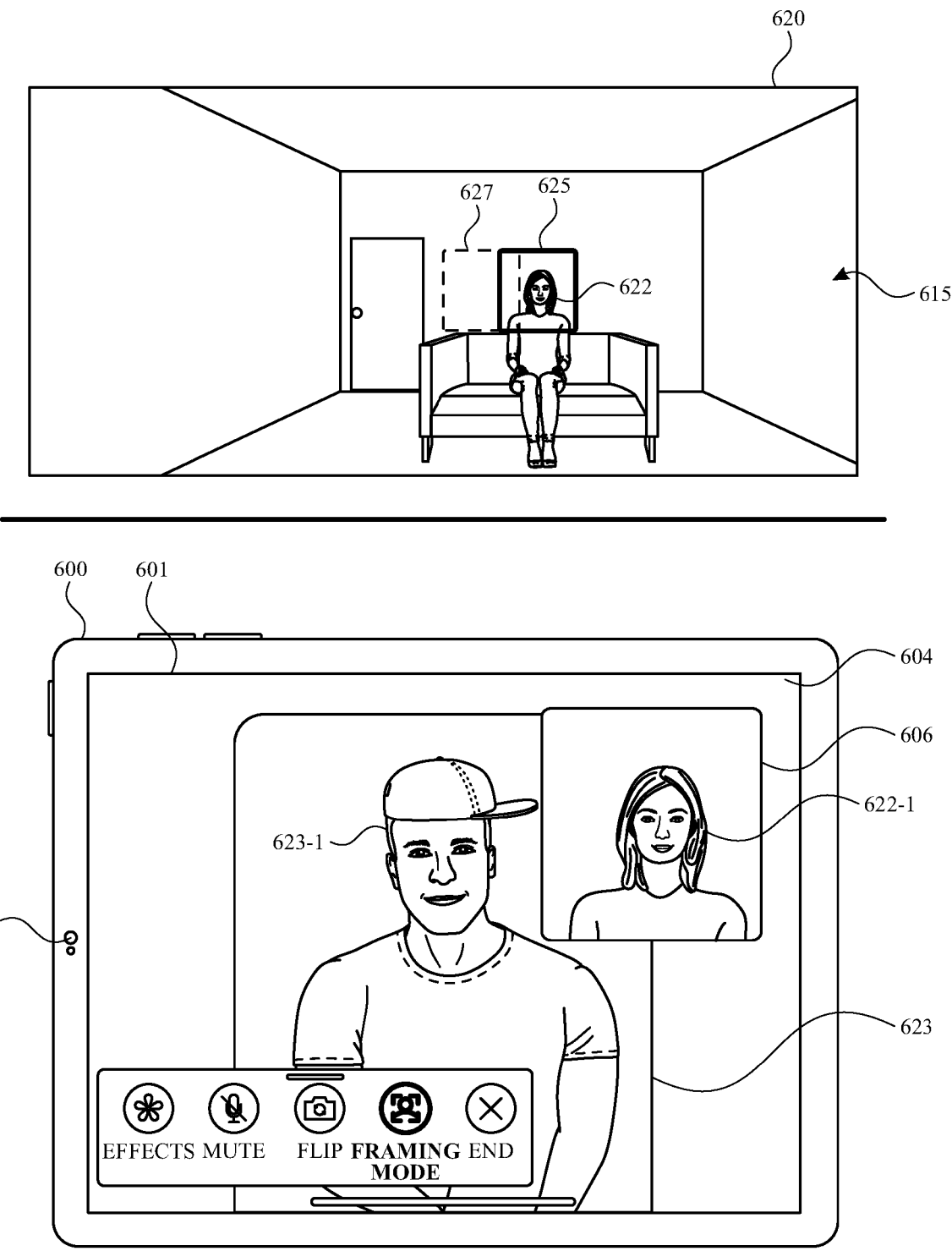

In FIG. 6G, device 600 is moved in a manner similar to that discussed above with respect to FIG. 6C. However, because the automatic framing mode is enabled in FIG. 6G, device 600 automatically adjusts the video feed field-of-view (portion 625) relative to field-of-view 620 to remain fixed on Jane's face, which has changed position relative to device 600 and camera 602 in response to the pivot of device 600. Accordingly, camera preview 606 continues to display representation 622-1 of Jane centered in the video feed field-of-view. The adjustment of the video feed field-of-view is represented by the change in the position of portion 625 within field-of-view 620. For example, when compared to FIG. 6F, the relative position of portion 625 has moved from a centered location within field-of-view 620 (represented in FIG. 6G by portion 627), to the shifted position depicted in FIG. 6G. In the embodiment depicted in FIG. 6G, the movement of device 600 is a pivot, however, device 600 can automatically adjust the displayed video feed field-of-view in response to other movements such as tilting, rotating, and/or moving (e.g., forward, backward, and/or side-to-side) device 600 in a manner such that Jane 622 remains located within field-of-view 620.

Figure 6H:
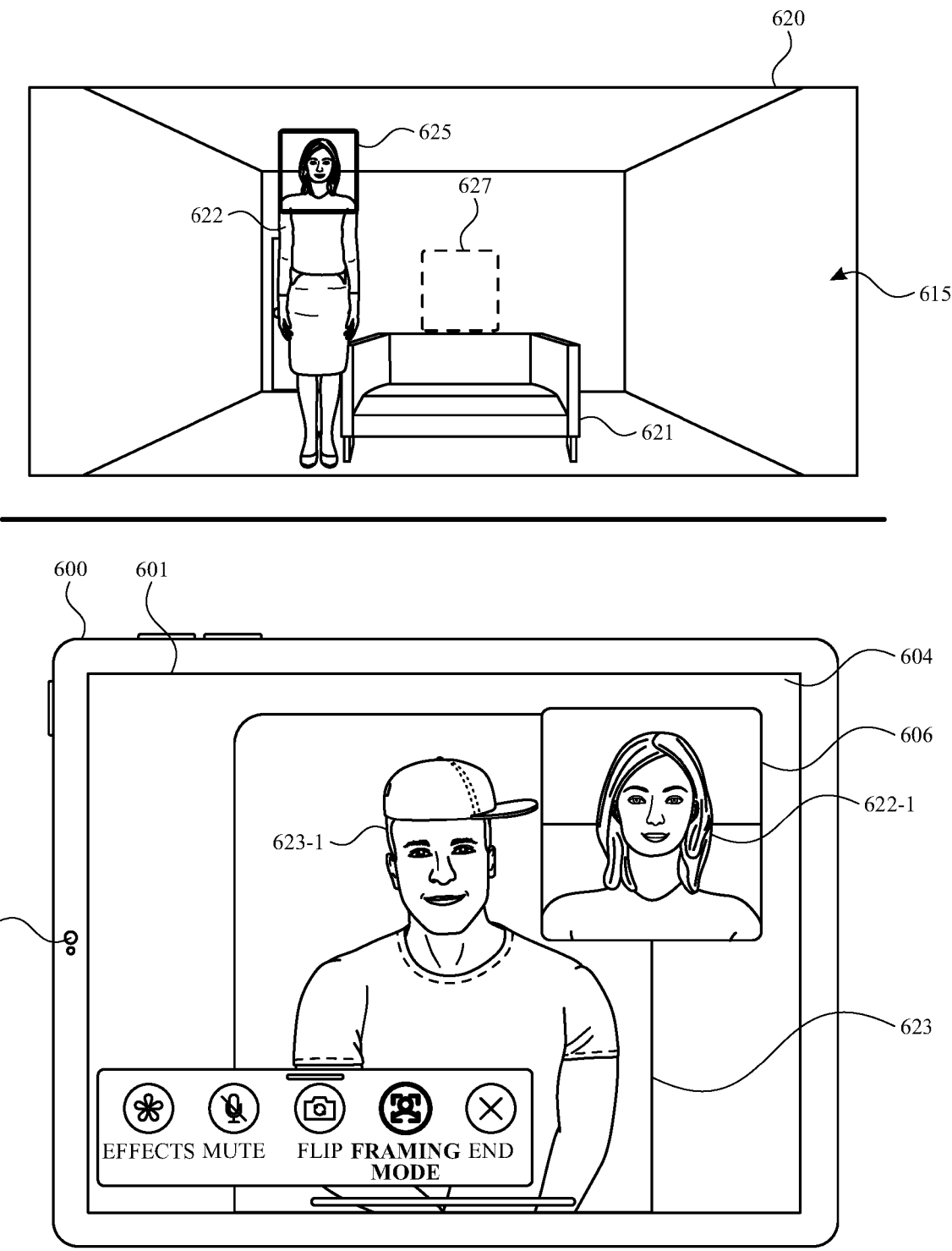

In FIG. 6H, device 600 is returned to its original position, and Jane 622 has moved to a standing position next to couch 621. Device 600 detects the updated position of Jane 622 in scene 615, and updates the video feed field-of-view to maintain its position on Jane 622, as shown in camera preview 606. Accordingly, portion 625 has moved from its prior position represented by portion 627 to the updated position around Jane's face, as depicted in FIG. 6H.

In some embodiments, the transition from the field-of-view depicted in camera preview 606 in FIG. 6G to the field-of-view depicted in camera preview 606 in FIG. 6H is executed as a match cut. For example, the transition from camera preview 606 in FIG. 6G to camera preview 606 in 6H is a match cut that is executed when Jane 622 has moved from her seated position on couch 621 to her standing position adjacent the couch. The result of the match cut is that the camera preview 606 appears to transition from a first camera view in FIG. 6G, to a different camera view in FIG. 6H (the different camera view optionally having a same zoom level as the camera view in FIG. 6G). However, the actual field-of-view of camera 602 (e.g., field-of-view 620) has not changed. Rather, only the portion of the field-of-view that is displayed (portion 625) has changed position within field-of-view 620.

Figure 6I:
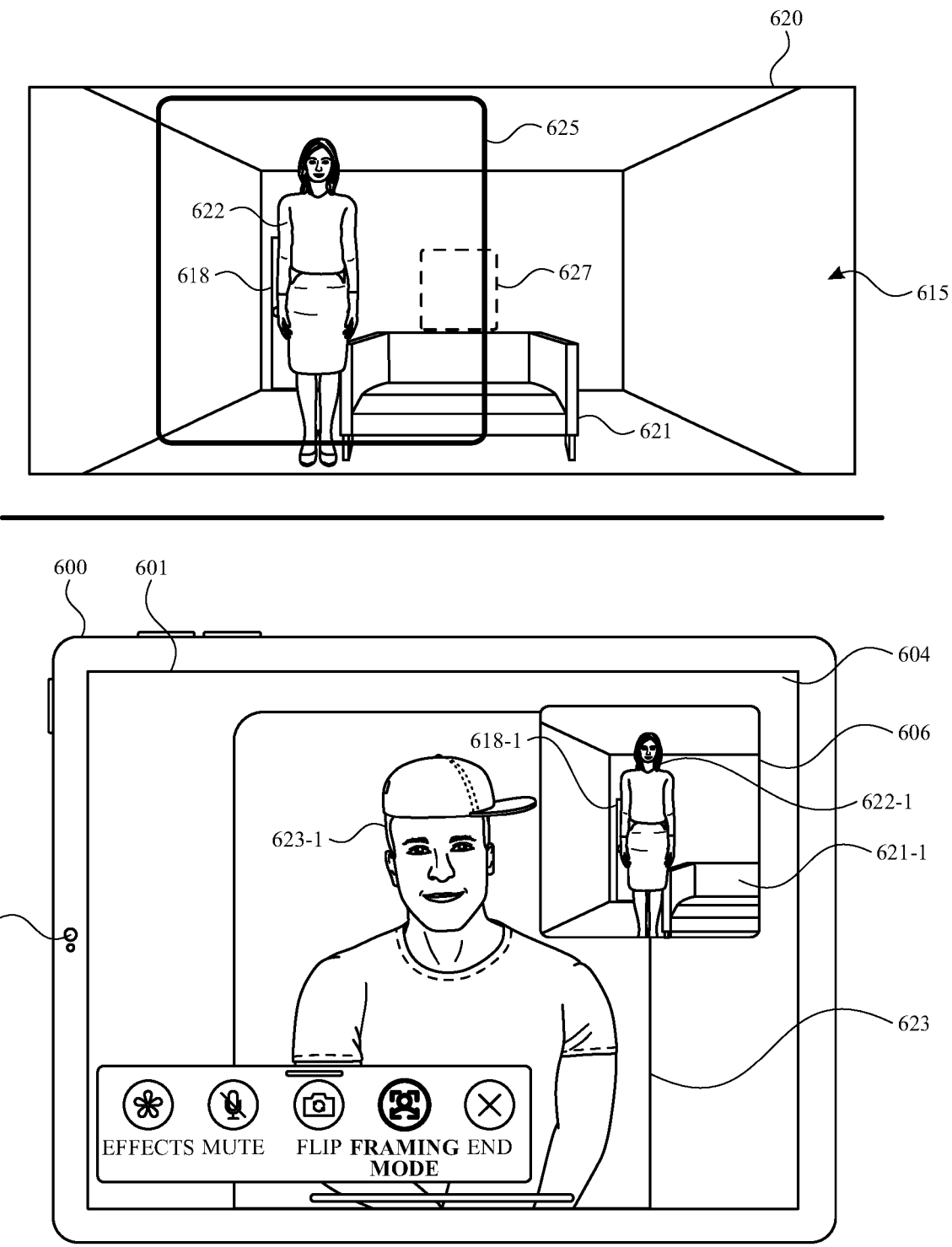

FIG. 6I is an embodiment similar to that depicted in FIG. 6H, but with camera preview 606 having a greater, zoomed out field-of-view when compared to that shown in FIG. 6H. Specifically, the embodiment depicted in FIG. 6I illustrates a jump cut transition from the camera preview in FIG. 6G to the camera preview in FIG. 6I. The jump cut transition is depicted by transitioning from camera preview 606 in FIG. 6G, to camera preview 606 in FIG. 6I, which has a larger (e.g., zoomed out) field-of-view. Accordingly, the video feed field-of-view in FIG. 6I (represented by portion 625) is a larger portion of field-of-view 620. This is illustrated by the size difference between portion 625 (corresponding to the camera preview in FIG. 6I) and portion 627 (corresponding to the camera preview in FIG. 6G).

FIGS. 6H and 6I illustrate specific embodiments of a transition between different camera previews. In some embodiments, other transitions can be executed such as, for example, by continuously moving (e.g., panning and/or zooming) the video feed field-of-view within field-of-view 620 to follow Jane 622 as she moves about scene 615.

Figure 6J:
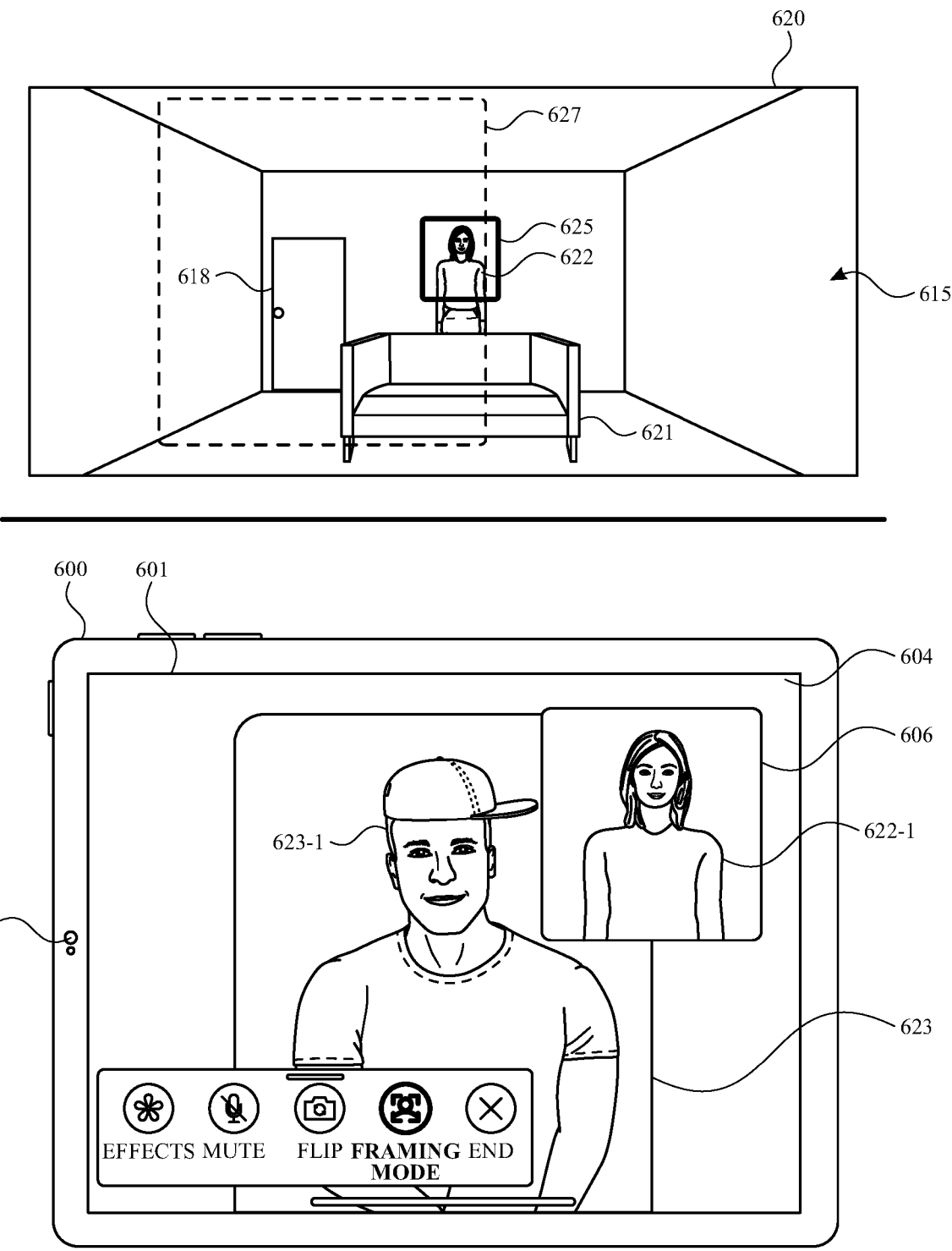

In FIG. 6J, Jane 622 has moved away from device 600, behind couch 621. In response to detecting the change in position of Jane 622, device 600 performs a transition (e.g., a jump cut transition) where camera preview 606 depicts a zoomed in view of Jane in scene 615. In the embodiment depicted in FIG. 6J, device 600 zooms in on Jane 622 (e.g., reduces the field-of-view) when she moves away from the camera (e.g., by a threshold distance). In some embodiments, device 600 zooms out from Jane 622 (e.g., enlarges the displayed field-of-view) as she moves toward the camera (e.g., by a threshold distance). For example, if Jane 622 were to move from her position in FIG. 6J to her previous position in FIG. 6I, camera preview 606 will zoom out to the camera preview depicted in FIG. 6I.

Figure 6K:
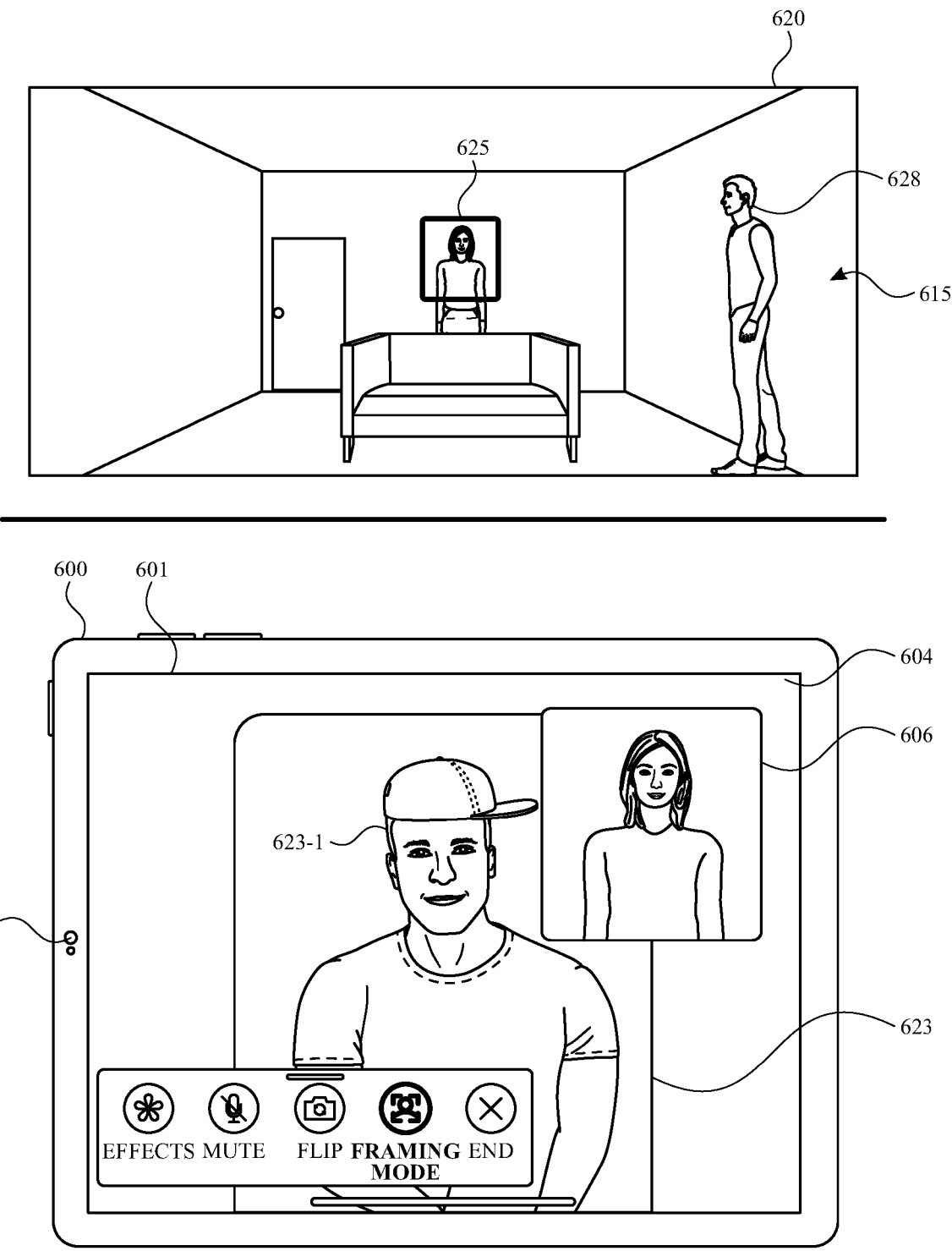

In FIG. 6K, another subject, Jack 628, walks into scene 615. Device 600 continues to display video conference interface 604 with the same camera preview as depicted in FIG. 6J. In the embodiment depicted in FIG. 6K, device 600 detects Jack 628 within field-of-view 620, but maintains the same video feed field-of-view while Jack 628 is moving about the scene or until Jack 628 moves to a particular location in the scene (e.g., closer to the center of the scene). In some embodiments, device 600 displays a prompt to adjust the camera preview when an additional subject is detected within field-of-view 620. Examples of such prompts are discussed in greater detail below with respect to FIG. 6P and the embodiments depicted in FIGS. 8A-8J.

Figure 6L:
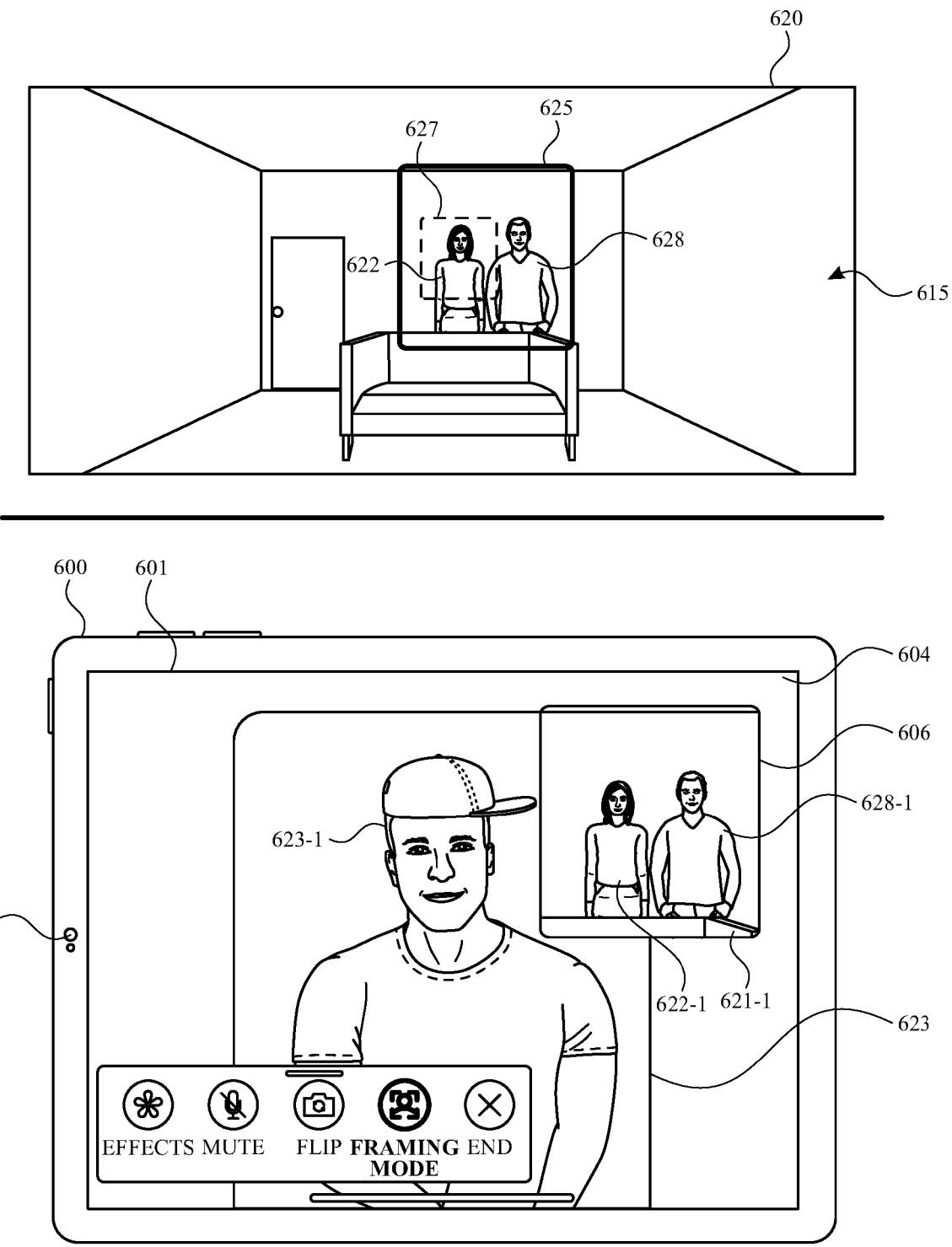

In FIG. 6L, device 600 reframes camera preview 606 to include representation 628-1 of Jack 628, who is now standing next to Jane 622 in scene 615. In some embodiments, device 600 automatically adjusts camera preview 606 in response to determining that Jack 628 stops moving about scene 615 and/or that he is exhibiting behavior indicative of a desire to participate in the video conference. Examples of such behavior can include turning attention to device 600 and/or camera 602, focusing/looking at, or in the general direction of, camera 602, remaining still (e.g., for at least a particular amount of time), being positioned next to participants of the video conference (e.g., Jane 622), facing towards device 600, speaking, and the like. In some embodiments, when the automatic framing mode is enabled, device 600 automatically adjusts the camera preview in response to detecting a change in the number of subjects detected within field-of-view 620 (such as when Jack 628 entered scene 615). As depicted in FIG. 6L, portion 625 represents the adjusted video feed field-of-view, and portion 627 represents the dimensions of the video feed field-of-view prior to being adjusted in FIG. 6L. When compared to the video feed field-of-view in FIG. 6K, the adjusted field-of-view in FIG. 6L is zoomed out and re-centered on Jane 622 and Jack 628, as depicted in camera preview 606.

Figure 6M:
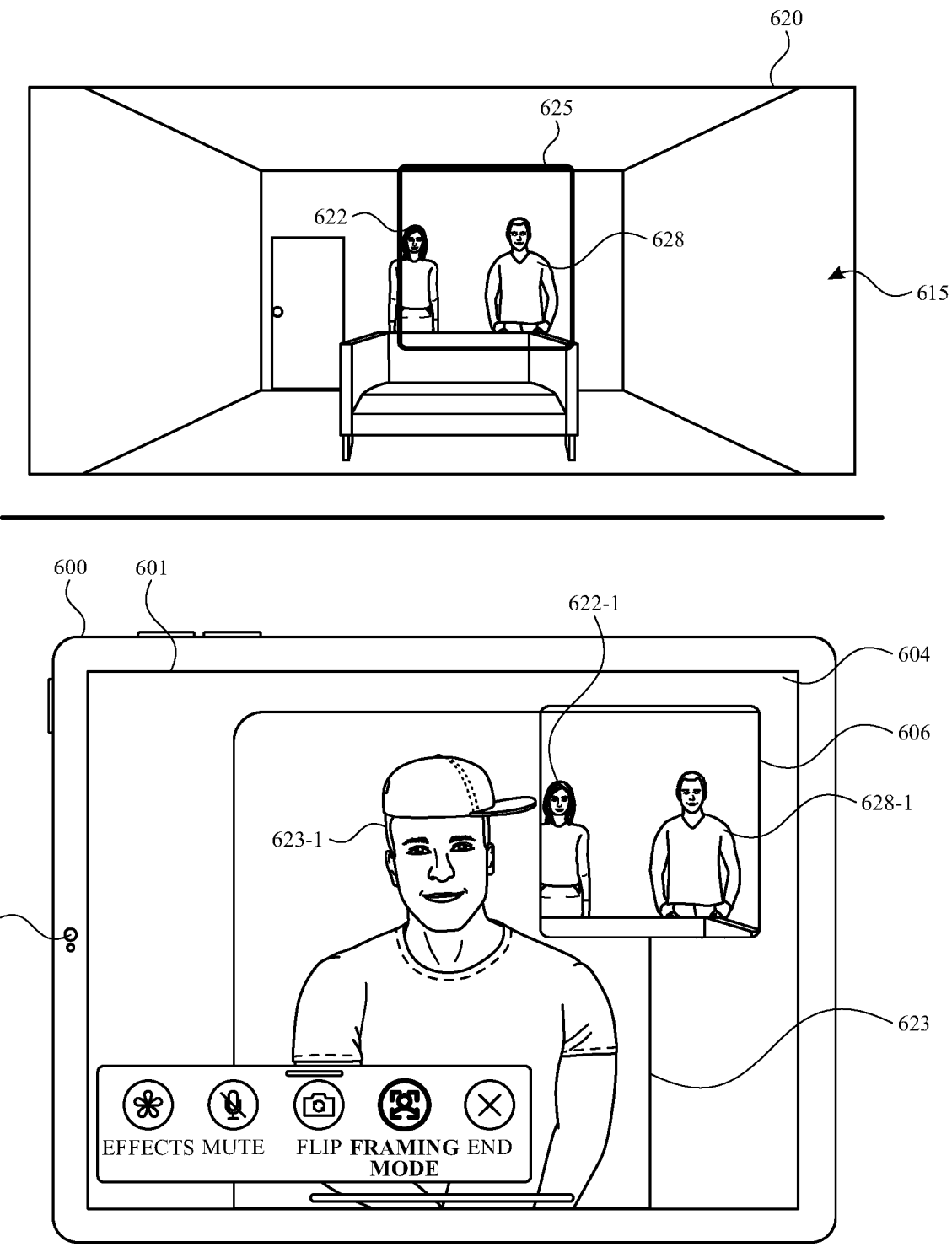

In FIG. 6M, Jane 622 begins to move away from Jack 628 and out of the video feed field-of-view represented by portion 625 and camera preview 606. While detecting Jane's movement, device 600 maintains (e.g., does not adjust) the field-of-view of camera preview 606. In some embodiments, device 600 readjusts the size of the video feed field-of-view as Jane moves away from Jack, such that both subjects remain within the video feed field-of-view (the camera preview). In some embodiments, after Jane has moved away from Jack, device 600 readjusts the video feed field-of-view after Jane stops moving, such that both subjects are within the camera preview.

Figure 6N:
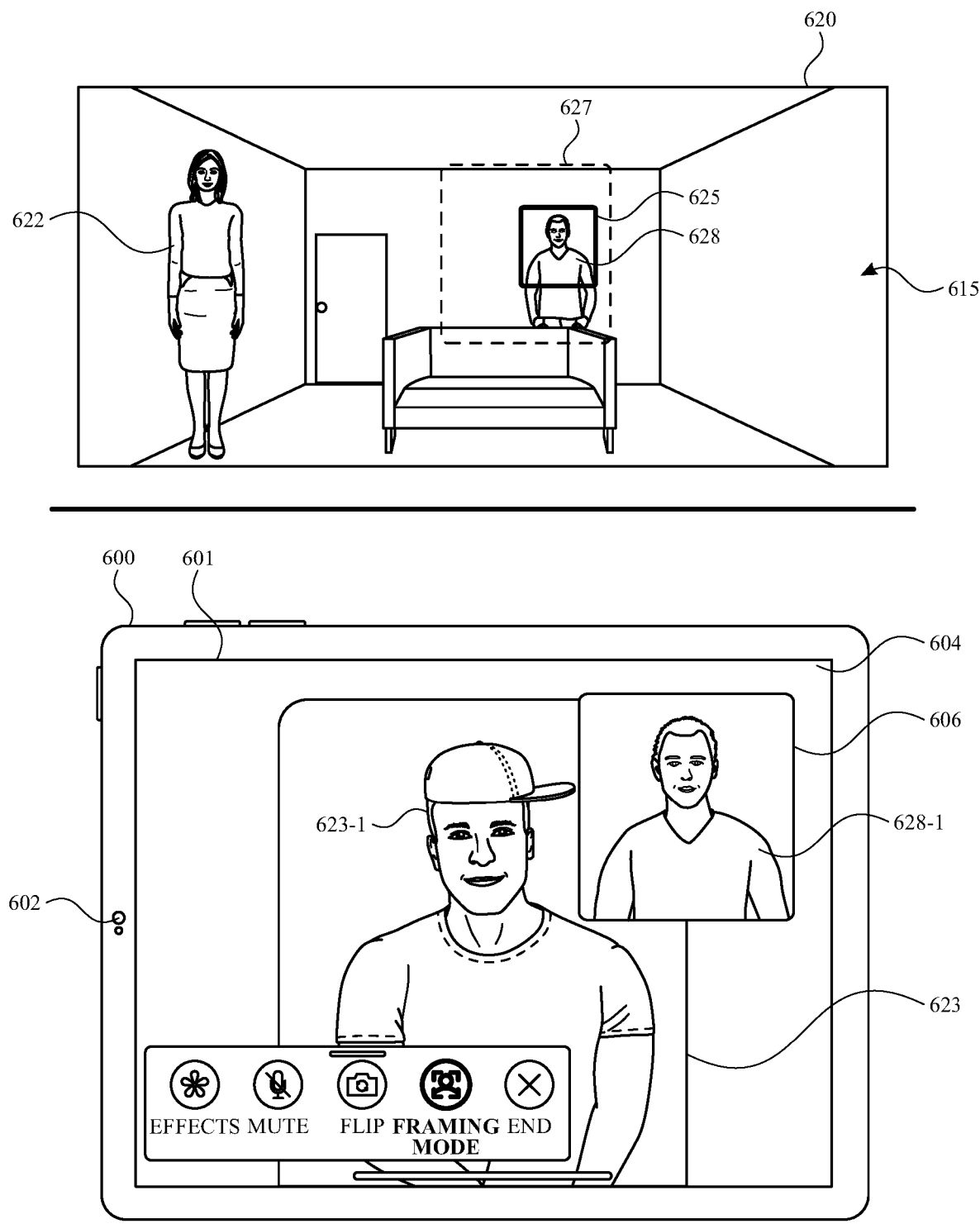
Figure 6O:
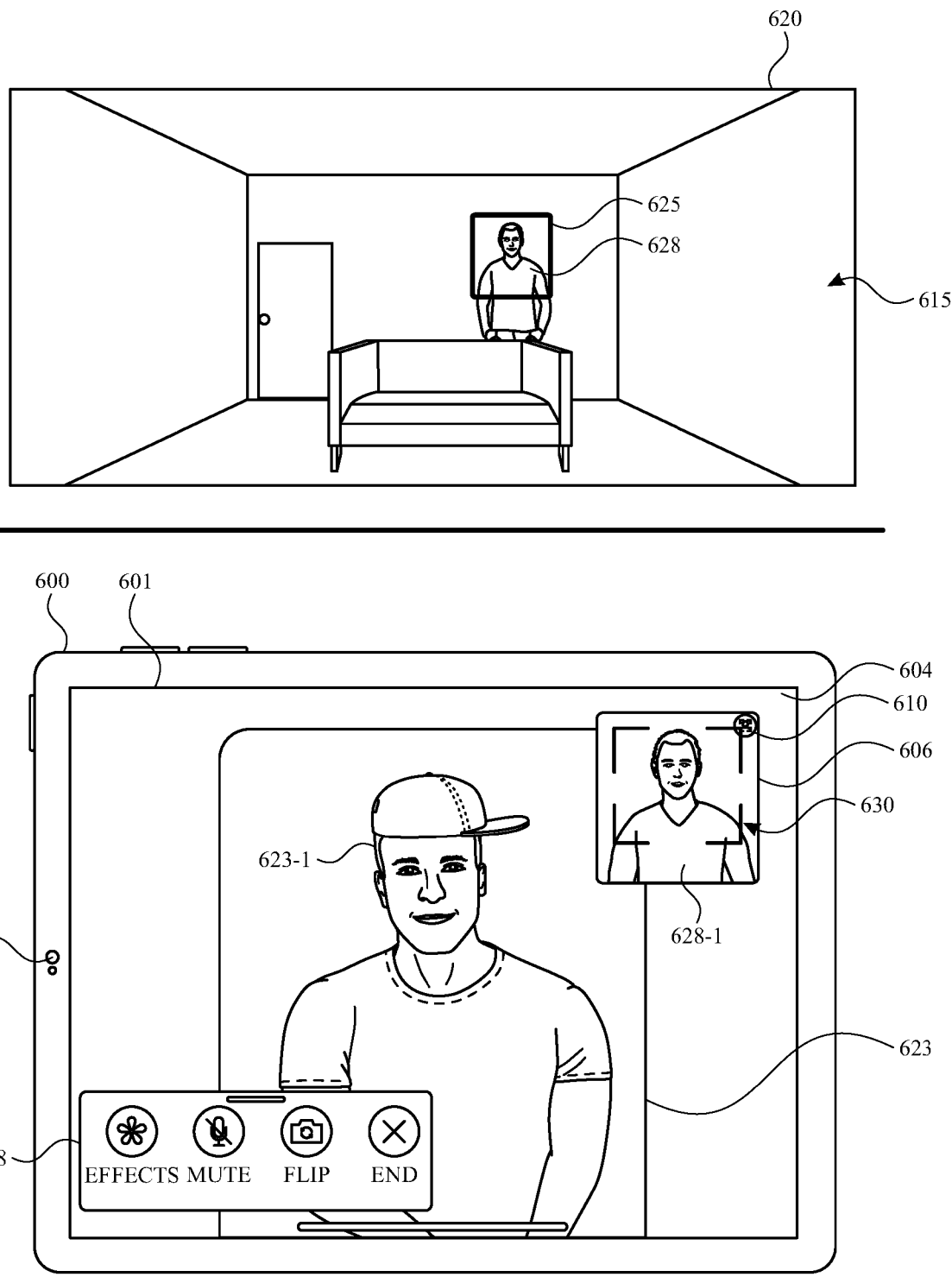

In FIG. 6N, device 600 detects Jane 622 is no longer within portion 625 of FIG. 6M (e.g., portion 627 in FIG. 6N) and, in response, adjusts the displayed video feed field-of-view to zoom in on Jack 628. Accordingly, device 600 displays video conference interface 604 with camera preview 606 having a zoomed in view of Jack 628. FIG. 6N depicts portion 625 having a smaller size than portion 627, to indicate the change in the displayed video feed field-of-view.

In some embodiments, when the automatic framing mode is enabled, device 600 displays one or more prompts to adjust the video feed field-of-view to include additional participants, in response to detecting additional subjects within field-of-view 620. Examples of such embodiments are described below with respect to FIGS. 6O-6Q.

FIG. 6O depicts an embodiment similar to that illustrated in FIG. 6N, but with framing mode affordance 610 displayed in the camera preview region instead of in options menu 608. Device 600 displays framing indicators 630 positioned around representation 628-1 of Jack, to indicate that device 600 detects the presence of a face (e.g., Jack's face) in the camera preview. In some embodiments, the framing indicators also indicate that the automatic framing mode is enabled and that the detected face is being tracked while the face is detected within portion 625, camera preview 606, and/or field-of-view 620. Jack 628 is currently the only participant of the video conference who is located in scene 615.

Figure 6P:
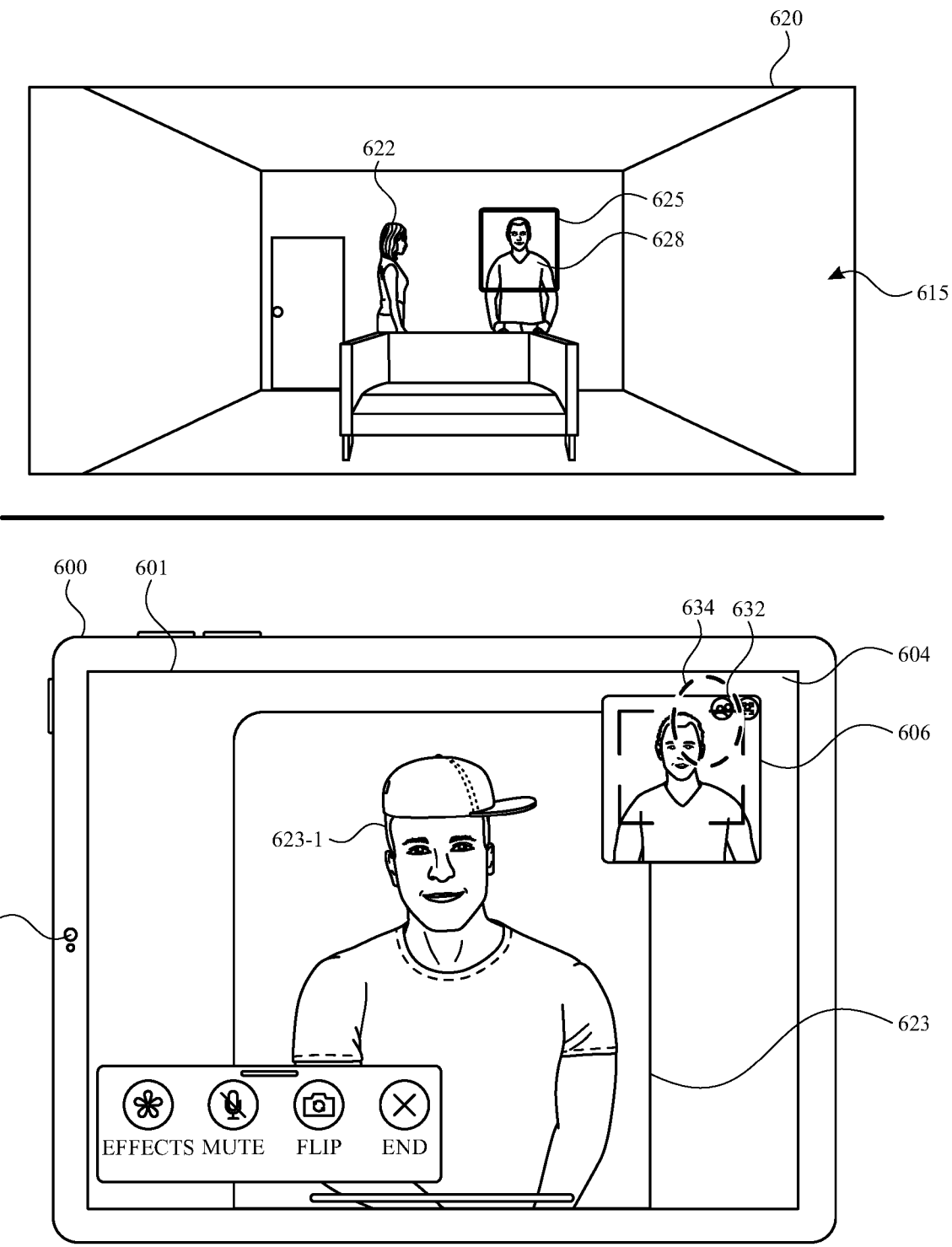
Figure 6Q:
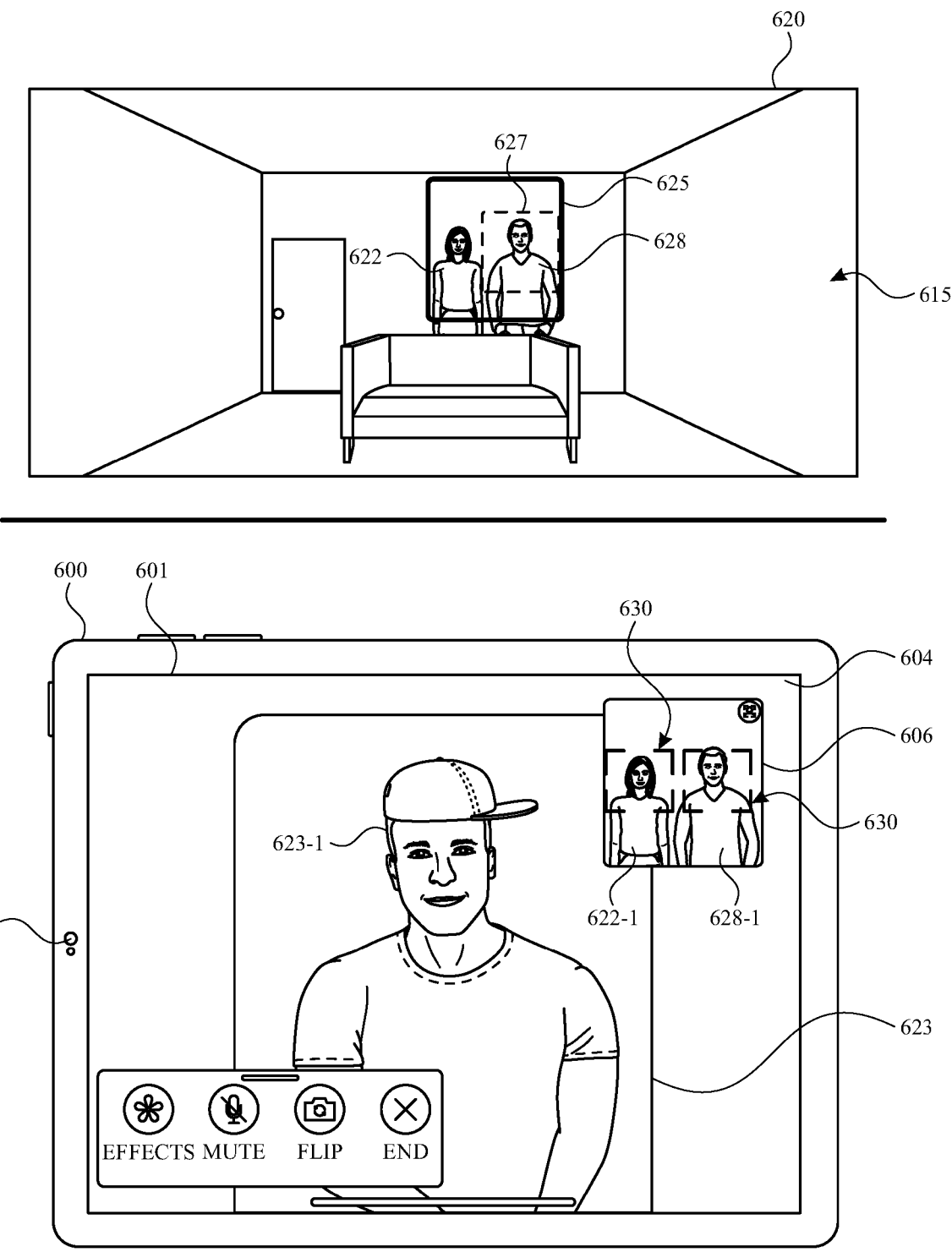

In FIG. 6P, device 600 detects that Jane 622 has entered scene 615, within field-of-view 620. In response, device 600 updates video conference interface 604 by displaying add affordance 632 in the camera preview region. Add affordance 632 is selectable to adjust the displayed video feed field-of-view to include additional subjects detected within field-of-view 620.

In FIG. 6P, device 600 detects input 634 on add affordance 632 and, in response, adjusts portion 625 such that camera preview 606 includes representation 622-1 of Jane with representation 628-1 of Jack, as depicted in FIG. 6Q. In some embodiments, Jane 622 is added as a participant of the video conference. Device 600 also recognizes the presence of Jane's face and displays framing indicators 630 around the representation of Jane's face (in addition to those around the representation of Jack's face) to indicate that the framing mode is enabled and that Jane's face is being tracked while it is detected within portion 625, camera preview 606, and/or field-of-view 620.

FIGS. 7A-7B depict a flow diagram illustrating a method for managing a live video communication session using an electronic device in accordance with some embodiments. Method 700 is performed at a computer system (e.g., a smartphone, a tablet) (e.g., 100, 300, 500, 600) that is in communication with a display generation component (e.g., 601) (e.g., a display controller, a touch-sensitive display system), one or more cameras (e.g., 602) (e.g., an infrared camera; a depth camera; a visible light camera), and one or more input devices (e.g., a touch-sensitive surface). Some operations in method 700 are, optionally, combined, the orders of some operations are, optionally, changed, and some operations are, optionally, omitted.

As described below, method 700 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 700, computer system (e.g., 600) displays (702), via the display generation component (e.g., 601), a communication request interface (e.g., 604-1 in FIG. 6A) (e.g., an interface for an incoming or outgoing live video communication session (e.g., a live video chat session, a live video conference session)).

The computer system (e.g., 600) displays (704) the communication request interface (e.g., 604-1 in FIG. 6A) including a first selectable graphical user interface object (e.g., 608-3) (e.g., an "accept" affordance) associated with a process for joining a live video communication session. In some embodiments, the accept affordance is selectable to initiate a process for accepting an incoming request to join a live video communication session. In some embodiments, the first selectable graphical user interface object is a "cancel" affordance that is selectable to initiate a process for canceling or terminating an outgoing request to join a live video communication session.

The computer system (e.g., 600) displays (706) (e.g., concurrently with 704) the communication request interface (e.g., 604-1 in FIG. 6A) including a second selectable graphical user interface object (e.g., 610) (e.g., a "framing mode" affordance; a "background blur" affordance; a "dynamic video quality" affordance) associated with a process for selecting between using a first camera mode for the one or more cameras (e.g., an automatic framing mode; a background blur mode; a dynamic video quality mode) and using a second camera mode for the one or more cameras (e.g., a mode different from the first camera mode (e.g., a mode in which the automatic framing mode is disabled, a mode in which the background blur mode is disabled, and/or a mode in which the dynamic video quality mode is disabled)) during a live video communication session.

In some embodiments, the framing mode affordance is selectable to enable/disable a mode (e.g., automatic framing mode) for: 1) tracking, during a live video communication session, a position and/or location of one or more subjects detected within a field-of-view of the one or more cameras, and 2) automatically adjusting a displayed view of the subject(s), during the live video communication session, based on the tracking of the subject.

In some embodiments, the background blur affordance is selectable to enable/disable a mode (e.g., background blur mode) in which a visual effect (e.g., a blurring, darkening, shading, obscuring, desaturating, or otherwise deemphasizing effect) is applied to a background portion of the camera field-of-view (e.g., 606) (e.g., a camera preview; an output video feed of the camera field-of-view) during the live video communication session (e.g., without applying the visual effect to the portion of the camera field-of-view that includes the representation of the subject (e.g., a foreground portion) (e.g., 622-1)).

In some embodiments, the dynamic video quality affordance is selectable to enable/disable a mode (e.g., dynamic video quality mode) for outputting (e.g., transmitting and, optionally, displaying) a camera field-of-view with portions having different degrees of compression and/or video qualities. For example, portions of the camera field-of-view that include a detected face (e.g., 622-1) are compressed less than portions of the camera field-of-view that do not include a detected face. In some embodiments, there is an inverse relationship between the degree of compression and video quality (e.g., greater compression results in lower video quality; less compression results in higher video quality). As such, the video feed for the live video communication session can be transmitted (e.g., by the computer system (e.g., 600)) to a recipient device of a remote participant of the live video communication session so that the portions of the camera field-of-view that include a detected face can be displayed at the recipient device with a higher video quality than the portions that do not include a detected face (due to the reduced compression of the portions of the camera field-of-view that include a detected face and the increased compression of the portions of the camera field-of-view that do not include a detected face). In some embodiments, the computer system varies the amount of compression as the video bandwidth changes (e.g., increases, decreases). For example, the degree of compression of the portion(s) of the camera field-of-view (e.g., the camera feed) that does not include the detected face(s) varies (e.g., increases or decreases with the corresponding change in bandwidth) while the degree of compression of the portion(s) of the camera field-of-view that includes the detected face(s) remains constant (or, in some embodiments, varies at a lesser rate or by a lesser amount than the portion(s) of the camera field-of-view that does not include the face(s)).

While displaying the communication request interface (e.g., 604-1 in FIG. 6A), the computer system (e.g., 600) receives (708), via the one or more input devices (e.g., 601), a set of one or more inputs (e.g., 612 and/or 614) that includes a selection (e.g., 614) of the first selectable graphical user interface object (e.g., 608-3) (e.g., the set of one or more inputs includes a selection of the accept affordance and, optionally, a selection of the framing mode affordance, background blur affordance, and/or dynamic video quality affordance).

In response to receiving the set of one or more inputs (e.g., 612 and/or 614) that includes a selection (e.g., 614) of the first selectable graphical user interface object (e.g., 608-3), the computer system (e.g., 600) displays (710), via the display generation component (e.g., 601), a live video communication interface (e.g., 604) for the live video communication session.

While displaying the live video communication interface (e.g., 604), the computer system (e.g., 600) detects (712) a change in a scene (e.g., 615) (e.g., a change in position of a subject) in the field-of-view (e.g., 620) of the one or more cameras (e.g., 602). In some embodiments, the scene includes a representation of the subject and, optionally, one or more additional subjects in the field of view of the one or more cameras.

In response (714) to detecting the change in the scene (e.g., 615) in the field-of-view (e.g., 620) of the one or more cameras (e.g., 602). The computer system (e.g., 600) perform one or more of steps 716 and 718 in method 700.

In accordance with a determination that the first camera mode is selected for use (e.g., enabled) (e.g., if the first camera mode is disabled by default, the set of one or more inputs includes a selection of the second selectable graphical user interface object; if the first camera mode is enabled by default, the set of one or more inputs does not include a selection of the second selectable graphical user interface object) (e.g., the framing mode affordance is in a selected state when the accept affordance is selected), the computer system (e.g., 600) adjusts (716) (e.g., automatically; without user input) a representation of the field-of-view of the one or more cameras (e.g., 606) (e.g., a displayed field-of-view of the one or more cameras) during the live video communication session based on the detected change in the scene (e.g., 615) in the field-of-view (e.g., 620) of the one or more cameras (e.g., 602) (e.g., automatically adjusting the representation of the field-of-view of the one or more cameras (e.g., based on a detected position of a subject) during the live video communication session). Adjusting a representation of the field-of-view of the one or more cameras during the live video communication based on the detected change in the scene in the field-of-view of the one or more cameras when the first camera mode is selected for use enhances the video communication session experience by automatically adjusting the field-of-view of the cameras (e.g., to maintain display of the subject/user) without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, adjusting the representation of the field-of-view of the one or more cameras (e.g., 606) during the live video communication session includes: 1) in accordance with a determination that a first set of criteria is met, including that the scene includes a subject (e.g., 622) (e.g., one or more users of the computer system) detected at a first position (within the field-of-view 620 of the one or more cameras; in FIG. 6F), displaying the live video communication interface 604 having a representation of a first field-of-view (e.g., 606 in FIG. 6F) (e.g., the live video communication interface is displayed with a first digital zoom level and a first displayed portion of the field-of-view of the one or more cameras) (in some embodiments, the representation of the first field-of-view includes a representation of the subject while the subject is located at the first position); and 2) in accordance with a determination that a second set of criteria is met, including that the subject is detected at a second position (e.g., 625 in FIG. 6H) different from the first position, displaying the live video communication interface having a representation of a second field-of-view (e.g., 606 in FIG. 6H) different from the representation of the first field-of-view (e.g., the live video communication interface is displayed with a second digital zoom level and/or a second displayed portion of the field-of-view of the one or more cameras) (e.g., a representation of a field-of-view that is zoomed in, zoomed out, and/or panned in a direction relative to the representation of the first field-of-view) (in some embodiments, the representation of the second field-of-view includes a representation of the subject while the subject is located at the second position). In some embodiments, when the first camera mode is selected for use (e.g., enabled), the representation of the field-of-view changes automatically (e.g., without changing the actual field-of-view of the one or more cameras) in response to a detected change in position of the subject and/or in response to detecting a second subject entering or leaving the field-of-view of the one or more cameras. For example, the representation of the field-of-view changes to track the position of the subject and adjusts a displayed position and/or zoom level (e.g., digital zoom level) to more prominently display the subject (e.g., changing the digital zoom level to appear to be zooming in on the subject as they move away from the camera; changing the digital zoom level to appear to be zooming out from the subject as they move toward the camera; changing the displayed portion of the field-of-view of the one or more cameras to appear to be panning in a particular direction as the subject moves in that direction).)

In accordance with a determination that the second camera mode is selected for use (e.g., enabled) (e.g., the framing mode affordance is in an unselected or deselected state when the accept affordance is selected), the computer system (e.g., 600) forgoes (718) adjusting a representation of the field-of-view of the one or more cameras during the live video communication session (e.g., as depicted in FIG. 6D) (e.g., based on the detected change in the scene in the field-of-view of the one or more cameras) (e.g., when the first camera mode is disabled, the live video communication interface maintains a same (e.g., default) representation of the field-of-view, regardless of whether or not the subject is positioned within the scene in the field-of-view of the one or more cameras, and regardless of where the subject is positioned within the field-of-view of the one or more cameras). In some embodiments, forgoing adjusting the representation of the field-of-view of the one or more cameras during the live video communication session includes: 1) while (e.g., in accordance with a determination that) the subject has the first position within the scene in the field-of-view of the one or more cameras (e.g., as depicted in FIG. 6B), displaying the live video communication interface having a representation of the first field-of-view (e.g., 606 in FIG. 6B); and 2) while (e.g., in accordance with a determination that) the subject has the second position within the scene in the field-of-view of the one or more cameras (e.g., in FIG. 6D), displaying the live video communication interface having the representation of the first field-of-view (e.g., 606 in FIG. 6D). In some embodiments, the representation of the first field-of-view is a standard or default representation of a field-of-view that does not change based on a change in the scene (e.g., a change in position of the subject with respect to the one or more cameras or a second subject entering or leaving the field-of-view of the one or more cameras).

In some embodiments, the detected change in the scene (e.g., 615) in the field-of-view (e.g., 620) of the one or more cameras (e.g., 602) includes a detected change in a set of attention-based factors for one or more subjects (e.g., 622; 628) in the scene (e.g., a first subject turns their attention to (e.g., focuses on, looks at) the one or more cameras (e.g., based on a gaze position, head position, and/or body position of the first subject)). In some embodiments, the computer system (e.g., 600) adjusts the representation of the field-of-view of the one or more cameras (e.g., 606) during the live video communication session based on the detected change in the scene in the field-of-view of the one or more cameras, including adjusting the representation of the field-of-view of the one or more cameras during the live video communication session based on (in some embodiments, in response to) the detected change in the set of attention-based factors for the one or more subjects in the scene (e.g., as depicted in FIG. 6L). Adjusting the representation of the field-of-view of the one or more cameras during the live video communication based on the detected change in the set of attention-based factors for the one or more subjects in the scene enhances the video communication session experience by automatically adjusting the field-of-view of the cameras based on the set of attention-based factors of the subjects in the scene without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, when the automatic framing mode is enabled, the computer system (e.g., 600) adjusts (e.g., reframes) the displayed portion of the field-of-view of the one or more cameras (e.g., 606) based on one or more attention-based factors of subjects (e.g., 622; 628) detected within the field-of-view (e.g., 620) of the one or more cameras (e.g., 602). For example, when the first subject turns attention to the one or more cameras, the representation of the field-of-view of the one or more cameras changes (e.g., zooms out) to include a representation of the first subject or to focus on the first subject. Conversely, when the first subject's attention shifts away from the one or more cameras, the representation of the field-of-view of the one or more cameras changes (e.g., zooms in) to exclude a representation of the first subject (e.g., if other subjects remain in the field-of-view of the one or more cameras) or to focus on another subject.

In some embodiments, the set of attention-based factors includes a first factor that is based on a detected focal plane of a first subject (e.g., 628) of the one or more subjects in the scene (e.g., as depicted in FIG. 6L). Adjusting the representation of the field-of-view of the one or more cameras during the live video communication based on the detected focal plane of a first subject of the one or more subjects in the scene enhances the video communication session experience by automatically adjusting the field-of-view of the cameras when the focal plane of the first subject meets criteria without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first subject's attention is determined based on the first subject's focal plane. For example, if the first subject's focal plane aligns (e.g., is co-planar) with the focal plane of the one or more cameras or the focal plane of another subject participating in the live video communication session, then the first subject is considered to be paying attention to the one or more cameras. The first subject is, therefore, considered to be an active participant in the live video communication session, and the computer system then adjusts the representation of the field-of-view of the one or more cameras to include the first subject in the live video communication interface.

In some embodiments, the set of attention-based factors includes a second factor that is based on whether a second subject (e.g., 628) of the one or more subjects in the scene (e.g., 615) (e.g., a subject other than the first subject) is determined to be looking at the one or more cameras (e.g., 602). Adjusting the representation of the field-of-view of the one or more cameras during the live video communication based on whether a second subject in the scene is determined to be looking at the one or more cameras enhances the video communication session experience by automatically adjusting the field-of-view of the cameras when the second subject looks at the camera without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the second subject's attention is determined based on whether the second subject is looking at the one or more cameras. If so, the second subject is considered to be paying attention to the one or more cameras and is, therefore, considered to be an active participant in the live video communication session. Accordingly, the computer system adjusts the representation of the field-of-view of the one or more cameras to include the second subject in the live video communication interface.

In some embodiments, the detected change in the scene (e.g., 615) in the field-of-view (e.g., 620) of the one or more cameras (e.g., 602) includes a detected change in a number (e.g., amount; quantity) of subjects (e.g., 622; 628) detected in the scene (e.g., a detected change in a number of subjects detected in the scene that satisfy a first set of criteria (e.g., the subject(s) is positioned in the field-of-view of the one or more cameras and, optionally, is stationary) (e.g., one or more subjects entering or exiting the scene in the field-of-view of the one or more cameras)). In some embodiments, adjusting the representation of the field-of-view of the one or more cameras (e.g., 606) during the live video communication session based on the detected change in the scene in the field-of-view of the one or more cameras includes adjusting the representation of the field-of-view of the one or more cameras during the live video communication session based on (in some embodiments, in response to) the detected change in the number of subjects detected in the scene (e.g., that satisfy the first set of criteria) (e.g., as depicted in FIG. 6L and/or FIG. 6N). Adjusting the representation of the field-of-view of the one or more cameras during the live video communication based on the detected change in the number of subjects detected in the scene enhances the video communication session experience by automatically adjusting the field-of-view of the cameras when the number of subjects in the scene changes without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the automatic framing mode is enabled, the computer system (e.g., 600) adjusts (e.g., reframes) the displayed portion of the field-of-view of the one or more cameras based on the number of subjects detected within the field-of-view of the one or more cameras. For example, when the number of subjects detected in the scene increases, the representation of the field-of-view of the one or more cameras changes (e.g., zooms out) to include the additional subjects (e.g., along with the subjects that were previously detected). Similarly, when the number of subjects detected in the scene decreases, the representation of the field-of-view of the one or more cameras changes (e.g., zooms in) to capture the subject(s) remaining in the scene.

In some embodiments, adjusting the representation of the field-of-view of the one or more cameras (e.g., 606) during the live video communication session based on the detected change in the number of subjects detected in the scene is based on a determination of whether a subject in the field-of-view (e.g., 620) is stationary (e.g., relatively stationary; not moving more than a threshold amount of movement in the field-of-view of the one or more cameras). Adjusting the representation of the field-of-view of the one or more cameras during the live video communication based on whether a subject in the field-of-view is stationary enhances the video communication session experience by automatically adjusting the field-of-view of the cameras when the subject in the scene is stationary without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, when the automatic framing mode is enabled, the computer system (e.g., 600) considers a detected subject (e.g., 628) to be a participant in the live video communication session when the subject does not move more than a threshold amount of movement. When the subject is considered an active participant, the computer system adjusts (e.g., reframes) the displayed portion of the field-of-view of the one or more cameras (e.g., 606) to then include a representation of the subject (e.g., as depicted in FIG. 6L). This prevents the computer system from automatically reframing the displayed portion of the field-of-view of the one or more cameras based on extraneous movement in the scene (e.g., such as that caused by a subject passing in the background or a child jumping around in the field-of-view of the one or more cameras), which would be distracting to participants/viewers of the live video communication session.

In some embodiments, the representation of the field-of-view of the one or more cameras (e.g., 606) has a first represented field-of-view before the computer system (e.g., 600) detects the change in the scene (e.g., 615) in the field-of-view (e.g., 620) of the one or more cameras (e.g., 602) (e.g., the computer system is displaying a portion of the field-of-view of the one or more cameras before the change in the scene is detected). In some embodiments, the change in the scene in the field-of-view of the one or more cameras includes a detected movement of a third subject (e.g., 622) from a first portion (e.g., 625 in FIG. 6G) of the field-of-view of the one or more cameras that corresponds to (e.g., is represented by; is included in) the first represented field-of-view (e.g., 606 in FIG. 6G) to a second portion of the field-of-view of the one or more cameras (e.g., portion 625 in FIG. 6H) that does not correspond to (e.g., is not represented by; is not included in) the first represented field-of-view (e.g., the third subject moves from a portion of the scene that corresponds to a portion of the field-of-view of the one or more cameras that is displayed prior to the third subject's movement to a portion of the scene that corresponds to a portion of the field-of-view of the one or more cameras that is not displayed prior to the third subject's movement). In some embodiments, adjusting the representation of the field-of-view of the one or more cameras during the live video communication session based on (in some embodiments, in response to) the detected change in the scene in the field-of-view of the one or more cameras includes: in accordance with a determination that a fourth subject (e.g., 628) is not detected in the scene in the first portion of the field-of-view of the one or more cameras, adjusting the representation of the field-of-view from the first represented field-of-view to a second represented field-of-view (e.g., different from the first represented field-of-view) that corresponds to (e.g., represents; displays; includes) the second portion of the field-of-view of the one or more cameras (e.g., display camera preview 606 as depicted in FIG. 6H). In accordance with a determination that the fourth subject (e.g., 628) is detected in the scene in the first portion of the field-of-view of the one or more cameras (e.g., Jack 628 is located in portion 625 in FIG. 6M as Jane 622 leaves the frame), forgoing adjusting the representation of the field-of-view from the first represented field-of-view to the second represented field-of-view (e.g., continuing to display the first represented field-of-view) (e.g., in FIG. 6M, device 600 continues to display camera preview 606 depicting portion 625 as Jane 622 leaves and Jack 628 remains). Selectively adjusting the representation of the field-of-view of the one or more cameras during the live video communication session from the first represented field-of-view to the second represented field-of-view based on whether or not a subject (e.g., the fourth subject) is detected in the scene in the first portion of the field-of-view of the one or more cameras after another subject (e.g., the third subject) leaves the first portion of the field-of-view enhances the video communication session experience by automatically adjusting the field-of-view of the cameras based on whether or not additional subjects remain in the first portion of the field-of-view when another subject leaves without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the automatic framing mode is enabled, the computer system does not track (e.g., follow; adjust the representation of the field-of-view in response to) movement of a subject that leaves the displayed field-of-view when another subject remains in the displayed field-of-view.

In some embodiments, the representation of the field-of-view of the one or more cameras (e.g., 606) has a third represented field-of-view (e.g., in FIG. 6F) before detecting the change in the scene (e.g., 615) in the field-of-view (e.g., 620) of the one or more cameras (e.g., 602) (e.g., the computer system is displaying a portion of the field-of-view of the one or more cameras before the change in the scene is detected). In some embodiments, the change in the scene in the field-of-view of the one or more cameras includes movement of a fifth subject (e.g., 622) from a third portion (e.g., 625 in FIG. 6F) of the field-of-view of the one or more cameras that corresponds to (e.g., is represented by; is included in) the third represented field-of-view to a fourth portion (e.g., 625 in FIG. 6H) of the field-of-view of the one or more cameras that does not correspond to (e.g., is not represented by; is not included in) the third represented field-of-view. In some embodiments, adjusting the representation of the field-of-view of the one or more cameras during the live video communication session based on (in some embodiments, in response to) the detected change in the scene in the field-of-view of the one or more cameras includes: displaying the representation of the field-of-view of the one or more cameras having a fourth represented field-of-view (e.g., 606 in FIG. 6H) (e.g., different from the third represented field-of-view; in some embodiments, including a subset of the third represented field-of-view) in the live video communication interface (e.g., 604) that corresponds to the fourth portion of the field-of-view of the one or more cameras and includes a representation (e.g., 622-1) of the fifth subject (e.g., replacing display of the third represented field-of-view with the fourth represented field-of-view, which includes a representation of the fifth subject (and, in some embodiments, includes a subset of the third represented field-of-view)). Ceasing displaying the third represented field-of-view, and displaying the fourth represented field-of-view that corresponds to the fourth portion of the field-of-view and includes a representation of the fifth subject, enhances the video communication session experience by automatically adjusting the field-of-view of the cameras to maintain display of the subject when the subject moves to a different location in the scene without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, adjusting the representation of the field-of-view of the one or more cameras (e.g., 606) during the live video communication session based on the detected change in the scene (e.g., 615) in the field-of-view (e.g., 620) of the one or more cameras (e.g., 602) further includes ceasing displaying the representation of the field-of-view of the one or more cameras having the third represented field-of-view in the live video communication interface (e.g., 606 in FIG. 6F). In some embodiments, when the automatic framing mode is enabled and the computer system (e.g., 600) detects a subject (e.g., 622) move out of frame (e.g., 606) (e.g., out of a displayed represented field-of-view), the computer system cuts to a different frame (e.g., displays a representation of a portion of the camera field-of-view) that includes the subject. In some embodiments, the cut (e.g., jump cut) includes a change in zoom level (e.g., a zoom in or out). For example, the change in the represented field-of-view is a jump cut that includes a zoomed out view that includes the user (e.g., when in a single person tracking mode). In some embodiments, the cut (e.g., match cut) includes a change from displaying a first region of the camera field-of-view to displaying a second region of the camera field-of-view that includes the user and does not include the first region. In some embodiments, when a second subject remains in frame after a first subject moves out of frame, the computer system displays a jump cut to a zoomed view of the second subject (e.g., when the automatic framing mode is enabled).

In some embodiments, the representation of the field-of-view of the one or more cameras (e.g., 606) has a first zoom value (e.g., a zoom setting (e.g., 1×, 0.5×, 0.7×)) before detecting the change in the scene in the field-of-view of the one or more cameras (e.g., as depicted in FIG. 6I). In some embodiments, the change in the scene (e.g., 615) in the field-of-view (e.g., 620) of the one or more cameras (e.g., 602) includes movement of a sixth subject (e.g., 622) from a first position (e.g., 625 in FIG. 6I) within the field-of-view of the one or more cameras that corresponds to (e.g., is represented by) the representation of the field-of-view and is a first distance from the one or more cameras to a second position (e.g., 625 in FIG. 6J) within the field-of-view of the one or more cameras that corresponds to (e.g., is represented by) the representation of the field-of-view and is a threshold distance from the one or more cameras (e.g., the subject moves (e.g., toward the camera; away from the camera) within the displayed frame to a predetermined distance from the one or more cameras). In some embodiments, adjusting the representation of the field-of-view of the one or more cameras during the live video communication session based on the detected change in the scene in the field-of-view of the one or more cameras includes: displaying the representation of the field-of-view of the one or more cameras having a second zoom value different from the first zoom value (e.g., 606 in FIG. 6J) (e.g., a zoomed in view; a zoomed out view; in some embodiments, including the entire portion of the field-of-view of the one or more cameras that was previously displayed in the representation of the field-of-view having the first zoom value, but instead displayed at the second zoom value) in the live video communication interface (e.g., 604) (e.g., jumping from the first zoom level to the second zoom level when the subject moves within the originally displayed frame to the predetermined distance from the one or more cameras). Ceasing displaying the representation of the field-of-view having the first zoom value, and displaying the representation of the field-of-view having a second zoom value, enhances the video communication session experience by automatically adjusting the zoom value of the representation of the field-of-view of the cameras to maintain prominent display of the subject when the subject moves in the scene to different distances from the camera without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, adjusting the representation of the field-of-view of the one or more cameras (e.g., 606) during the live video communication session based on the detected change in the scene (e.g., 615) in the field-of-view (e.g., 620) of the one or more cameras (e.g., 602) includes ceasing displaying the representation of the field-of-view of the one or more cameras having the first zoom value in the live video communication interface (e.g., 606 in FIG. 6I). In some embodiments, when the subject (e.g., 622) moves toward the camera to a first threshold distance from the camera, the representation of the field-of-view of the one or more cameras transitions to the second zoom value, which is a zoomed out view of the previously displayed portion of the field-of-view of the one or more cameras (e.g., a jump cut to a wide angle view). In some embodiments, when the subject moves away from the camera to a second threshold distance from the camera, the representation of the field-of-view of the one or more cameras transitions to the second zoom value, which is a zoomed in view of the previously displayed portion of the field-of-view of the one or more cameras.

In some embodiments, the computer system (e.g., 600) concurrently displays the second selectable graphical user interface object (e.g., 610) with the live video communication interface (e.g., 604) that includes one or more other selectable controls (e.g., 608) for controlling the live video communication (e.g., an end call button for ending the live video communication session, a switch camera button for switching which camera is used for the live video communication session, a mute button for muting/unmuting audio of the user of the device in the live video communication session, an effects button for adding/removing visual effects from the live video communication session, an add user button for adding a user to the live video communication session, and/or a camera on/off button for turning video of the user on/off in the live video communication session). In some embodiments, the second selectable graphical user interface object (e.g., "framing mode" affordance) is continuously displayed during the live video communication session.

In some embodiments, while displaying the live video communication interface (e.g., 604) when a seventh subject (e.g., 628) (e.g., a first participant in the live video communication session) is detected in the scene (e.g., 615) in the field-of-view (e.g., 620) of the one or more cameras (e.g., 602), the computer system (e.g., 600) detects an eighth subject (e.g., 622) (e.g., a second participant in the live video communication session) in the scene in the field-of-view of the one or more cameras (e.g., detecting an increase in the number of subjects in the scene). In response to detecting the eighth subject in the scene in the field-of-view of the one or more cameras, the computer system displays, via the display generation component (e.g., 601), a prompt (e.g., 632) (e.g., text to add a second participant to the live video communication session, an affordance for adding a second participant, an indication of a second participant (e.g., a framing indication (e.g., 630) in a potential preview (e.g., blurred region) to show recognition of the detected additional subject(s)), stacked camera preview windows, or other prompts as discussed with respect to FIGS. 8A-8R) to adjust the representation of the field-of-view of the one or more cameras to include a representation (e.g., 622-1) of the eighth subject in the live video communication interface (e.g., 604) (e.g., as depicted in FIG. 6Q). Displaying a prompt to adjust the representation of the field-of-view of the one or more cameras to include a representation of the eighth subject in the live video communication interface, in response to detecting the eighth subject in the scene, provides feedback to a user of the computer system that an additional subject has been detected in the field-of-view of the one or more cameras, and reduces the number of user inputs at the computer system by providing an option for automatically adjusting the representation of the field-of-view to include the additional subject without requiring the user to navigate a settings menu or other additional interfaces to adjust the represented field-of-view. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the field-of-view of the one or more cameras (e.g., 606) has a fifth represented field-of-view (e.g., in FIG. 6K) before detecting the change in the scene (e.g., 615) in the field-of-view (e.g., 620) of the one or more cameras (e.g., 602) (e.g., the computer system (e.g., 600) is displaying a portion of the field-of-view of the one or more cameras before the change in the scene is detected). In some embodiments, the change in the scene in the field-of-view of the one or more cameras includes movement of one or more subjects (e.g., 628) detected in the scene. In some embodiments, adjusting the representation of the field-of-view of the one or more cameras during the live video communication session based on the detected change in the scene in the field-of-view of the one or more cameras includes: in accordance with a determination that the one or more subjects have less than a threshold amount of movement (e.g., a non-zero threshold of movement) for at least a threshold amount of time (e.g., a predetermined amount of time (e.g., one second, two seconds, three seconds)), displaying the representation of the field-of-view of the one or more cameras having a sixth represented field-of-view (e.g., 606 in FIG. 6L) (e.g., different from the fifth represented field-of-view) in the live video communication interface (e.g., 604) (e.g., adjusting the representation of the field-of-view of the one or more cameras after the one or more subjects have less than the threshold amount of movement of the predetermined amount of time). In accordance with a determination that the one or more subjects do not have less than the threshold amount of movement for at least the threshold amount of time, continuing displaying the representation of the field-of-view of the one or more cameras having the fifth represented field-of-view in the live video communication interface (e.g., until the one or more subjects do have less than the threshold amount of movement for at least the threshold amount of time) (e.g., maintaining the originally displayed frame while one or more of the subjects are moving). Selectively adjusting the representation of the field-of-view of the one or more cameras during the live video communication session from the fifth represented field-of-view to the sixth represented field-of-view based on whether or not one or more subjects detected in the scene have less than a threshold amount of movement for at least a threshold amount of time enhances the video communication session experience by automatically adjusting the field-of-view of the cameras when additional subjects enter the scene with the intent to participate in the live video communication session, without adjusting the field-of-view when subjects enter the scene without the intent to participate. This also reduces the number of computations performed by the computer system by eliminating extraneous adjustments to the represented field-of-view anytime there is a change in the number of participants in the scene. Performing an operation when a set of conditions has been met without requiring further user input, and reducing the number of computations performed by the computer system, enhance the operability of the computer system and make the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the automatic framing mode is enabled, the computer system maintains the originally displayed view until one or more of the subjects are stationary.

Figure 12L:
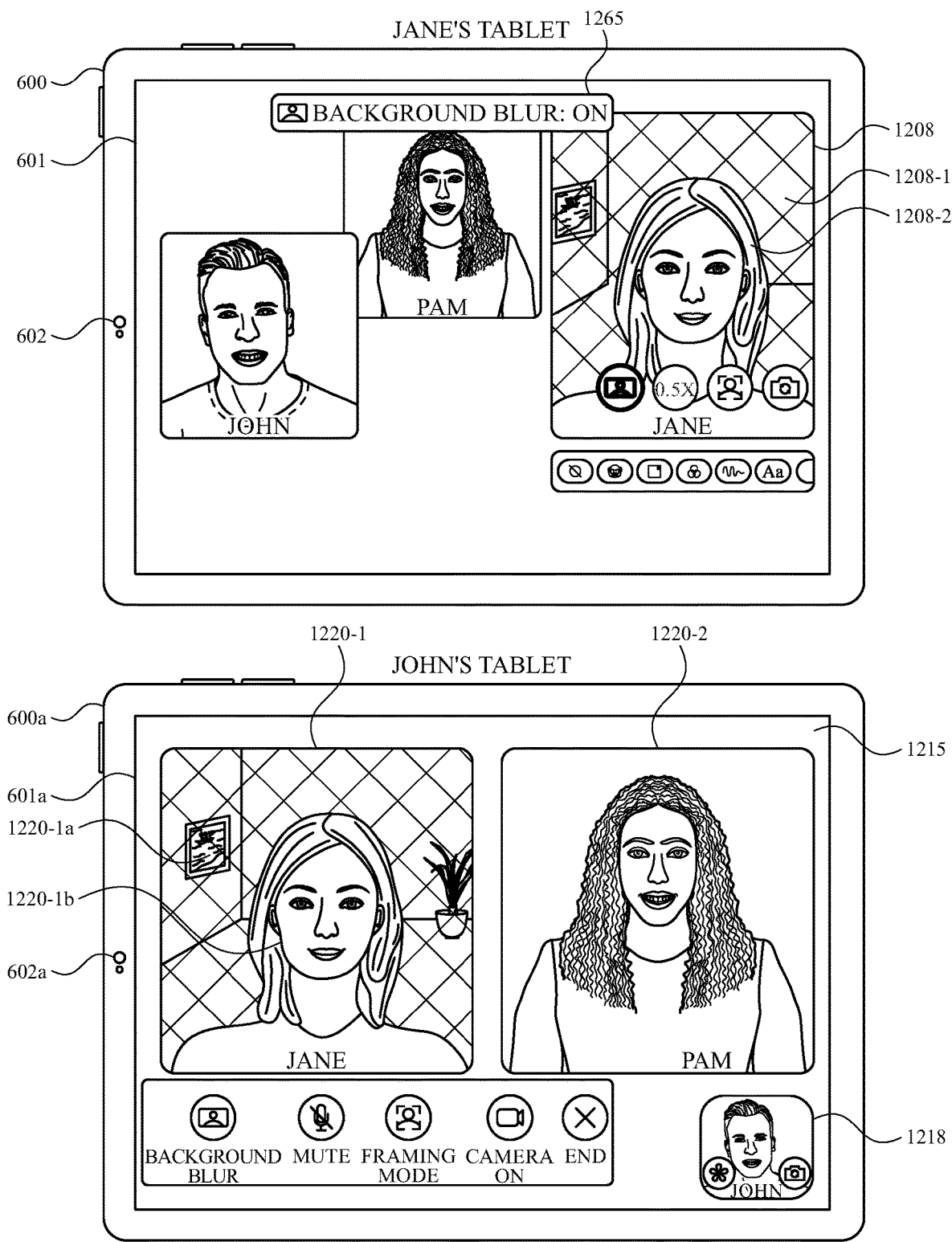
Figure 12M:
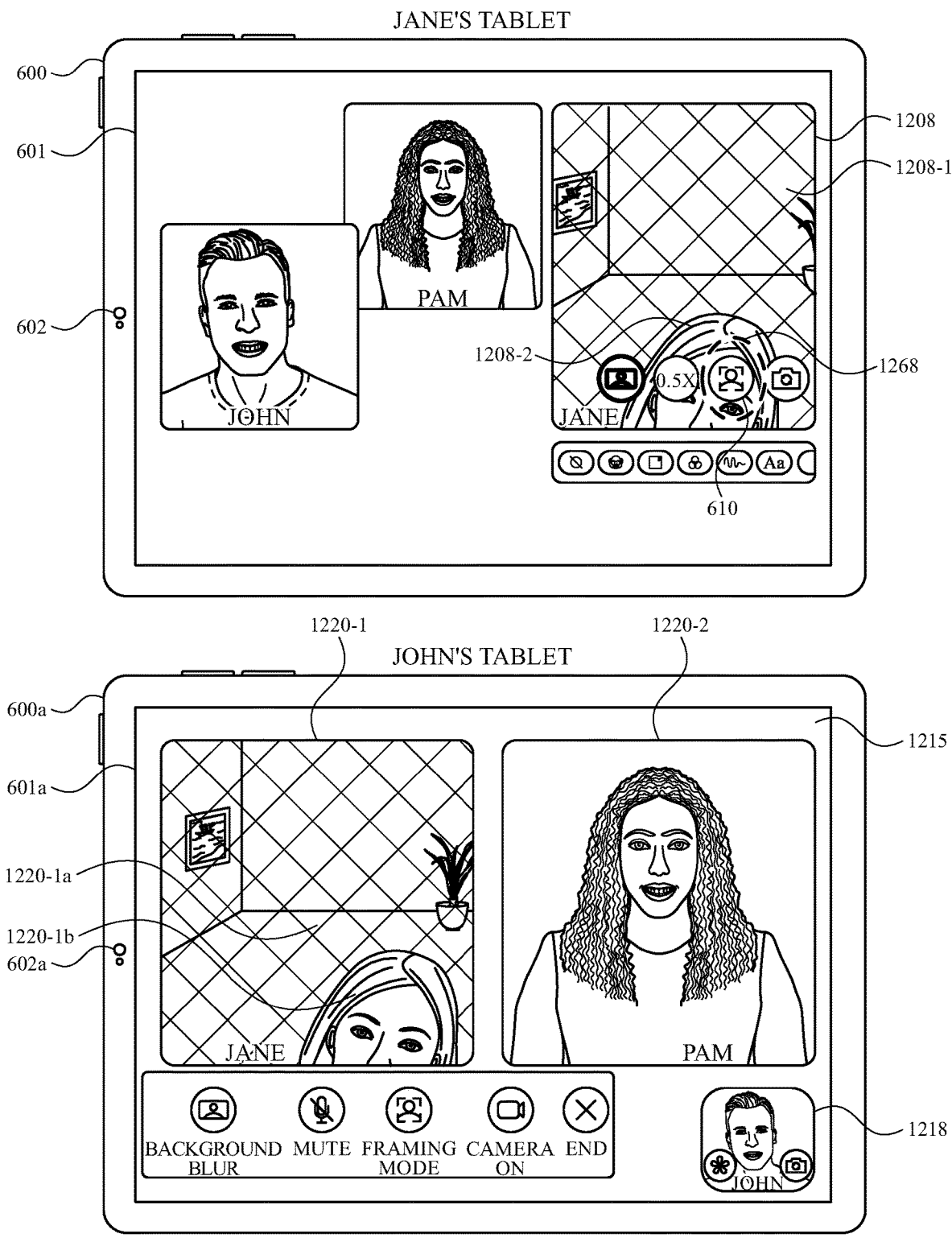
Figure 12N:
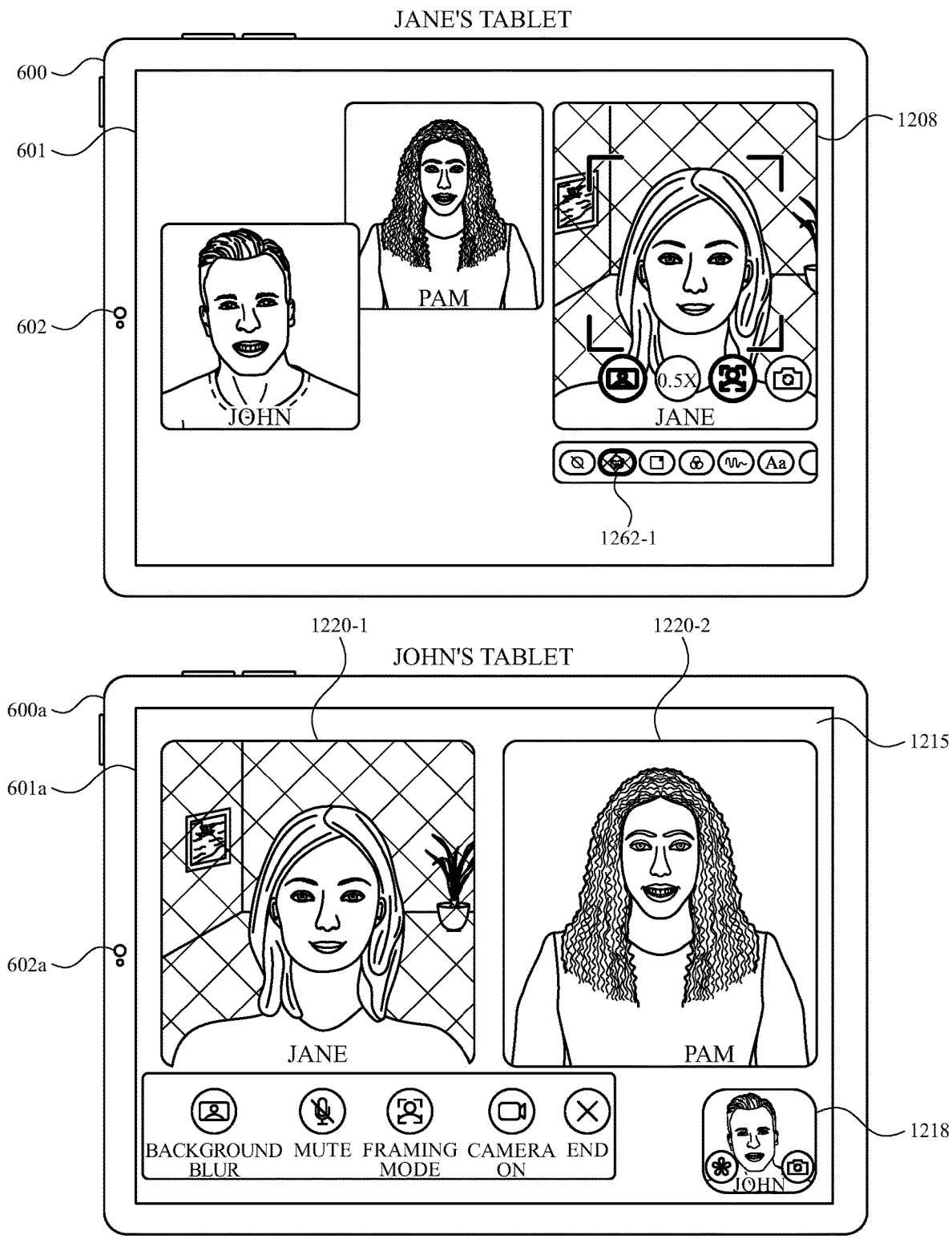
Figure 12O:
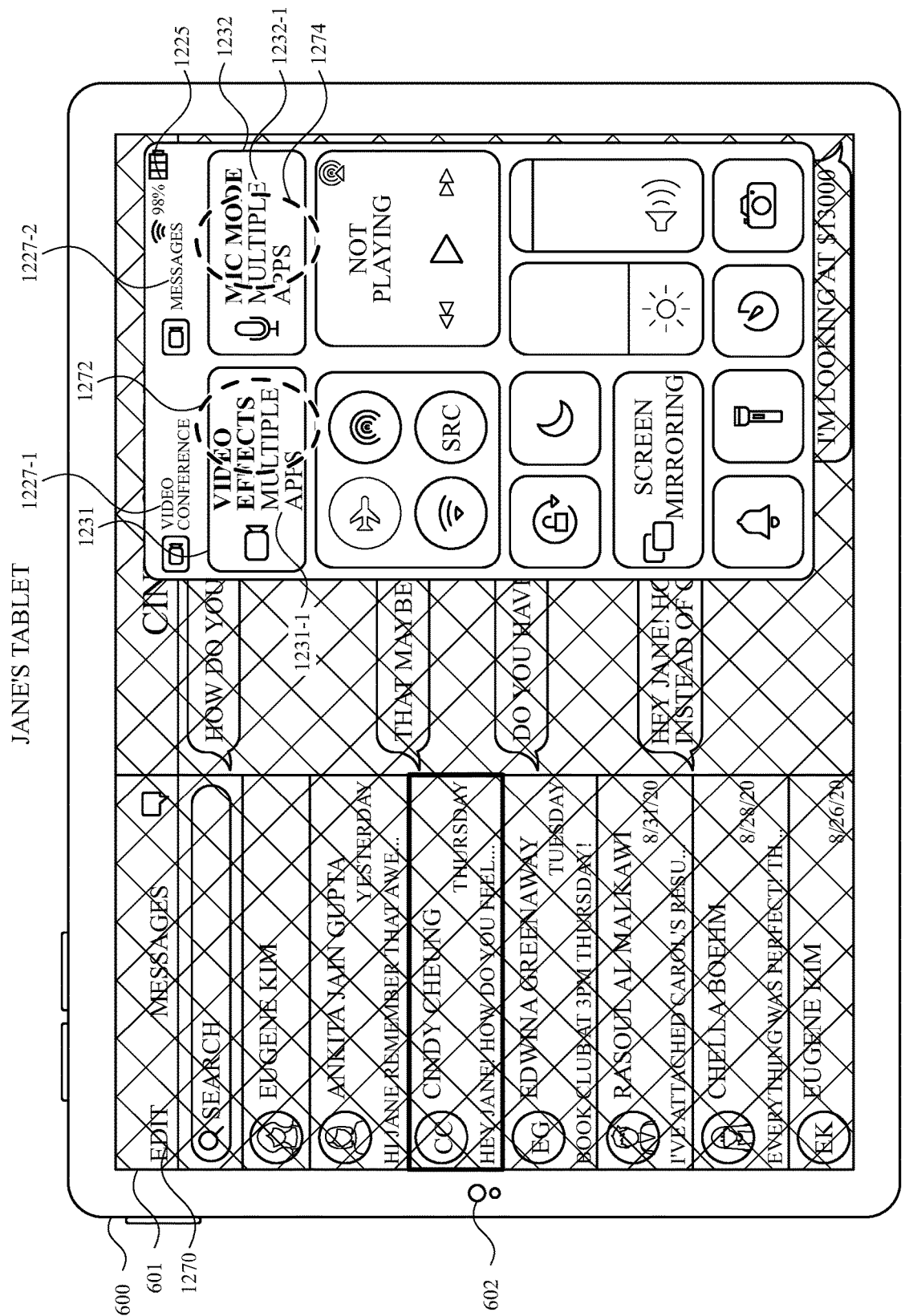
Figure 12P:
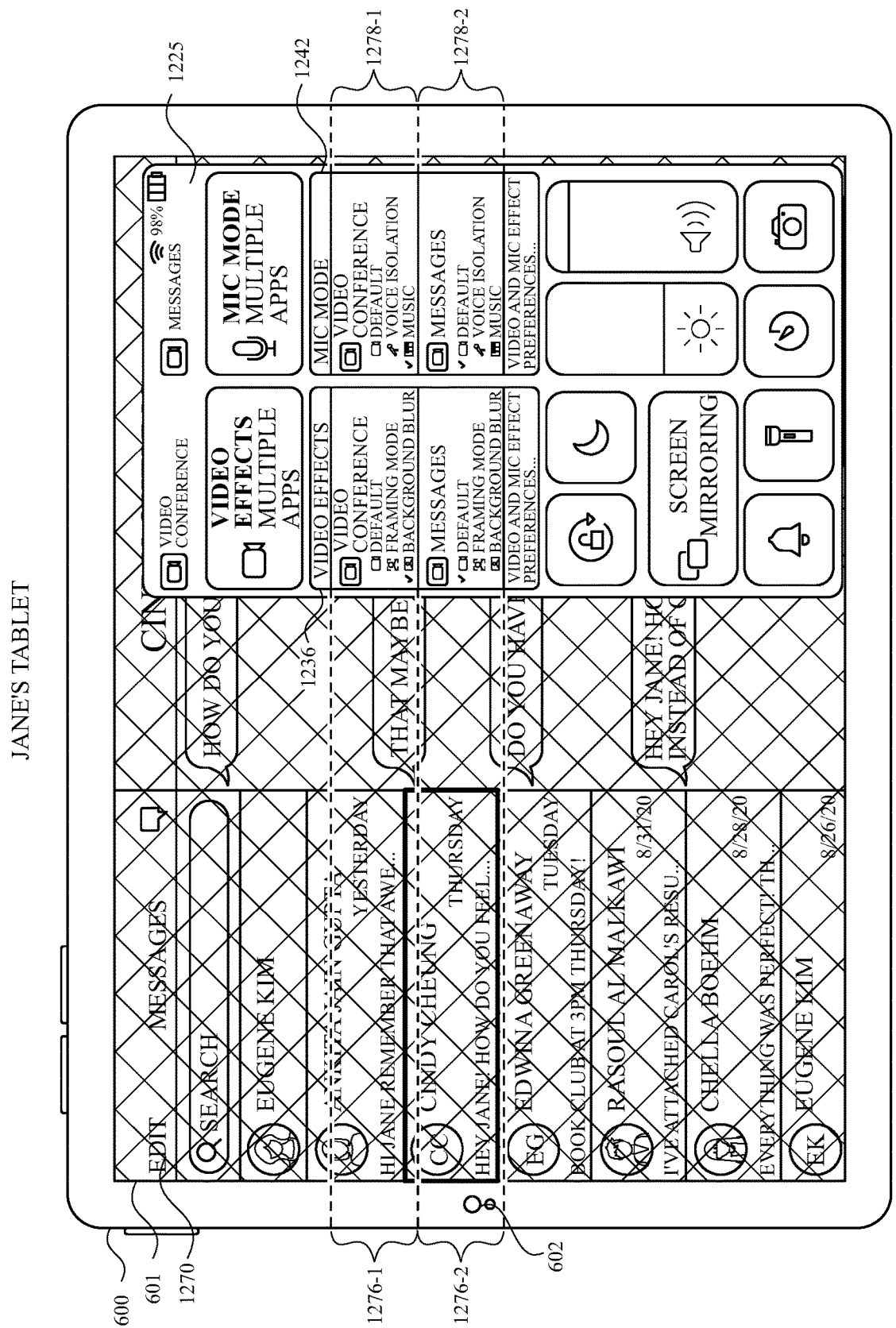
Figure 12Q:
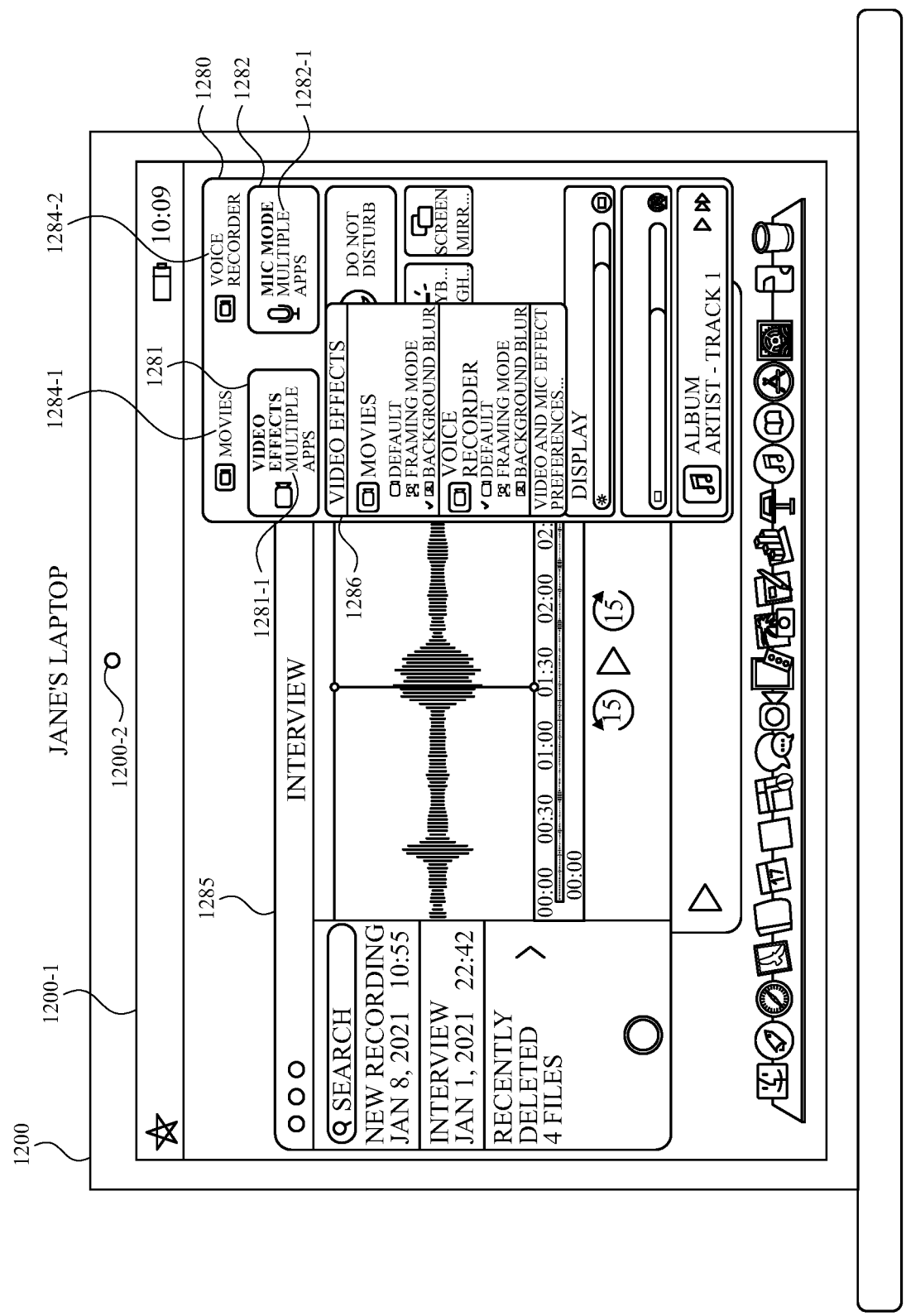

In some embodiments, the computer system (e.g., 600, 600a) displays, via the display generation component (e.g., 601, 601a), a representation of a first portion of a field-of-view of one or more cameras (e.g. 606, 1006, 1056, 1208, 1218) of a respective device of a respective participant in the live video communication session (e.g., a portion of the field-of-view of a camera of a remote participant in the live video communication session that includes a detected face of a remote participant (e.g., 1220-1b in FIG. 12L; a portion of video feed 1210-1 that includes John's face; a portion of video feed 1023 that includes John's face; a portion of video feed 1053-2 that includes Jane's face)) (e.g., a portion of the field-of-view of the one or more cameras of the computer system includes a detected face of the subject (e.g., 1208-2 in FIG. 12L; a portion of camera preview 1218 that includes John's face; a portion of camera preview 1006 that includes Jane's face; a portion of camera preview 1056 that includes John's face)) and a representation of a second portion of the field-of-view of one or more cameras of the respective device of the respective participant (e.g., a portion of the field-of-view of the camera of the remote participant that does not include a detected face of a remote participant (e.g., 1220-1a in FIG. 12L; a portion of video feed 1210-1 that does not include John's face; a portion of video feed 1023 that does not include John's face; a portion of video feed 1053-2 that does not include Jane's face)) (e.g., a portion of the field-of-view of the one or more cameras of the computer system that does not include a detected face of the subject (e.g., 1208-1 in FIG. 12L; a portion of camera preview 1218 that does not include John's face; a portion of camera preview 1006 that does not include Jane's face; a portion of camera preview 1056 that does not include John's face)), including displaying the representation of the first portion of the field-of-view of one or more cameras of the respective device of the respective participant with a reduced degree of compression (e.g., a higher video quality) than the representation of the second portion of the field-of-view of one or more cameras of the respective device of the respective participant in accordance with a determination that the first portion of the field-of-view of one or more cameras includes a detected feature of a respective type (e.g., a face; multiple different faces) while a detected feature of the respective type is not detected in the second portion of the field-of-view of one or more cameras of the respective device of the respective participant (e.g., when a face (or multiple different faces) is detected in the first portion of the field-of-view and not in the second portion of the field-of-view, the second portion is compressed (e.g., by the sending device (e.g., the device of the remote participant (e.g., 600a; 600); the computer system of the subject (e.g., 600; 600a))) at a greater degree than the first portion such that the first portion of the field-of-view can be displayed (e.g., at the receiving device (e.g., the computer system; the device of the remote participant)) at a higher video quality than the second portion of the field-of-view when a face is detected in the first portion and not in the second portion (e.g., 1220-1b is displayed having a higher video quality than 1220-1a in FIG. 12L; the portion of video feed 1210-1 that includes John's face is displayed having a higher video quality than a portion of video feed 1210-1 that does not include John's face; the portion of video feed 1053-2 that includes Jane's face is displayed having a higher video quality than a portion of video feed 1053-2 that does not include Jane's face; the portion of video feed 1023 that includes John's face is displayed having a higher video quality than a portion of video feed 1023 that does not include John's face)). Displaying the representation of the first portion of the field-of-view of one or more cameras of the respective device of the respective participant in the live video communication session with a reduced degree of compression than the representation of the second portion of the field-of-view of one or more cameras of the respective device of the respective participant in accordance with a determination that the first portion of the field-of-view of the one or more cameras includes a detected feature of a respective type while a detected feature of the respective type is not detected in the second portion of the field-of-view of one or more cameras conserves computational resources by conserving bandwidth and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600, 600a) enables a dynamic video quality mode for outputting (e.g., transmitting to a recipient device (e.g., 600a; 600), optionally while displaying at the sending device (e.g., 600; 600a)) the camera field-of-view (e.g., 606, 1006, 1056, 1208, 1210-1, 1218, 1220-1, 1023, 1053-2) with portions having different degrees of video compression. In some embodiments, the computer system compresses portions of the camera field-of-view that do not include one or more faces (e.g., 1220-1a in FIG. 12L; a portion of video feed 1210-1 that does not include John's face; a portion of video feed 1023 that does not include John's face; a portion of video feed 1053-2 that does not include Jane's face) more than portions of the camera field-of-view that do include one or more faces (e.g., 1220-1b in FIG. 12L; a portion of video feed 1210-1 that includes John's face; a portion of video feed 1023 that includes John's face; a portion of video feed 1053-2 that includes Jane's face). In some embodiments, the computer system optionally displays the compressed video feed in the camera preview. In some embodiments, the computer system transmits the video feed having the different degrees of compression during the live video communication session such that a recipient device (e.g., a remote participant) can display the video feed received from the sending device (e.g., the computer system) having higher-video-quality portions concurrently displayed with lower-video-quality portions, wherein the higher-video-quality portions of the video feed include the face(s) and the lower-video-quality portions of the video feed do not include the face(s) (e.g., 1220-1b is displayed having a higher video quality than 1220-1a in FIG. 12L; the portion of video feed 1210-1 that includes John's face is displayed having a higher video quality than a portion of video feed 1210-1 that does not include John's face; the portion of video feed 1053-2 that includes Jane's face is displayed having a higher video quality than a portion of video feed 1053-2 that does not include Jane's face; the portion of video feed 1023 that includes John's face is displayed having a higher video quality than a portion of video feed 1023 that does not include John's face). Similarly, in some embodiments, the computer system receives compressed video data from a remote device (e.g., a device of a remote participant of the live video communication session) and displays the video feed from the remote device having the different degrees of compression such that the video feed of the remote device can be displayed with a higher-video-quality portion that includes the face of the remote participant and a lower-video-quality portion (displayed concurrently with the higher-quality portion) that does not include the face of the remote participant (e.g., 1220-1*b* is displayed having a higher video quality than 1220-1*a* in FIG. 12L; the portion of video feed 1210-1 that includes John's face is displayed having a higher video quality than a portion of video feed 1210-1 that does not include John's face; the portion of video feed 1053-2 that includes Jane's face is displayed having a higher video quality than a portion of video feed 1053-2 that does not include Jane's face; the portion of video feed 1023 that includes John's face is displayed having a higher video quality than a portion of video feed 1023 that does not include John's face). In some embodiments, the different degrees of compression can be applied to a video feed where multiple faces are detected. For example, the video feed can have multiple higher-quality (less compressed) portions, each corresponding to a location of one of the detected faces.

In some embodiments, the dynamic video quality mode is independent of the automatic framing mode and background blur mode such that the dynamic video quality mode can be enabled and disabled separate from the automatic framing mode and the background blur mode. In some embodiments, the dynamic video quality mode is implemented with the automatic framing mode such that the dynamic video quality mode is enabled when the automatic framing mode is enabled and is disabled when the automatic framing mode is disabled. In some embodiments, the dynamic video quality mode is implemented with the background blur mode such that the dynamic video quality mode is enabled when the background blur mode is enabled and is disabled when the background blur mode is disabled.

In some embodiments, after the feature of the respective type has moved from the first portion of the field-of-view of one or more cameras (e.g., 606, 1006, 1023, 1053-2, 1056, 1208, 1210-1, 1218, 1220-1) of the respective device of the respective participant to the second portion of the field-of-view of one or more cameras of the respective device of the respective participant (e.g., detecting the movement of the feature of the respective type from the first portion of the field-of-view of the one or more cameras to the second portion of the field-of-view of the one or more cameras; and, in response to detecting the movement of the feature of the respective type from the first portion of the field-of-view of the one or more cameras to the second portion of the field-of-view of the one or more cameras), the computer system (e.g., 600, 600*a*) displays, via the display generation component (e.g., 601, 601*a*), the representation of the first portion of the field-of-view of one or more cameras of the respective device of the respective participant and the representation of the second portion of the field-of-view of one or more cameras of the respective device of the respective participant (e.g., a portion of the field-of-view that includes a detected face), including displaying the representation of the first portion the field-of-view of one or more cameras of the respective device of the respective participant with an increased degree of compression (e.g., a lower video quality) than the representation of the second portion of the field-of-view of one or more cameras of the respective device of the respective participant in accordance with a determination that the second portion of the field-of-view of one or more cameras of the respective device of the respective participant includes a detected feature of the respective type while a detected feature of the respective type is not detected in the first portion of the field-of-view of one or more cameras of the respective device of the respective participant (e.g., as the face moves within the field-of-view of the one or more cameras, the degrees of compression of respective portions of the field-of-view of the one or more cameras change such that the face (e.g., a portion of the field-of-view that includes the face) is (e.g., remains) output (e.g., transmitted and, optionally, displayed) having a lower degree of compression than portions of the field-of-view that do not include the face (e.g., as Jane's face moves, video feed 1053-2 and/or 1220-1 is updated so that her face continues to be displayed at a higher video quality and portions of the video feed that do not include her face (even portions that were previously displayed at a higher quality) are displayed at a lower video quality; as John's face moves, video feed 1023 and/or 1210-1 is updated so that his face continues to be displayed at a higher video quality and portions of the video feed that do not include his face (even portions that were previously displayed at a higher quality) are displayed at a lower video quality)). Displaying, after the feature of the respective type has moved from the first portion of the field-of-view of one or more cameras of the respective device of the respective participant to the second portion of the field-of-view of one or more cameras of the respective device of the respective participant, the representation of the first portion of the field-of-view of one or more cameras of the respective device of the respective participant in the live video communication session with an increased degree of compression than the representation of the second portion of the field-of-view of one or more cameras of the respective device of the respective participant in accordance with a determination that the second portion of the field-of-view of the one or more cameras includes a detected feature of the respective type while a detected feature of the respective type is not detected in the first portion of the field-of-view of one or more cameras conserves computational resources by conserving bandwidth and decreasing the amount of image data that is processed for display and/or transmission at a high image quality as a face moves within the scene. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the feature of the respective type is a face (e.g., a face detected within a field-of-view of one or more cameras; a face of a remote participant (e.g., Jane's face in video feed 1220-1 and/or 1053-2; John's face in video feed 1023 and/or 1210-1); a face of the subject (e.g., Jane's face in camera preview 606, 1006, and/or 1208; John's face in camera preview 1056 and/or 1218)). In some embodiments, displaying the representation of the second portion of the field-of-view of one or more cameras (e.g., 606, 1006, 1023, 1053-2, 1056, 1208, 1210-1, 1218, 1220-1) of the respective device of the respective participant includes displaying the representation of the second portion of the field-of-view of one or more cameras of the respective device of the respective participant having a lesser video quality than the representation of the first portion of the field-of-view of one or more cameras of the respective device of the respective participant (e.g., 1220-1*a* is displayed having a lower video quality than 1220-1b in FIG. 12L; the portion of video feed 1210-1 that does not include John's face is displayed having a lower video quality than a portion of video feed 1210-1 that includes John's face; the portion of video feed 1053-2 that does not include Jane's face is displayed having a lower video quality than a portion of video feed 1053-2 that includes Jane's face; the portion of video feed 1023 that does not include John's face is displayed having a lower video quality than a portion of video feed 1023 that includes John's face) (e.g., due to a reduced compression of the representation of the first portion of the field-of-view of the one or more cameras) in accordance with a determination that the first portion of the field-of-view of one or more cameras includes the detected face while a face is not detected in the second portion of the field-of-view of one or more cameras of the respective device of the respective participant. Displaying the representation of the second portion of the field-of-view of one or more cameras of the respective device of the respective participant having a lesser video quality than the representation of the first portion of the field-of-view in accordance with a determination that the first portion of the field-of-view includes the detected face while a face is not detected in the second portion of the field-of-view of one or more cameras of the respective device of the respective participant conserves computational resources by conserving bandwidth and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, portions of the camera field-of-view that do not include a detected face (e.g., 621-1; 1220-1a; 1208-1; portions of 1218 and/or 1210-1 that do not include John's face; portions of 1006 and/or 1053-2 that do not include Jane's face) are output (e.g., transmitted and, optionally, displayed) having a lesser image quality than portions of the camera field-of-view that do include a detected face (e.g., 622-1; 1220-1b; 1208-2; portions of 1218 and/or 1210-1 that include John's face; portions of 1006 and/or 1053-2 that include Jane's face) (due to the increased compression of the portions that do not include a detected face). In some embodiments, when no faces are detected in the field-of-view of the one or more cameras, the computer system (e.g., 600; 600a) applies a uniform or substantially uniform degree of compression to the first and second portions of the field-of-view of the one or more cameras such that the video feed (e.g., both the first and second portions) can be output having a uniform or substantially uniform video quality. In some embodiments, when multiple faces are detected in the camera field-of-view (e.g., multiple participants of the live video communication session are detected), the computer system applies the reduced compression concurrently to the portions of the field-of-view that correspond to the detected faces such that the faces can be displayed concurrently (e.g., at a recipient device) having the higher image quality. In some embodiments, the computer system applies the increased compression to the representation of the second portion of the field-of-view of one or more cameras, even if a face is detected in the second portion. For example, the computer system can determine that the face in the second portion is not a participant of the live video communication session (e.g., the person is a bystander in the background) and, therefore, does not reduce the degree of compression of the second portion having the face.

In some embodiments, after (e.g., in response to detecting) a change in bandwidth for transmitting a representation of the field-of-view of one or more cameras (e.g., 606, 1006, 1023, 1053-2, 1056, 1208, 1210-1, 1218, 1220-1) of the respective device (e.g., 600, 600a) of the respective participant occurs (e.g., is detected), while a feature of the respective type (e.g., a face) is detected in the first portion of the field-of-view of one or more cameras of the respective device of the respective participant (e.g., 622-1; 1220-1b; 1208-2; portions of 1218 and/or 1210-1 that include John's face; portions of 1006 and/or 1053-2 that include Jane's face) and while a feature of the respective type is not detected in the second portion of the field-of-view of one or more cameras of the respective device of the respective participant (e.g., 621-1; 1220-1a; 1208-1; portions of 1218 and/or 1210-1 that do not include John's face; portions of 1006 and/or 1053-2 that do not include Jane's face), a degree of compression (e.g., an amount of compression) of the representation of the first portion of the field-of-view of one or more cameras of the respective device of the respective participant is changed by an amount that is less than an amount of change of a degree of compression of the representation of the second portion of the field-of-view of one or more cameras of the respective device of the respective participant (e.g., when a face is detected in the first portion of the field-of-view of one or more cameras, and a face is not detected in the second portion of the field-of-view of one or more cameras, the rate of change in compression (in response to a change in bandwidth (e.g., a decrease in bandwidth)) is less for the first portion of the field-of-view than for the second portion of the field-of-view). Changing a degree of compression of the representation of the first portion of the field-of-view of one or more cameras of the respective device of the respective participant by an amount that is less than an amount of change of a degree of compression of the representation of the second portion while a feature of the respective type is detected in the first portion and a feature of the respective type is not detected in the second portion conserves computational resources by conserving bandwidth for the first portion of the representation of the field-of-view of the one or more cameras that includes the feature of the respective type and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after (e.g., in response to detecting) a change in bandwidth for transmitting a representation of the field-of-view of one or more cameras (e.g., 606, 1006, 1023, 1053-2, 1056, 1208, 1210-1, 1218, 1220-1) of the respective device (e.g., 600; 600a) of the respective participant occurs (e.g., is detected), while a feature of the respective type is not detected in the first portion of the field-of-view of one or more cameras of the respective device of the respective participant (e.g., 621-1; 1220-1a; 1208-1; portions of 1218 and/or 1210-1 that do not include John's face; portions of 1006 and/or 1053-2 that do not include Jane's face) and while a feature of the respective type is detected in the second portion of the field-of-view of one or more cameras of the respective device of the respective participant (e.g., 622-1; 1220-1*b*; 1208-2; portions of 1218 and/or 1210-1 that include John's face; portions of 1006 and/or 1053-2 that include Jane's face), a degree of compression (e.g., an amount of compression) of the representation of the first portion of the field-of-view of one or more cameras of the respective device of the respective participant is changed by an amount that is more than an amount of change of a degree of compression of the representation of the second portion of the field-of-view of one or more cameras of the respective device of the respective participant (e.g., when a face is detected in the second portion of the field-of-view of one or more cameras, and a face is not detected in the first portion of the field-of-view of one or more cameras, the rate of change in compression (in response to a change in bandwidth (e.g., a decrease in bandwidth)) is greater for the first portion of the field-of-view than for the second portion of the field-of-view). Changing a degree of compression of the representation of the first portion of the field-of-view of one or more cameras of the respective device of the respective participant by an amount that is more than an amount of change of a degree of compression of the representation of the second portion while a feature of the respective type is not detected in the first portion and a feature of the respective type is detected in the second portion conserves computational resources by conserving bandwidth for the second portion of the representation of the field-of-view of the one or more cameras that includes the feature of the respective type and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to a change in bandwidth for transmitting a representation of the field-of-view of one or more cameras (e.g., 606, 1006, 1023, 1053-2, 1056, 1208, 1210-1, 1218, 1220-1) of the respective device (e.g., 600; 600*a*) of the respective participant occurring (e.g., being detected), a quality (e.g., a video quality) (e.g., due to a change in the amount of video compression) of the representation of the second portion of the field-of-view of one or more cameras of the respective device of the respective participant (e.g., 621-1; 1220-1*a*; 1208-1; portions of 1218 and/or 1210-1 that do not include John's face; portions of 1006 and/or 1053-2 that do not include Jane's face) is changed by an amount that is greater than an amount of change of quality (in some embodiments, the representation of the first portion does not change in quality or has a nominal amount of change in quality) of the representation of the first portion of the field-of-view of one or more cameras of the respective device of the respective participant (e.g., 622-1; 1220-1*b*; 1208-2; portions of 1218 and/or 1210-1 that include John's face; portions of 1006 and/or 1053-2 that include Jane's face) (e.g., when a face is detected in the first portion of the field-of-view of one or more cameras, and a face is not detected in the second portion of the field-of-view of one or more cameras, the image quality of the second portion varies more than the image quality of the first portion in response to a change in bandwidth (e.g., a decrease in bandwidth)). Changing a quality of the representation of the second portion of the field-of-view of one or more cameras of the respective device of the respective participant by an amount that is greater than an amount of change of quality of the representation of the first portion conserves computational resources by conserving bandwidth for the first portion of the representation of the field-of-view of the one or more cameras and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while a face is detected in the first portion of the field-of-view of one or more cameras (e.g., 622-1; 1220-1*b*; 1208-2; portions of 1218 and/or 1210-1 that include John's face; portions of 1006 and/or 1053-2 that include Jane's face), and is not detected in the second portion of the field-of-view (e.g., 621-1; 1220-1*a*; 1208-1; portions of 1218 and/or 1210-1 that do not include John's face; portions of 1006 and/or 1053-2 that do not include Jane's face), the computer system (e.g., 600; 600*a*) detects a change in available bandwidth (e.g., an increase in bandwidth; a decrease in bandwidth) and, in response, adjusts (e.g., increases; decreases) the compression of the second portion of the representation of the field-of-view of the one or more cameras without adjusting the compression of the first portion of the representation of the field-of-view of the one or more cameras. In some embodiments, when detecting a change in bandwidth, the computer system adjusts the compression of the first portion at a lesser rate than the adjustment to the second portion. In some embodiments, the method includes detecting (e.g., at the respective device of the respective participant) a change in bandwidth for transmitting a representation of the field-of-view of one or more cameras of the respective device of the respective participant while a feature of the respective type (e.g., a face) is detected in the first portion of the field-of-view of one or more cameras of the respective device of the respective participant and while a feature of the respective type is not detected in the second portion of the field-of-view of one or more cameras of the respective device of the respective participant.

Note that details of the processes described above with respect to method 700 (e.g., FIGS. 7A-7B) are also applicable in an analogous manner to methods 900, 1100, 1300, and 1400 described below. For example, method 900, method 1100, method 1300, and/or method 1400 optionally include one or more of the characteristics of the various methods described above with reference to method 700. For brevity, these details are not repeated below.

FIGS. 8A-8R illustrate exemplary user interfaces for managing a live video communication session (e.g., a video conference), in accordance with some embodiments. The user interfaces in these figures are used to illustrate the processes described herein, including the processes in FIG. 9.

FIGS. 8A-8R illustrate device 600 displaying user interfaces on display 601 for managing a live video communication session, similar to that discussed above with respect to FIGS. 6A-6Q. FIGS. 8A-8R depict various embodiments in which device 600 prompts a user to adjust the displayed portion of a camera field-of-view (e.g., the camera preview)

in response to detecting another subject in a scene when an automatic framing mode is enabled. One or more of the embodiments discussed below with respect to FIGS. 8A-8R can be combined with one or more of the embodiments discussed with respect to FIGS. 6A-6Q, FIGS. 10A-10J, and FIGS. 12A-12U.

Figure 8B:
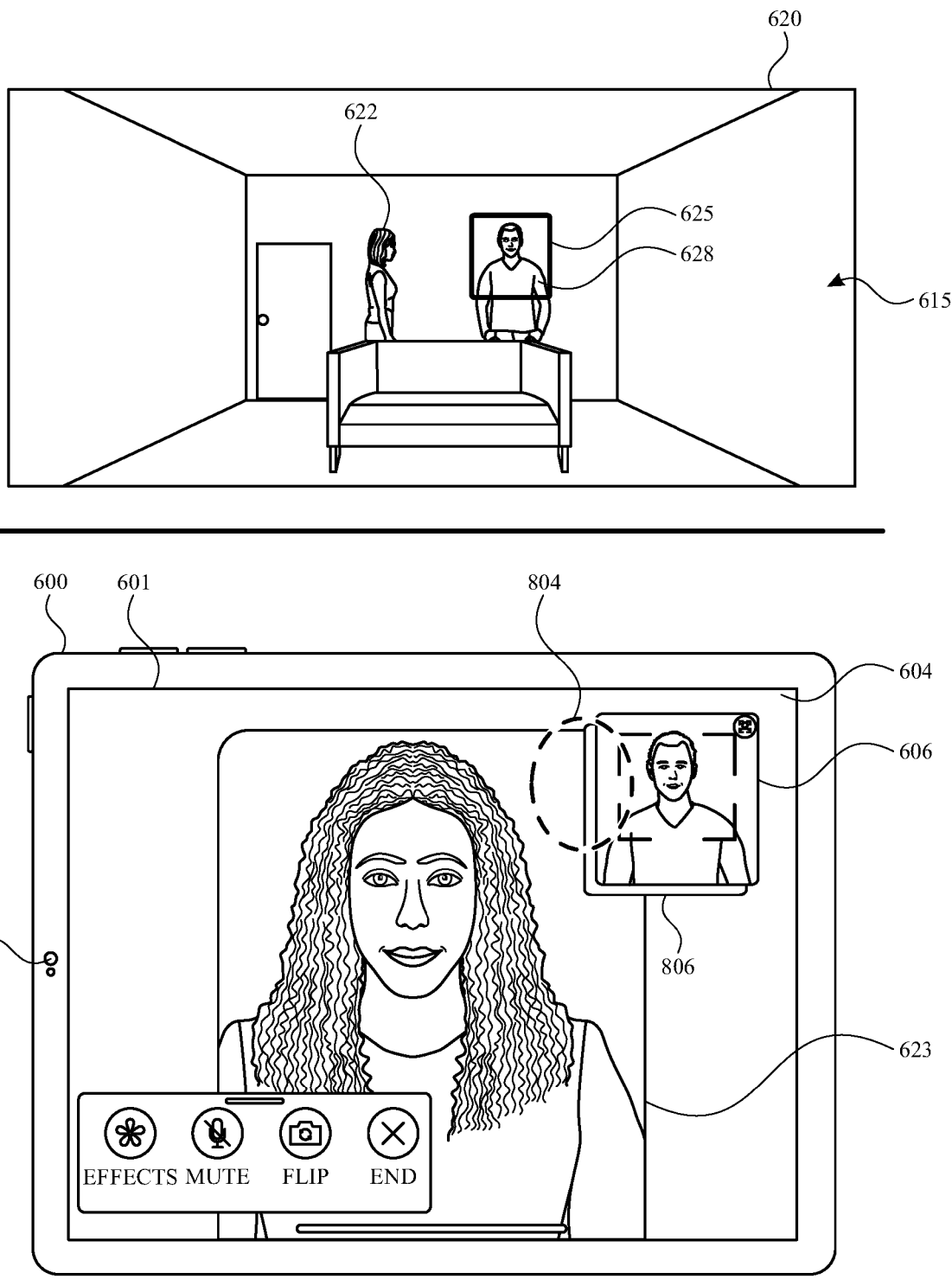
Figure 8C:
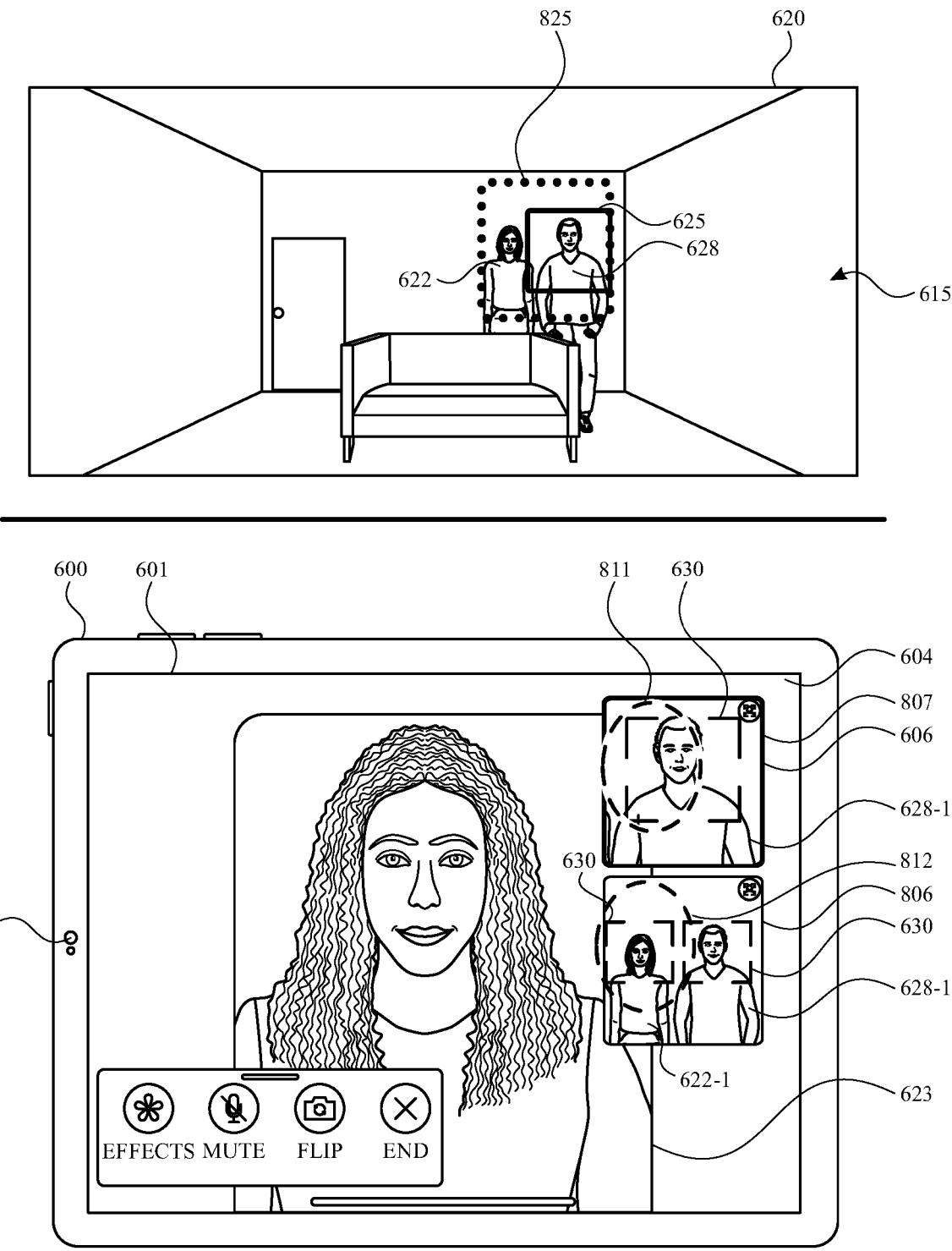
Figure 8D:
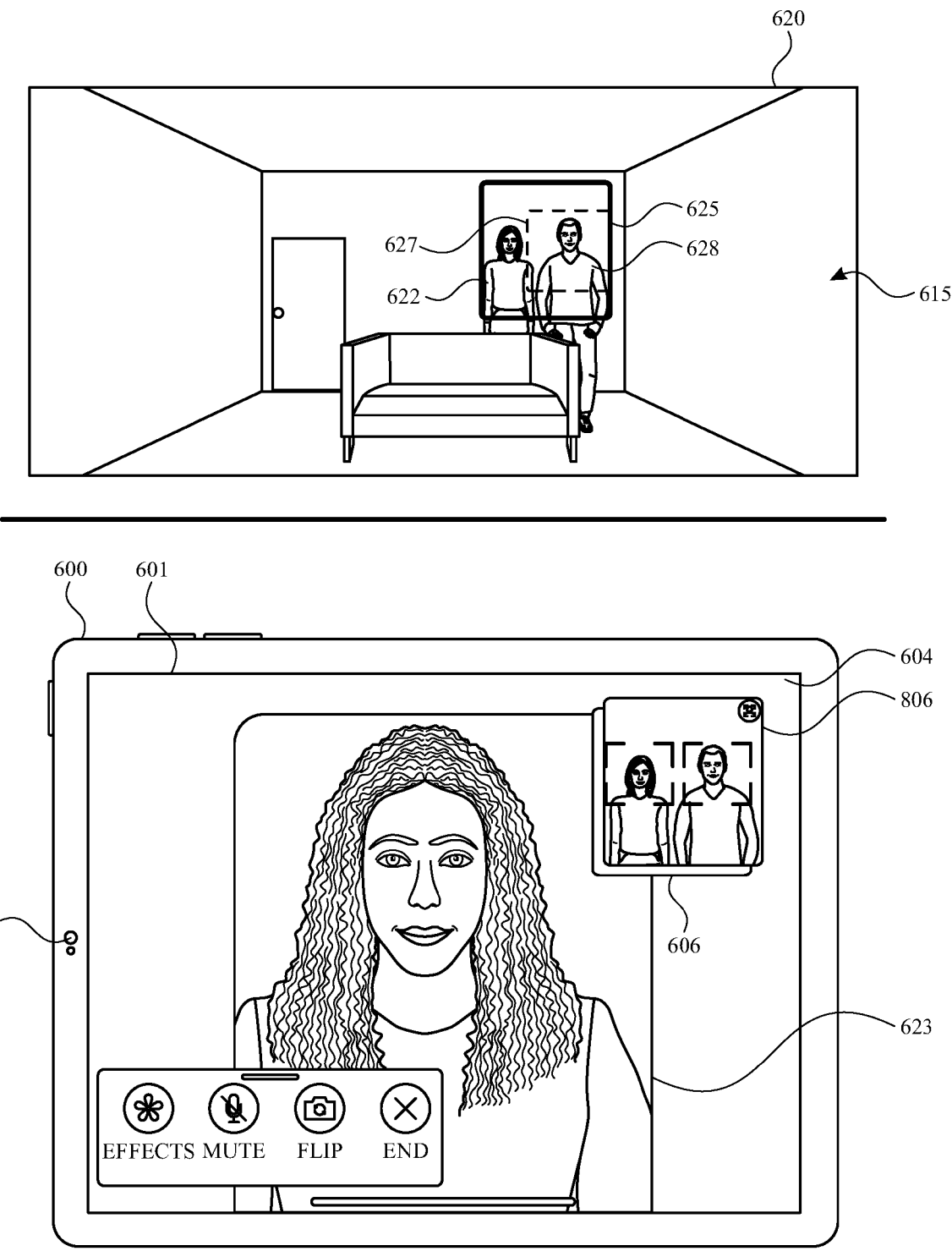
Figure 8E:
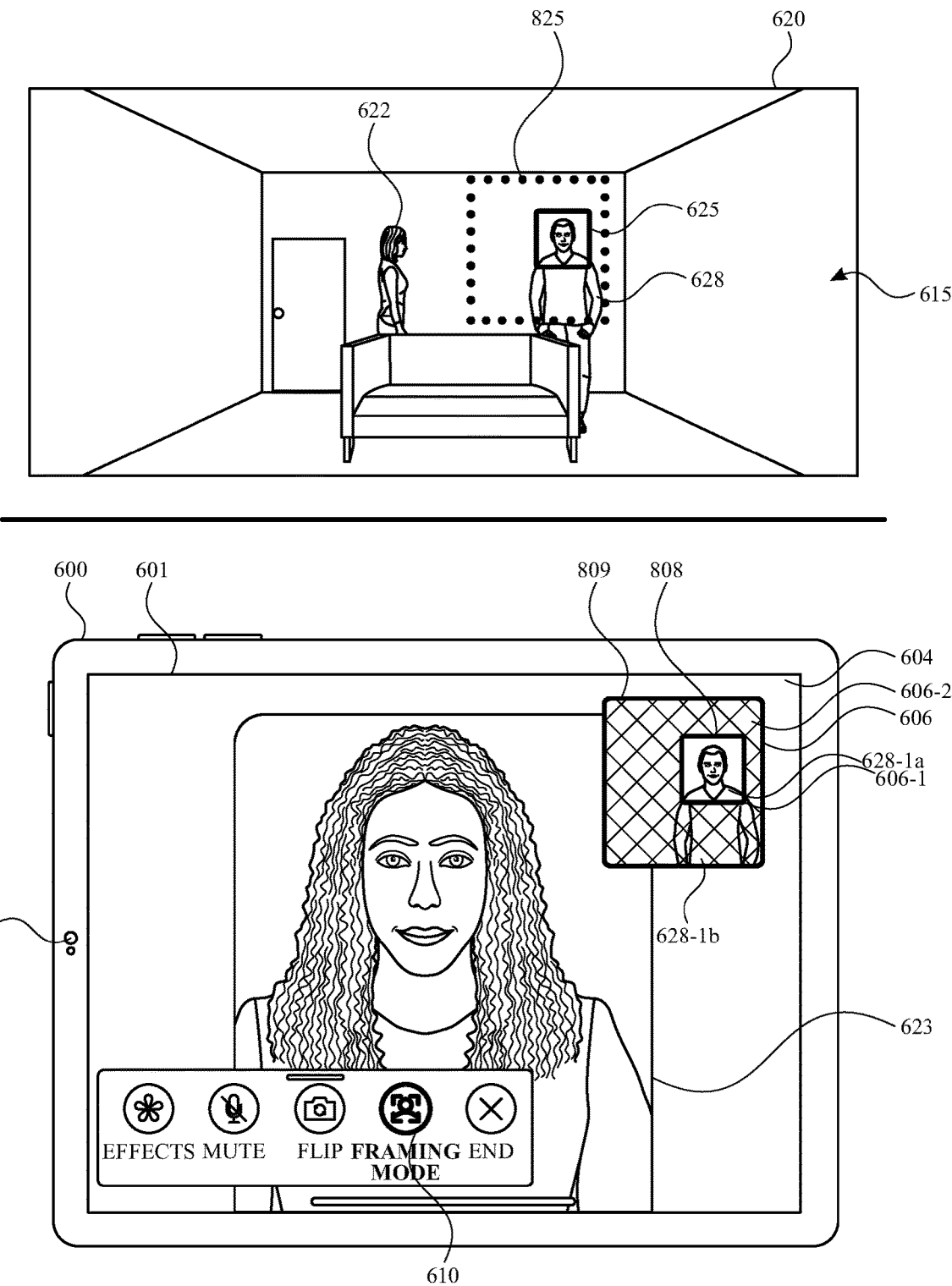
Figure 8F:
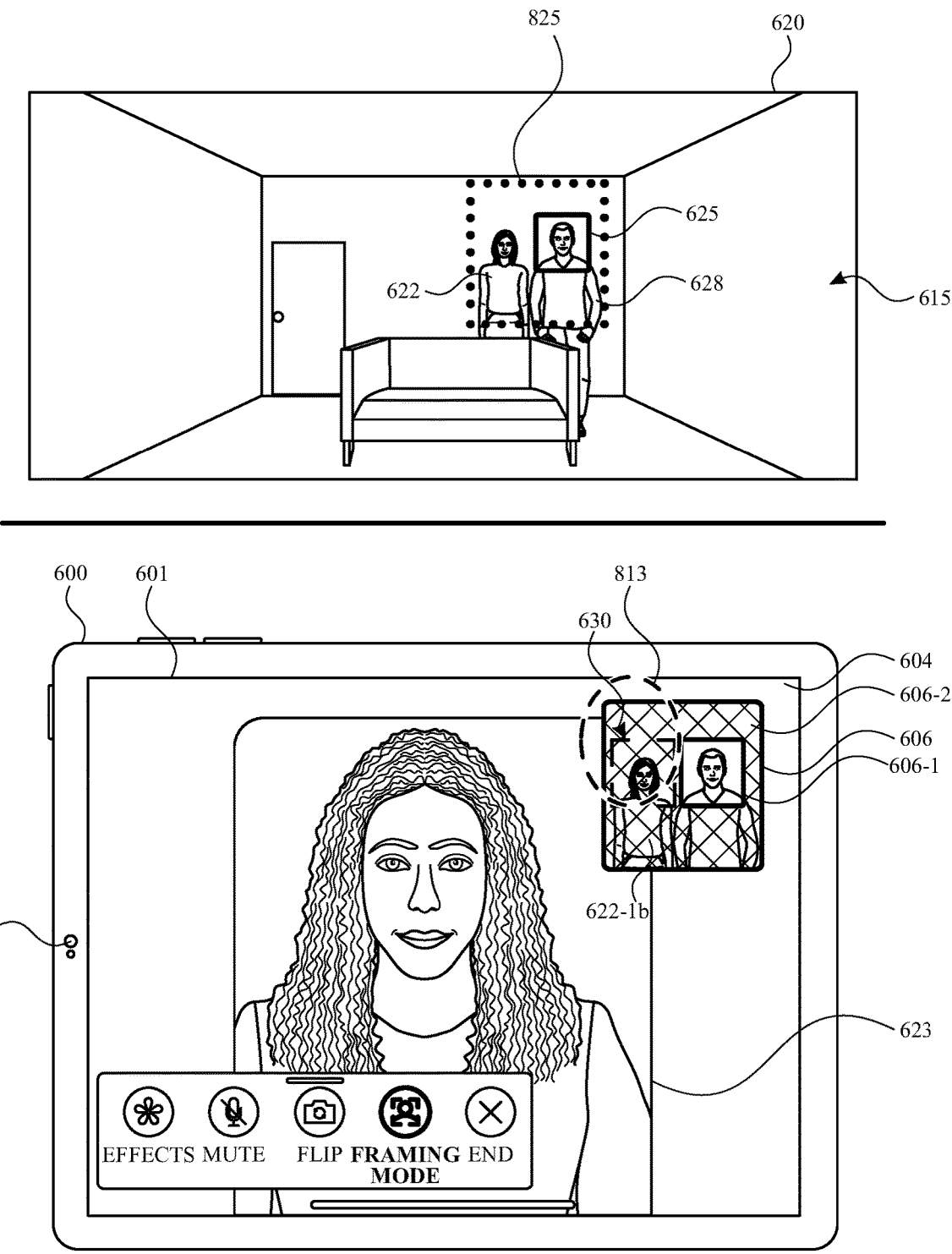
Figure 8G:
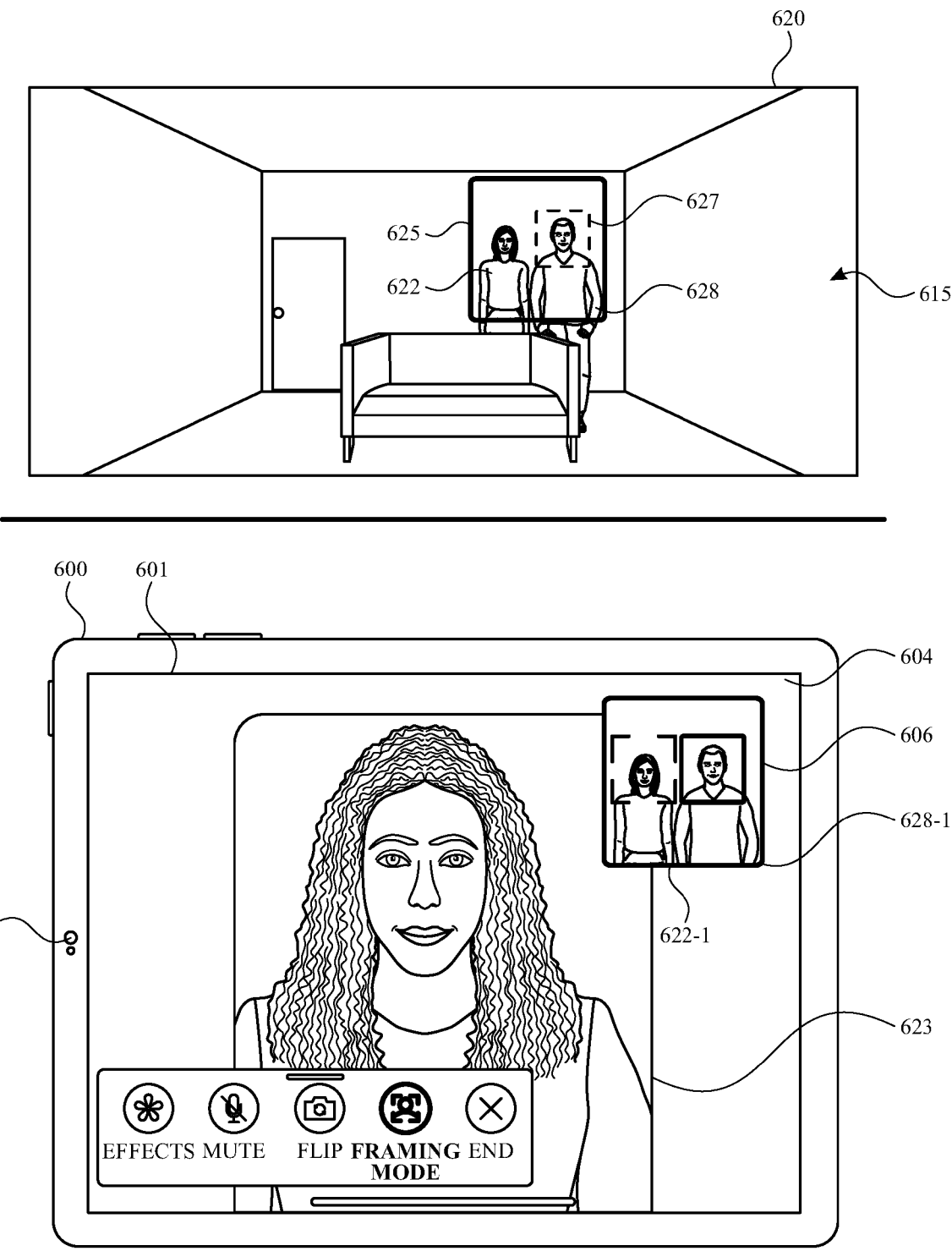
Figure 8H:
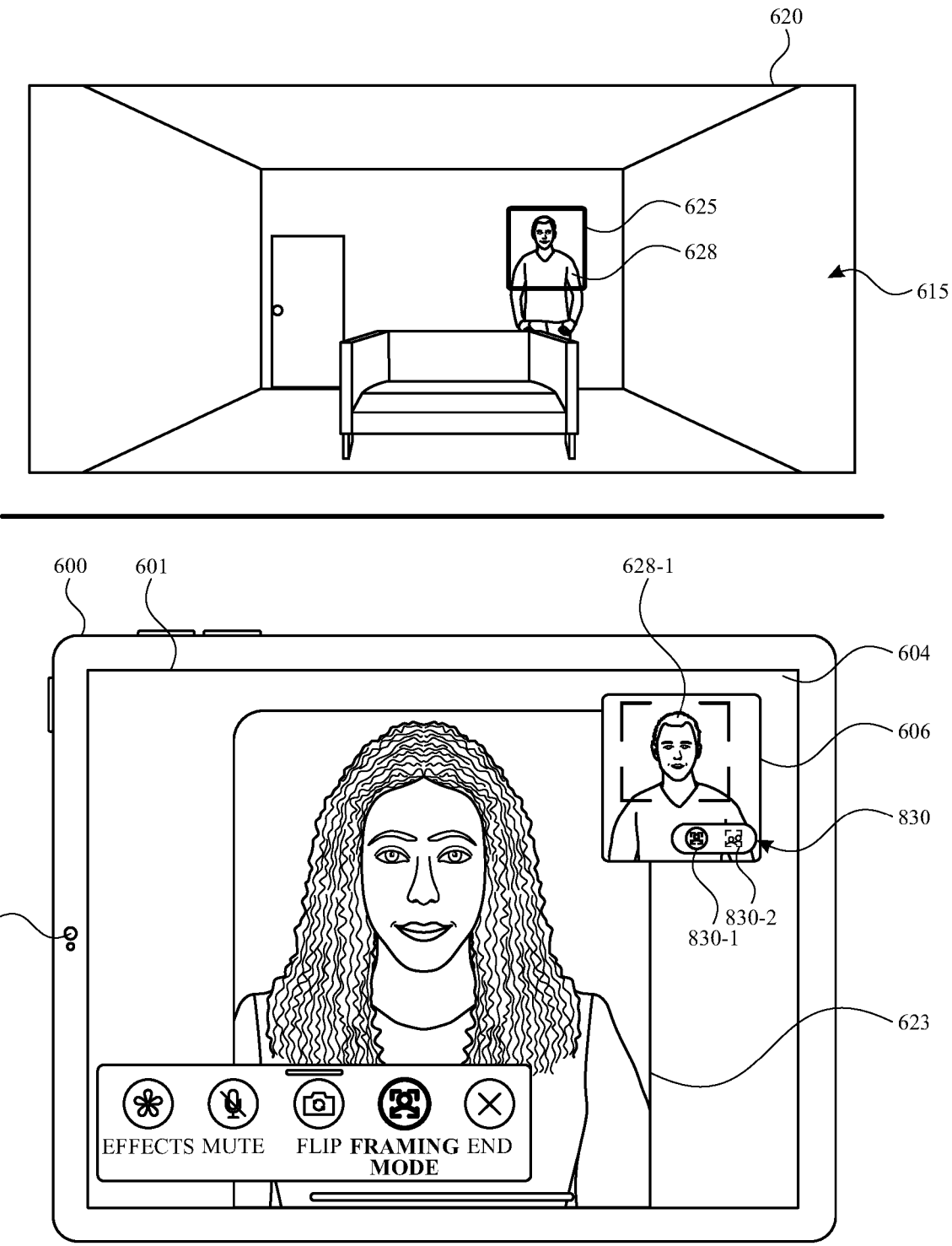
Figure 8I:
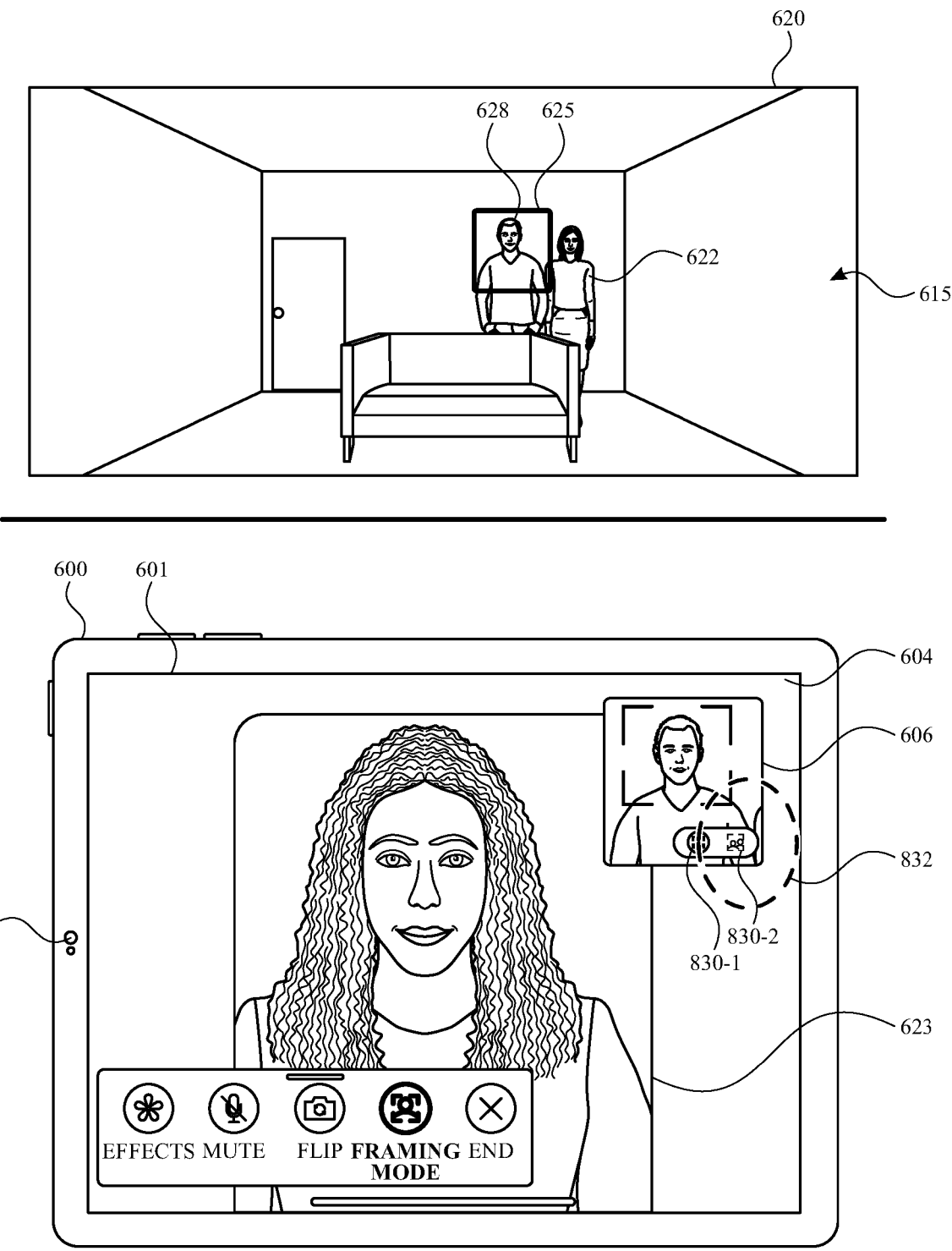
Figure 8J:
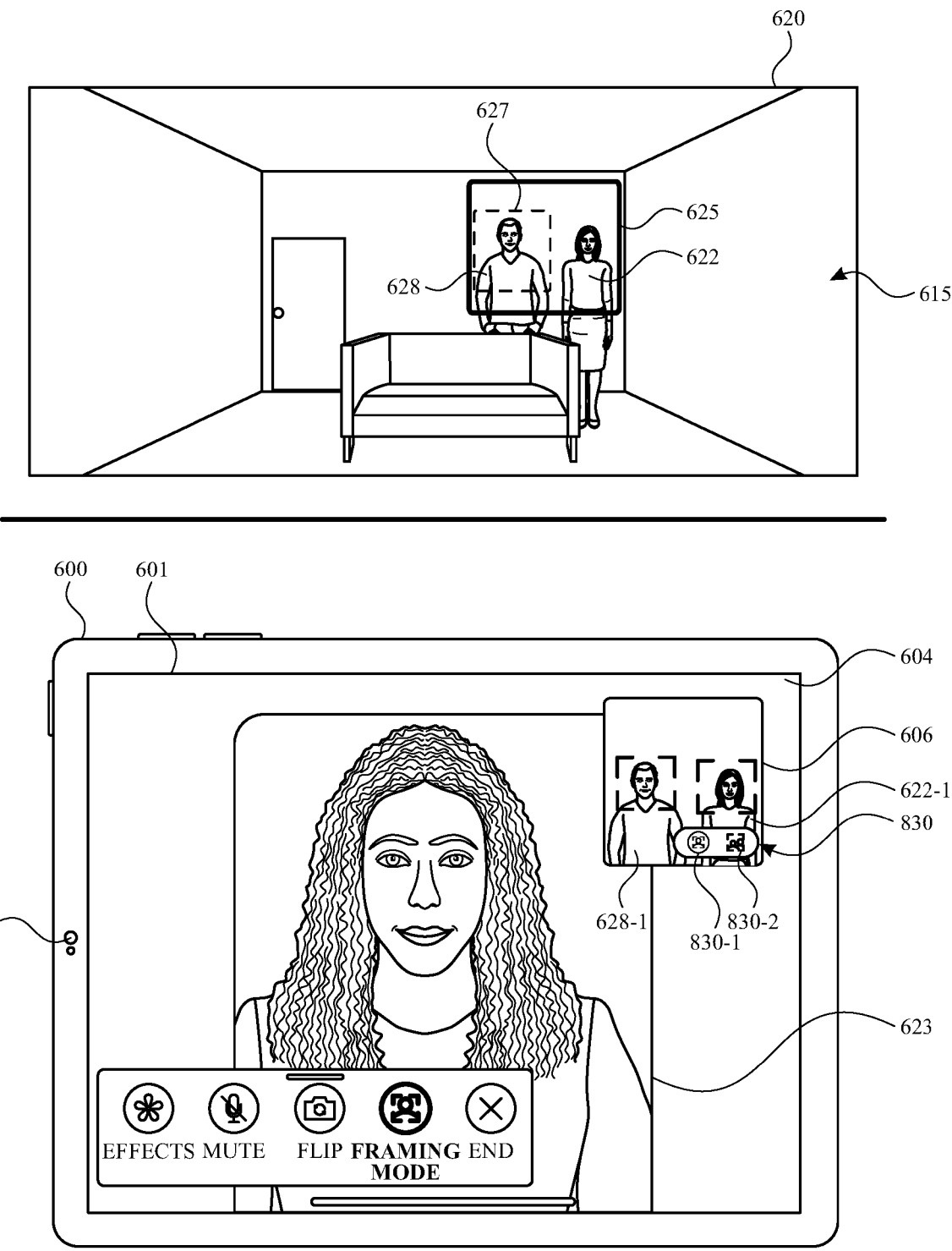

FIGS. 8A-8J depict example embodiments in which device 600 displays a prompt to adjust the video feed field-of-view to include additional participants, in response to detecting additional subjects in scene 615. FIGS. 8A-8D illustrate an embodiment in which the prompt includes displaying stacked camera preview options. FIGS. 8E-8G illustrate an embodiment in which the prompt includes displaying a camera preview having obscured and unobscured regions. FIGS. 8H-8J illustrate an embodiment in which the prompt includes displaying an option to switch between a single-person framing mode and a multi-person framing mode. Other embodiments, such as that described above with respect to FIG. 6P, are provided in which device 600 displays a prompt that includes an affordance (e.g., add affordance 632) that is selectable to adjust the displayed field-of-view to include additional subjects.

FIG. 8A depicts an embodiment similar to that discussed above with respect to FIG. 6O, except that video feed 623 now includes representation 623-2 of Pam instead of representation 623-1 of John. The automatic framing mode is enabled, as indicated by the bolded state of framing mode affordance 610 and the display of framing indicators 630.

In FIG. 8A, Jack is participating in a video conference with Pam using device 600. Similarly, Pam is participating in the video conference with Jack using a device that includes one or more features of devices 100, 300, 500, or 600. For example, Pam is using a tablet similar to device 600. Accordingly, Pam's device displays a video conference interface similar to video conference interface 604, except that the camera preview on Pam's device displays the video feed captured from Pam's device (what is currently depicted in video feed 623 in FIG. 8A), and the incoming video feed on Pam's device displays the video feed output from device 600 (what is currently depicted in camera preview 606 in FIG. 8A).

In FIG. 8B, device 600 detects Jane 622 entering scene 615, within field-of-view 620. In response, device 600 updates video conference interface 604 by displaying secondary camera preview 806 positioned behind, and offset from, camera preview 606. The stacked appearance of camera preview 606 and secondary camera preview 806 indicates that multiple video feed fields-of-view are available for the video conference, and that the user can change the displayed field-of-view. Device 600 indicates that camera preview 606 is the currently selected or enabled video feed field-of-view because it is positioned on top of secondary camera preview 806. Thus, secondary camera preview 806 represents an option for adjusting the video feed field-of-view, which, in this embodiment, is an alternate field-of-view that includes both Jack 628 and Jane 622 (the additional subject who has entered the scene). In some embodiments, the different camera previews represent different zoom values and, as such, the different camera preview options can also be considered different zoom controls/options.

Device 600 detects input 804 (e.g., a tap input) on the stacked previews (e.g., on secondary camera preview 806) and, in response, updates video conference interface 604 by shifting the position of secondary camera preview 806 so that it is no longer positioned behind camera preview 606, as depicted in FIG. 8C.

In FIG. 8C, device 600 displays both camera preview 606 and secondary camera preview 806 separated (unstacked) in video conference interface 604. Device 600 also displays bolded outline 807 to indicate the currently selected video feed field-of-view, which, in FIG. 8C, is camera preview 606. Secondary camera preview 806 represents an available video feed field-of-view offered by device 600. Portion 825 represents the portion of field-of-view 620 that is displayed in secondary camera preview 806, whereas portion 625 represents the portion of field-of-view 620 that is currently displayed in camera preview 606. While camera preview 806 shows a rendering of portion 825, camera preview 806 is not currently selected and, therefore, device 600 is not currently outputting a view of portion 825 for the video conference.

Camera preview 606 includes representation 628-1 of Jack and a portion of representation 622-1 of Jane. Secondary camera preview 806 is a zoomed out view (compared to the view in camera preview 606) that includes representation 628-1 of Jack and representation 622-1 of Jane. As previously discussed, framing indicators 630 are depicted in camera preview 606 and secondary camera preview 806 to indicate Jane's and Jack's faces are detected within the respective video feed fields-of-view.

While the camera preview options are displayed in the unstacked configuration depicted in FIG. 8C, device 600 can maintain or switch between the available preview options in response to user inputs. For example, if device 600 detects input 811 on camera preview 606, the device continues to use (e.g., output) the video feed field-of-view represented by camera preview 606, and video conference interface 604 returns to the view depicted in FIG. 8B. If device 600 detects input 812 on secondary camera preview 806, device 600 switches to (e.g., outputs) the video feed field-of-view represented by secondary camera preview 806, and the camera previews return to the stacked configuration with secondary camera preview 806 on top and camera preview 606 on bottom, as depicted in FIG. 8D. In some embodiments, when device 600 switches from camera preview 606 to secondary camera preview 806, bolded outline 807 moves from camera preview 606 to secondary camera preview 806 to indicate the switch from outputting camera preview 606 to outputting secondary camera preview 806.

In FIG. 8D, portion 625 represents the portion of field-of-view 620 that is currently being output for the video conference. Because secondary camera preview 806 was selected in response to input 812, portion 625 now corresponds to secondary camera preview 806. Portion 627 represents the previous video feed field-of-view, which now corresponds to camera preview 606.

In FIG. 8E, device 600 detects Jane 622 entering scene 615. Device 600 displays camera preview 606 having unblurred region 606-1 (denoted by boundary 808 and no hatching) and blurred region 606-2 (denoted by boundary 809 and hatching). Unblurred region 606-1 represents the current video feed field-of-view, whereas blurred region 606-2 represents additional video feed field-of-view that is available, but not currently being output, for the video conference. Accordingly, portion 625 corresponds to the field-of-view of the unblurred region, and portion 825 corresponds to the available field-of-view of the blurred and unblurred regions combined. The display of blurred and unblurred regions in camera preview 606 indicates that the video feed field-of-view is capable of being adjusted. The use of blurring is described as one manner in which to distinguish the current video feed field-of-view from the additional available video feed field-of-view. However, these regions can be distinguished by other visual indications and appearances such as shading, darkening, highlighting, or other visual obscuring to either emphasize or deemphasize the various regions. Boundaries 808 and 809 are also used to visually distinguish these regions.

In FIG. 8E, unblurred region 606-1 depicts unobscured representation 628-1a of Jack—specifically, Jack's face—that is being output for the video conference. Blurred region 606-2 depicts an obscured (e.g., blurred) representation of the available video feed field-of-view that is included in portion 825 of field-of-view 620 and not included in portion 625. For example, in FIG. 8E, blurred region 606-2 depicts obscured representation 628-1b of Jack's body. In some embodiments, the blurred and/or unblurred regions include framing indicators when device 600 detects a face in the corresponding region.

In FIG. 8F, Jane 622 has entered portion 825 of field-of-view 620, and device 600 displays obscured representation 622-1b of Jane in blurred region 606-2 of the camera preview. Device 600 detects input 813 on blurred region 606-2 (or on framing indicators positioned around Jane's face in blurred region 606-2) and, in response, adjusts (e.g., expands) the video feed field-of-view to include the previously blurred region 606-2, as depicted in FIG. 8G. In some embodiments, the blurred/unblurred regions of the camera preview represent different zoom values for the video feed field-of-view. As such, the camera preview 606, which can be selected to switch to a field-of-view with a different zoom value (e.g., by expanding the unblurred region), can also be considered a zoom control.

Portion 625, in FIG. 8G, represents the expanded portion of field-of-view 620 that is now being output for the video conference, and portion 627 represents the prior displayed portion of field-of-view 620 corresponding to unblurred portion 606-1 in FIG. 8F. Camera preview 606 now depicts unobscured representation 628-1 of Jack and unobscured representation 622-1 of Jane.

In some embodiments, the adjustment of the video feed field-of-view discussed above with respect to FIGS. 8E-8G is reversed when the conditions that triggered the adjustment are no longer met. For example, if Jane leaves frame 625 in FIG. 8G, then device 600 returns to the state depicted in FIG. 8E, where camera preview 606 includes unblurred region 606-1 and blurred region 606-2.

FIGS. 8H-8J depict various interfaces for an embodiment in which device 600 switches the automatic framing mode between a single-person framing mode setting and a multi-person framing mode setting. In FIG. 8H, while the automatic framing mode is enabled, device 600 detects Jack 628 in scene 615 and displays video conference interface 604 with framing mode options 830 depicted in camera preview 606. Framing mode options 830 include single-person option 830-1 and multi-person option 830-2. When single-person option 830-1 is in a selected state, as depicted in FIG. 8H, the single-person framing mode setting is enabled and device 600 keeps the video feed field-of-view focused on a single user's face, even when another person is detected in field-of-view 620. For example, in FIG. 8I, although Jane 622 is now positioned next to Jack 628 in scene 615, device 600 maintains the video feed field-of-view that features Jack 628 (represented in camera preview 606 and portion 625), instead of automatically adjusting the video feed field-of-view to include Jane.

In FIG. 8I, device 600 detects input 832 on multi-person option 830-2. In response, device 600 switches from the single-person framing mode setting to the multi-person framing mode setting. When the multi-person framing mode setting is enabled, device 600 automatically adjusts the video feed field-of-view to include additional subjects detected in field-of-view 620 (or a subset thereof). For example, when device 600 switches to the multi-person framing mode setting, device 600 expands the video feed field-of-view to include representations 628-1 and 622-1 of both Jack and Jane, as depicted in camera preview 606 in FIG. 8J. Accordingly, portion 625 in FIG. 8J represents the expanded video feed field-of-view resulting from enabling the multi-person framing mode setting, and portion 627 represents the prior video feed field-of-view corresponding to the single-person framing mode setting. In some embodiments, the framing mode options 830 correspond to video feed fields-of-view having different zoom values and, as such, framing mode options 830 can also be considered zoom controls/options.

In some embodiments, the transition depicted in FIGS. 8H-8J can be combined with the camera preview having blurred and unblurred regions as discussed with respect to FIGS. 8E-8G. For example, device 600 can display camera preview 606 having blurred and unblurred regions, similar to that depicted in FIG. 8E, but also including framing mode options 830 similar to those depicted in FIG. 8H. When device 600 is in the single-person framing mode setting, device 600 displays camera preview 606 having both blurred and unblurred regions, regardless of whether anybody is detected in the blurred portion of the frame (similar to that depicted in FIGS. 8E and 8F). However, when device 600 is in the multi-person framing mode setting, device 600 can transition the camera preview 606 from the blurred and unblurred appearance to an unblurred appearance (similar to the transition in FIGS. 8F and 8G) in response to detecting another person in the blurred region. In a similar manner, if a person is detected in the blurred region (as shown in FIG. 8F) when device 600 switches from single-person framing mode to the multi-person framing mode, device 600 adjusts the video feed field-of-view to include the previously blurred region that includes the person who was previously detected in the blurred region (similar to the transition depicted in FIGS. 8F and 8G). In some embodiments, device 600 can reverse the transitions discussed above. For example, if device 600 is displaying camera preview 606 with both subjects in the field-of-view (similar to that depicted in FIG. 8J), and device 600 detects a selection of single-person framing option 830-1, device 600 can adjust the video feed field-of-view to return to the blurred/unblurred appearance, similar to that depicted in FIG. 8F.

Figure 8K:
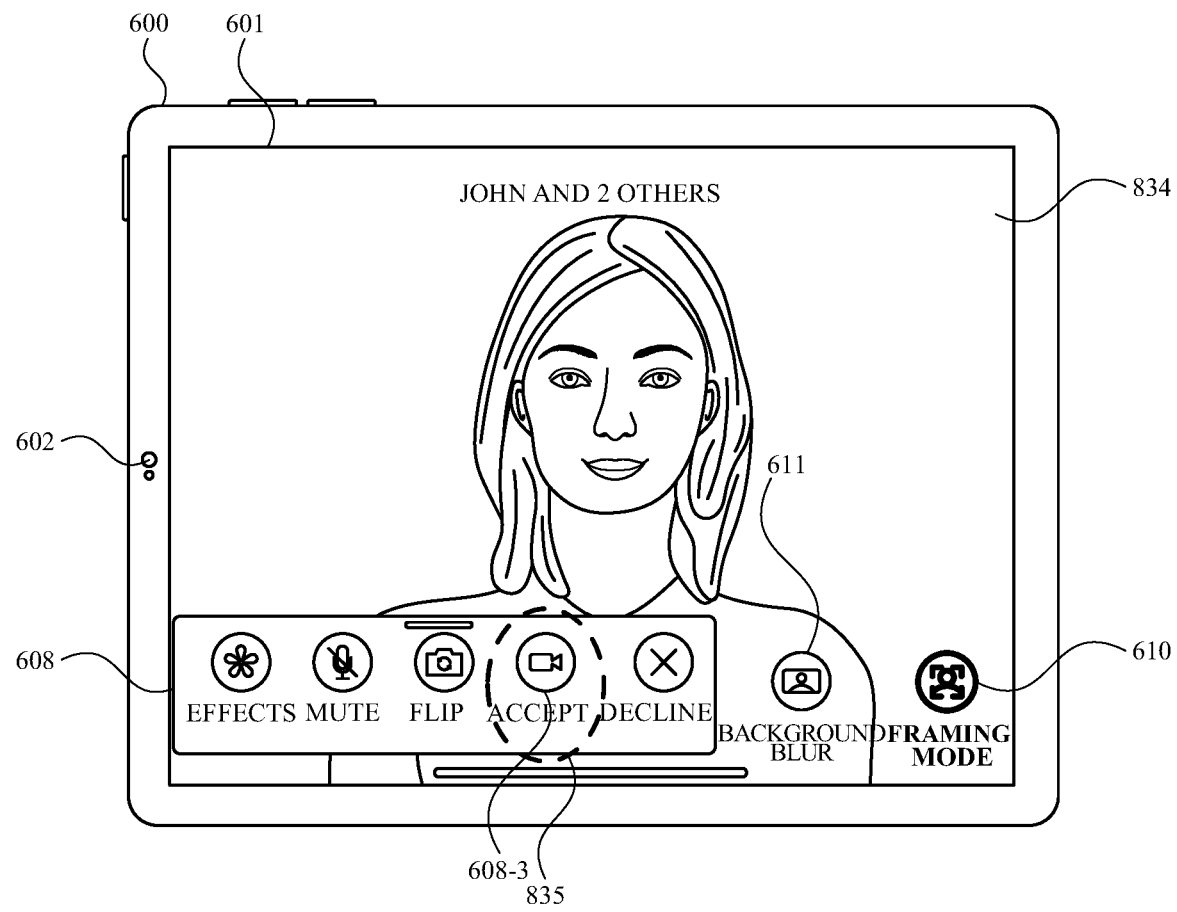

Referring now to FIG. 8K, device 600 displays video conference interface 834, which depicts an incoming request to join a live video conference with John and two other remote participants. Video conference interface 834 is similar to video conference interface 604, except that multiple participants are active on the video conference session depicted in video conference interface 834. Therefore, the embodiments described herein with respect to video conference interface 604 can be applied in an analogous manner to video conference interface 834. Similarly, the embodiments described herein with respect to video conference interface 834 can be applied in an analogous manner to video conference interface 604, and the like.

In FIG. 8K, device 600 detects input 835 on accept option 608-3, while the automatic framing mode is enabled (as indicated by the bolded appearance of framing mode affordance 610) and the background blur mode is disabled (as indicated by the unbolded appearance of background blur affordance 611). In response, device 600 accepts the live video conference call and joins the video conference session with the automatic framing mode enabled and the background blur mode disabled, as depicted in FIG. 8L.

Figure 8L:
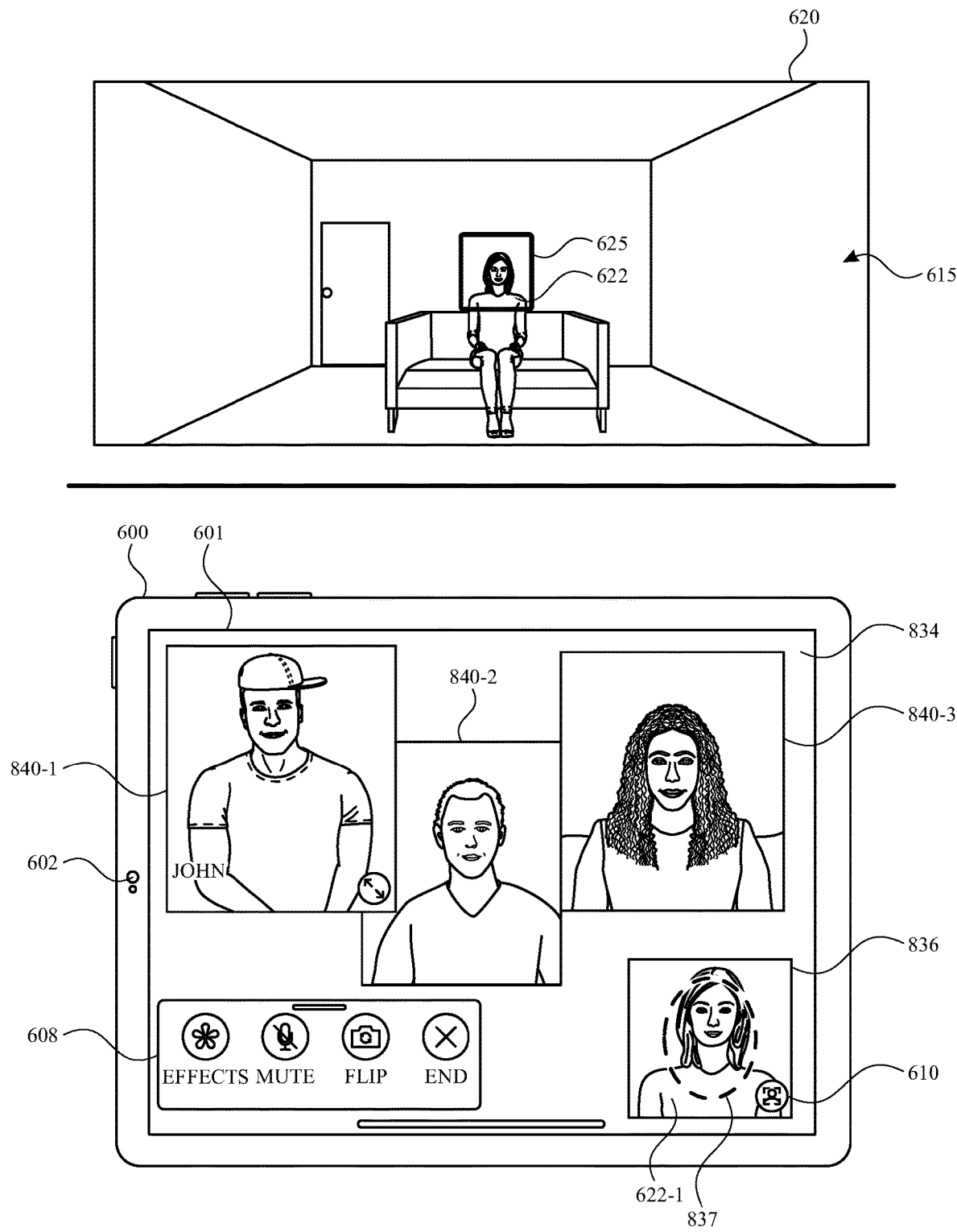

FIG. 8L depicts device 600 displaying video conference interface 834 with camera preview 836 (similar to camera preview 606), and incoming video feeds 840-1, 840-2, and 840-3 for each of the respective remote participants of the live video conference session. Camera preview 836 includes representation 622-1 of Jane and framing mode affordance 610. In some embodiments, framing mode affordance 610 is selectable in camera preview 836 to enable or disable the automatic framing mode. In some embodiments, framing mode affordance 610 is not selectable until camera preview 836 is displayed in an enlarged state, such as that depicted in FIG. 8M. In some embodiments, device 600 displays framing mode affordance 610 in camera preview 836 when the automatic framing mode is enabled and does not display the affordance when the automatic framing mode is disabled. In some embodiments, device 600 persistently displays framing mode affordance 610, and indicates whether or not the automatic framing mode is enabled by changing the appearance of the framing mode affordance (e.g., bolding the affordance when the mode is enabled). In some embodiments, framing mode affordance 610 is displayed in options menu 608.

In FIG. 8L, Jane is participating in a video conference with Pam, John, and Jack using device 600. Similarly, Pam, John, and Jack are each participating in the video conference with Jane and the other respective participants using respective devices that include one or more features of devices 100, 300, 500, or 600. For example, John, Jack, and Pam are each using a tablet similar to device 600. Accordingly, the devices of the other participants (John, Jack, and Pam) each display a video conference interface similar to video conference interface 834, except that the camera preview on each respective device displays the video feed captured from that user's respective device (e.g., Pam's camera preview displays what is currently depicted in video feed 840-3, John's camera preview displays what is currently depicted in video feed 840-1, and Jack's camera preview displays what is currently depicted in video feed 840-2), and the incoming video feed on the devices of the other participants (John, Jack, and Pam) include the video feed output from device 600 (what is currently depicted in camera preview 836 in FIG. 8L) and the video feeds output from the devices of the other participants.

Figure 8M:
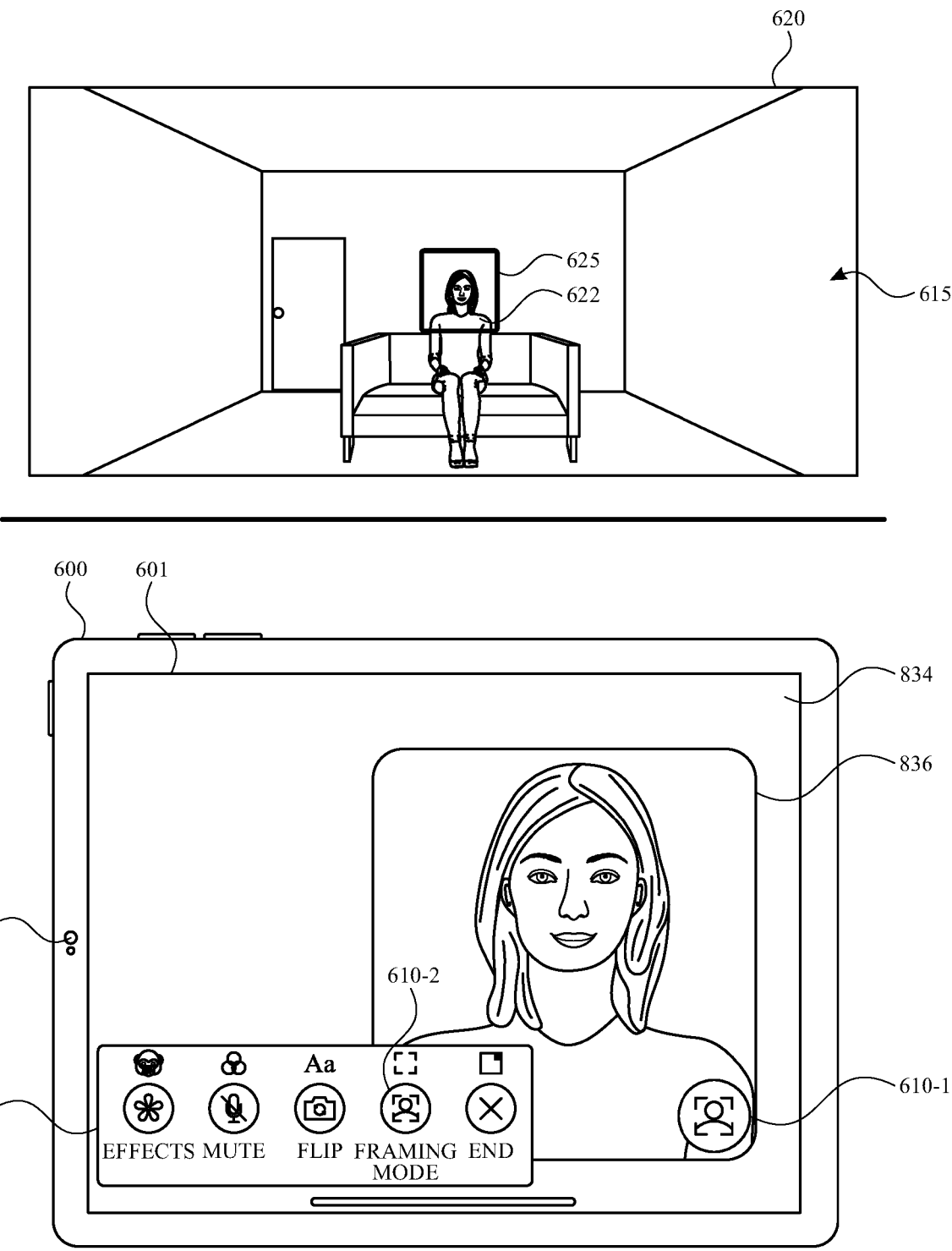

In FIG. 8L, device 600 detects input 837 on camera preview 836 and, in response, enlarges camera preview 836, as depicted in FIG. 8M. In FIG. 8M, device 600 displays framing mode affordance 610 in two locations in video conference interface 834. Framing mode affordance 610-1 is displayed in camera preview 836, and framing mode affordance 610-2 is displayed in options menu 608. In some embodiments, framing mode affordance 610 is only displayed in one location (e.g., either options menu 608 or in camera preview 836) at any given time.

In some embodiments, device 600 displays framing mode affordance 610 having an altered appearance when the automatic framing mode is unavailable. For example, in FIG. 8N, the lighting conditions in scene 615 are poor and, in response to detecting the poor lighting conditions, device 600 displays framing mode affordance 610-1 and framing mode affordance 610-2 having a greyed out appearance to indicate that the automatic framing mode is currently unavailable. When the lighting conditions improve, device 600 displays framing mode affordance 610-1 and 610-2 having the appearance shown in FIG. 8M.

Figure 8N:
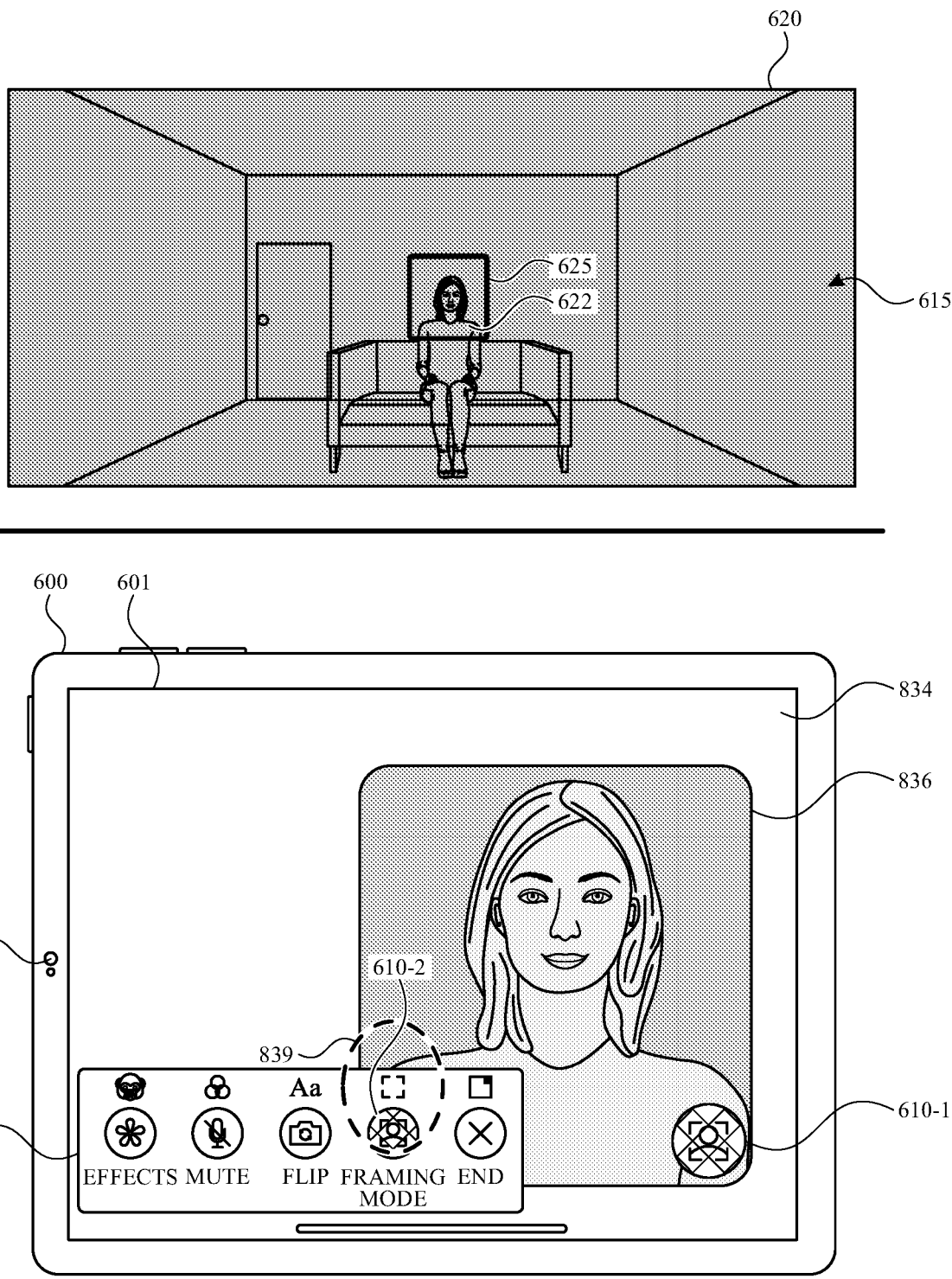
Figure 8O:
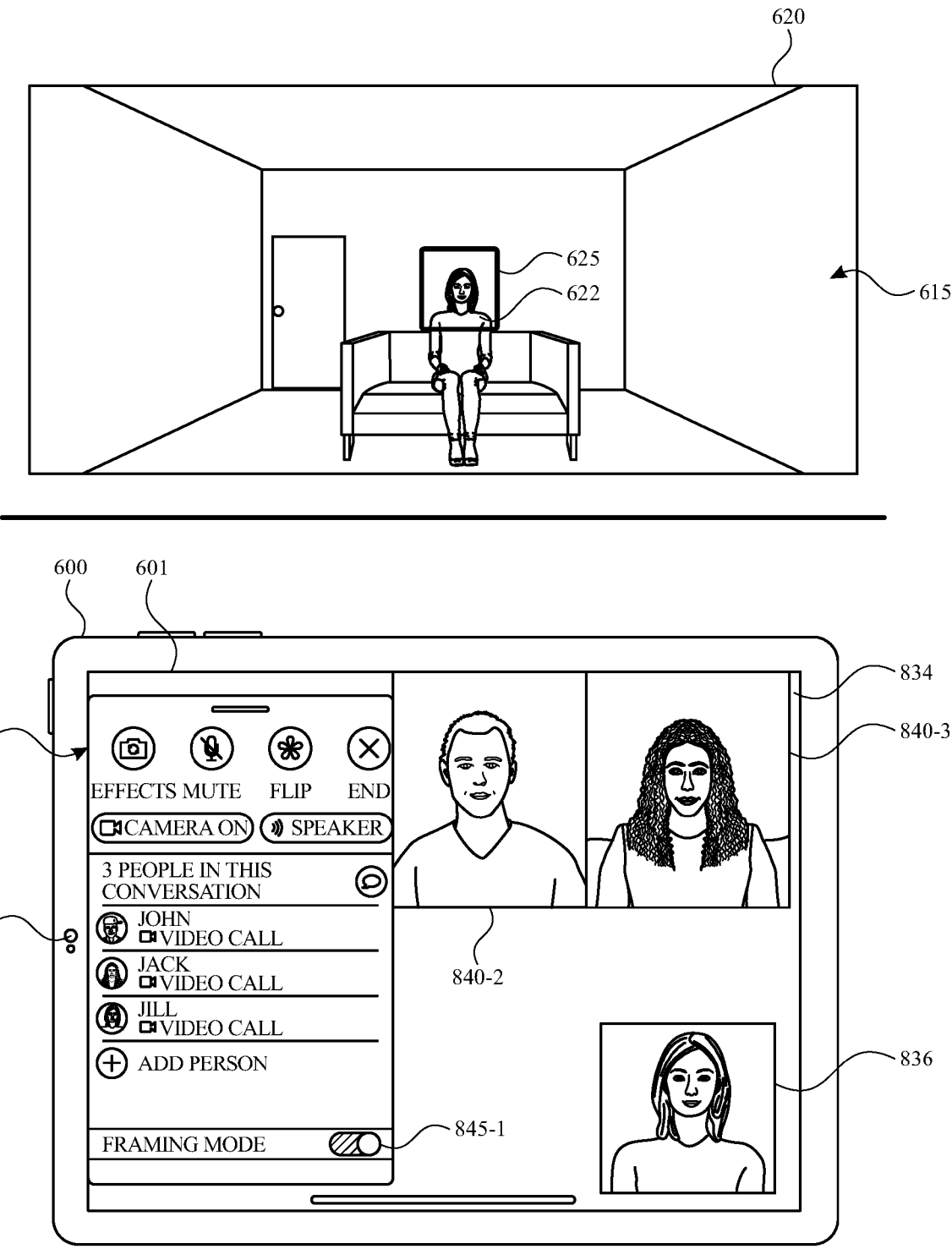

In FIG. 8N, device 600 detects input 839 (e.g., a tap input or a drag gesture) on options menu 608 and, in response, displays the interface depicted in FIG. 8O. In some embodiments, device 600 displays video conference interface 834 depicted in FIG. 8L in response to detecting an input on other locations of the video conference interface 834 depicted in FIG. 8N such as, for example, on camera preview 836 or on a location of the interface other than options menu 608.

In FIG. 8O, device 600 displays video conference interface 834 having expanded options menu 845, incoming video feeds 840-2 and 840-3, and camera preview 836. Expanded options menu 845 includes information and various options for the video conference, including framing mode option 845-1, which is similar to framing mode affordance 610.

Figure 8P:
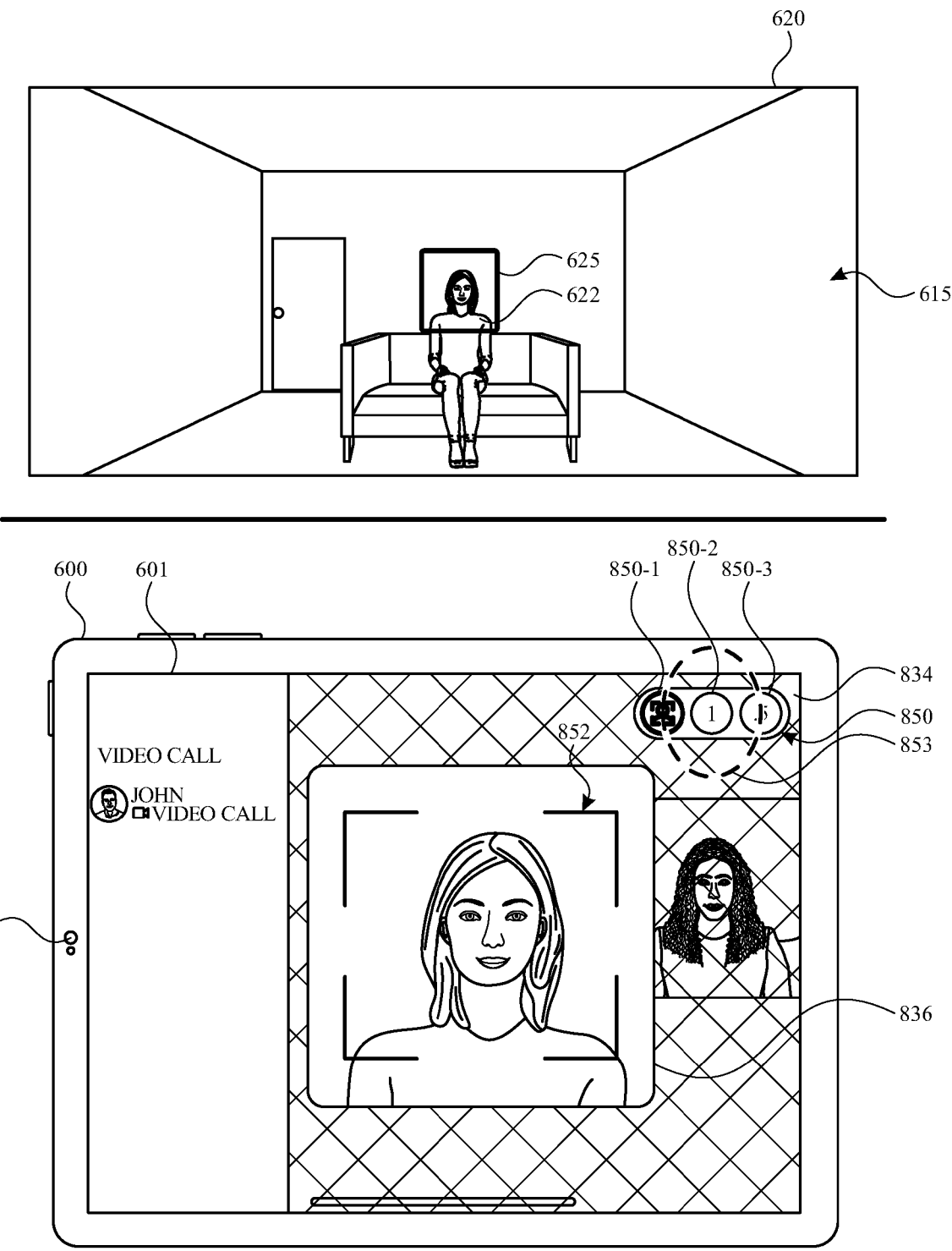

Referring now to FIG. 8P, device 600 displays video conference interface 834 with an enlarged camera preview 836 and control options 850. In some embodiments, the interface depicted in FIG. 8P is displayed in response to an input on camera preview 836 in FIG. 8O. Control options 850 include framing mode option 850-1, 1X zoom option 850-2, and 0.5× zoom option 850-3. Framing mode option 850-1 is similar to framing mode affordance 610, and is displayed in a bolded state to indicate that the automatic framing mode is enabled. Because the automatic framing mode is enabled, camera preview 836 includes framing indicators 852 (similar to framing indicators 630) positioned around the face of representation 622-1 of Jane. Zoom options 850-2 and 850-3 are selectable to manually change the digital zoom level of the video feed field-of-view. Because zoom options 850-2 and 850-3 manually adjust the digital zoom of camera preview 836, selecting the zoom options disables the automatic framing mode, as discussed below.

In FIG. 8P, device 600 detects input 853 on zoom option 850-2. In response, device 600 emphasizes (e.g., bolds and optionally enlarges) zoom option 850-2 and disables the automatic framing mode. In the embodiment depicted in FIG. 8P, the 1× zoom level was the zoom setting prior to detecting input 853. Therefore, device 600 continues to display representation 622-1 at the 1× zoom level. Because the automatic framing mode is disabled, framing mode option 850-1 is deemphasized (e.g., no longer bolded) and framing indicators 852 are no longer displayed in FIG. 8Q.

Figure 8Q:
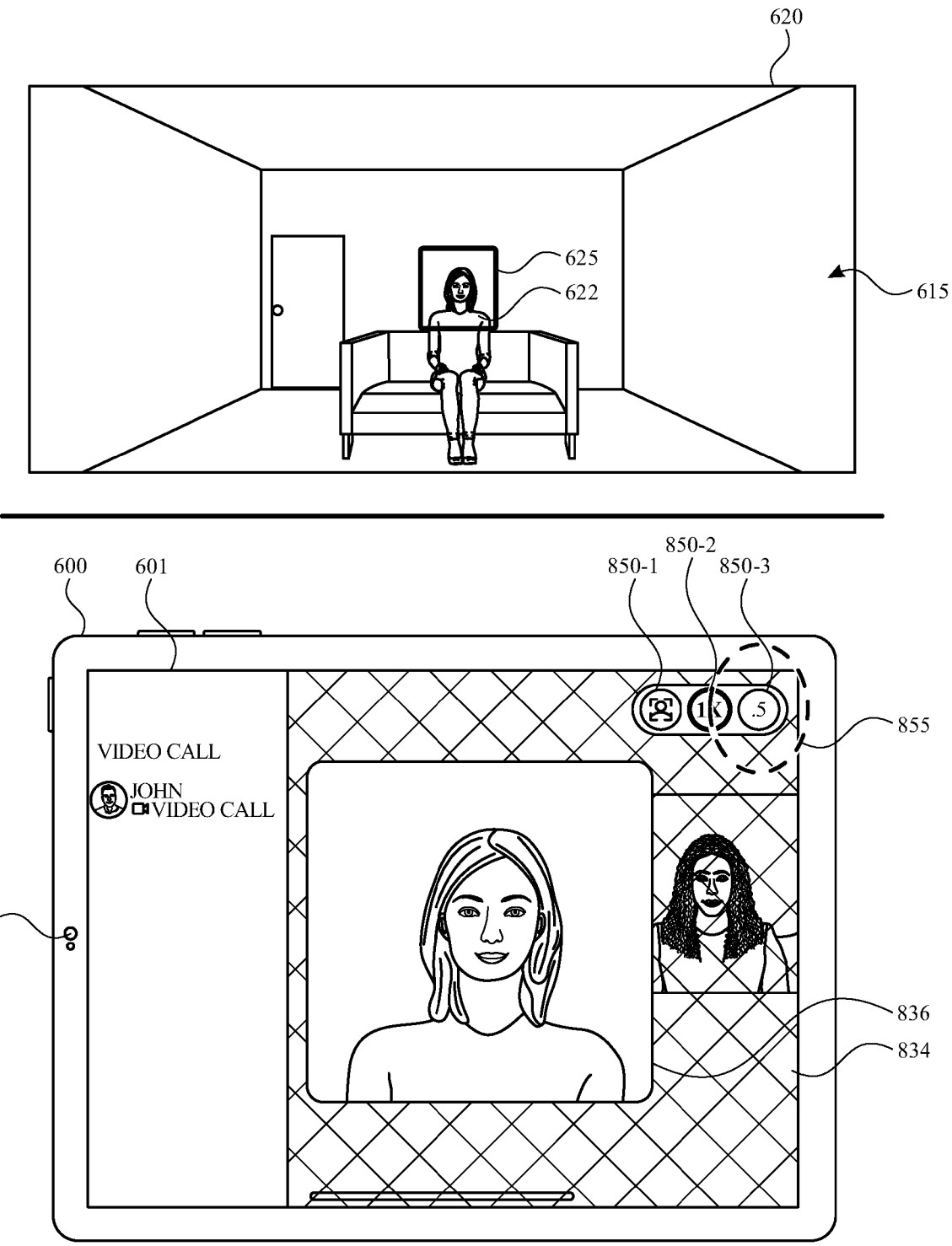
Figure 8R:
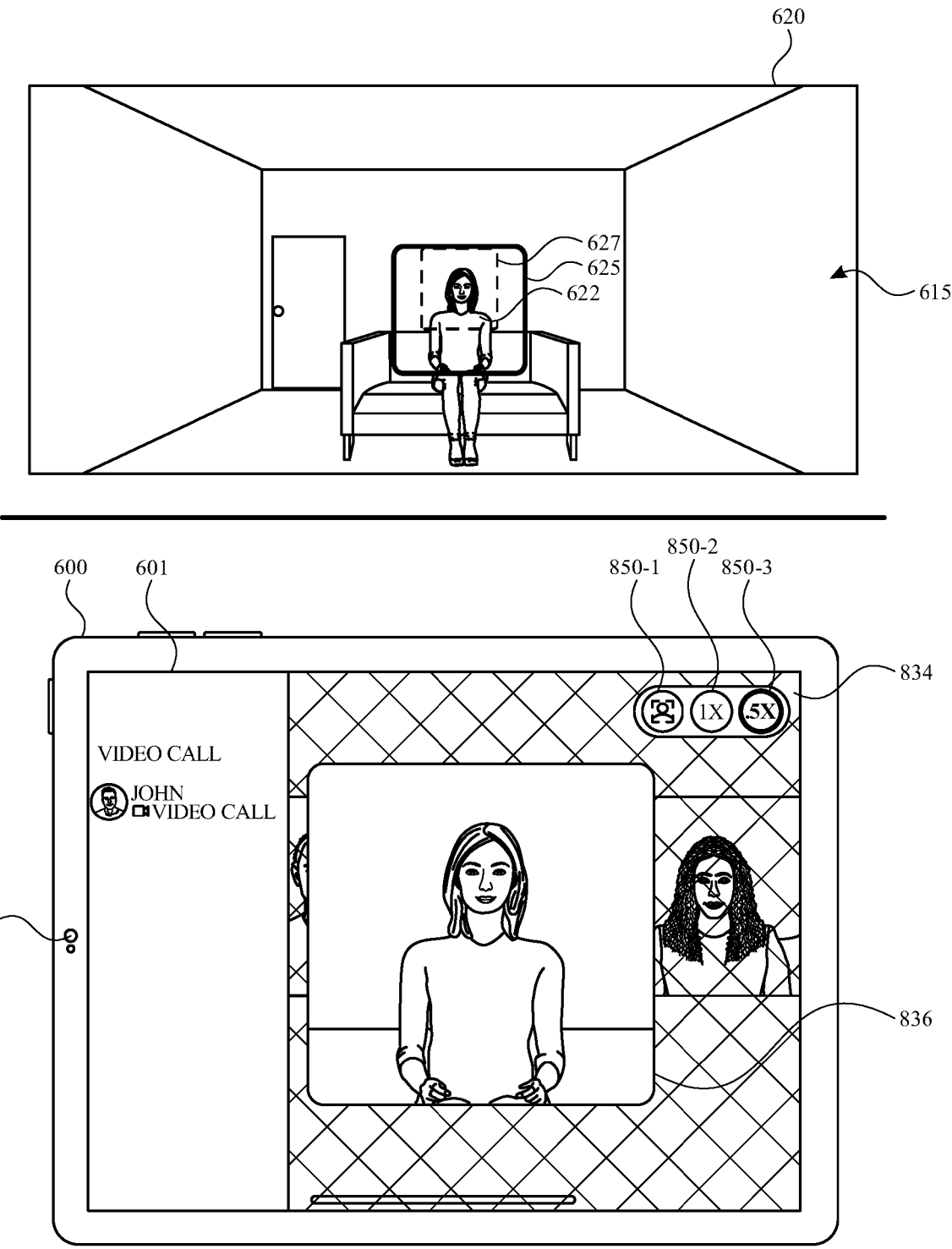

In FIG. 8Q, device 600 detects input 855 on zoom option 850-3 and, in response, adjusts the digital zoom level as indicated in FIG. 8R. Accordingly, device 600 emphasizes zoom option 850-3, deemphasizes zoom option 850-2, and displays camera preview 836 having a 0.5× digital zoom value (zoomed out compared to camera preview 836 in FIG. 8Q). Portion 625 represents the portion of field-of-view 620 that is displayed after the video feed field-of-view is zoomed out, and portion 627 represents the portion of field-of-view 620 that was previously displayed when zoom option 850-2 was selected.

FIG. 9 is a flow diagram illustrating a method for managing a live video communication session using an electronic device in accordance with some embodiments. Method 900 is performed at a computer system (e.g., a smartphone; a tablet) (e.g., 100, 300, 500, 600) that is in communication with a display generation component (e.g., a display controller, a touch-sensitive display system), one or more cameras (e.g., 602) (e.g., a visible light camera; an infrared camera; a depth camera), and one or more input devices (e.g., a touch-sensitive surface). Some operations in method 900 are, optionally, combined, the orders of some operations are, optionally, changed, and some operations are, optionally, omitted.

As described below, method 900 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 900, computer system (e.g., 600) displays (902), via the display generation component (e.g., 601), a live video communication interface (e.g., 604; 834) for a live video communication session (e.g., an interface for a live video communication session (e.g., a live video chat session, a live video conference session, etc.)). In some embodiments, the live video communication interface includes a live preview of the user of the computer system and a live representation of one or more participants (e.g., remote users) of the live video communication session.

The computer system (e.g., 600) displays the live video communication interface (e.g., 604; 834) including (904) a representation (e.g., 623; 623-1; 840-1; 840-2; 840-3) of one or more participants (e.g., remote participant(s) of the live video communication session) in the live video communication session other than participants (e.g., 622; 628) visible via the one or more cameras (e.g., 602). In some embodiments, participants visible via the one or more cameras are subjects positioned within a field-of-view (e.g., 620) of the one or more cameras and represented (e.g., displayed) in the live video communication session (e.g., 606; 806) via the display generation component (e.g., 601).

The computer system (e.g., 600) displays the live video communication interface (e.g., 640; 834) including (904) (e.g., concurrently with the representation of the one or more participants) a representation of a field-of-view of the one or more cameras (e.g., 606; 806; 836) that is visually associated with (e.g., displayed adjacent to; displayed grouped together with) a visual indication (e.g., 610; 610-1; 610-2; 630; 632; 806; 808; 809; 606-1; 606-2; 830; 830-1; 830-2; 845-1; 850; 850-1; 850-2; 850-3; 852) (e.g., a prompt (e.g., text); a selectable graphical user interface object (e.g., zoom controls; a framing mode affordance; a framing indication; an affordance for selecting a single-person framing mode; an affordance for selecting a multi-person framing mode); a representation of a camera preview (e.g., an alternate camera preview); a framing indication) of an option to change (e.g., adjust) the representation (e.g., change a digital zoom level/value; expand the displayed field-of-view; contracting the displayed field-of-view) of the field-of-view of the one or cameras during the live video communication session (e.g., the representation of the field-of-view of the one or more cameras is displayed with a first digital zoom level and a first displayed portion of the field-of-view of the one or more cameras). Displaying a representation of a field-of-view of the one or more cameras that is visually associated with a visual indication of an option to change the representation of the field-of-view of the one or more cameras during the live video communication session provides feedback to a user of the computer system that alternative representations of the field-of-view of the one or more cameras are available for selection, and reduces the number of user inputs at the computer system by providing an option for adjusting the representation of the field-of-view without requiring the user to navigate a settings menu or other additional interfaces to adjust the represented field-of-view. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the field-of-view (e.g., 620) of the one or more cameras (e.g., 602) is a preview (e.g., 606; 806; 836) of image data outputted, or capable of being outputted, by the computer system (e.g., 600) to one or more electronic devices associated with the one or more participants (e.g., the remote participants) of the live video communication session. In some embodiments, the representation of the field-of-view of the one or more cameras includes a representation (e.g., 622-1; 628-1) of a subject (e.g., 622; 628) (e.g., a participant; a user of the computer system that is detected within a field-of-view (e.g., 620) of the one or more cameras during the live video communication session) participating in the live video communication session (e.g., a camera preview of the user of the computer system for the live video communication session). In some embodiments, the visual indication (e.g., 850-2; 850-3; 806; 606; 632) of the option to change the representation of the field-of-view of the one or more cameras is selectable to manually adjust a framing (e.g., digital zoom level) of the representation of the field-of-view of the one or more cameras during the live video communication session. In some embodiments, the visual indication (e.g., 610; 610-1; 610-2; 845-1; 830-1; 830-2; 850-1) of the option to change the representation of the field-of-view of the one or more cameras is selectable to enable or disable a mode for automatically adjusting the representation of the field-of-view of the one or more cameras, which, in some embodiments, includes a representation of the subject and, optionally, one or more additional subjects, during the live video communication session.)

While displaying the live video communication interface (e.g., 604; 834) for the live video communication session, the computer system (e.g., 600) detects (908), via the one or more input devices (e.g., 601), a set of one or more inputs (e.g., 626; 634; 804; 811; 812; 813; 832; 850-2; 850-3) that corresponds to a request to initiate a process for adjusting (in some embodiments, manually; in some embodiments, automatically (e.g., without user input)) the representation of the field-of-view of the one or more cameras (e.g., 606; 806; 836) during the live video communication session.

In response to detecting the set of one or more inputs (e.g., 626; 634; 804; 811; 812; 813; 832; 850-2; 850-3), the computer system (e.g., 600) initiates (910) the process for adjusting the representation of the field-of-view of the one or more cameras (e.g., 606; 806; 836) during the live video communication session (e.g., manually adjusting a framing (e.g., digital zoom level) of the representation of the field-of-view of the one or more cameras during the live video communication session) (e.g., enabling (or disabling) a mode (e.g., an automatic framing mode) for automatically adjusting the representation of the field-of-view of the one or more cameras while the live video communication session is active). In some embodiments, adjusting the representation of the field-of-view of the one or more cameras during the live video communication session includes outputting (e.g., to an electronic device (e.g., John's tablet 600*a*) of the one or more participants (the remote participants)) image data corresponding to the adjusted representation of the field-of-view of the one or more cameras during the live video communication session.

In some embodiments, when displaying the live video communication session (e.g., via the live video communication interface), the computer system (e.g., 600) displays, via the display generation component (e.g., 601), a set of one or more controls (e.g., 850-2; 850-3; 606-2; 630; 806) (e.g., one or more controls to increase or decrease a zoom level, and/or one of more controls to set a predetermined zoom level such as a 2× zoom affordance, a 1× zoom affordance and/or a 0.5× zoom affordance; a framing indication; a representation of an alternate camera preview) for adjusting a zoom level (e.g., a digital zoom) of the representation of the field-of-view of the one or more cameras (e.g., 606; 806; 836), wherein the set of one or more controls is displayed concurrently with the visual indication (e.g., 610; 850-1) (e.g., framing mode affordance) of the option to change the representation of the field-of-view of the one or more cameras during the live video communication session. Displaying a set of one or more controls for adjusting a zoom level of the representation of the field-of-view of the one or more cameras concurrently with the visual indication of the option to change the representation of the field-of-view of the one or more cameras during the live video communication session provides feedback to a user of the computer system that alternative zoom levels are selectable along with alternative representations of the field-of-view of the one or more cameras, and reduces the number of user inputs at the computer system by providing an option for adjusting the zoom level and the representation of the field-of-view of the one or more cameras without requiring the user to navigate a settings menu or other additional interfaces to adjust the zoom level and/or represented field-of-view. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the live video communication interface includes an option to enable an automatic framing mode (e.g., the framing mode affordance) and one or more zoom controls for adjusting a digital zoom level of the representation of the field-of-view of the one or more cameras being output by the computer system for the live video communication session.

In some embodiments, the computer system (e.g., 600) detects, via the one or more input devices (e.g., 601), a first input (e.g., 804) directed to the set of one or more controls (e.g., 806) for adjusting a zoom level of the representation of the field-of-view of the one or more cameras (e.g., 606). In response to detecting the first input directed to the set of one or more controls, the computer system displays the set of one or more controls (e.g., 606; 806) such that a first control option (e.g., 606) is displayed separately from (e.g., visually distinct from) a second control option (e.g., 806) (e.g., wherein the first control option is selectable to adjust the zoom level of the representation of the field-of-view of the one or more cameras to a first zoom value, and the second control option is selectable to adjust the zoom level of the representation of the field-of-view of the one or more cameras to a second zoom value different from the first zoom value). Displaying the set of one or more controls such that a first control option is displayed separately from a second control option in response to detecting the first input directed to the set of one or more controls provides additional control options without cluttering the user interface with additional displayed controls until they are desired and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first control option is a preview of the representation of the field-of-view of the one or more cameras having the first zoom value, and the second control option is a preview of the representation of the field-of-view of the one or more cameras having the second zoom value.

In some embodiments, while displaying the set of one or more controls (e.g., 606; 806), the computer system (e.g., 600) detects a second input (e.g., 811; 812) corresponding to a selection of the first control option (e.g., 606) or the second control option (e.g., 806). In response to detecting the second input, the computer system adjusts the representation of the field-of-view of the one or more cameras during the live video communication session based on the selection of the first control option or the second control option (e.g., as depicted in FIG. 8B or 8D) (e.g., in accordance with a determination that the first control option is selected, outputting (e.g., to an electronic device of the one or more participants) image data corresponding to the representation of the field-of-view of the one or more cameras having the first zoom value; and in accordance with a determination that the second control option is selected, outputting (e.g., to the electronic device of the one or more participants) image data corresponding to the representation of the field-of-view of the one or more cameras having the second zoom value). Adjusting the representation of the field-of-view of the one or more cameras during the live video communication session based on the selection of the first control option or the second control option provides feedback to a user of the computer system indicating that a different represented field-of-view of the one or more cameras is selected for the live video communication session, and reduces the number of user inputs at the computer system by quickly adjusting the representation of the field-of-view without requiring the user to navigate a settings menu or other additional interfaces to adjust the represented field-of-view. Providing improved feedback and reducing the number of inputs and the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more controls (e.g., 850-2; 850-3) for adjusting a zoom level of the representation of the field-of-view of the one or more cameras includes a first zoom control (e.g., 850-2) (e.g., one or more controls to increase a zoom level and/or one or more controls to set a predetermined zoom level such as a 2× zoom affordance or 1× zoom affordance) having a first fixed position (e.g., relative to the visual indication of the option to change the representation of the field-of-view of the one or more cameras during the live video communication session (e.g., framing mode affordance 850-1)) and a second zoom control (e.g., 850-3) (e.g., one or more controls to decrease a zoom level and/or one or more controls to set a predetermined zoom level such as a 1× zoom affordance or a 0.5× zoom affordance) having a second fixed position (e.g., relative to the visual indication of the option to change the representation of the field-of-view of the one or more cameras during the live video communication session (e.g., framing mode affordance)) (e.g., wherein the first zoom control is selectable to adjust the zoom level of the representation of the field-of-view of the one or more cameras to a first zoom value, and the second zoom control is selectable to adjust the zoom level of the representation of the field-of-view of the one or more cameras to a second zoom value different from the first zoom value). The computer system (e.g., 600) detects (e.g., while displaying the live video communication interface), via the one or more input devices (e.g., 601), a third input (e.g., 853; 855) corresponding to a selection of the first zoom control or the second zoom control. While continuing to display the first zoom control having the first fixed position and the second zoom control having the second fixed position (e.g., the first and second zoom controls are displayed having a position relative to (e.g., adjacent) the visual indication that does not change in response to a selection of the first or second zoom control), and in response to detecting the third input, the computer system adjusts the representation 836 of the field-of-view of the one or more cameras during the live video communication session based on the selection of the first zoom control or the second zoom control (e.g., in accordance with a determination that the first zoom control is selected, outputting (e.g., to an electronic device of the one or more participants) image data corresponding to the representation of the field-of-view of the one or more cameras having the first zoom value; and in accordance with a determination that the second zoom control is selected, outputting (e.g., to the electronic device of the one or more participants) image data corresponding to the representation of the field-of-view of the one or more cameras having the second zoom value). Adjusting the representation of the field-of-view of the one or more cameras during the live video communication session based on the selection of the first zoom control or the second zoom control while continuing to display the first and second zoom controls having the first and second fixed positions, and in response to detecting the third input, provides feedback to a user of the computer system indicating that a different zoom level is selected for the represented field-of-view of the one or more cameras, and reduces the number of user inputs at the computer system by quickly adjusting the zoom level of the representation of the field-of-view of the one or more cameras without requiring the user to navigate a settings menu or other additional interfaces to adjust the zoom level. Providing improved feedback and reducing the number of inputs and the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, as part of the process for adjusting the representation of the field-of-view of the one or more cameras (e.g., 606; 806; 836) during the live video communication session, the computer system (e.g., 600) detects a number of subjects (e.g., 622; 628) within the field-of-view (e.g., 620) of the one or more cameras (e.g., 602) during the live video communication session. The computer system adjusts the representation of the field-of-view of the one or more cameras based on the number of subjects detected in the field-of-view of the one or more cameras during the live video communication session (e.g., zooming out and/or expanding the representation of the field-of-view when multiple subjects are detected or when the number of subjects detected increases; zooming in and/or contracting the representation of the field-of-view when a single subject is detected or when the number of subjects detected decreases). Adjusting the representation of the field-of-view of the one or more cameras based on the number of subjects detected in the field-of-view of the one or more cameras during the live video communication session enhances the video communication session experience by automatically adjusting the field-of-view of the cameras when the number of subjects in the scene changes without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the visual indication of the option to change the representation of the field-of-view of the one or more cameras during the live video communication session (e.g., framing mode affordance 610) is selectable to enable a mode for which the representation of the field-of-view of the one or more cameras is automatically adjusted based on a number of subjects detected within the field-of-view of the one or more cameras, such as that discussed with respect to FIGS. 8C, 8G, and 8J, for example. In some embodiments, the visual indication of the option to change the representation of the field-of-view of the one or more cameras during the live video communication session includes a toggle (e.g., single/multi-person framing mode affordance 830-1/830-2) for selecting between a single-person framing mode and a multi-person framing mode.

In some embodiments, as part of the process for adjusting the representation of the field-of-view of the one or more cameras (e.g., 606; 806; 836) during the live video communication session, the computer system (e.g., 600) adjusts a zoom level (e.g., a digital zoom) of the representation of the field-of-view of the one or more cameras during the live video communication session based on one or more characteristics of the scene (e.g., 615) (e.g., a distance to one or more of the subjects and/or a number of subjects in the field-of-view of the one or more cameras). Adjusting a zoom level of the representation of the field-of-view of the one or more cameras during the live video communication session based on one or more characteristics of the scene (such as the detected distance of one or more subjects from the one or more cameras and/or a number of subjects in the field-of-view of the one or more cameras) enhances the video communication session experience by automatically adjusting the field-of-view of the cameras when a subject moves closer to, or farther away from, the one or more cameras without requiring further input from the user. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the visual indication of the option to change the representation of the field-of-view of the one or more cameras during the live video communication session (e.g., framing mode affordance 610 and/or 850-1) is selectable to enable a mode for which the zoom level of the representation of the field-of-view of the one or more cameras (e.g., 606; 806; 836) is automatically adjusted based on the distance of one or more subjects (e.g., 622) from the one or more cameras (e.g., 602) as discussed, for example, with respect to FIGS. 6H-6J.

In some embodiments, the visual indication (e.g., 830; 830-1; 830-2) of the option to change the representation of the field-of-view of the one or more cameras (e.g., 606; 806; 836) during the live video communication session is selectable to enable (e.g., toggle between) a first camera mode (e.g., a mode in which the representation of the field-of-view of the one or more cameras changes (e.g., zooms in/zooms out/expands/contracts) based on a number of subjects detected within the field-of-view of the one or more cameras; a multi-person framing mode) or a second camera mode (e.g., a mode in which the representation of the field-of-view of the one or more cameras does not change based on a number of subjects detected within a field-of-view of the one or more cameras; a single-person framing mode). In some embodiments, while displaying the live video communication interface (e.g., 604; 834) for the live video communication session, the computer system (e.g., 600) detects a change in a scene (e.g., 615) in the field-of-view (e.g., 620) of the one or more cameras (e.g., 602), including a change in a number of subjects (e.g., 622; 628) in the scene (e.g., the number of subjects in the scene increases from one subject to two subjects). In response to detecting the change in the scene in the field-of-view of the one or more cameras, in accordance with a determination that the first camera mode is enabled, the computer system adjusts the representation of the field-of-view of the one or more cameras based on the change in the number of subjects in the scene (e.g., zooming out and/or expanding the representation of the field-of-view when multiple subjects are detected or when the number of subjects detected increases; zooming in and/or contracting the representation of the field-of-view when a single subject is detected or when the number of subjects detected decreases). In accordance with a determination that the second camera mode is enabled, the computer system forgoes adjusting the representation of the field-of-view of the one or more cameras based on the change in the number of subjects in the scene (e.g., adjusting the representation of the field-of-view of the one or more cameras based on changes in the scene other than the change in the number of subjects (e.g., displaying image data showing movement of a single subject in the scene)). Selectively adjusting the representation of the field-of-view of the one or more cameras based on the change in the number of subjects in the scene, depending upon whether the first camera mode or the second camera mode is enabled, enhances the video communication session experience by permitting the user to enable or disable a mode in which the representation of the field-of-view of the one or more cameras is automatically adjusted when additional participants are detected within the field-of-view of the one or more cameras, without requiring additional input from the user. This also reduces the number of computations performed by the computer system by eliminating extraneous adjustments to the represented field-of-view anytime additional participants are detected in the scene and the second camera mode is enabled. Performing an operation when a set of conditions has been met without requiring further user input, and reducing the number of computations performed by the computer system, enhance the operability of the computer system and make the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the live video communication interface (e.g., 604; 834) includes a first representation (e.g., 606) of a first participant (e.g., 628) in the live video communication session. The first representation corresponds to a first portion (e.g., 625 in FIG. 8C) of the field-of-view (e.g., 620) of the one or more cameras (e.g., 602). In some embodiments, the live video communication interface includes a second representation (e.g., 806) of a second participant (e.g., 622) in the live video communication session different from the first participant. The second representation corresponds to a second portion (e.g., 825 in FIG. 8C) of the field-of-view of the one or more cameras, where the second portion of the field-of-view of the one or more cameras is different from the first portion of the field-of-view of the one or more cameras (e.g., and, in some embodiments, includes at least some of the first portion), and wherein the second representation is separate from the first representation (e.g., the first and second representations are visually distinguished from each other (e.g., by a visible boundary (e.g., a line, border, or discontinuity separating the representations) between the first and second representations)) (e.g., the first representation of the first participant and the second representation of the second participant are displayed concurrently with the representation of the field-of-view of the one or more cameras (e.g., the camera preview)). Displaying a first representation of a first participant corresponding to a first portion of the field-of-view of the one or more cameras and a second representation of a second participant corresponding to a second portion of the field-of-view of the one or more cameras that is different from the first portion of the one or more cameras and, where the second representation is separate from the first representation, provides feedback to a user of the computer system indicating that different video feeds are available for capturing different sets of participants for the live video communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first and second representations (e.g., 606; 806) have different represented fields-of-view (e.g., different zoom levels) for the respective representations. In some embodiments, the first representation includes a representation of the first participant, and the second representation includes a representation of the first participant and a representation of the second participant.

In some embodiments, the computer system (e.g., 600) displays (concurrently) the first representation (e.g., 606) of the first participant (e.g., 628) and the second representation (e.g., 806) of the second participant (e.g., 622) in response to detecting an input (e.g., 804) (e.g., a tap input) on the live video communication interface (e.g., 604) for the live video communication session (e.g., the camera preview; the representation of the field-of-view of the one or more cameras; the stacked camera preview).

In some embodiments, the representation of the field-of-view of the one or more cameras (e.g., 606; 806; 836) (e.g., the camera preview, which optionally includes a representation of a participant of the live video communication session) includes a graphical indication (e.g., 630; 610) of whether the option to change the representation of the field-of-view of the one or more cameras during the live video communication session is enabled (e.g., the framing mode affordance is highlighted or has a selected appearance when the automatic framing mode is enabled, and is not highlighted or has an unselected appearance when the automatic framing mode is not enabled) (e.g., the framing mode affordance is displayed when the automatic framing mode is enabled and is not displayed when the automatic framing mode is not enabled). Displaying the representation of the field-of-view of the one or more cameras including a graphical indication of whether the option to change the representation of the field-of-view of the one or more cameras during the live video communication session is enabled provides feedback to a user of the computer system indicating whether or not the option to change the representation of the field-of-view of the one or more cameras is enabled without requiring the user to access a separate menu interface or to move within the field-of-view of the one or more cameras to test whether the option is enabled. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the field-of-view of the one or more cameras (e.g., 836), the computer system (e.g., 600) detects an input (e.g., 837) directed to the representation of the field-of-view of the one or more cameras (e.g., a tap input on the camera preview). In response to detecting the input directed to the representation of the field-of-view of the one or more cameras, the computer system displays, via the display generation component (e.g., 601), a selectable graphical user interface object (e.g., 610-1; 610-2) (e.g., the framing mode affordance) that is selectable to enable (or disable) the option to change (e.g., automatically; without user input) the representation of the field-of-view of the one or more cameras during the live video communication session to a different framing option for the field-of-view of the one or more cameras (e.g., the framing mode affordance is displayed in response to an input on the camera preview, and is then selectable to enable or disable the automatic framing mode).

In some embodiments, the graphical indication (e.g., 610-1; 610-2) of whether the option to enable automatically changing which portion of the field-of-view of the one or more cameras is used for the live video communication session has a first appearance (e.g., as depicted in FIG. 8M) (e.g., the framing mode affordance is displayed and/or has a non-obscured appearance when the automatic framing mode is available) when the ability to automatically change which portion of the field-of-view of the one or more cameras is used for the live video communication session is available to be used (e.g., conditions (e.g., lighting) are favorable or suitable for adjusting the representation of the field-of-view of the one or more cameras). In some embodiments, the graphical indication of whether the option to enable automatically changing which portion of the field-of-view of the one or more cameras is used for the live video communication session has a second appearance different from the first appearance (e.g., as depicted in FIG. 8N) (e.g., the framing mode affordance is greyed out, obscured, not displayed, or otherwise unavailable when the automatic framing mode is unavailable) when the ability to automatically change which portion of the field-of-view of the one or more cameras is used for the live video communication session is unavailable to be used (e.g., conditions (e.g., lighting) are not favorable or are unsuitable for adjusting the representation of the field-of-view of the one or more cameras). Displaying the graphical indication having the first or second appearance provides feedback to a user of the computer system indicating whether the ability to automatically change which portion of the field-of-view of the one or more cameras is used for the live video communication session is available or unavailable to be used. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the automatic framing mode is enabled, but conditions (e.g., lighting conditions) are poor or unsuitable for automatically adjusting the representation of the field-of-view of the one or more cameras, the computer system does not display the framing mode affordance or displays the framing mode affordance having an appearance indicating that the automatic framing mode is currently unavailable.

In some embodiments, the representation of the field-of-view of the one or more cameras (e.g., 606; 806; 836) includes a first displayed region (e.g., 606-1) (e.g., an unblurred, undarkened, unshaded, or otherwise emphasized region) of the representation of the field-of-view of the one or more cameras corresponding to a first portion (e.g., 625 in FIG. 8F) of the field-of-view (e.g., 620) of the one or more cameras (e.g., 602) (e.g., a portion of the field-of-view of the one or more cameras that is currently selected/outputted for the live video communication session). In some embodiments, the representation of the field-of-view of the one or more cameras includes a second displayed region (e.g., 606-2) (e.g., a blurred, darkened, shaded, or otherwise deemphasized region) of the representation of the field-of-view of the one or more cameras corresponding to a second portion (e.g., 825 in FIG. 8F) of the field-of-view of the one or more cameras different from the first portion of the field-of-view, wherein the second displayed region is visually distinguished from the first displayed region (e.g., the first displayed region is unblurred, undarkened, unshaded, or otherwise emphasized, and the second displayed region is blurred, darkened, shaded, or otherwise deemphasized) (e.g., the second portion of the field-of-view is greater (e.g., wider) than the first portion of the field-of-view). In some embodiments, the first displayed region is visually distinguished from the second displayed region by a border (e.g., 808) around the first displayed region. In some embodiments, the second displayed region includes (e.g., encompasses) the first displayed region plus additional displayed regions not included in the first displayed region. In some embodiments, the second portion of the field-of-view includes (e.g., encompasses) the first portion of the field-of-view plus additional portions of the field-of-view not in the first portion of the field-of-view.

In some embodiments, in accordance with a determination that the first portion (e.g., 625 in FIG. 8F) of the field-of-view (e.g., 620) of the one or more cameras (e.g., 602) is selected (e.g., currently selected/outputted) for the live video communication session, the computer system (e.g., 600) displays the first displayed region (e.g., 606-1) having a visually unobscured (e.g., unblurred, undarkened, unshaded, or otherwise emphasized) appearance, and displays the second displayed region (e.g., 606-2) of the representation of the field-of-view with an obscured appearance (e.g., having a visually obscured (e.g., blurred, darkened, shaded, or otherwise deemphasized) appearance).

In some embodiments, in accordance with a determination that the second portion (e.g., 625 in FIG. 8G) of the field-of-view (e.g., 620) of the one or more cameras (e.g., 602) is selected (e.g., currently selected/outputted) for the live video communication session, the computer system (e.g., 600) displays the second displayed region having a visually unobscured (e.g., unblurred) appearance (e.g., 606 as depicted in FIG. 8G) (e.g., and optionally displaying the first displayed region having the visually unobscured appearance) (e.g., and optionally displaying the first displayed region having a visually obscured appearance). Displaying the first displayed region and/or the second displayed region having a visually unobscured appearance in accordance with a determination that the first and/or second portion of the field-of-view of the one or more cameras is selected for the live video communication session provides feedback to a user of the computer system indicating the portion of the field-of-view that is selected for the live video communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) indicates the currently selected portion (e.g., 625) of the field-of-view (e.g., 620) of the one or more cameras (e.g., 602) for the live video communication session by displaying the region (e.g., 606; 606-1) corresponding to the currently selected portion of the field-of-view having an unobscured appearance (e.g., unblurred). Incidentally, the computer system displays portions (e.g., 825) of the representation of the field-of-view of the one or more cameras that are not currently selected for the live video communication session as having an obscured (e.g., blurred) appearance (e.g., 606-2). For example, when the first portion of the field-of-view is selected, the first displayed region is displayed unblurred, while the second displayed region is blurred, thereby indicating that the first displayed region (the first portion of the field-of-view) is selected for being outputted for the live video communication session, but the second displayed region (the second portion of the field-of-view (the portion that does not include the first portion of the field-of-view)) is not.

In some embodiments, the representation of the field-of-view of the one or more cameras (e.g., 606) includes a graphical element (e.g., 808) (e.g., boundary) displayed to separate the first displayed region (e.g., 606-1) from the second displayed region (e.g., 606-2) (in some embodiments, the second displayed region (including the second portion of the field-of-view) includes a border (e.g., 809) to visually distinguish it from the representation of one or more participants (e.g., remote participants) in the live video communication session other than participants visible via the one or more cameras). Displaying the representation of the field-of-view including a graphical element displayed to separate the first displayed region from the second displayed region provides feedback to a user of the computer system indicating that the first displayed region is separate from the second displayed region. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) displays one or more indications (e.g., 630) (e.g., framing indications) of one or more faces in the second portion (e.g., 825 in FIG. 8F) of the field-of-view (e.g., 620) of the one or more cameras (e.g., 602) (e.g., framing indications are displayed at least partially in the blurred region (e.g., 606-2) of the camera preview to indicate the presence of faces detected in the field-of-view of the one or more cameras (e.g., in the second portion of the field-of-view of the one or more cameras)) (e.g., framing indications are displayed framing the faces detected in the second portion of the field-of-view of the one or more cameras). In some embodiments, the one or more indications are selectable to initiate a process for adjusting the representation of the field-of-view of the one or more cameras (e.g., 606) during the live video communication session (e.g., the representation of the field-of-view is adjusted to include a representation of a face corresponding to the selected indication) (e.g., switching from the first portion of the field-of-view of the one or more cameras to the second portion of the field-of-view of the one or more cameras for the live video communication session). Displaying one or more indications of the one or more faces in the second portion of the field-of-view of the one or more cameras that are selectable to initiate a process for adjusting the representation of the field-of-view of the one or more cameras during the live video communication session provides the user with easily accessible controls for adjusting the representation of the field-of-view without cluttering the UI with additional displayed controls for manually adjusting the representation of the field-of-view to fit the additional faces, and provides feedback to a user of the computer system indicating that the one or more faces are detected in the field-of-view of the one or more cameras and that the computer system is capable of adjusting the representation of the field-of-view of the one or more cameras during the live video communication session to include representations of the one or more faces. Providing additional controls without cluttering the UI and providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the one or more indications (e.g., 630) of the one or more faces in the second portion (e.g., 825 in FIG. 8F) of the field-of-view (e.g., 620) of the one or more cameras (e.g., 602) are displayed while a face of a first subject (e.g., 628) is detected in the field-of-view (e.g., 620) of the one or more cameras (e.g., in the first portion (e.g., 625 in FIG. 8F) of the field-of-view) and the first portion (e.g., 625) of the field-of-view of the one or more cameras is selected for the live video communication session. In some embodiments, the one or more indications of the one or more faces are displayed in response to detecting the one or more faces of subjects (e.g., 622) other than the first subject in the second portion (e.g., 825) of the field-of-view of the one or more cameras.

In some embodiments, while the first portion (e.g., 625 in FIG. 8F) of the field-of-view (e.g., 620) of the one or more cameras (e.g., 602) is selected for the live video communication session, the computer system (e.g., 600) detects a selection (e.g., 813) of one or more of the indications (e.g., 630) of the one or more faces in the second portion (e.g., 825) of the field-of-view of the one or more cameras. In response to detecting the selection of one or more of the indications, the computer system initiates a process for adjusting (e.g., expanding; unblurring additional regions of) the representation of the field-of-view of the one or more cameras during the live video communication session to include one or more representations of the one or more faces corresponding to the selected indications (e.g., as depicted in FIG. 8G) (e.g., the second region becomes unblurred to indicate the second portion of the field-of-view of the one or more cameras is selected/outputted for the live video communication session). In some embodiments, as the indications are selected, the computer system expands (e.g., indicated by the unblurring of) the representation of the field-of-view of the one or more cameras (the camera preview) to include representations of the faces corresponding to the selected indications. In some embodiments, in response to a selection of one of the indications, the computer system includes the second portion of the field-of-view of the one or more cameras for the live video communication session.

In some embodiments, the representation of the field-of-view of the one or more cameras (e.g., 606) includes a representation of a first subject (e.g., 628-1) detected in the field-of-view (e.g., 620) of the one or more cameras (e.g., 602). In some embodiments, as a part of initiating the process for adjusting the representation of the field-of-view of the one or more cameras during the live video communication session, the computer system (e.g., 600) automatically (e.g., without user input) adjusts (e.g., enlarging and/or shifting) the representation of the field-of-view of the one or more cameras to include a representation of a second subject (e.g., 622-1) detected in the field-of-view of the one or more cameras that meet a set of criteria (e.g., as depicted in FIG. 8J), wherein the representation of the second subject is displayed concurrently with the representation of the first subject (e.g., the subject(s) is visible in the field-of-view of the one or more cameras; the subject(s) is stationary for a predetermined period of time). In some embodiments, the computer system automatically adjusts the representation of the field-of-view of the one or more cameras based on the number of subjects (e.g., when the multi-person framing mode is enabled). Automatically adjusting the representation of the field-of-view of the one or more cameras to include the representation of the second subject that is displayed concurrently with the representation of the first subject enhances the live video communication session experience by automatically adjusting the representation of the field-of-view of the one or more cameras when additional subjects are detected in the scene. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the field-of-view of the one or more cameras (e.g., 606; 806; 836) having a first displayed state (e.g., 606 in FIG. 6P) (e.g., a first zoom level), and while a face of a subject (e.g., 628) is detected in a first region (e.g., 625) of the field-of-view (e.g., 620) of the one or more cameras (e.g., 602), detecting a second subject (e.g., 622) in a second region of the field-of-view of the one or more cameras (e.g., a region of the field-of-view that is outside the first region). In response to detecting the second subject in the second region of the field-of-view of the one or more cameras, the computer system (e.g., 600) displays a second selectable graphical user interface object (e.g., 632) (e.g., an affordance and/or text). The computer system detects a selection (e.g., 634) of the second selectable graphical user interface object. In response to detecting the selection of the second selectable graphical user interface object, the computer system adjusts the representation of the field-of-view of the one or more cameras from having the first displayed state to having a second displayed state (e.g., a second zoom level) that is different from the first displayed state and includes a representation of the second subject (e.g., as depicted in FIG. 6Q). Displaying a second selectable graphical user interface object that causes the device to adjust the representation of the field-of-view of the one or more cameras from having the first displayed state to having a second displayed state that is different from the first displayed state and includes a representation of the second subject provides controls as needed for adjusting the representation of the field-of-view of the one or more cameras when additional participants are detected in the field-of-view of the one or more cameras. Providing additional control options without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when a second subject (e.g., a potential participant of the live video communication session) is detected within the field-of-view of the one or more cameras, the computer system displays an option that can be selected to adjust (e.g., expand) the field-of-view of the representation of the field-of-view of the one or more cameras to include both the first subject and the second subject.

In some embodiments, while a mode (e.g., automatic framing mode) is enabled for automatically adjusting the representation of the field-of-view of the one or more cameras (e.g., 606; 806; 836) during the live video communication session based on a change in position of a subject (e.g., 622; 628) detected in the field-of-view (e.g., 620) of the one or more cameras (e.g., 602), the computer system (e.g., 600) detects a selection (e.g., 853) of an option (e.g., 850-2) for changing a zoom level (e.g., an option for selecting a predetermined zoom level such as a 2× zoom affordance, a 1× zoom affordance, or a 0.5× zoom affordance changing a digital and/or optical zoom) of the representation of the field-of-view of the one or more cameras (e.g., 836) during the live video communication session. In response to detecting the selection of the option for changing the zoom level, the computer system disables the mode for automatically adjusting the representation of the field-of-view of the one or more cameras during the live video communication session and adjusts a zoom level of the representation of the field-of-view of the one or more cameras (e.g., as depicted in FIG. 8Q).

Note that details of the processes described above with respect to method 900 (e.g., FIG. 9) are also applicable in an analogous manner to the methods described above and below. For example, method 700, method 1100, method 1300, and/or method 1400 optionally include one or more of the characteristics of the various methods described above with reference to method 900. For brevity, these details are not repeated.

FIGS. 10A-10J illustrate exemplary user interfaces for managing a live video communication session (e.g., a video conference), in accordance with some embodiments. The user interfaces in these figures are used to illustrate the processes described herein, including the processes in FIG. 11.

FIGS. 10A-10J illustrate device 600 displaying user interfaces on display 601 for managing a live video communication session, similar to that discussed above with respect to FIGS. 6A-6Q and FIGS. 8A-8R. FIGS. 10A-10J depict various embodiments in which device 600, when an automatic framing mode is enabled, can emphasize or more prominently display the portions of the field-of-view of the camera that include more important or relevant content, such as participants of the video conference session, and exclude or deemphasize portions of the field-of-view of the camera that do not include the more important or relevant content. One or more of the embodiments discussed below with respect to FIGS. 10A-10J can be combined with one or more of the embodiments discussed herein with respect to FIGS. 6A-6Q, FIGS. 8A-8R, and FIGS. 12A-12U.

FIG. 10A depicts an embodiment similar to those discussed with respect to FIGS. 6A-6Q and FIGS. 8A-8R, except that the automatic framing feature is not provided (e.g., the automatic framing mode is disabled or device 600 is not configured to provide the automatic framing feature). FIG. 10A is used to illustrate the differences in the video feed field-of-view that is output by device 600 for the video conference, in comparison to embodiments in which the automatic framing feature is provided.

FIG. 10A depicts scene 615 with Jane 622 and Jack 628 sitting on couch 621. Device 600 displays video conference interface 1004, which is similar to video conference interfaces 604 and 834. Video conference interface 1004 includes camera preview 1006 (similar to camera previews 606 and 836), options menu 1008 (similar to options menu 608), and video feed 1023 (similar to video feed 623). In some embodiments, device 600 does not display a framing mode affordance in video conference interface 1004 when the automatic framing mode is not provided. In some embodiments, device 600 displays a framing mode affordance having an unselected state when the automatic framing mode is not provided. In some embodiments, device 600 displays camera preview 1006 having the appearance depicted in FIG. 10A when the automatic framing feature is not provided, or when the automatic framing feature is provided, but not enabled.

Figure 10H:
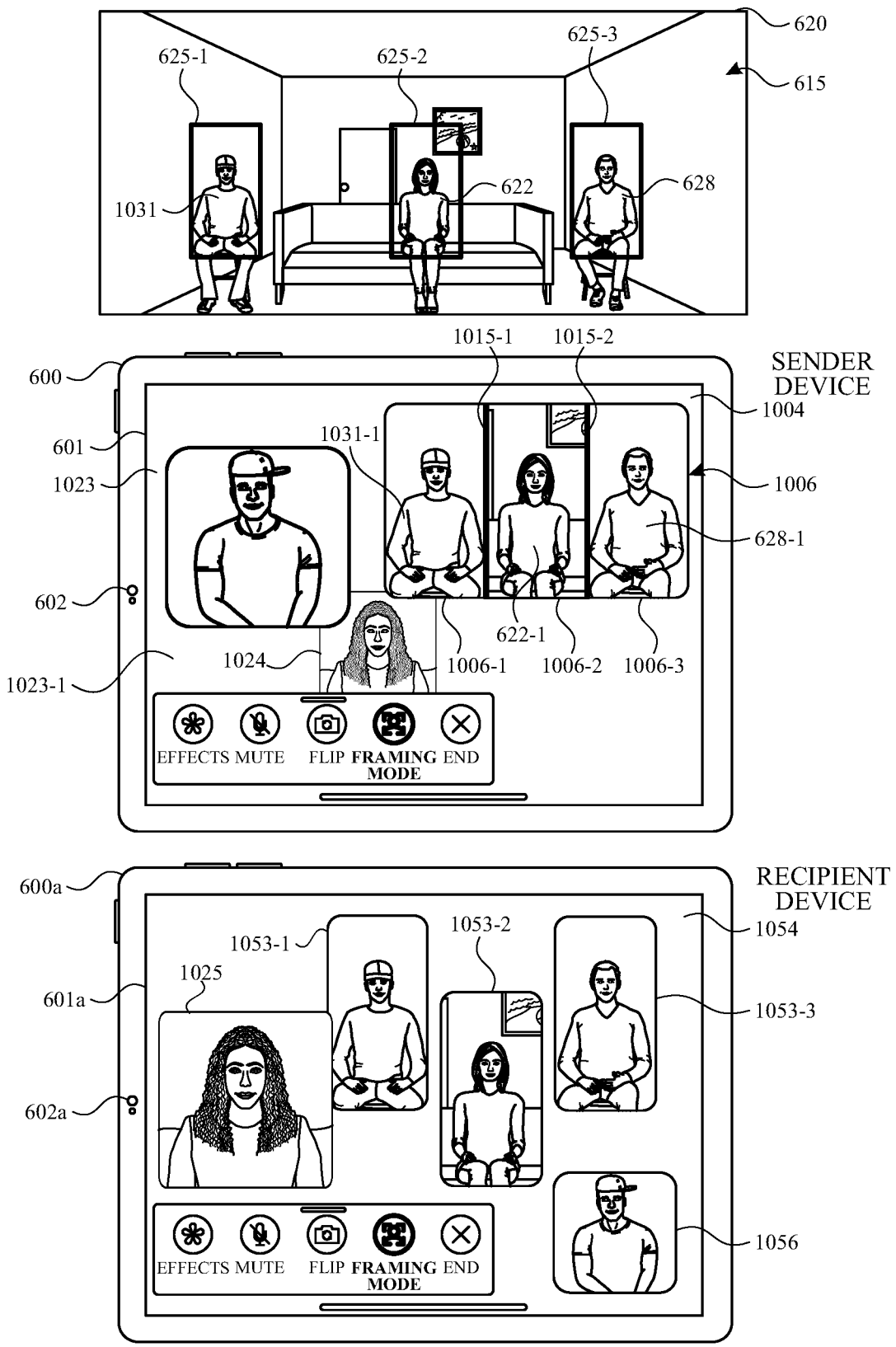

In FIG. 10A, Jane and Jack are participating in a video conference with John using device 600. Similarly, John is participating in the video conference with Jane and Jack using a device that includes one or more features of devices 100, 300, 500, or 600. For example, John is using a tablet similar to device 600 (e.g., John's tablet 600a in FIGS. 10H-10J and 12B-12N). Accordingly, John's device displays a video conference interface similar to video conference interface 1004, except that the camera preview on John's device displays the video feed captured from John's device (what is currently depicted in video feed 1023 in FIG. 10A), and the incoming video feed on John's device displays the video feed output from device 600 (what is currently depicted in camera preview 1006 in FIG. 10A).

In the embodiment depicted in FIG. 10A, Jane and Jack are participants of a video conference with John, who is depicted as representation 1023-1 in video feed 1023. In this embodiment, because the automatic framing mode is not provided, the video feed field-of-view for the video conference is the same as (or substantially similar to) the field-of-view of camera 602, as depicted in camera preview 1006. Accordingly, camera preview 1006 depicts representation 615-1 of scene 615, which is shrunken down to fit within the boundaries of camera preview 1006, resulting in a compressed view of the scene that deemphasizes the participants and clutters the camera preview by displaying extraneous portions of the scene that are not relevant to other participants of the video conference (e.g., John). As will be described in greater detail below, when the automatic framing mode is enabled, device 600 optimizes the displayed video feed field-of-view in order to emphasize or more prominently display the portions of the field-of-view of camera 602 that include more important or relevant content, such as participants of the video conference session, and to exclude or deemphasize portions of the field-of-view of camera 602 that do not include the more important or relevant content.

FIG. 10B depicts an embodiment similar to that shown in FIG. 10A, except that the automatic framing feature is now provided by device 600. In some embodiments, the provision of the automatic framing feature is indicated, for example, by the display of framing mode affordance 1010 (similar to framing mode affordance 610), or by the bolding of framing mode affordance 1010 to indicate an enabled state of the automatic framing mode. Moreover, because the automatic framing feature is now enabled, device 600 automatically reframes the video feed field-of-view depicted in camera preview 1006 based on detected changes in scene 615 (e.g., to emphasize participants detected within the available field-of-view of camera 602). Portion 625 represents the portion of field-of-view 620 that is currently displayed for the video conference (as depicted in camera preview 1006).

When the automatic framing mode is enabled, device 600 is capable of detecting conditions of scene 615 and, in response, automatically adjusting (e.g., zooming in/out, panning, resizing, reframing, splitting, merging, etc.) the displayed video feed field-of-view based on the conditions detected in the scene. In the embodiments illustrated in FIGS. 10B-10J, the conditions that affect the displayed video feed field-of-view can include a number of subjects detected in the scene, a spacing of the subjects, and/or positioning of subjects. In some embodiments, other conditions discussed throughout the present disclosure can also be considered, such as movement of the subjects, inputs at device 600, and various device settings such as whether a single-person framing mode or multi-person framing mode is enabled.

In FIG. 10B, device 600 detects the presence of Jane 622 and Jack 628 in scene 615 and, in response, adjusts the displayed video feed field-of-view to more prominently display representations of Jane 622 and Jack 628, based on a spacing of the subjects. In FIG. 10B, device 600 detects that Jane 622 and Jack 628 are sitting close together. In response, device 600 displays portion 625 of field-of-view 620, which is a continuous portion of field-of-view 620 that includes the detected participants and the portion of the scene between them. Camera preview 1006 represents a continuous video feed field-of-view that depicts representation 622-1 of Jane adjacent representation 628-1 of Jack, with representation 618-1 of the door and representation 1016-1 of picture 1016 in the background. When compared to the embodiment in FIG. 10A, where the automatic framing feature is not provided, the camera preview in FIG. 10B depicts an output video feed that is zoomed in on participants Jack 628 and Jane 622, eliminating the display of extraneous portions of scene 615 that are not relevant for the video conference.

In FIG. 10C, device 600 detects that Jane 622 has moved away from Jack 628 (she is separate from Jack by a threshold amount). In response, device 600 transitions the outputted video feed field-of-view from the continuous field-of-view depicted in FIG. 10B to a split field-of-view, as depicted in FIG. 10C. For example, device 600 displays the camera preview with first preview portion 1006-1 separated from second preview portion 1006-2 by line 1015. In some embodiments, line 1015 is depicted in video conference interface 1004, but is not included in the output video feed field-of-view. In some embodiments, line 1015 is included in the output video feed field-of-view. First preview portion 1006-1 represents the content of portion 625-1 of field-of-view 620 that includes Jane 622. Accordingly, first preview portion 1006-1 includes representation 622-1 of Jane 622 and representation 618-1 of door 618 in the background behind her. Second preview portion 1006-2 represents the content of portion 625-2 of field-of-view 620 that includes Jack 628. Accordingly, second preview portion 1006-2 includes representation 628-1 of Jack 628 and representation 1016-1 of picture 1016 in the background behind him. Portion 1027 represents the portion of field-of-view 620 that was previously displayed in camera preview 1006 in FIG. 10B and is now excluded from the camera preview, as illustrated in FIG. 10C.

As depicted in FIG. 10C, Jane 622 is standing while Jack 628 is sitting, placing Jane's head higher in the scene than Jack's head. In the embodiment in FIG. 10C, device 600 accounts for the vertical offset by framing the portions of the video feed field-of-view about the respective participants' faces. Therefore, portion 625-1 is vertically offset from portion 625-2 within camera field-of-view 620. The result is that representation 622-1 of Jane 622 and representation 628-1 of Jack 628 are not vertically offset in the camera preview, which could be distracting to viewers of the camera preview (e.g., Jane or Jack) or output video feed (e.g., John).

As illustrated in FIGS. 10B and 10C, device 600 accounts for changes in the scene that is within field-of-view 620 by switching between a continuous video feed field-of-view and a split video feed field-of-view, in order to more prominently feature the participants of the video conference while also eliminating the display of portions of the scene that are not relevant to the video conference. The embodiments depicted in FIGS. 10D-10G illustrated examples of additional scenarios for which device 600 switches between the split and continuous fields-of-view.

In FIG. 10D, Jake 1031 is now sitting on the couch in between Jane 622 and Jack 628. Device 600 detects the addition of Jake 1031 between Jane and Jack and, in response, transitions from the split field-of-view in FIG. 10C to the continuous field-of-view depicted in FIG. 10D. Device 600 now displays portion 625 of field-of-view 620 in camera preview 1006, which includes representations 622-1, 1031-1, and 628-1 of Jane, Jake, and Jack, respectively. Portions 1027-1 and 1027-2 represent the portions of field-of-view 620 that were previously displayed in the split field-of-view depicted in FIG. 10C.

In FIG. 10E, Jake leaves scene 615, and Jane 622 and Jack 628 remain seated on the couch. In response to detecting the departure of Jake from between Jane and Jack, device 600 transitions from the continuous video feed field-of-view depicted in 10D to the split video feed field-of-view depicted in the camera preview in FIG. 10E. The split field-of-view is similar to that depicted in FIG. 10C. In FIG. 10E, portions 625-1 and 625-2 of field-of-view 620 are displayed in first preview portion 1006-1 and second preview portion 1006-2, respectively, and portion 1027 represents the portion of field-of-view 620 that was previously displayed in the continuous video feed field-of-view depicted in FIG. 10D.

In FIG. 10F, Jane 622 moves back to her position on the couch next to Jack 628, similar to that depicted in FIG. 10B. In response to detecting Jane positioned next to Jack (less than a threshold distance from Jack), device 600 transitions from the split video feed field-of-view depicted in FIG. 10E to the continuous video feed field-of-view depicted in camera preview 1006 in FIG. 10F. The continuous field-of-view is similar to that depicted in FIG. 10B. In FIG. 10F, portion 625 of field-of-view 620 is displayed in camera preview 1006, and portions 1027-1 and 1027-2 represent the portions of field-of-view 620 that were previously displayed in the split video feed field-of-view depicted in FIG. 10E.

In FIG. 10G, Jack 628 has left the frame of camera preview 1006 in FIG. 10F (represented by portion 1027 of field-of-view 620). In response to detecting Jack leaving the frame, device 600 automatically readjusts the frame of the video feed field-of-view to zoom in on Jane 622, as depicted in FIG. 10G. Accordingly, portion 625 of field-of-view 620 is now displayed in camera preview 1006, depicting a larger view of representation 622-1 of Jane.

Figure 10I:
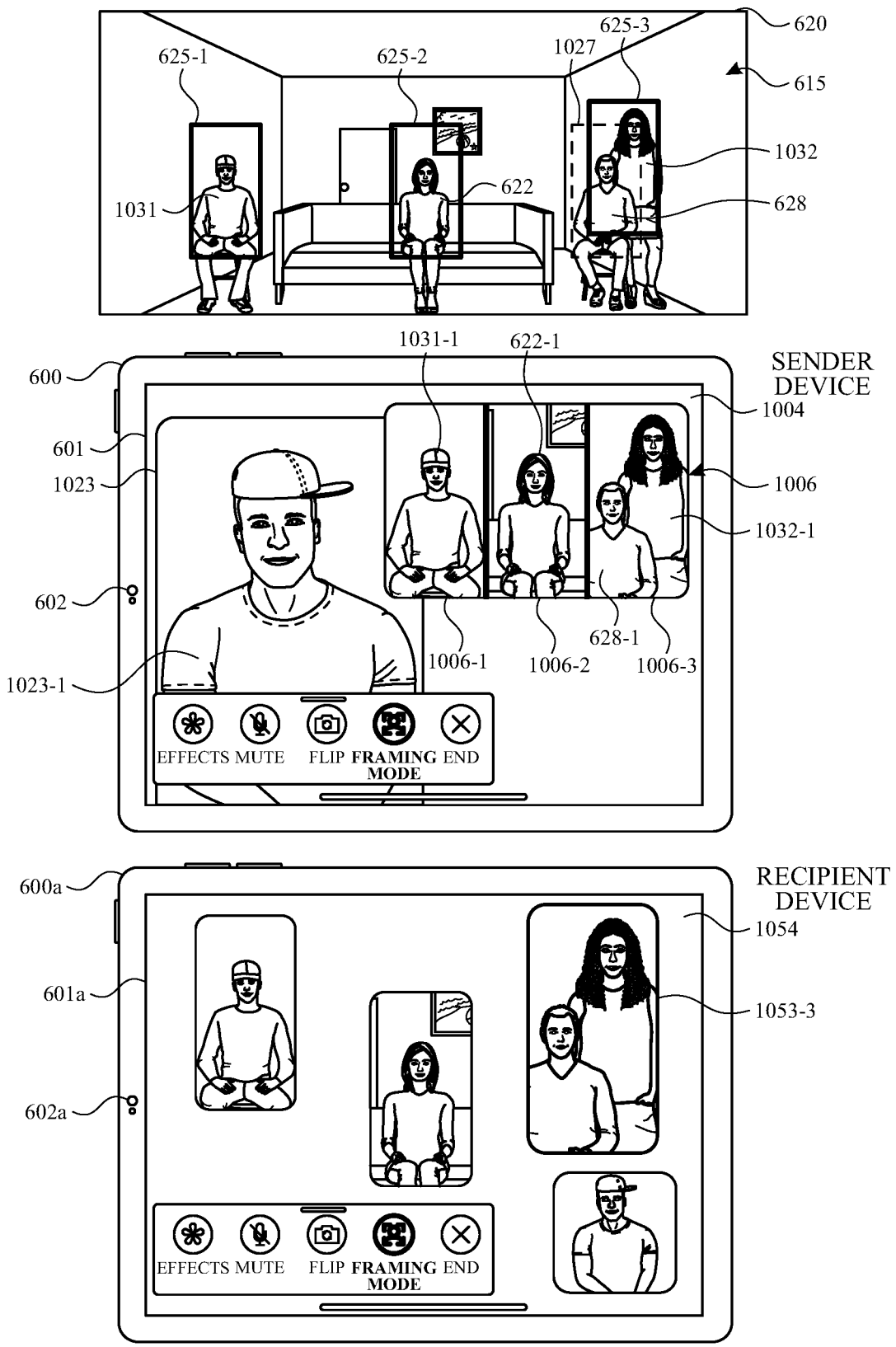
Figure 10J:
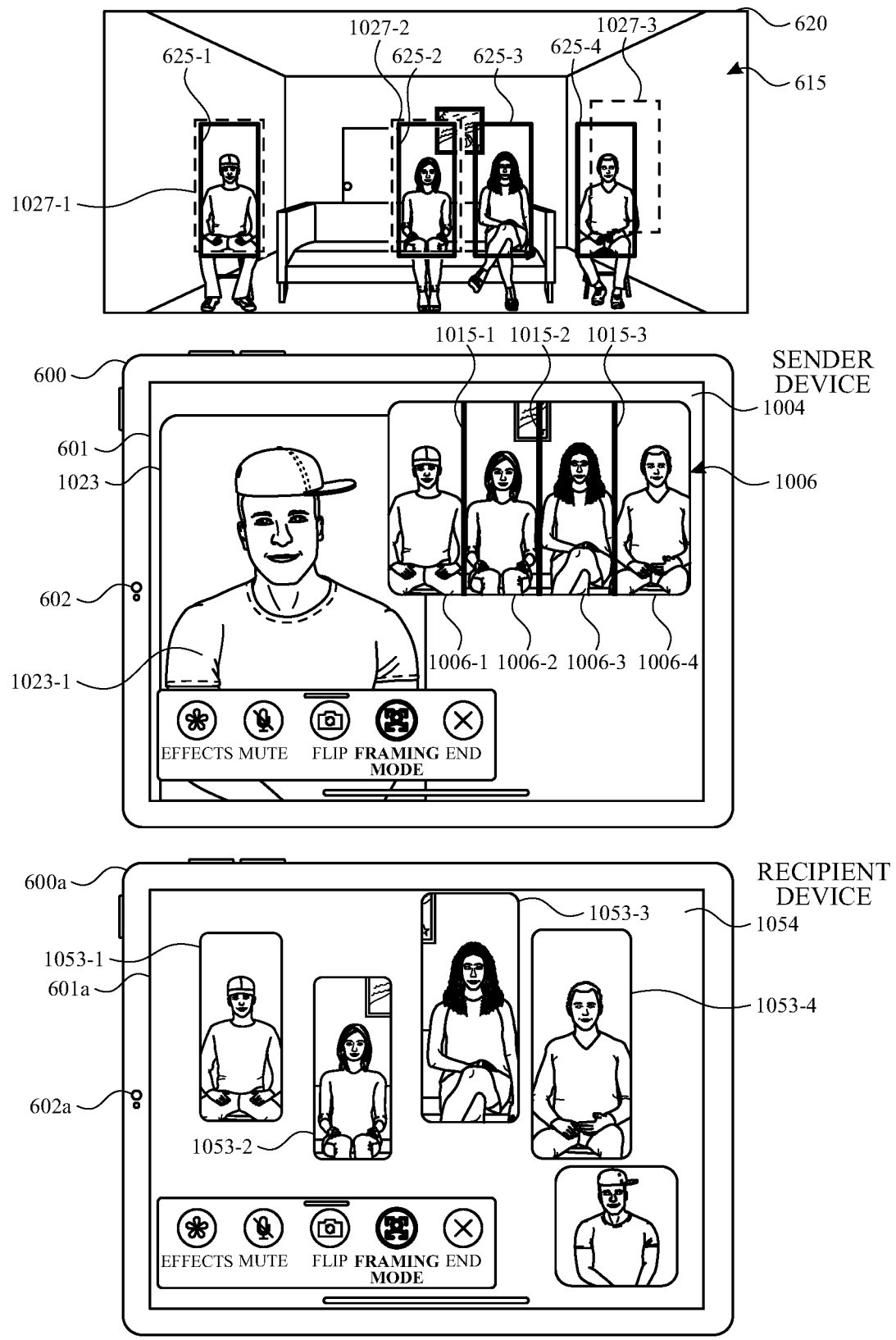

FIGS. 10H-10J depict embodiments in which the split video feed field-of-view includes more than two portions. In these embodiments, participants of the video conference include Jane, Jack, Jake, John, and Pam. In FIG. 10H, Jane, Jack, and Jake are participating in the video conference using device 600, whereas John and Pam are participating in the video conference each using a respective device that includes one or more features of devices 100, 300, 500, or 600. For example, John is using device 600a (also referred to herein as "John's tablet"), which is depicted with device 600 in FIG. 10H. Device 600a is similar to device 600 and includes components such as display 601a and camera 602a. Similarly, Pam is using a device similar to device 600 and device 600a. In FIG. 10H, the video feed from Pam's device, which includes a representation of Pam, is displayed on device 600 as video feed 1024 and is displayed on John's device 600a as video feed 1025.

In FIG. 10H, Jake 1031 is seated in scene 615 with Jane 622 and Jack 628. Device 600 detects that Jane, Jack, and Jake are each separated from each other by at least a threshold distance and, in response, outputs a video feed that is split into three portions. Video conference interface 1004 includes lines 1015-1 and 1015-2 separating camera preview 1006 into three distinct portions each corresponding to a displayed portion of field-of-view 620. First preview portion 1006-1 displays portion 625-1 of field-of-view 620, which includes Jake 1031 who is depicted in first preview portion 1006-1 by representation 1031-1. Second preview portion 1006-2 displays portion 625-2 of field-of-view 620, which includes Jane 622 who is depicted in second preview portion 1006-2 by representation 622-1. Third preview portion 1006-3 displays portion 625-3 of field-of-view 620, which includes Jack 628 who is depicted in third preview portion 1006-3 by representation 628-1.

John's device 600*a* depicts video conference interface 1054, which is similar to video conference interface 1004 and video conference interface 834. Video conference interface 1054 includes camera preview 1056, which depicts a representation of John, who is positioned with the field-of-view of camera 602*a*. In addition to receiving the video feed from Pam's device, John's device 600*a* is receiving the video feed output from device 600. However, instead of displaying the received video feed from device 600 in a split field-of-view similar to camera preview 1006, device 600*a* displays each portion of the video feed as a separate video feed that is visually distinct and separate from the others, similar to Pam's video feed 1025 and similar to other embodiments (such as that shown in FIG. 8L) where multiple video feeds are displayed when the device is participating in a video conference session with multiple remote devices and participants. Accordingly, video conference interface 1054 displays video feeds 1053-1, 1053-2, and 1053-3 along with Pam's video feed 1025, as depicted in FIG. 10H. Video feed 1053-1 corresponds to first preview portion 1006-1 and, therefore, displays a representation of portion 625-1 of field-of-view 620. Video feed 1053-2 corresponds to second preview portion 1006-2 and, therefore, displays a representation of portion 625-2 of field-of-view 620. Video feed 1053-3 corresponds to third preview portion 1006-3 and, therefore, displays a representation of portion 625-3 of field-of-view 620.

In some embodiments, the displayed video feeds change size based on a detected level of activity within the respective video feed. For example, in FIG. 10H, the level of activity detected in video feed 1023 is greater than the level of activity detected in video feed 1024. Thus, device 600 displays John's video feed 1023 having a larger size and/or more prominent position than (for example, partially overlapping) Pam's video feed 1024. Similarly, the level of activity detected in Pam's video feed 1025 is greater than the level of activity detected in video feeds 1053-1, 1053-2, and 1053-3. Therefore, Pam's video feed 1025 is displayed having a larger size and/or more prominent position than video feeds 1053-1, 1053-2, and 1053-3.

FIG. 10I depicts an embodiment similar to that shown in FIG. 10H, except that Pam has ended her participation in the video conference via her respective device (Pam ended the video conference call on her device), and has now physically entered scene 615 and is standing next to Jack 628. Because Pam ended the video conference on her device, the video feed from Pam's device is no longer displayed on device 600 and device 600*a*. Additionally, device 600 detects the presence of Pam 1032 next to Jack 628 and, in response, automatically adjusts the displayed video feed field-of-view to include Pam 1032, who is determined to be an additional participant of the video conference. Because Pam 1032 is less than a threshold distance from Jack 628 in the embodiment depicted in FIG. 10I, device 600 reframes (e.g., pans) the displayed portion of field-of-view 620 that previously included Jack 628 to include both Jack 628 and Pam 1032. In some embodiments, the reframing can include panning, zooming, and/or resizing the displayed video feed field-of-view (or a portion thereof). Portion 625-3 represents the displayed field-of-view 620 after the adjustment, and portion 1027 represents the field-of-view that was displayed prior to the adjustment.

As a result of the adjusted video feed field-of-view, device 600 updates third preview portion 1006-3 to include representation 1032-1 of Pam with representation 628-1 of Jack, and device 600*a* updates video feed 1053-3 in an analogous manner. Additionally, due to Pam's entering video feed 1053-3, video feed 1053-3 has a greater level of activity than video feeds 1053-1 and 1053-2. As a result, John's device 600*a* displays video feed 1053-3 having an enlarged size.

FIG. 10J depicts an embodiment similar to that shown in FIG. 10I, except that Pam 1032 has moved to a position on the couch, separated from the other subjects in the scene. In response to detecting Pam 1032 moving from her position next to Jack 628 to her position on the couch, device 600 automatically splits the displayed video field-of-view into four portions, each including one of the subjects in the scene, and resizes the displayed portions as needed. The previously displayed portions of field-of-view 620 are represented by portions 1027-1, 1027-2, and 1027-3. The currently displayed portions of field-of-view 620 are represented by portions 625-1, 625-2, 625-3, and 625-4.

As a result of the adjusted video feed field-of-view, device 600 updates camera preview 1006 to include fourth preview portion 1006-4, and resizes the other preview portions to fit within camera preview 1006. Third preview portion 1006-3 now corresponds to portion 625-3, which includes Pam 1032, and fourth preview portion 1006-4 corresponds to portion 625-4, which includes Jack 628. Device 600*a* updates video conference interface 1054 in an analogous manner by adding video feed 1053-4. Video feed 1053-3 corresponds to third preview portion 1006-3, and video feed 1053-4 corresponds to fourth preview portion 1006-4. Additionally, due to Pam's movement within the scene (specifically, within the portions of the scene corresponding to video feeds 1053-3 and 1053-4), video feeds 1053-3 and 1053-4 have a greater level of activity than video feeds 1053-1 and 1053-2. As a result, John's device 600*a* displays video feeds 1053-3 and 1053-4 having an enlarged size.

The embodiments discussed herein and depicted in FIGS. 6A-6Q, FIGS. 8A-8R, FIGS. 10A-10J, and FIGS. 12A-12U provide representative, non-limiting examples of the adjustments performed by device 600 in response to detecting changes within a field-of-view of the camera when various modes of operation, such as the automatic framing mode or the background blur mode, are enabled. As such, the adjustments are not intended to be limiting and can be combined, reversed, or modified in accordance with the scope of the present disclosure. For example, with reference to FIGS. 10I and 10J, if Pam 1032 were to move from the couch to her prior position next to Jack 628, device 600 could merge the third and fourth preview portions to display camera preview having the appearance depicted in FIG. 10I.

FIG. 11 is a flow diagram illustrating a method for managing a live video communication session using an electronic device in accordance with some embodiments. Method 1100 is performed at a computer system (e.g., a smartphone, a tablet) (e.g., 100, 300, 500, 600, 600*a*) that is in communication with a display generation component (e.g., a display controller, a touch-sensitive display system) (e.g., 601) and one or more cameras (e.g., a visible light camera; an infrared camera; a depth camera) (e.g., 602). Some operations in method 1100 are, optionally, combined, the orders of some operations are, optionally, changed, and some operations are, optionally, omitted.

As described below, method 1100 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 1100, computer system (e.g., 600) displays (1102) via the display generation component (e.g., 601), a live video communication interface (e.g., 1004) for a live video communication session (e.g., an interface for a live video communication session (e.g., a live video chat session, a live video conference session, etc.)), the live video communication interface including one or more representations (e.g., 1006) of a field-of-view (e.g., 620) of the one or more cameras (e.g., 602) (e.g., the live video communication interface is displayed with a first digital zoom level and a first displayed portion of the field-of-view of the one or more cameras).

While the live video communication session is active, the computer system (e.g., 600) captures (1104), via the one or more cameras (e.g., 602), image data for the live video communication session (e.g., data captured in camera field-of-view 620).

In accordance with a determination (1106), based on the image data for the live video communication session captured via the one or more cameras (e.g., 602), that an amount of separation (e.g., distance and/or angle) between a first participant (e.g., 622) (e.g., of the live video communication session) and a second participant (e.g., 628) (e.g., of the live video communication session) (e.g., a detected distance and/or angle within the field-of-view of the one or more cameras and between the first participant and the second participant) meets separation criteria (e.g., as depicted in FIG. 10C) (e.g., is greater than a first threshold amount (e.g., distance and/or angle)), computer system (e.g., 600) concurrently displays, via the display generation component (e.g., 601), the items noted in 1108 and 1110.

At 1108 of method 1100, the computer system (e.g., 600) displays a representation (e.g., content (e.g., 622-1) depicted in first preview 1006-1) (e.g., live video) of a first portion (e.g., 625-1) of the field-of-view (e.g., 620) of the one or more cameras (e.g., 602) (e.g., a first portion that includes image data for (e.g., representing) the first participant (e.g., and excludes image data for the second participant)) (e.g., the representation of the first portion of the field-of-view of the one or more cameras includes a representation of the first participant, but not a representation of the second participant) at a first region (e.g., 1006-1) of the live video communication interface (e.g., 1004).

At 1110 of method 1100, the computer system (e.g., 600) displays a representation (e.g., content (e.g., 628-1) depicted in second preview 1006-2) (e.g., live video) of a second portion (e.g., 625-2) of the field-of-view (e.g., 620) of the one or more cameras (e.g., 602) (e.g., a second portion that includes image data for (e.g., representing) the second participant (e.g., and excludes image data for the first participant)) (e.g., the representation of the second portion of the field-of-view of the one or more cameras includes a representation of the second participant, but not a representation of the first participant) at a second region (e.g., 1006-2) of the live video communication interface (e.g., 1004) that is distinct from the first region (e.g., 1006-1) (e.g., the first and second regions are visually distinguished from each other (e.g., by a visible boundary (e.g., a line 1015 or discontinuity separating the regions) between the first and second regions); the first and second regions do not overlap (but, in some embodiments, share a boundary)). The representation of the first portion of the field-of-view of the one or more cameras and the representation of the second portion of the field-of-view of the one or more cameras are displayed without displaying a representation of a third portion (e.g., 1027) of the field-of-view of the one or more cameras that is in between the first portion (e.g., 625-1) of the field-of-view of the one or more cameras and the second portion (e.g., 625-2) of the field-of-view of the one or more cameras (e.g., the live video communication interface has a split field-of-view that includes the first and second portions of the field-of-view of the one or more cameras and omits the third portion of the field-of-view of the one or more cameras, as depicted in FIG. 10C, for example). Displaying the representation of the first portion of the field-of-view of the one or more cameras at a first region of the live video communication interface, and displaying a representation of a second portion of the field-of-view of the one or more cameras at a second region of the live video communication interface, without displaying a representation of a third portion of the field-of-view of the one or more cameras that is in between the first and second portions optimizes use of the display to present more relevant information to the user and to present the relevant information with a larger view than would otherwise be available, and conserves computational resources by using fewer pixels to display information that is not relevant to the user Optimizing use of the display and conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the live video communication interface does not include (e.g., omits; forgoes displaying) a representation of image data for at least a portion of the field-of-view of the one or more cameras that is positioned between the first participant and the second participant. In other words, in some embodiments, when the first and second participants are physically separated in the physical environment by more than the threshold amount within the field-of-view of the one or more cameras, the live video communication interface does not show a representation of at least some of the physical environment positioned between the first and second participants.

In accordance with a determination, based on the image data for the live video communication session captured via the one or more cameras (e.g., 602), that the amount of separation between the first participant (e.g., 622) and the second participant (e.g., 628) does not meet the separation criteria (e.g., as depicted in FIG. 10B) (e.g., is less than the first threshold amount (e.g., distance and/or angle)), the computer system (e.g., 600) displays (1112), via the display generation component (e.g., 601), a representation (e.g., content (e.g., 618-1, 622-1, 628-1, 1016-1) depicted in camera preview 1006) (e.g., live video) of a fourth portion (e.g., 625 in FIG. 10B) of the field-of-view (e.g., 620) of the one or more cameras (e.g., 602) that includes the first participant (e.g., 622) and the second participant (e.g., 628) while maintaining display of a portion (e.g., 1027 in FIG. 10C) (e.g., the third portion) of the field-of-view of the one or more cameras that is in between the first participant and the second participant (e.g., without excluding any of the portion of the field-of-view of the one or more cameras that is between the first participant and the second participant) (e.g., including all of the field-of-view of the one or more cameras that is between the first participant and the second participant) (e.g., wherein the fourth portion of the field-ofview of the one or more cameras is a continuous portion of the field-of-view of the one or more cameras (e.g., the live video communication interface has a continuous field-of-view that includes the first and second participants)) (e.g., the fourth portion of the field-of-view of the one or more cameras is different from the first portion of the field-of-view of the one or more cameras and the second portion of the field-of-view of the one or more cameras; in some embodiments the fourth portion of the field-of-view of the one or more cameras includes both the first and second portions of the field-of-view of the one or more cameras and at least a portion of the field-of-view of the one or more cameras that is not included in the first and second portions (e.g., the third portion)) (e.g., the fourth portion of the field-of-view of the one or more cameras includes image data for (e.g., representing) the first participant and the second participant) (e.g., the representation of the fourth portion of the field-of-view of the one or more cameras includes a representation of the first participant and a representation of the second participant). In some embodiments, the representation of the fourth portion of the field-of-view of the one or more cameras includes a representation of image data for the field-of-view of the one or more cameras that is positioned between the first participant and the second participant. In other words, in some embodiments, when the first and second participants are physically separated in the physical environment by less than the threshold amount within the field-of-view of the one or more cameras, the live video communication interface (e.g., 1004) does not exclude a representation of the physical environment between the first and second participants.

In some embodiments, a representation (e.g., 622-1) of the first participant (e.g., 622) is capable of being displayed (e.g., by the display generation component (e.g., 601) of the computer system (e.g., 600)) in the representation (e.g., 1006-1) of the first portion of the field-of-view of the one or more cameras and in the representation (e.g., 1006 in FIG. 10B) of the fourth portion of the field-of-view of the one or more cameras. In some embodiments, the representation of the first participant is more largely/prominently/clearly displayed in the representation of the first portion than in the representation of the fourth portion. This is because the continuous field-of-view provided by the representation of the fourth portion is a zoomed out view so that the representations (e.g., 622-1 and 628-1) of both the first and second participants (e.g., 622 and 628), as well as the portion of the field-of-view of the one or more cameras that is between the first and second participants, can be displayed in the representation of the fourth portion of the field-of-view of the one or more cameras, whereas the representation of the first participant can be displayed with a more zoomed in view because the third portion of the field-of-view of the one or more cameras that is between the first and second participants is omitted when the representations of the first and second portions of the field-of-view of the one or more cameras are displayed. For similar reasons, the representation of the second participant is more largely/prominently/ clearly displayed in the representation of the second portion than in the representation of the fourth portion.

In some embodiments, the representation of the first portion (e.g., 625-1) of the field-of-view (e.g., 620) of the one or more cameras (e.g., 602), the representation of the second portion (e.g., 625-2) of the field-of-view of the one or more cameras, and the representation of the fourth portion (e.g., 625 in FIG. 10B) of the field-of-view of the one or more cameras are generated from a set of data (e.g., image data within field-of-view 620) captured from a first camera (e.g., 602) (e.g., a wide angle camera (e.g., a single camera with a wide angle lens) (e.g., the representations of the portions of the field-of-view of the one or more cameras are all generated from a same set of image data obtained at the same time from a single camera).

In some embodiments, the amount of separation between the first participant (e.g., 622) and the second participant (e.g., 628) does not meet the separation criteria in accordance with a determination, based on the image data for the live video communication session captured via the one or more cameras (e.g., 602), that a third participant (e.g., 1031) (e.g., a participant other than the first or second participant) is detected between the first participant and the second participant (e.g., as depicted in FIG. 10D) (e.g., the split field-of-view is not displayed when there is at least one participant between the first and second participants in the live video communication session) (e.g., the continuous field-of-view is displayed when there is at least one participant between the first and second participants in the live video communication session).

In some embodiments, the amount of separation between the first participant (e.g., 622) and the second participant (e.g., 622) does not meet the separation criteria in accordance with a determination, based on the image data for the live video communication session captured via the one or more cameras (e.g., 602), that a distance between the first participant and a middle participant (e.g., 1031) (e.g., a participant positioned between the first and second participants) is less than a first threshold distance (e.g., 3 feet, 2 feet, 1 foot) and a distance between the second participant (e.g., 628) and the middle participant is less than the first threshold distance (e.g., as depicted in FIG. 10D) (e.g., the split field-of-view is not displayed when there is at least one participant between the first and second participants in the live video communication session, and the distance between the middle participant and the first and second participants is less than a threshold distance) (e.g., the continuous field-of-view is displayed when there is at least one participant between the first and second participants in the live video communication session and the distance between the middle participant and the first and second participants is less than a threshold distance).

In some embodiments, in accordance with a determination, based on the image data for the live video communication session captured via the one or more cameras (e.g., 602), that the first participant (e.g., 622) is the only participant detected (e.g., see FIG. 10G) (e.g., there is only one participant detected in the live video communication session), the computer system (e.g., 600) displays, via the display generation component (e.g., 601), a representation (e.g., 1006 in FIG. 10G) of a fifth portion (e.g., 625 in FIG. 10G) of the field-of-view (e.g., 620) of the one or more cameras that includes a view of the first participant (e.g., 622-1 in FIG. 10G) in which the first participant is larger than when the first participant is displayed along with the second participant (e.g., 622-1 in FIG. 10F). Displaying a representation of a fifth portion of the field-of-view of the one or more cameras that includes a view of the first participant in which the first participant is larger than when the first participant is displayed along with the second participant optimizes use of the display to present more relevant information to the user and conserves computational resources by using fewer pixels to display information that is not relevant to the user. Optimizing use of the display and conserving computational resources enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the system more quickly and efficiently. In some embodiments, when only a single participant of the live video communication session is detected in the field-of-view of the one or more cameras, the computer system displays a zoomed in view of the single participant.

In some embodiments, while displaying the representation of the first portion of the field-of-view (e.g., 1006-1 in FIG. 10E) and the representation of the second portion of the field-of-view (e.g., 1006-2 in FIG. 10E) without displaying the representation of the third portion (e.g., a portion of 1027 in FIG. 10E that is in between, and does not include, portions 625-1 and 625-2 of the field-of-view of the one or more cameras that is in between the first portion (e.g., 625-1) of the field-of-view (e.g., 620) and the second portion (e.g., 625-2) of the field-of-view, the computer system (e.g., 600) detects (e.g., based on the image data for the live communication session) a change in the amount of separation between the first participant and the second participant (e.g., Jane 622 moves next to Jack 628 as depicted in FIG. 10F) (e.g., while displaying the split field-of-view, the first participant and the second participant move closer to each other). In accordance with a determination that the amount of separation between the first participant (e.g., 622) and the second participant (e.g., 628) does not meet the separation criteria (e.g., and in response to the change in the amount of separation between the first participant and the second participant), the computer system displays, via the display generation component, a representation (e.g., 1006 in FIG. 10F) of a fifth portion (e.g., 625 in FIG. 10F) of the field-of-view of the one or more cameras that includes the first participant and the second participant while maintaining display of a portion of the field-of-view of the one or more cameras that is in between the first participant and the second participant (e.g., when the first and second participants are no longer separated by the predetermined amount, the computer system merges the split field-of-view together to display the continuous field-of-view). Displaying the representation of a fifth portion of the field-of-view of the one or more cameras that includes the first participant and the second participant while maintaining display of a portion of the field-of-view of the one or more cameras that is in between the first participant and the second participant in accordance with a determination that the amount of separation between the first and second participants does not meet the separation criteria enhances the live video communication session experience by automatically adjusting the representation of the field-of-view of the one or more cameras to include representations of both the first and second participants when they are positioned close to each other. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the first portion of the field-of-view (e.g., 1006-1 in FIG. 10C) and the representation of the second portion of the field-of-view (e.g., 1006-2 in FIG. 10C) without displaying the third portion (e.g., 1027 in FIG. 10C) of the field-of-view (e.g., 620) of the one or more cameras (e.g., 602) that is in between the first portion (e.g., 625-1) of the field-of-view and the second portion (e.g., 625-2) of the field-of-view, the computer system (e.g., 600) detects a fourth participant (e.g., 1031) (e.g., a participant other than the first or second participant) positioned between the first participant and the second participant and (optionally) positioned less than a second threshold distance (e.g., 3 feet, 2 feet, 1 foot) from the first participant and less than the second threshold distance from the second participant in the image data for the live video communication session (e.g., while displaying the split field-of-view, detecting an additional participant positioned between, and less than a threshold distance from, the first participant and the second participant). In some embodiments, the fourth participant is detected in the third portion of the field-of-view of the one or more cameras that is in between the first portion of the field-of-view and the second portion of the field-of-view. In response to detecting the fourth participant positioned between the first participant and the second participant and (optionally) positioned less than the second threshold distance from the first participant and less than the second threshold distance from the second participant in the image data for the live video communication session, the computer system displays, via the display generation component (e.g., 601), a representation (e.g., 1006 in FIG. 10D) of a sixth portion (e.g., 625 in FIG. 10D) of the field-of-view of the one or more cameras that includes the first participant (e.g., 622) and the second participant (e.g., 628) while maintaining display of a portion of the field-of-view of the one or more cameras that is in between the first participant and the second participant and includes the fourth participant (e.g., 1031) (e.g., when the fourth participant is detected between the first and second participants (and less than the threshold distance from the first and second participants), the computer system merges the split field-of-view together to display the continuous field-of-view that includes the first, second, and fourth participants). Displaying a representation of a sixth portion of the field-of-view of the one or more cameras that includes the first participant and the second participant while maintaining display of a portion of the field-of-view of the one or more cameras that is in between the first and second participants and includes the fourth participant in response to detecting the fourth participant positioned between, and less than the second threshold distance from, the first and second participants enhances the live video communication session experience by automatically adjusting the representation of the field-of-view of the one or more cameras to include the portion of the field-of-view of the one or more cameras that includes the fourth participant when the fourth participant is positioned less than the threshold distance from both the first and second participants. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation (e.g., 1006 in FIG. 10B) of the fourth portion (e.g., 625 in FIG. 10B) of the field-of-view (e.g., 620) of the one or more cameras (e.g., 602) that includes the first participant (e.g., 622) and the second participant (e.g., 628) while maintaining display of the portion of the field-of-view of the one or more cameras that is in between the first participant and the second participant, the computer system (e.g., 600)

detects (e.g., based on the image data for the live video communication session) a change in the amount of separation between the first participant and the second participant (e.g., while displaying the continuous field-of-view, the first participant and the second participant move away from each other). In accordance with a determination (e.g., based on the image data for the live video communication session) that the amount of separation between the first participant and the second participant meets the separation criteria (e.g., and in response to detecting the change in the amount of separation between the first participant and the second participant), the computer system displays, via the display generation component (e.g., 601), a representation (e.g., 1006-1 in FIG. 10C) of a seventh portion (e.g., 625-1 in FIG. 10C) of the field-of-view and a representation (e.g., 1006-2 in FIG. 10C) of an eighth portion (e.g., 625-2 in FIG. 10C) of the field-of-view without displaying a ninth portion (e.g., 1027 in FIG. 10C) of the field-of-view of the one or more cameras that is in between the seventh portion of the field-of-view and the eighth portion of the field-of-view (e.g., when the first and second participants become separated by the predetermined amount, the computer system switches from the continuous field-of-view to the split field-of-view). Displaying a representation of a seventh portion of the field-of-view and a representation of an eighth portion of the field-of-view without displaying a ninth portion of the field-of-view of the one or more cameras that is in between the seventh and eighth portions of the field-of-view in accordance with a determination that the changed amount of separation between the first and second participants meets the separation criteria enhances the live video communication session experience by automatically adjusting the representation of the field-of-view of the one or more cameras to a split field-of-view when the first and second participants move away from each other by at least a threshold amount, optimizes use of the display to present more relevant information to the user, and conserves computational resources by using fewer pixels to display information that is not relevant to the user. Performing an operation when a set of conditions has been met without requiring further user input, optimizing use of the display, and conserving computations resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the representation of the fourth portion of the field-of-view of the one or more cameras (e.g., 1006 in FIG. 10D) that includes the first participant (e.g., 622) and the second participant (e.g., 628) while maintaining display of a portion of the field-of-view of the one or more cameras that is in between the first participant and the second participant and includes a fifth participant (e.g., 1031) that is detected, based on the image data for the live video communication session, in between the first participant and the second participant and (optionally) positioned less than a third threshold distance from the first participant and less than the third threshold distance from the second participant (e.g., while displaying the continuous field-of-view when there is an additional participant positioned between, and less than a threshold distance from, the first participant and the second participant), the computer system (e.g., 600) detects (e.g., based on the image data for the live video communication session) a change in position of the fifth participant (e.g., Jake 1031 leaves scene 615 as depicted in FIG. 10E). In accordance with a determination (e.g., based on the change in the image data for the live video communication session) that the fifth participant is no longer detected in between the first participant and the second participant and (optionally) positioned less than the third threshold distance from the first participant and less than the third threshold distance from the second participant (e.g., and in response to detecting the change in position of the fifth participant), the computer system displays, via the display generation component (e.g., 601), the representation of the first portion of the field-of-view (e.g., 1006-1 in FIG. 10E) (e.g., that includes the first participant) and the representation of the second portion of the field-of-view (e.g., 1006-2 in FIG. 10E) (e.g., that includes the second participant) without displaying the portion of the field-of-view of the one or more cameras that is in between the first participant and the second participant (e.g., when the fifth participant is no longer detected between the first and second participants, the computer system switches from the continuous field-of-view to the split field-of-view). Displaying the representation of the first portion of the field-of-view and the representation of the second portion of the field-of-view without displaying the portion of the field-of-view of the one or more cameras that is in between the first and second participants in accordance with a determination that the fifth participant is no longer detected in between and less than the third threshold distance from the first and second participants enhances the live video communication session experience by automatically adjusting the representation of the field-of-view of the one or more cameras to a split field-of-view when a participant that was previously in between the first and second participants is no longer positioned between the first and second participants, optimizes use of the display to present more relevant information to the user, and conserves computational resources by using fewer pixels to display information that is not relevant to the user. Performing an operation when a set of conditions has been met without requiring further user input, optimizing use of the display, and conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the live video communication interface (e.g., 1004) for the live video communication session: in accordance with a determination, based on the image data for the live video communication session captured via the one or more cameras (e.g., 602), that an amount of separation between the first participant (e.g., 622), the second participant (e.g., 628), and a sixth participant (e.g., 1031) meets the separation criteria (e.g., the first, second, and sixth participants are each spaced apart from each other by at least a threshold amount (e.g., distance and/or angle) as depicted in FIG. 10H), the computer system (e.g., 600) concurrently displays, via the display generation component (e.g., 601), the following items (e.g., as depicted in FIG. 10H). The computer system displays a representation (e.g., 622-1) of a tenth portion (e.g., 625-2) of the field-of-view of the one or more cameras (e.g., that includes the first participant (e.g., and excludes the second participant and the sixth participant)) at a third region (e.g., 1006-2 in FIG. 10H) of the live video communication interface (e.g., 1004). The computer system also displays a representation (e.g., 628-1) of an eleventh portion (e.g., 625-3) of the field-of-view of the one or more cameras (e.g., that includes the second participant (e.g., and excludes the first participant and the sixth participant)) at a fourth region (e.g., 1006-3 in FIG. 10H) of the live video communication interface that is distinct from the third region. The computer system also displays a representation (e.g., 1031-1) of a twelfth portion (e.g., 625-1) of the field-of-view of the one or more cameras (e.g., that includes the sixth participant (e.g., and excludes the first participant and the second participant)) at a fifth region (e.g., 1006-1 in FIG. 10H) of the live video communication interface that is distinct from the third region and the fourth region, wherein the representation of the tenth portion of the field-of-view of the one or more cameras, the representation of the eleventh portion of the field-of-view of the one or more cameras, and the representation of the twelfth portion of the field-of-view of the one or more cameras are displayed without displaying a representation of a thirteenth portion (e.g., a portion of door 618 located between, and not included in, portions 625-1 and 625-2) of the field-of-view (e.g., 620) of the one or more cameras that is in between at least two of the tenth, eleventh, and twelfth portions of the field-of-view of the one or more cameras (e.g., the live video communication interface has a split field-of-view that includes the tenth, eleventh, and twelfth portions of the field-of-view of the one or more cameras). Displaying the representation of the tenth portion of the field-of-view of the one or more cameras at a third region of the live video communication interface, displaying the representation of the eleventh portion of the field-of-view at a fourth region of the live video communication interface, and displaying the representation of the twelfth portion of the field-of-view of the one or more cameras at a fifth region of the live video communication interface, without displaying a representation of a thirteenth portion of the field-of-view of the one or more cameras that is in between at least two of the tenth, eleventh, and twelfth portions optimizes use of the display to present more relevant information to the user and to present the relevant information with a larger view than would otherwise be available, and conserves computational resources by using fewer pixels to display information that is not relevant to the user. Optimizing use of the display and conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination, based on the image data for the live video communication session captured via the one or more cameras (e.g., 602), that the amount of separation between the first participant (e.g., 622), the second participant (e.g., 628), and the sixth participant (e.g., 1031) does not meet the separation criteria (e.g., see FIG. 10D), displaying, via the display generation component, a representation of a fourteenth portion (e.g., 625 in FIG. 10D) of the field-of-view of the one or more cameras that includes the first participant (e.g., 622), the second participant (e.g., 628), and the sixth participant (e.g., 1031) while maintaining display of a portion of the field-of-view of the one or more cameras that is in between at least two of the first participant, the second participant, and the sixth participant (e.g., the live video communication interface has a continuous field-of-view that includes the first, second, and sixth participants). In some embodiments, subsets (e.g., two or more) of the participants can be grouped together in a single field-of-view, and separate from other subsets of participants. For example, a representation of a portion of the field-of-view of the one or more cameras can include a representation of two subjects, and be displayed separate from a representation of another portion of the field-of-view of the one or more cameras that includes a representation of a different subject.

In some embodiments, while displaying the live video communication interface (e.g., 1004) for the live video communication session: in accordance with a determination, based on the image data for the live video communication session captured via the one or more cameras (e.g., 602), that an amount of separation between the first participant (e.g., 622), the second participant (e.g., 628), a seventh participant (e.g., 1031), and an eighth participant (e.g., 1032) meets the separation criteria (e.g., the first, second, seventh, and eighth participants are each spaced apart from each other by at least a threshold amount (e.g., distance and/or angle)), the computer system (e.g., 600) concurrently displays, via the display generation component (e.g., 601), the following items (e.g., as depicted in FIG. 10J). The computer system displays a representation (e.g., 622-1) of a fifteenth portion (e.g., 625-2) of the field-of-view (e.g., 620) of the one or more cameras (e.g., that includes the first participant (e.g., and excludes the second, seventh, and eighth participants)) at a sixth region (e.g., 1006-2 in FIG. 10J) of the live video communication interface. The computer system displays a representation (e.g., 628-1) of a sixteenth portion (e.g., 625-4) of the field-of-view of the one or more cameras (e.g., that includes the second participant (e.g., and excludes the first, seventh, and eighth participants)) at a seventh region (e.g., 1006-4 in FIG. 10J) of the live video communication interface that is distinct from the sixth region. The computer system displays a representation (e.g., 1031-1) of a seventeenth portion (e.g., 625-1) of the field-of-view of the one or more cameras (e.g., that includes the seventh participant (e.g., and excludes the first, second, and eighth participants)) at an eighth region (e.g., 1006-1 in FIG. 10J) of the live video communication interface that is distinct from the sixth region and the seventh region. The computer system displays a representation (e.g., 1032-1) of a eighteenth portion (e.g., 625-3) of the field-of-view of the one or more cameras (e.g., that includes the eighth participant (e.g., and excludes the first, second, and seventh participants)) at a ninth region (e.g., 1006-3 in FIG. 10J) of the live video communication interface that is distinct from the sixth region, the seventh region, and the eighth region, wherein the representation of the fifteenth portion of the field-of-view of the one or more cameras, the representation of the sixteenth portion of the field-of-view of the one or more cameras, the representation of the seventeenth portion of the field-of-view of the one or more cameras, and the representation of the eighteenth portion of the field-of-view of the one or more cameras are displayed without displaying a representation of a nineteenth portion (e.g., representation 618-1 of door 618 that is positioned between, but not included in, portion 625-1 and 625-2) of the field-of-view of the one or more cameras that is in between at least two of the fifteenth, sixteenth, seventeenth, and eighteenth portions of the field-of-view of the one or more cameras (e.g., the live video communication interface has a split field-of-view that includes the fifteenth, sixteenth, seventeenth, and eighteenth portions of the field-of-view of the one or more cameras). Displaying the representation of the fifteenth portion of the field-of-view of the one or more cameras at a sixth region of the live video communication interface, displaying the representation of the sixteenth portion of the field-of-view at a seventh region of the live video communication interface, displaying the representation of the seventeenth portion of the field-of-view of the one or more cameras at an eighth region of the live video communication interface, and displaying the representation of the eighteenth portion of the field-of-view of the one or more cameras at a ninth region of the live video communication interface, without displaying a representation of a nineteenth portion of the field-of-view of the one or more cameras that is in between at least two of the fifteenth, sixteenth, seventeenth, and eighteenth portions optimizes use of the display to present more relevant information to the user and to present the relevant information with a larger view than would otherwise be available, and conserves computational resources by using fewer pixels to display information that is not relevant to the user. Optimizing use of the display and conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination, based on the image data for the live video communication session captured via the one or more cameras (e.g., 602), that the amount of separation between the first participant (e.g., 622), the second participant (e.g., 628), the seventh participant (e.g., 1031), and the eighth participant (e.g., 1032) does not meet the separation criteria, displaying, via the display generation component, a representation of a twentieth portion of the field-of-view (e.g., 620) of the one or more cameras that includes the first participant, the second participant, the seventh participant, and the eighth participant while maintaining display of a portion of the field-of-view of the one or more cameras that is in between at least two of the first participant, the second participant, the seventh participant, and the eighth participant (e.g., the live video communication interface has a continuous field-of-view that includes the first, second, seventh, and eighth participants). In some embodiments, subsets (e.g., two or more) of the participants can be grouped together in a single field-of-view (e.g., as depicted in 1006-3 in FIG. 10I), and separate from other subsets of participants. For example, a representation of a portion of the field-of-view of the one or more cameras can include a representation of two subjects (e.g., 628-1 and 1032-1 in FIG. 10I), and be displayed separate from a representation of another portion of the field-of-view of the one or more cameras (e.g., 1006-2 in FIG. 10I) that includes a representation (e.g., 622-1) of a different subject.

Note that details of the processes described above with respect to method 1100 (e.g., FIG. 11) are also applicable in an analogous manner to the methods described above and below for methods 700, 900, 1300, and 1400. For example, method 700, method 900, method 1300, and/or method 1400 optionally includes one or more of the characteristics of the various methods described above with reference to method 1100. For brevity, these details are not repeated.

FIGS. 12A-12U illustrate exemplary user interfaces for managing a live video communication session (e.g., a video conference), in accordance with some embodiments. The user interfaces in these figures are used to illustrate the processes described herein, including the processes in FIGS. 13 and 14.

Figure 12R:
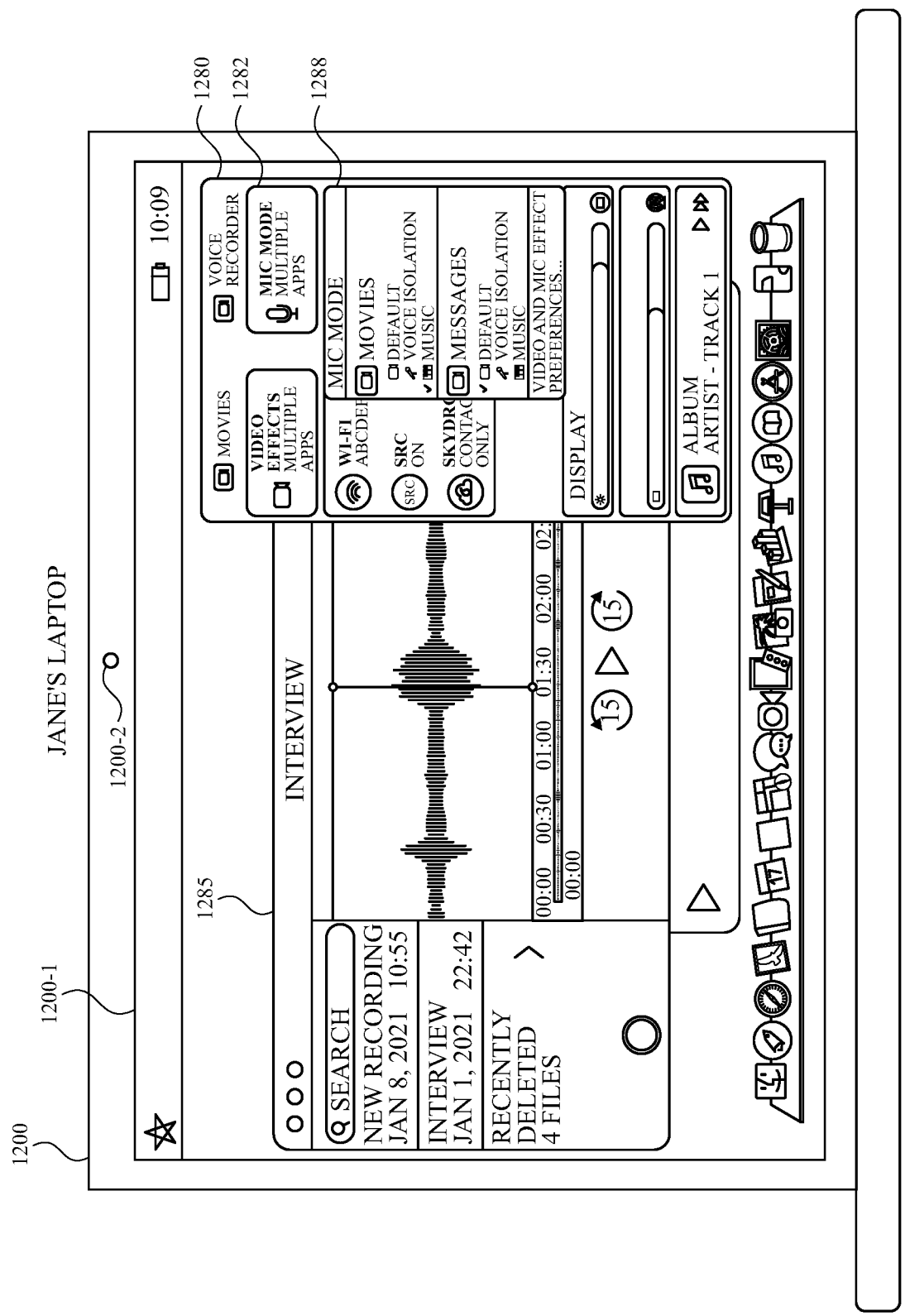

FIGS. 12A-12R illustrate device 600 displaying user interfaces on display 601 for managing a live video communication session, similar to that discussed above with respect to FIGS. 6A-6Q, FIGS. 8A-8R, and FIGS. 10A-10J, including displaying various user interfaces for changing video and audio settings for device 600. One or more of the embodiments discussed below with respect to FIGS. 12A-12U can be combined with one or more of the embodiments discussed with respect to FIGS. 6A-6Q, FIGS. 8A-8R, and FIGS. 10A-10J. For example, the background blur feature discussed with respect to FIGS. 12A-12U (and the corresponding background blur affordance 611) can be incorporated in one or more of the interfaces depicted in FIGS. 6A-6Q, FIGS. 8A-8R, and FIGS. 10A-10J.

FIG. 12A depicts an embodiment in which device 600 (also referred to herein as Jane's tablet) displays UI 1201 for an incoming video conference call (similar to those depicted in FIGS. 6A and 8K discussed above). UI 1201 includes framing mode affordance 610 and background blur affordance 611. A background blur mode can be enabled or disabled in response to, for example, input 1202 on background blur affordance 611, and the automatic framing mode can be enabled or disabled in response to, for example, input 1204 on framing mode affordance 610. As discussed in greater detail below, when the background blur mode is enabled, device 600 blurs (or otherwise obstructs) a background portion of the video feed output for the video conference call without blurring the portion of the video feed that includes the participant.

In FIG. 12B, device 600 displays video conference UI 1205 in response to detecting input 1206 on accept option 608-3. Video conference UI 1205 is a user interface for an ongoing video conference between Jane, John, and Pam. Jane is depicted in camera preview 1208 (similar to camera previews 606 and 836), which is a representation of the video feed captured using camera 602 and being transmitted from device 600 (Jane's tablet) to the other participants of the video conference (e.g., to John's tablet 600a). John is depicted in video feed 1210-1, which is the video feed transmitted from John's tablet 600a to Jane's tablet and Pam's device for the video conference. Similarly, Pam is depicted in video feed 1210-2, which is the video feed transmitted from Pam's device to John's and Jane's tablets.

Video conference UI 1205 also includes options menu 1211 (similar to options menu 1008). Options menu 1211 includes background blur affordance 611, mute option 1212, framing mode affordance 610, camera option 1213, and end call option 1214. Background blur affordance 611 is selectable to enable or disable the background blur mode for the video conference call. Mute option 1212 is selectable to mute or unmute audio detected by device 600 for the video conference call. Framing mode affordance 610 is selectable to enable or disable the automatic framing mode for the video conference call. Camera option 1213 is selectable to enable or disable camera 602 for the video conference call (e.g., disabling/enabling the video feed captured via camera 602). End call option 1214 is selectable to terminate the video conference call.

Video conference UI 1205 includes effects affordance 1216 and camera flip affordance 1217 overlaying camera preview 1208. Effects affordance 1216 is selectable to enable or disable the display of various visual effects with the video feed captured by device 600 such as, for example, virtual avatars, stickers, color filters, and the like. Camera flip affordance 1217 is selectable to change which camera is used for the video feed for the video conference call. For example, selecting camera flip affordance 1217 alternates between using camera 602 and a camera positioned on a different side (e.g., backside) of device 600.

In the embodiment depicted in FIG. 12B, the background blur and automatic framing modes are both disabled for device 600. However, if the framing mode affordance 610 was in a selected state when input 1206 was detected on accept option 608-3, the automatic framing mode would be enabled for Jane's tablet and framing mode affordance 610 would be displayed in menu options 1211 having a selected appearance (e.g., bolded). Similarly, if the background blur affordance 611 was in a selected state when input 1206 was detected, the background blur mode would be enabled for Jane's tablet and background blur affordance 611 would be displayed in menu options 1211 having a selected appearance.

FIG. 12B also depicts John's tablet 600*a* having video conference UI 1215 (similar to video conference UI 1205). John is depicted in camera preview 1218 (similar to camera preview 1208), which is a representation of the video feed captured using camera 602*a* and being transmitted from John's tablet 600*a* to the other participants of the video conference (e.g., Jane's tablet (device 600)). Jane is depicted in video feed 1220-1, which is the video feed transmitted from device 600 to John's tablet 600*a* and Pam's device for the video conference. Similarly, Pam is depicted in video feed 1220-2, which is the video feed transmitted from Pam's device to John's and Jane's tablets.

In FIG. 12B, device 600 detects input 1222 (e.g., a drag gesture). In response to detecting input 1222, device 600 displays control settings interface 1225, as depicted in FIG. 12C.

In FIG. 12C, device 600 displays control settings interface 1225 over video conference UI 1205, which is blurred in the background behind control settings interface 1225. Control settings interface 1225 includes information and controls for changing various settings of device 600.

As shown in FIG. 12C, control settings interface 1225 includes identifier 1227, which provides an indication (e.g., text and/or icon) of an application operating on device 600 that is currently accessing, or has recently accessed (e.g., accessed less than a threshold amount of time ago (e.g., two minutes ago, five minutes ago, or ten minutes ago)), the camera and/or microphone of device 600. For example, because camera 602 and a microphone of device 600 are being used by device 600 for the video conference call, the video conference app is listed by identifier 1227. In some embodiments, control settings interface 1225 includes a listing of applications that recently used or accessed the camera and/or microphone of device 600, even if the application is not currently in use or accessing the camera or microphone.

Control settings interface 1225 also includes video effects control 1231 and microphone mode control 1232. Video effects control 1231 is selectable to display a listing of video settings that can be applied to applications that access (e.g., operate, control, and/or use images captured by) a camera of device 600 (e.g., camera 602). Video effects control 1231 includes indication 1231-1 of a currently selected video effects setting, which, in FIG. 12C, is the default video effects setting. Microphone mode control 1232 is selectable to display a listing of audio settings that can be applied to applications that access the microphone of device 600. Microphone mode control 1232 includes indication 1232-1 of a currently selected microphone mode setting, which, in FIG. 12C, is the default microphone mode setting.

In some embodiments, video effects control 1231 is displayed if the camera has been recently used, even if the camera is currently not in use. If the camera has not been recently used, video effects control 1231 is not displayed in control settings interface 1225. In some embodiments, video effects control 1231 is displayed without microphone mode control 1232 (e.g., microphone mode control 1232 is hidden or not displayed if the microphone is not in use or has not been recently used). In some embodiments, microphone mode control 1232 is displayed if the microphone has been recently used, even if the microphone is currently not in use. If the microphone has not been recently used, microphone mode control 1232 is not displayed in control settings interface 1225. In some embodiments, microphone mode control 1232 is displayed without video effects control 1231 (e.g., video effects control 1231 is hidden or not displayed if the camera is not in use or has not been recently used).

As depicted in FIG. 12C, device 600 displays identifier 1227, video effects control 1231, and microphone mode control 1232 in region 1225-1 of control settings interface 1225. Region 1225-1 is a region of the control settings interface that is not user-configurable. Conversely, region 1225-2 is a region of the control settings interface that is user-configurable. As shown in FIG. 12C, when identifier 1227, video effects control 1231, or microphone mode control 1232 is displayed in control settings interface 1225, the controls and information in region 1225-2 are shifted down from a default position in the control settings interface (e.g., the default position shown in FIG. 12I).

In FIG. 12C, Jane has moved her face partially outside the field-of-view of camera 602 and, therefore, is shown in video feed 1220-1 of John's tablet 600*a* with her face partly out of frame.

In FIG. 12D, device 600 displays expanded video effects controls 1236 in response to input 1234 on video effects control 1231 in FIG. 12C. Expanded video effects controls 1236 provides an expanded listing of the video effect options that are selectable for the application(s) accessing the camera of device 600. Expanded video effects controls 1236 also includes settings option 1237, which is selectable to access an audio/video settings menu (e.g., see FIG. 12S or 12T). In some embodiments, control settings interface 1225 is blurred or otherwise obscured in the background behind expanded video effects controls 1236.

The video effects options include default option 1236-1, framing mode option 1236-2, and background blur option 1236-3. Default option 1236-1 corresponds to a default video setting for the camera in which the automatic framing mode and the background blur mode are both disabled. In some embodiments, selecting default option 1236-1 disables the automatic framing mode and the background blur mode. Framing mode option 1236-2 corresponds to the automatic framing mode for the camera. Selecting framing mode option 1236-2 enables the automatic framing mode, similar to selecting framing mode affordance 610. Background blur option 1236-3 corresponds to the background blur mode for the camera. Selecting background blur option 1236-3 enables the background blur mode, similar to selecting background blur affordance 611. When a video effects option is selected, the corresponding video effects settings are applied to applications (e.g., video conference application) that are currently using, or recently used, the camera of device 600.

In the embodiment depicted in FIG. 12D, indication 1231-1 shows that default option 1236-1 is currently selected; however, this selection can also be indicated in different ways such as, e.g., by displaying a checkmark, highlighting, or other visual indication of which setting(s) is currently selected or enabled. In some embodiments, one or more of the video effects options are disabled if they are not supported by the currently active camera. For example, if camera 602 does not support the automatic framing mode, framing mode option 1236-2 can be omitted or shown struck through, greyed out, or otherwise not available for selection. In some embodiments, more than one video effects option can be concurrently enabled. For example, framing mode option 1236-2 can be enabled concurrently with background blur option 1236-3.

In FIG. 12D, device 600 detects input 1238 on framing mode option 1236-2 and input 1240 on microphone mode control 1232. In response to detecting input 1238 on framing mode option 1236-2, device 600 enables the automatic framing mode. When the automatic framing mode is enabled, device 600 automatically reframes Jane's face in the outgoing video feed of device 600 in a manner similar to that discussed above with respect to FIGS. 6D and 6E. The reframing of Jane's face is depicted in video feed 1220-1 of John's tablet 600a in FIG. 12E. Additionally, device 600 updates indication 1231-1 to show framing mode is selected and bolds framing mode affordance 610, as shown in FIG. 12E.

In FIG. 12E, device 600 displays expanded microphone mode controls 1242 in response to input 1240 on microphone mode control 1232 in FIG. 12D. Expanded microphone mode controls 1242 provides an expanded listing of the audio options that are selectable for the application(s) accessing the microphone of device 600. Expanded microphone mode controls 1242 also includes settings option 1243 (similar to settings option 1237), which is selectable to access an audio/video settings menu (e.g., see FIG. 12S or 12U). In some embodiments, control settings interface 1225 is blurred or otherwise obscured in the background behind expanded microphone mode controls 1242.

The microphone mode options include default option 1242-1, voice isolation option 1242-2, and music option 1242-3. Default option 1242-1 corresponds to a default audio setting for the microphone in which the voice isolation setting and the music setting are both disabled. In some embodiments, selecting default option 1242-1 disables the voice isolation setting and the music setting. In some embodiments, when the default setting is enabled, device 600 filters out background audio detected using the microphone. Voice isolation option 1242-2 corresponds to a setting in which device 600 isolates audio that is identified as being a voice, such as a voice of a participant within frame of the camera (e.g., camera 602). For example, audio from Jane is isolated from background audio and/or voices of people who are not identified as being within the frame of camera preview 1208. Music option 1242-3 corresponds to a setting in which device 600 does not filter out audio and, in some embodiments, amplifies the audio detected via the microphone. When a microphone mode option is selected, the corresponding audio settings are applied to applications (e.g., a video conference application) that are currently using, or recently used, the microphone of device 600.

In the embodiment depicted in FIG. 12E, indication 1232-1 shows that default option 1242-1 is currently selected; however, this selection can also be indicated in different ways such as, e.g., by displaying a checkmark, highlighting, or other visual indication of which setting is currently selected or enabled. In some embodiments, one or more of the microphone mode options are disabled if they are not supported by the currently active microphone. For example, if the microphone does not support the voice isolation setting, voice isolation option 1242-2 can be omitted or shown struck through, greyed out, or otherwise not available for selection. In some embodiments, more than one microphone mode option can be concurrently enabled.

In FIG. 12E, device 600 detects input 1244 on music option 1242-3 and, in response, enables the music setting, as indicated by indication 1232-1 of microphone mode control 1232 in FIG. 12F.

In FIG. 12F, device 600 detects input 1246 and, in response, ceases displaying control settings interface 1225, as depicted in FIG. 12G.

In FIG. 12G, device 600 displays video conference UI 1205 while the automatic framing mode and the music setting are enabled. Device 600 detects input 1248 on mute option 1212, input 1250 on camera option 1213, and drag gesture input 1252. In response to the inputs in FIG. 12G, device 600 mutes and disables the respective audio and video transmitted for the video conference, and displays control settings interface 1225.

In FIG. 12H, device 600 displays control settings interface 1225. Video effects control 1231 includes an indication 1231-2 of the disabled state of camera 602, and microphone mode control 1232 includes an indication 1232-2 of the disabled state of the microphone. In the embodiment shown in FIG. 12H, indication 1231-2 indicates that the camera (e.g., camera 602) of device 600 is turned off. Accordingly, the video conference application (or any other application that uses the camera) is not able to access the camera. Similarly, indication 1232-2 indicates that the microphone of device 600 is turned off and currently is not accessible to the video conference application or any other application that uses the microphone. Accordingly, video conference interface 1215 of John's tablet 600a displays no video data in video feed 1220-1 and displays mute glyph 1254 and camera off glyph 1256 to denote the muted audio and disabled video feed of Jane's tablet.

In some embodiments, after the camera and microphone have not been accessed by an application for a specific period of time (e.g., three minutes, five minutes, ten minutes), device 600 does not display identifier 1227, video effects control 1231, and/or microphone mode control 1232 in control settings interface 1225. For example, FIG. 12I depicts an embodiment in which the video conference has been over for more than five minutes and no other application has accessed the camera or microphone during the five minute period. In this embodiment, device 600 displays control settings interface 1225 over home screen interface 1255, and identifier 1227, video effects control 1231, and microphone mode control 1232 are not displayed.

Referring now to FIG. 12J, device 600 displays video conference UI 1205 and detects input 1258 on camera preview 1208. In some embodiments, input 1258 is a tap gesture. In some embodiments, input 1258 is a de-pinch gesture.

In response to detecting input 1258, device 600 enlarges the camera preview and displays different controls, as depicted in FIG. 12K. For example, device 600 displays background blur affordance 611, zoom affordance 1260 (similar to zoom options 850-2 and 850-3), framing mode affordance 610, and camera flip affordance 1217 overlaid on camera preview 1208. Additionally, device 600 replaces effects affordance 1216 with effects menu 1262, which is displayed adjacent (e.g., below) camera preview 1208. Effects menu 1262 includes various effects options that can be selected to enable (or disable) a type of visual effect that is applied to the video feed of device 600. For example, effects option 1262-1 is selectable to enable or disable the display of virtual effects such as virtual avatars and/or virtual stickers in the camera feed.

In FIG. 12K, device 600 detects input 1264 on background blur affordance 611 and, in response, enables the background blur mode, as depicted in FIG. 12L.

In FIG. 12L, device 600 temporarily displays banner 1265 to inform the user (e.g., Jane) that the background blur mode was enabled on device 600. In some embodiments, a similar banner is displayed when the automatic framing mode is enabled. When the background blur mode is enabled, device 600 applies a visual effect (e.g., a blurring effect) to a background portion of the video feed for the video conference, without applying the visual effect to a portion of the video feed that includes the participant of the video conference. For example, in FIG. 12L, the blurred background effect is depicted in camera preview 1208 of device 600 and in video feed 1220-1 of John's tablet 600a. In the camera preview of device 600, background portion 1208-1 has a blurred effect (indicated by hatching), and portion 1208-2, which includes a representation of Jane, does not have a blurred effect (indicated by the absence of hatching). Similarly, in Jane's video feed on John's tablet 600a, background portion 1220-1a has the blurred effect (indicated by hatching), and portion 1220-1b, which includes a representation of Jane, does not have the blurred effect (indicated by the absence of hatching).

In some embodiments, the background blur mode is dynamic. For example, as Jane moves within the field-of-view of camera 602, device 600 updates the video feed in real time such that Jane remains displayed without the blurring effect, and the background portion (or any portion of the camera frame that does not include a portion of Jane) remains blurred. In FIG. 12M, Jane has moved within the field-of-view of camera 602, yet camera preview 1208 and video feed 1220-1 continue to show the background portion blurred while Jane remains unblurred.

In FIG. 12M, device 600 detects input 1268 on framing mode affordance 610 and, in response, enables the automatic framing mode concurrently with the background blur mode. As such, device 600 automatically reframes the position of Jane's face within the video feed while continuing to blur the background, as illustrated in camera preview 1208 and video feed 1220-1. In some embodiments, when the automatic framing mode (and, in some embodiments, the background blur mode) is enabled, device 600 disables various visual effect options. For example, in FIG. 12N, device 600 displays effects option 1262-1 having a greyed out appearance indicating that device 600 has disabled the display of the virtual effects associated with effects option 1262-1 (e.g., virtual avatars and/or virtual stickers) while the automatic framing mode is enabled.

The various video effect and microphone mode settings can be applied to different applications operating on device 600. For example, FIGS. 12O and 12P depict an embodiment in which control settings interface 1225 displays video effects control 1231 and microphone mode control 1232 while the camera and/or microphone is being accessed (or has been recently accessed) by multiple different applications (e.g., the video conference application and a messages application, as indicated by identifications 1227-1 and 1227-2, respectively). Control settings interface 1225 is displayed over messages application interface 1270 and includes video effects control 1231 and microphone mode control 1232. Video effects control 1231 includes indication 1231-1 indicating that the video effects settings are being applied to multiple applications. Similarly, microphone mode control 1232 includes indication 1232-1 indicating that the audio settings are being applied to multiple applications.

FIG. 12P depicts expanded video effects controls 1236, which are displayed in response to input 1272 in FIG. 12O, and expanded microphone mode controls 1242, which are displayed in response to input 1274 in FIG. 12O. In some embodiments, the expanded video effects controls and the expanded microphone mode controls are displayed sequentially (in response to respective inputs 1272 and 1274), and in some embodiments, they are displayed concurrently as shown in FIG. 12P.

Expanded video effects controls 1236 includes first region 1276-1 that includes the video effects options (similar to video effects options 1236-1 to 1236-3) for the video conference application and second region 1276-2 that includes the video effects options for the messages application. Similarly, expanded microphone mode controls 1242 includes first region 1278-1 that includes the microphone mode options (similar to microphone mode options 1242-1 to 1242-3) for the video conference application and second region 1278-2 that includes the microphone mode options for the messages application.

In some embodiments, the various video effect and microphone mode settings can be applied to applications operating on a different device such as, for example, laptop 1200. In some embodiments, laptop 1200 includes one or more features of devices 100, 300, 500, or 600. For example, FIGS. 12Q and 12R depict an embodiment in which laptop 1200 displays, on display 1200-1, control settings interface 1280 (similar to control settings interface 1225) having video effects control 1281 (similar to video effects control 1231) and microphone mode control 1282 (similar to microphone mode control 1232) while camera 1200-2 and/or microphone of laptop 1200 is being accessed (or has been recently accessed) by multiple different applications (e.g., a movies application and a voice recorder application as indicated by identifications 1284-1 and 1284-2, respectively). Control settings interface 1280 is displayed partially over voice recorder application window 1285 and includes video effects control 1281 and microphone mode control 1282. Video effects control 1281 includes indication 1281-1 indicating that the video effects settings are being applied to multiple applications operating at laptop 1200. Similarly, microphone mode control 1282 includes indication 1282-1 indicating that the audio settings are being applied to multiple applications operating at laptop 1200.

In FIG. 12Q, control settings interface 1280 includes expanded video effects controls 1286, which are displayed in response to an input (e.g., a mouse click) on video effects control 1281. Expanded video effects controls 1286 are similar to the expanded video effects controls 1236 in FIG. 12P. In FIG. 12R, control settings interface 1280 includes expanded microphone mode controls 1288, which are displayed in response to an input (e.g., a mouse click) on microphone mode control 1282. Expanded microphone mode controls 1288 are similar to the expanded microphone mode controls 1242 in FIG. 12P.

Figure 12S:
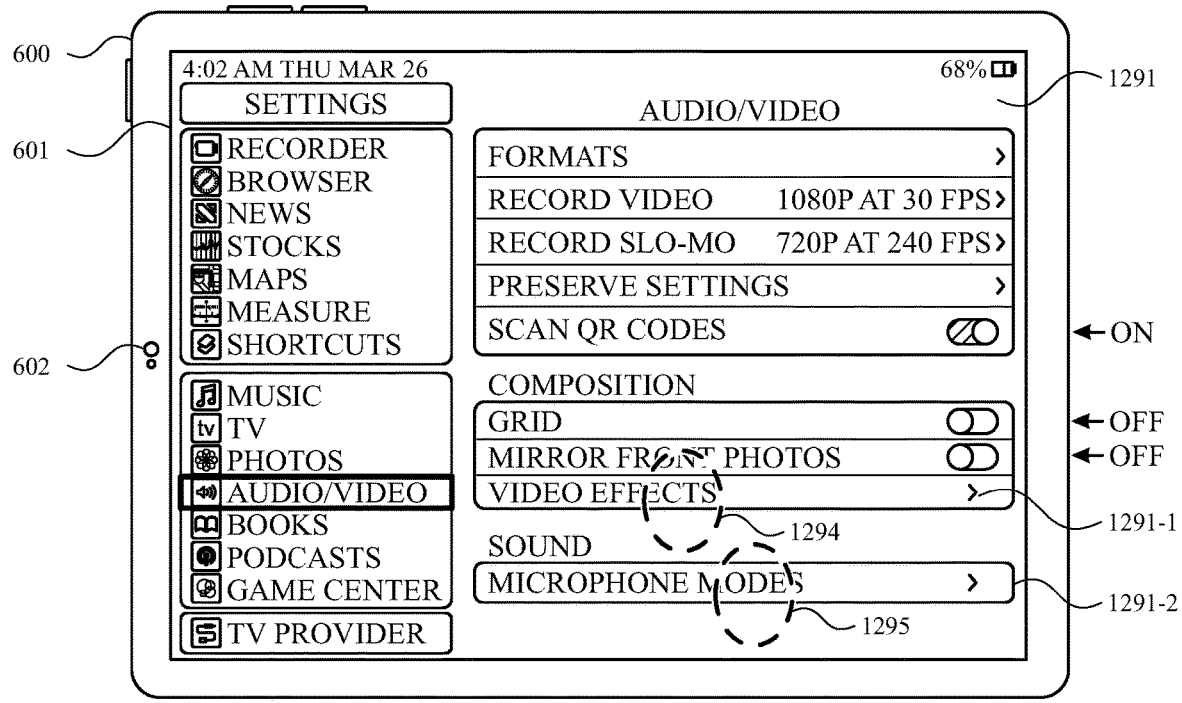
Figure 12T:
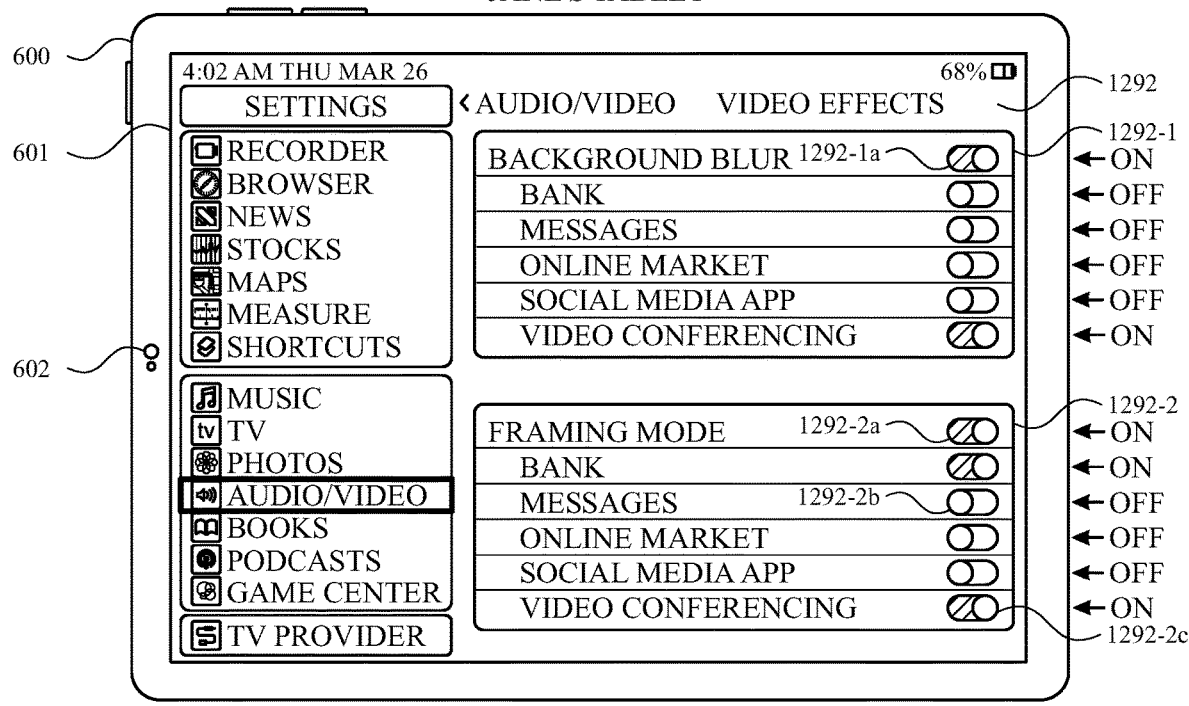
Figure 12U:
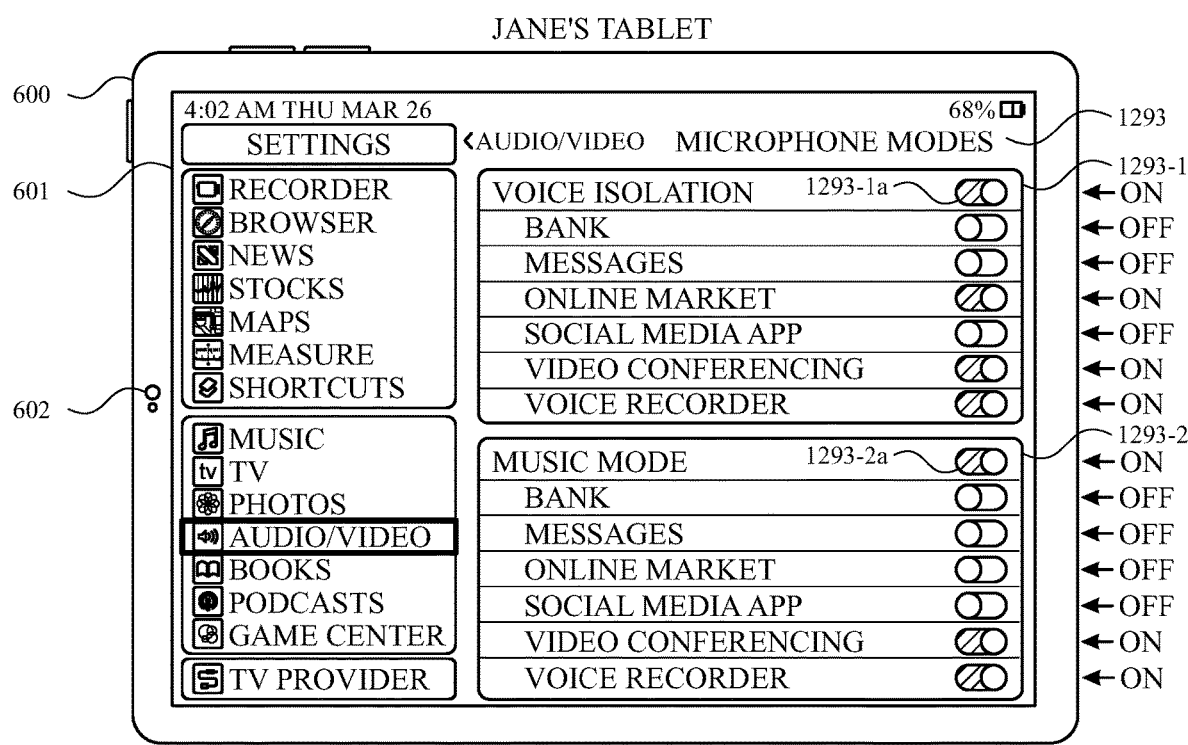

FIGS. 12S-12T depict example interfaces of a settings user interface on device 600. In some embodiments, the settings interface is displayed in response to an input on settings option 1237 or settings option 1243. For example, in response to input 1290 on settings option 1237 in FIG. 12D, device 600 displays audio/video settings interface 1291 in FIG. 12S or video effects settings interface 1292 in FIG. 12T. In some embodiments, in response to an input on settings option 1243 in FIG. 12E, device 600 displays audio/video settings interface 1291 in FIG. 12S or microphone mode settings interface 1293 in FIG. 12U. In some embodiments, the settings depicted in FIGS. 12S-12T can be accessed to control the video effects and microphone mode settings even when the camera and/or microphone of device 600 is not in use or has not been recently used.

FIG. 12S depicts audio/video settings interface 1291, which includes video effects settings option 1291-1 and microphone mode settings option 1291-2.

FIG. 12T depicts video effects settings interface 1292, which, in some embodiments, is displayed in response to detecting input 1294 on video effects settings option 1291-1. Video effects settings interface 1292 includes background blur settings 1292-1, which include toggle switches (e.g., 1292-1*a*) for globally enabling or disabling the background blur mode (e.g., similar to selecting background blur affordance 611) and for selectively enabling or disabling the background blur mode feature for specific applications. Video effects settings interface 1292 also includes framing mode settings 1292-2, which include toggle switches (e.g., 1292-2*a*) for globally enabling or disabling the automatic framing mode (e.g., similar to selecting framing mode affordance 610) and for selectively enabling or disabling the automatic framing mode feature for specific applications.

FIG. 12U depicts microphone mode settings interface 1293, which, in some embodiments, is displayed in response to detecting input 1295 on microphone mode settings option 1291-2. Microphone mode settings interface 1293 includes voice isolation settings 1293-1, which include toggle switches (e.g., 1293-1*a*) for globally enabling or disabling the voice isolation mode and for selectively enabling or disabling the voice isolation mode feature for specific applications. Microphone mode settings interface 1293 also includes music mode settings 1293-2, which include toggle switches (e.g., 1293-2*a*) for globally enabling or disabling the music mode feature and for selectively enabling or disabling the music mode feature for specific applications.

In some embodiments, device 600 can enable or disable a dynamic video quality mode in which portions of the video feed captured from device 600 for the video conference are compressed by different amounts, which can result in the video feed received from device 600 having different video qualities for different portions of the video feed. For example, device 600 compresses portions of the video feed that do not include a detected face and does not compress (or compresses by a lesser amount) portions of the video feed that include a detected face. In some embodiments, the degree of compression is inversely related to video quality. As a result, the video feed that is transmitted for the video conference is displayed at the recipient device having an increased video quality for the portions of the video feed that include a detected face and having a reduced video quality for the portions of the video feed that do not include a detected face.

The dynamic video quality mode can be enabled for device 600 and/or device 600*a*. For example, referring to the embodiments discussed with respect to FIGS. 12A-12U, when the dynamic video quality feature is enabled, device 600 transmits the video feed from Jane's tablet to John's tablet 600*a* such that video feed 1220-1 has increased video quality for a portion that includes Jane's face (e.g., portion 1220-1*b*), and has reduced video quality for portions that do not include Jane's face (e.g., portion 1220-1*a*). As another example, and with reference to the embodiments discussed with respect to FIGS. 10H-10J, when the dynamic video quality feature is enabled for John's device 600*a*, device 600*a* transmits the video feed from John's device 600*a* to device 600 such that video feed 1023 has increased video quality for a portion that includes John's face (e.g., a foreground portion of the video feed), and has reduced video quality for portions that do not include John's face (e.g., a background portion of the video feed).

In some embodiments, when the dynamic video quality mode is enabled, device 600 (or device 600*a*) automatically adjusts the amounts by which the various portions of the video feed are compressed based on a change (e.g., increase or decrease) in the bandwidth available for transmitting the video feed for the video conference. As a result, as the bandwidth increases or decreases, the video quality of the portions of the video feed that do not include the face (e.g., the background portion) varies (increases or decreases) more than the video quality of the face (which is held at a relatively constant, relatively high quality, even as the quality of the background portion increases/decreases).

In some embodiments, when the dynamic video quality mode is enabled and device 600 (or device 600*a*) does not detect any faces within the field-of-view of the camera (e.g., camera 602), device 600 (or device 600*a*) compresses the video feed at a relatively uniform amount so that the quality of the video feed remains relatively uniform. In some embodiments, when the dynamic video quality mode is enabled and device 600 (or device 600*a*) detects one or more faces, device 600 (or device 600*a*) dynamically varies the compression of the different portions of the video feed as the face(s) moves such that the resulting display of the video feed (e.g., video feed 1220-1 at John's device 600*a*) maintains a relatively high video quality of the face as it moves within the frame, while also displaying the other portions of the video feed at the lower video quality. In some embodiments, the lower compression amount (e.g., the higher video quality) is optionally applied to a single face (e.g., when either one face or multiple faces are detected within the field-of-view of camera 602). In some embodiments, the lower compression amount (e.g., the higher video quality) is optionally applied to multiple faces concurrently.

In some embodiments, the dynamic video quality mode is implemented independently from the background blur feature and the automatic framing feature. In some embodiments, device 600 displays a separate affordance (e.g., similar to framing mode affordance 610 or background blur affordance 611) that is selectable to enable or disable the dynamic video quality mode. In some embodiments, the dynamic video quality mode is integrated with the background blur feature or the automatic framing feature such that the dynamic video quality mode is enabled/disabled when the background blur mode or automatic framing mode is enabled/disabled.

FIG. 13 is a flow diagram illustrating a method for managing a live video communication session using a computer system in accordance with some embodiments. Method 1300 is performed at a computer system (e.g., 600, 1200) (e.g., a smartphone, a tablet, a wearable device (e.g., a smartwatch), a desktop or laptop computer) that is in communication with one or more output generation components (e.g., 601, 1200-1) (e.g., a display controller, a touch-sensitive display system, a speaker, a bone conduction audio output device, a tactile output generator, a projector, and/or a holographic display) and one or more input devices (e.g., 601) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the computer system is in communication with one or more media recording devices (e.g., a microphone, a camera (e.g., an infrared camera, a depth camera, a visible light camera). Some operations in method 1300 are, optionally, combined, the orders of some operations are, optionally, changed, and some operations are, optionally, omitted.

As described below, method 1300 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

The computer system (e.g., 600) detects (1302), via the one or more input devices (e.g., 601), a request (e.g., 1222, 1252) to display a system interface (e.g., 1225, 1280) (e.g., a control settings interface that includes selectable options for controlling various settings associated with the computer system).

In response to detecting the request to display the system interface (e.g., 1225, 1280), the computer system (e.g., 600) displays (1304), via the one or more output generation components (e.g., 601), the system interface that includes a plurality of concurrently displayed controls for controlling different system functions of the computer system (e.g., display brightness, media controls, system volume, do not disturb, flashlight, wireless communication modes), including: in accordance with a determination (1306) that a media communication session (e.g., a video communication session, a video chat session, a phone call) (e.g., the microphone and/or camera are currently active (e.g., the microphone is recording audio data) (e.g., the camera is recording video data)) has been active within a predetermined amount of time, the plurality of concurrently displayed controls includes a set of one or more media communication controls (e.g., 1231, 1232) (e.g., a graphical user interface object that is selectable to control (e.g., select, change, enable, disable) one or more settings of the microphone; a graphical user interface object that is selectable to control (e.g., select, change, enable, disable) one or more settings of the camera), wherein the media communication controls provide access to media communication settings that determine how media (e.g., audio and/or image (e.g., video) data) is handled (e.g., controlled, modified, generated, produced, filtered, displayed, processed) by the computer system (e.g., while using one or more media recording devices) during media communication sessions (e.g., real-time communication sessions such as phone calls or video calls); and in accordance with a determination (1308) that a media communication session has not been active within the predetermined amount of time, the plurality of concurrently displayed controls (e.g., the controls in control settings interface 1225) are displayed without the set of one or more media communication controls (e.g., controls 1231 and/or 1232 are not displayed in control settings interface 1225 of FIG. 12I).

While displaying (1310) the system interface (e.g., 1225) having the set of one or more media communication controls (e.g., 1231, 1232), the computer system (e.g., 600) detects, via the one or more input devices (e.g., 601), a set of one or more inputs including an input (e.g., 1234, 1240, 1272, 1274) directed to the set of one or more media communication controls (e.g., a selection of one or more of the media controls).

In response to detecting (1312) the set of one or more inputs including the input (e.g., 1234, 1240, 1272, 1274) directed to the set of one or more media communication controls (e.g., 1231, 1232) when a respective media communication session has been active within the predetermined amount of time, the computer system (e.g., 600) adjusts the media communication settings for the respective media communication session (e.g., adjusting a microphone setting for recording audio data; adjusting a camera setting for recording video data). Displaying the plurality of concurrently displayed controls with or without the media communication controls, depending on whether or not a media communication session has been active within a predetermined amount of time provides additional controls for accessing media communication settings without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a camera control (e.g., 1231, 1236, 1281, 1286) (e.g., a graphical user interface object that is selectable to control one or more settings of the camera) (e.g., without displaying a microphone control). Displaying the set of one or more media communication controls including a camera control provides feedback to a user of the computer system that the camera has been accessed during the media communication session and provides additional controls for accessing camera settings without cluttering the user interface with additional displayed controls until an input is detected and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a microphone control (e.g., 1232, 1242, 1282, 1288) (e.g., a graphical user interface object that is selectable to control one or more settings of the microphone) (e.g., without displaying a camera control). Displaying the set of one or more media communication controls including a microphone control provides feedback to a user of the computer system that the microphone has been accessed during the media communication session and provides additional controls for accessing microphone settings without cluttering the user interface with additional displayed controls until an input is detected and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the set of one or more media communication controls includes concurrently displaying a camera control (e.g., 1231, 1236, 1281, 1286) and a microphone control (e.g., 1232, 1242, 1282, 1288) (e.g., the camera control and the microphone control are displayed concurrently in the system interface). Displaying the set of one or more media communication controls including concurrently displaying a camera control and a microphone control provides feedback to a user of the computer system that the camera and microphone have been accessed during the media communication session and provides additional controls for accessing camera and microphone settings without cluttering the user interface with additional displayed controls until an input is detected and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a camera control (e.g., 1231, 1236, 1281, 1286) (e.g., a graphical user interface object that is selectable to control one or more settings of the camera) that, when selected, changes a communication setting of a camera (e.g., 602) (e.g., initiates a process for changing a communication setting (e.g., a visual effects mode) of the camera), and displaying the set of one or more media communication controls includes: in accordance with a determination that the camera is in an enabled state (e.g., is currently in use; is currently enabled) (e.g., and the media communication session has been active within the predetermined amount of time), displaying the camera control having a first visual appearance indicative of the enabled state of the camera (e.g., 1231 in FIG. 12C) (e.g., having a visual effect that indicates that the camera is enabled (e.g., the camera control is highlighted, bolded, emphasized, or is displayed having a default appearance)); and in accordance with a determination that the camera is in a disabled state (e.g., is not currently in use; is currently disabled or turned off) (e.g., and the media communication session has been active within the predetermined amount of time), displaying the camera control having a second visual appearance, different from the first visual appearance, indicative of the disabled state of the camera (e.g., 1231 in FIG. 12H) (e.g., the camera control is displayed having a visual effect (e.g., a strikethrough, blurring, darkening, shading, desaturating, or otherwise deemphasizing effect) that indicates the camera is disabled). Displaying the camera control having a visual appearance indicative of an enabled or disabled state of the camera provides feedback to a user of the computer system whether or not the camera is currently enabled for the media communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a microphone control (e.g., 1232, 1242, 1282, 1288) (e.g., a graphical user interface object that is selectable to control one or more settings of the microphone) that, when selected, changes a communication setting of a microphone (e.g., initiates a process for changing a communication setting (e.g., an audio processing mode or audio effects mode) of the microphone), and displaying the set of one or more media communication controls includes: in accordance with a determination that the microphone is in an enabled state (e.g., is currently in use; is currently enabled) (e.g., and the media communication session has been active within the predetermined amount of time), displaying the microphone control having a third visual appearance indicative of the enabled state of the microphone (e.g., 1232 in FIG. 12C) (e.g., having a visual effect that indicates that the microphone is enabled (e.g., the microphone control is highlighted, bolded, emphasized, or is displayed having a default appearance)); and in accordance with a determination that the microphone is in a disabled state (e.g., is not currently in use; is currently disabled or turned off) (e.g., and the media communication session has been active within the predetermined amount of time), displaying the microphone control having a fourth visual appearance, different from the third visual appearance, indicative of the disabled state of the microphone (e.g., 1232 in FIG. 12H) (e.g., the microphone control is displayed having a visual effect (e.g., a strikethrough, blurring, darkening, shading, desaturating, or otherwise deemphasizing effect) that indicates the microphone is disabled). Displaying the microphone control having a visual appearance indicative of an enabled or disabled state of the microphone provides feedback to a user of the computer system whether or not the microphone is currently enabled for the media communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the system interface (e.g., 1225, 1280) with the plurality of concurrently displayed controls that include the set of one or more media communication controls includes: in accordance with a determination that one or more media communication settings (e.g., 1236-1, 1236-2, 1236-3, 1242-1, 1242-2, 1242-3) (e.g., camera settings (e.g., a framing mode setting, a background blur setting, a default setting) and/or microphone settings (e.g., a default setting, a voice isolation setting, a music setting)) are enabled (e.g., selected), displaying the set of one or more media communication controls (e.g., 1236, 1242) (e.g., a camera control and/or a microphone control) having a visual appearance indicative of an enabled state of the set of one or more media communication settings (e.g., displaying text, highlighting, a checkmark (e.g., in region 1276-1, 1276-2, 1278-1, and/or 1278-2 of FIG. 12P), bolding, an emphasizing visual effect, and/or other visual indication of the enabled media communication setting(s)); and in accordance with a determination that one or more media communication settings are disabled (e.g., not selected, not enabled), displaying the set of one or more media communication controls having a visual appearance indicative of a disabled state of the one or more media communication settings (e.g., displaying text, strikethrough, a deemphasizing visual effect, and/or other visual indication of the disabled media communication setting(s) (e.g., not displaying a checkmark or other visual indication as depicted in FIG.

12P)). Displaying the set of one or more media communication controls having a visual appearance indicative of an enabled or disabled state of the one or more media communication settings provides feedback to a user of the computer system whether or not media communication settings are currently enabled for the media communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the visual appearance indicative of the enabled or disabled state of the set of one or more media communication settings is independent of the visual appearance indicating whether or not the microphone and/or camera is enabled or disabled. For example, the camera control can be displayed with an indication of the enabled or disabled state of the media communication settings (e.g., showing a default, background blur, or framing mode is enabled or disabled) and an indication that the camera is disabled or enabled (e.g., showing the camera control in a shaded appearance when the camera is disabled and a non-shaded appearance when the camera is enabled). Similarly, the microphone control can be displayed with an indication of the enabled or disabled state of the media communication settings (e.g., showing a default, voice isolation, or music mode is enabled or disabled) and an indication that the microphone is disabled or enabled (e.g., showing the microphone control in a shaded appearance when the microphone is disabled and a non-shaded appearance when the microphone is enabled).

In some embodiments, displaying the system interface (e.g., 1225, 1280) with the plurality of concurrently displayed controls that include the set of one or more media communication controls (e.g., 1231, 1232) includes: in accordance with a determination that a first media communication setting (e.g., 1236-1, 1236-2, 1236-3, 1242-1, 1242-2, 1242-3) (e.g., a camera setting (e.g., a framing mode setting, a background blur setting, a default setting); a microphone setting (e.g., a default setting, a voice isolation setting, a music setting)) associated with a first media communication control (e.g., 1231, 1232) (e.g., a camera control, a microphone control) is enabled (e.g., selected), displaying the first media communication control having a first visual appearance (e.g., 1231-1 in FIG. 12C; 1232-1 in FIG. 12C) indicative of the enabled state of the first media communication setting (e.g., displaying text, highlighting, a checkmark, and/or other visual indication of the enabled media communication setting); and in accordance with a determination that a second media communication setting associated with the first media communication control, different from the first media communication setting, is enabled (e.g., the first media communication setting is not selected; a different media communication setting is selected), displaying the first media communication control having a second visual appearance (e.g., 1231-1 in FIG. 12E; 1232-1 in FIG. 12F), different from the first visual appearance, indicative of the enabled state of the second media communication setting (e.g., displaying text, highlighting, a checkmark, and/or other visual indication that the second set of media communication settings are enabled). Displaying the first media communication control having a first visual appearance indicative of an enabled state of the first or second media communication setting provides feedback to a user of the computer system of whether the first media communication setting is enabled or the second media communication setting is enabled. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a first camera control option (e.g., 1236-3) (e.g., a background blur option) that is selectable to initiate a process for changing an appearance (e.g., applying a visual effect that blurs, obscures, darkens, shades, or otherwise deemphasizes) of a representation of a background portion (e.g., 1208-1, 1220-1*a*) of a field-of-view of a camera (e.g., 602) (e.g., a portion of the camera field-of-view that does not include a subject) (e.g., without applying the visual effect to a foreground portion (e.g., a portion that includes the subject) of the camera field-of-view) (e.g., as discussed with respect to FIGS. 12K-12N and FIG. 14). Displaying the set of one or more media communication controls including the first camera control option provides additional controls for quickly and easily changing an appearance of a representation of a background portion of a field-of-view of a camera without cluttering the user interface with additional displayed controls until an input is detected and avoids accidental inputs while the additional control options are not displayed. Easily changing the appearance of (e.g., hiding) the background provides privacy benefits to the user of the computer system by preventing the display of the background (e.g., to other participants of the live video communication session and, in some embodiments, to the application hosting the live video communication session). Providing privacy benefits and additional control options without cluttering the user interface with additional displayed controls, and avoiding accidental inputs, enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system (e.g., 600) detects a selection of the first camera control option (e.g., 1264) and, in response, initiates a process for changing an appearance of a representation of a background portion of a field-of-view of a camera (e.g., 1208-1, 1220-1*a*), including applying a visual effect to the representation of the background portion of the field-of-view of the camera.

In some embodiments, the set of one or more media communication controls includes a second camera control option (e.g., 1236-2) (e.g., a framing mode option) that is selectable to enable a mode (e.g., automatic framing mode) for automatically adjusting a representation of a field-of-view of one or more cameras (e.g., 1208, 1220-1) (e.g., during a live video communication session) based on a change in position of a subject detected in the field-of-view of the one or more cameras (e.g., 602) (e.g., as discussed with respect to FIGS. 6A-6Q and FIGS. 7A-7B). Displaying the set of one or more media communication controls including the second camera control option provides additional controls for enabling a mode for automatically adjusting a representation of a field-of-view of one or more cameras based on a change in position of a subject detected in the field-of-view without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the framing mode option is selectable to enable/disable a mode for: 1) tracking (e.g., during a live video communication session) a position and/or location of one or more subjects detected within a field-of-view of the one or more cameras, and 2) automatically adjusting a displayed view of the subject(s) (e.g., during the live video communication session) based on the tracking of the subject. In some embodiments, the computer system (e.g., 600) detects a selection of the second camera control option and, in response, enables (or disables) the mode for automatically adjusting the representation of the field-of-view of the one or more cameras based on a change in position of a subject detected in the field-of-view of the one or more cameras.

In some embodiments, the second camera control option (e.g., 1236-2) is disabled (e.g., not displayed; displayed having a visual appearance indicative of the disabled state (e.g., greyed out, struck through, or otherwise visually deemphasized)) when the one or more cameras (e.g., 602) are not compatible with the mode for automatically adjusting a representation of a field-of-view of the one or more cameras (e.g., the camera is not a wide angle camera). Disabling the second camera control option when the one or more cameras are not compatible with the mode for automatically adjusting a representation of a field-of-view of the one or more cameras provides feedback to a user of the computer system that the mode is not available and reduces inputs at the computer system by informing the user that the second camera control option is not selectable. Providing improved feedback and reducing inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more media communication controls includes a first microphone control option (e.g., 1242-2) (e.g., a voice isolation mode option) that is selectable to enable a voice isolation mode for a microphone (e.g., a mode for isolating audio (e.g., a voice) that is identified as being within frame of a camera (e.g., the audio is originating from a source (e.g., a person) that is positioned within a field-of-view of a camera); a mode for filtering out audio that is not identified as being within frame of the camera). Displaying the set of one or more media communication controls including the first microphone control option provides additional controls for enabling a voice isolation mode for a microphone without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system (e.g., 600) detects a selection of the first microphone control option and, in response, enables (or disables) the voice isolation mode for the microphone.

In some embodiments, the set of one or more media communication controls includes a second microphone control option (e.g., 1242-3) (e.g., a music mode option) that is selectable to enable a music emphasis mode for a microphone (e.g., a mode that does not filter out audio and, optionally, amplifies audio (e.g., background audio)). Displaying the set of one or more media communication controls including the second microphone control option provides additional controls for enabling a music emphasis mode for a microphone without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the second microphone control option and, in response, enables (or disables) the music emphasis mode for the microphone.

In some embodiments, the set of one or more media communication controls includes a third microphone control option (e.g., 1242-1) (e.g., a default mode option) that is selectable to enable a mode (e.g., a default mode) for filtering background noise using a microphone (e.g., a mode for filtering out audio (e.g., background audio)). Displaying the set of one or more media communication controls including the third microphone control option provides additional controls for enabling a mode for filtering background noise using a microphone without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the third microphone control option and, in response, enables (or disables) the mode for filtering background noise using a microphone.

In some embodiments, the computer system (e.g., 600) receives an input directed to the set of one or more media communication controls (e.g., 1238, 1244) (e.g., a selection of a camera setting option; a selection of a microphone mode option). In response to receiving the input directed to the set of one or more media communication controls, the computer system changes media communication settings in a first manner (e.g., enabling a default camera mode; enabling an automatic framing mode for a camera; enabling a background blur option for a camera; enabling a default microphone mode; enabling a voice isolation mode for a microphone; enabling a music mode for a microphone) for a first application (e.g., a camera application) operating at the computer system, and changes media communication settings in the first manner for a second application (e.g., a video conference application) operating at the computer system different from the first application. Changing media communication settings in the first manner for both the first application and the second application conserves computational resources and reduces inputs at the computer system by applying a selected media communication setting for multiple applications without requiring the user to select the settings individually for each application. Reducing inputs and conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the system interface (e.g., 1225, 1280) with the plurality of concurrently displayed controls that include the set of one or more media communication controls (e.g., 1231, 1232) includes: in accordance with a determination that a camera (e.g., 602) (optionally, and/or microphone) has been active within the predetermined amount of time, displaying the set of one or more media communication controls (e.g., a microphone control (e.g., 1232) and/or text (e.g., 1227) indicating a name of an application that is currently using (or has recently used) the camera and/or microphone) concurrently with a camera control (e.g., 1231) (e.g., a graphical user interface object that is selectable to control (e.g., select, change, enable, disable) one or more settings of the camera); and in accordance with a determination that the camera has not been active within the predetermined amount of time, displaying the set of one or more media communication controls without displaying the camera control (e.g., forgoing displaying the camera control while displaying other controls for controlling different system functions of the computer system). Displaying the set of one or more media communication controls concurrently with the camera control, or without displaying the camera control, depending on whether or not the camera has been active within the predetermined amount of time provides additional controls for the camera without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the camera control is displayed if the camera has been used recently, even if the camera is not currently in use. In some embodiments, displaying the set of one or more media communication controls includes displaying text that indicates the name of the application that is currently (or was recently) using the camera and/or microphone.

In some embodiments, displaying the system interface (e.g., 1225, 1280) with the plurality of concurrently displayed controls that include the set of one or more media communication controls (e.g., 1231, 1232) includes: in accordance with a determination a microphone (optionally, and/or camera) has been active within the predetermined amount of time, displaying the set of one or more media communication controls (e.g., a camera control (e.g., 1231) and/or text (e.g., 1227) indicating a name of an application that is currently using (or has recently used) the camera (e.g., 602) and/or microphone) concurrently with a microphone audio control (e.g., 1232) (e.g., a graphical user interface object that is selectable to control (e.g., select, change, enable, disable) one or more settings of the microphone); and in accordance with a determination that the microphone has not been active within the predetermined amount of time, displaying the set of one or more media communication controls without displaying the microphone audio control (e.g., forgoing displaying the microphone control while displaying other controls for controlling different system functions of the computer system). Displaying the set of one or more media communication controls with or without the microphone audio control depending on whether or not the microphone has been active within the predetermined amount of time provides additional controls for the microphone without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the microphone control is displayed if the microphone has been used recently, even if the microphone is not currently in use. In some embodiments, displaying the set of one or more media communication controls includes displaying text that indicates the name of the application that is currently (or was recently) using the camera and/or microphone.

In some embodiments, displaying the system interface (e.g., 1225, 1280) with the plurality of concurrently displayed controls that include the set of one or more media communication controls (e.g., 1231, 1232) includes displaying a representation (e.g., 1227, 1227-1, 1227-2) of one or more applications (e.g., text identifying the application(s) (e.g., "camera" and/or "video conference")) associated with a media communication session that has been active within the predetermined amount of time (e.g., the system interface displays the names of applications that are, or have been recently, using the camera and/or microphone during the media communication session). Displaying a representation of one or more applications associated with a media communication session that has been active within the predetermined amount of time provides feedback to a user of the computer system indicating which applications have recently been active for a media communication session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the system interface (e.g., 1225, 1280) with the plurality of concurrently displayed controls that include the set of one or more media communication controls (e.g., 1231, 1232) includes displaying a graphical user interface object (e.g., 1237, 1243) (e.g., a link to a settings interface) that is selectable to display a user interface (e.g., 1291, 1292, 1293) (e.g., a settings interface) that includes the media communication settings (e.g., 1291-1, 1291-2, 1292-1, 1292-2, 1293-1, 1293-2) that determine how media is handled by the computer system (e.g., 600) during media communication sessions. Displaying a graphical user interface object that is selectable to display a user interface that includes the media communication settings provides additional controls for accessing the media communication settings without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the graphical user interface object and, in response, displays the user interface that includes the media communication settings that determine how media is handled by the computer system during media communication sessions.

In some embodiments, displaying the system interface (e.g., 1225, 1280) with the plurality of concurrently displayed controls that include the set of one or more media communication controls includes: displaying a first set of media communication controls (e.g., 1292-1, 1293-1) for a first media communication device (e.g., a camera (e.g., 602); a microphone), wherein the first set of media communication controls provides access to media communication settings that determine how media (e.g., video data; audio data) is handled using the first media communication device during a media communication session provided via a first application (e.g., a "video conferencing" application (e.g., see FIG. 12T)); and displaying a second set of media communication controls for the first media communication device (e.g., 1292-2, 1293-2), wherein the second set of media communication controls provides access to media communication settings that determine how media is handled using the first media communication device during a media communication session provided via a second application different from the first application (e.g., a "messages" application (e.g., see FIG. 12T)). Displaying a first set of media communication controls for a first media communication device that provides access to media communication settings that determine how media is handled for a first application, and displaying a second set of media communication controls for the first media communication device that provides access to media communication settings that determine how media is handled for a second application provides additional application-specific controls for the first media communication device without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while a media communication session has not been active within the predetermined amount of time: the computer system (e.g., 600) receives, via the one or more input devices (e.g., 601), an input (e.g., 1290, 1294, 1295) corresponding to a request to display a settings user interface (e.g., a selection of the link to the settings interface displayed with the media communication controls; a selection of a menu option in a settings application for the computer system). In response to receiving the input corresponding to the request to display the settings user interface, the computer system displays, via the one or more output generation components (e.g., 601), a settings user interface (e.g., 1291, 1292, 1293) that includes the media communication settings that determine how media is handled by the computer system during media communication sessions. Displaying the settings user interface that includes the media communication settings in response to the input corresponding to the request to display the settings user interface provides additional controls for determining how media is handled by the computer system during media communication sessions when a media communication session has not been active within the predetermined amount of time without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the settings user interface (e.g., 1292) includes a selectable option (e.g., 1292-1*a*) for enabling (and/or disabling) a first media communication setting for changing an appearance (e.g., applying a visual effect that blurs, obscures, darkens, shades, or otherwise deemphasizes) of a representation of a background portion (e.g., 1208-1, 1220-1*a*) of a field-of-view of a camera (e.g., 602) (e.g., a portion of the camera field-of-view that does not include a subject) (e.g., without applying the visual effect to a foreground portion (e.g., a portion that includes the subject) of the camera field-of-view) (e.g., as discussed with respect to FIGS. 12K-12N and FIG. 14), wherein the first media communication setting corresponds to (e.g., applies to, controls, affects) applications (e.g., all applications) operating at the computer system that use the camera. Displaying the settings user interface having a selectable option for enabling a first media communication setting for changing an appearance of a representation of a background portion of a field-of-view of a camera for applications operating at the computer system that use the camera provides additional controls for quickly and easily enabling the first media communication setting without cluttering the user interface with additional displayed controls until an input is detected and avoids accidental inputs while the additional control options are not displayed. Easily changing the appearance of (e.g., hiding) the background provides privacy benefits to the user of the computer system by preventing the display of the background (e.g., to other participants of the live video communication session and, in some embodiments, to the applications operating at the computer system that use the camera). Providing privacy benefits and additional control options without cluttering the user interface with additional displayed controls, and avoiding accidental inputs, enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the selectable option and, in response, enables (or disables) the first media communication setting for changing an appearance of a representation of a background portion of a field-of-view of a camera.

In some embodiments, the settings user interface (e.g., 1293) includes a selectable option (e.g., 1293-1*a*, 1293-2*a*) for enabling (and/or disabling) a third media communication setting for changing an audio setting of a microphone (e.g., a default setting, a voice isolation setting, a music emphasis setting), wherein the third media communication setting corresponds to (e.g., applies to; controls; affects) applications (e.g., all applications) operating at the computer system that use the microphone. Displaying the settings user interface having a selectable option for enabling a third media communication setting for changing an audio setting of a microphone for applications operating at the computer system that use the microphone provides additional controls for quickly and easily changing an audio setting of the microphone without cluttering the user interface with additional displayed controls until an input is detected and avoids accidental inputs while the additional control options are not displayed. Easily changing the audio setting of the microphone reduces computational resources used by the computer system to generate and/or process unnecessary audio. Providing additional control options without cluttering the user interface with additional displayed controls, avoiding accidental inputs, and reducing computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the selectable option and, in response, enables (or disables) the third media communication setting for changing an audio setting of a microphone.

In some embodiments, the settings user interface (e.g., 1292) includes a plurality of controls (e.g., 1292-2) corresponding to a mode (e.g., automatic framing mode) for automatically adjusting a representation (e.g., 1208, 1220-1) of a field-of-view of one or more cameras (e.g., 602) (e.g., during a live video communication session) based on a change in position of a subject detected in the field-of-view of the one or more cameras (e.g., as discussed with respect to FIGS. 6A-6Q and FIGS. 7A-7B). In some embodiments, the plurality of controls includes a first control (e.g., 1292-2*b*) that is selectable to enable (and/or disable) the mode for a first application (e.g., a "messages" application) operating at the computer system (e.g., 600) that uses the camera In some embodiments, the computer system detects a selection of the first control and, in response, enables (or disables) the mode for the first application operating at the computer system that uses the camera. In some embodiments, the plurality of controls includes a second control (e.g., 1292-2*c*) that is selectable to enable (and/or disable) the mode for a second application (e.g., a "video conferencing" application), different from the first application, operating at the computer system that uses the camera. In some embodiments, the computer system detects a selection of the second control and, in response, enables (or disables) the mode for the second application operating at the computer system that uses the camera.

In some embodiments, displaying the system interface (e.g., 1225, 1280) with the plurality of concurrently displayed controls that include the set of one or more media communication controls (e.g., 1231, 1232) includes: in accordance with a determination that a media communication session has been active within the predetermined amount of time, displaying the set of one or more media communication controls in a first region (e.g., 1225-1) of the system interface (e.g., a region located at a top portion of the system interface) and displaying a set of one or more system controls in a second region (e.g., 1225-2) of the system interface (e.g., a region that is positioned below (e.g., and does not overlap) the first region of the system interface); and in accordance with a determination that a media communication session has not been active within the predetermined amount of time, displaying the set of one or more system controls at least partially in the first region of the system interface (e.g., one or more of the system controls are shifted upward into the first region when the media communication controls are not displayed (e.g., see FIG. 12I)). Displaying the set of one or more media communication controls at least partially in the first region of the system interface and displaying the set of one or more system controls in a second region of the system interface when a media communication session has been active within the predetermined amount of time provides additional controls for the media communication session without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first region (e.g., 1225-1) of the system interface (e.g., 1225) is not user configurable (e.g., the user cannot change, customize, and/or select the configuration of the controls that are displayed in the first region). In some embodiments, regions of the system interface other than the first region (e.g., the second region (e.g., 1225-2)) are user configurable.

Note that details of the processes described above with respect to method 1300 (e.g., FIG. 13) are also applicable in an analogous manner to the methods described below and above. For example, method 700, method 900, method 1100, and/or method 1400 optionally includes one or more of the characteristics of the various methods described above with reference to method 1300. For brevity, these details are not repeated.

FIG. 14 is a flow diagram illustrating a method for managing a live video communication session using a computer system (e.g., a smartphone, a smartwatch) in accordance with some embodiments. Method 1400 is performed at a computer system (e.g., 600, 1200) that is in communication with one or more output generation components (e.g., 601, 1200-1) (e.g., a display controller, a touch-sensitive display system, a speaker, a bone conduction audio output device, a tactile output generator, a projector, and/or a holographic display), one or more cameras (e.g., 602, 1200-2) (e.g., an infrared camera; a depth camera; a visible light camera), and one or more input devices (e.g., 601) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1400 are, optionally, combined, the orders of some operations are, optionally, changed, and some operations are, optionally, omitted.

As described below, method 1400 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

The computer system (e.g., 600) displays (1402) via the one or more output generation components (e.g., 601), a live video communication interface (e.g., 1205) for a live video communication session (e.g., an interface for a live video communication session (e.g., a live video chat session, a live video conference session, etc.)), wherein displaying the live video communication interface includes concurrently displaying (1404) (in some embodiments, the live video communication interface includes a live preview (e.g., 1208) of the user of the computer system and a live representation (e.g., 1210-1, 1210-2) of one or more participants (e.g., remote users) of the live video communication session.) a representation of a field-of-view of the one or more cameras of the computer system (e.g., 1208) (e.g., a camera preview of the computer system for the live video communication session (optionally including a representation of a subject participating in the live video communication session); in some embodiments, the representation of the field-of-view of the one or more cameras of the computer system corresponds to a participant of the live video communication session who is associated with the computer system (e.g., based on a user account of the computer system)), wherein the representation of the field-of-view of the one or more cameras is visually associated with (e.g., displayed adjacent to; displayed grouped together with) an indication (e.g., 610, 611) (e.g., a graphical user interface object (e.g., a "background blur" affordance; a "framing mode" affordance; a "dynamic video quality" affordance)) of an option to initiate a process for changing an appearance of a portion (e.g., a background portion of the camera preview; a portion of the camera preview that does not include a representation of the subject (e.g., a face of the subject), a portion of the camera preview that at least partially surrounds the subject) of the representation of the field-of-view of the one or more cameras other than a subject (e.g., 1208-1) (e.g., other than a portion of the representation of the field-of-view of the one or more cameras that includes a subject (or a face of the subject)) that is displayed in the representation of the field-of-view of the one or more cameras (e.g., a participant of the live video communication session; a user of the computer system that is detected within a field-of-view of the one or more cameras during the live video communication session) during the live video communication session (e.g., the background blur affordance (or, in some embodiments, the dynamic video quality affordance) is selectable for enabling/disabling a visual effect (e.g., a blurring, darkening, shading, desaturating, or otherwise deemphasizing effect (e.g., a reduced video quality)) that is applied to a background portion of the camera preview during the live video communication session (e.g., without applying the visual effect to the portion of the camera preview that includes the representation of the subject (e.g., a foreground portion; a portion that includes the subject's face))). Displaying a representation of a field-of-view of the one or more cameras that is visually associated with an indication of an option to initiate a process for changing an appearance of a portion of the representation of the field-of-view of the one or more cameras other than a subject that is displayed in the representation of the field-of-view of the one or more cameras provides feedback to a user of the computer system that the appearance of the representation of the field-of-view of the one or more cameras is capable of being modified, and reduces the number of user inputs at the computer system by providing an option for changing the appearance of the portion of the representation of the field-of-view other than a subject without requiring the user to navigate a settings menu or other additional interfaces to change the appearance. Providing improved feedback and reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

The computer system also concurrently displays (1406) (in some embodiments, the representation of the field-of-view of the one or more cameras is a preview of image data outputted, or capable of being outputted, by the computer system to one or more electronic devices associated with one or more participants (e.g., remote participants) of the live video communication session) a representation of one or more participants (e.g., 1210-1, 1210-2) (e.g., remote participant(s)) in the live video communication session that is different from (e.g., not included with; displayed separate from) the representation of the field-of-view of the one or more cameras of the computer system (e.g., one or more video feeds of participants in the live video communication session).

While displaying the live video communication interface for the live video communication session (e.g., 1205), the computer system (e.g., 600) detects (1408), via the one or more input devices (e.g., 601), a set of one or more inputs (e.g., 1202, 1264) (e.g., a selection of the background blur affordance and/or dynamic video quality affordance) that corresponds to a request to change (in some embodiments, automatically (e.g., without further user input)) an appearance of a portion (e.g., 1208-1) of the representation of the field-of-view of the one or more cameras other than a subject that is displayed in the representation of the field-of-view of the one or more cameras (e.g., the set of one or more inputs including an input directed to the indication of the option to initiate the process for changing the appearance of the portion of the representation of the field of view of the one or more cameras or an input directed to the representation of a field-of-view of the one or more cameras of the computer system).

In response to detecting (1410) the set of one or more inputs (e.g., 1202, 1264), the computer system (e.g., 600) changes the appearance of the portion (e.g., 1208-1) of the representation of the field-of-view of the one or more cameras other than a subject that is displayed in the representation (e.g., 1208) of the field-of-view of the one or more cameras (e.g., enabling/disabling a visual effect (e.g., a blurring, darkening, shading, obscuring, desaturating, or otherwise deemphasizing effect (e.g., a reduced video quality)) that is applied to a background portion of the camera preview during the live video communication session (e.g., without applying the visual effect to the portion of the camera preview that includes the representation of the subject (e.g., 1208-2) (e.g., a foreground portion; a portion that includes the subject's face))). Changing the appearance of the portion of the representation of the field-of-view of the one or more cameras other than a subject that is displayed in the representation of the field-of-view of the one or more cameras provides enhanced privacy control for a user of the computer system by preventing the display of the background (e.g., to other participants of the live video communication session and, in some embodiments, to the application hosting the live video communication session), and reduces the number of user inputs at the computer system by changing the appearance of the portion of the representation of the field-of-view other than a subject without requiring the user to navigate a settings menu or other additional interfaces to change the appearance. Reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, changing the appearance of the portion (e.g., 1208-1) of the representation of the field-of-view of the one or more cameras other than a subject that is displayed in the representation of the field-of-view of the one or more cameras (e.g., 1208) during the live video communication session includes outputting (e.g., to an electronic device (e.g., 600a) of the one or more participants (the remote participants)) image data corresponding to the representation of the field-of-view of the one or more cameras including the subject (e.g., 1220-1b) and the portion of the representation of the field-of-view having the changed appearance during the live video communication session (e.g., 1220-1a). In some embodiments, in response to the set of one or more inputs, the computer system enables a mode (e.g., dynamic video quality mode) for outputting (e.g., transmitting and, optionally, displaying) a camera field-of-view with portions having different degrees of compression and/or video qualities. For example, portions of the camera field-of-view that include a detected face of the subject (e.g., 1208-2, 1220-1b) (or detected faces of subjects) are compressed less than portions of the camera field-of-view that do not include a detected face (e.g., 1208-1, 1220-1a). As such, the video feed for the live video communication session can be transmitted (e.g., by the computer system (e.g., 600)) to a recipient device (e.g., 600a) of a remote participant of the live video communication session so that the portions (e.g., 1220-1b) of the camera field-of-view that include a detected face can be displayed at the recipient device with a higher video quality than the portions (e.g., 1220-1a) that do not include a detected face (due to the reduced compression of the portions of the camera field-of-view that include a detected face and the increased compression of the portions of the camera field-of-view that do not include a detected face). In some embodiments, the computer system varies the amount of compression as the video bandwidth changes (e.g., increases, decreases). For example, the degree of compression of the portion(s) of the camera field-of-view (e.g., the camera feed) that does not include the detected face(s) varies (e.g., increases or decreases with the corresponding change in bandwidth) while the degree of compression of the portion(s) of the camera field-of-view that includes the detected face(s) remains constant (or, in some embodiments, varies at a lesser rate or by a lesser amount than the portion(s) of the camera field-of-view that does not include the face(s)).

In some embodiments, prior to displaying the indication (e.g., 611) of an option to initiate a process for changing an appearance of a portion of the representation of the field-of-view of the one or more cameras other than a subject, the computer system (e.g., 600) detects an input (e.g., 1258) directed to the representation of the field-of-view of the one or more cameras (e.g., 1208) (e.g., the input is detected while the camera preview is displayed without the indication of the option (e.g., without the background blur affordance)). In response to detecting the input directed to the representation of the field-of-view of the one or more cameras, the computer system displays the indication (e.g., 611 in FIG. 12K) (e.g., displaying the camera preview visually associated with the indication) of an option to initiate a process for changing an appearance of a portion of the representation of the field-of-view of the one or more cameras other than a subject. Displaying the indication of an option to initiate a process for changing an appearance of a portion of the representation of the field-of-view of the one or more cameras other than a subject in response to detecting the input directed to the representation of the field-of-view of the cameras provides additional control options for changing an appearance of the portion of the representation of the field-of-view without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the system more quickly and efficiently. In some embodiments, the computer system detects a selection of the indication of the option to initiate a process for changing an appearance of a portion of the representation of the field-of-view of the one or more cameras other than a subject and, in response, initiates the process, including changing the appearance of the portion of the representation of the field-of-view of the one or more cameras other than a subject that is displayed in the representation of the field-of-view of the one or more cameras (e.g., blurring portion 1208-1, as illustrated in FIG. 12L).

In some embodiments, the indication (e.g., 611) of an option to initiate a process for changing an appearance of a portion (e.g., 1208-1) of the representation of the field-ofview of the one or more cameras other than a subject is displayed (e.g., in FIG. 12K) over at least a portion of the representation (e.g., 1208) of the field-of-view of the one or more cameras of the computer system (e.g., the indication (e.g., the background blur affordance) is displayed overlaid on the camera preview). Displaying the indication of an option to initiate a process for changing an appearance of a portion of the representation of the field-of-view of the one or more cameras other than a subject over at least a portion of the representation of the field-of-view of the one or more cameras provides feedback to a user of the computer system that the option is applicable to the representation of the camera preview (and an outgoing video feed) without cluttering the UI with additional content to describe operation of the option. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the live video communication interface (e.g., 1205) includes: displaying, via the one or more output generation components (e.g., 601), a camera control (e.g., 1217) (e.g., a camera flip affordance) that is selectable to change the representation of the field-of-view of the one or more cameras (e.g., 1208) from a representation of a field-of-view of a first camera (e.g., 602) (e.g., a camera preview for a first camera (e.g., a camera on a front side of the computer system)) to a representation of a field-of-view of a second camera different from the first camera (e.g., a camera preview for a second camera (e.g., a camera on a back side of the computer system)). In some embodiments, the camera control is displayed concurrently with the indication (e.g., 611) of an option to initiate a process for changing an appearance of a portion of the representation of the field-of-view of the one or more cameras other than a subject. Displaying a camera control concurrently with the indication of an option to initiate a process for changing an appearance of a portion of the representation of the field-of-view of the one or more cameras other than a subject provides feedback to a user of the computer system that the camera control and the option for changing the appearance of the representation of the field-of-view are applicable to the representation of the camera preview (and an outgoing video feed) without cluttering the UI with additional content to describe operation of the controls. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the camera control and, in response, changes the representation of the field-of-view of the one or more cameras from a representation of a field-of-view from the first camera to a representation of a field-of-view of the second camera.

In some embodiments, displaying the live video communication interface (e.g., 1205) includes: displaying, via the one or more output generation components (e.g., 601), a visual effects control (e.g., 1216) (e.g., a visual effects affordance) that is selectable to enable (and/or disable) a mode for displaying the representation of the field-of-view of the one or more cameras (e.g., 1208) with one or more visual effects (e.g., graphical visual effects (e.g., avatar effects, filter effects, text effects, and/or sticker effects) that are displayed in the camera preview, but are not part of the image data that is obtained using the camera). In some embodiments, the visual effects control is displayed concurrently with the indication (e.g., 611) of an option to initiate a process for changing an appearance of a portion (e.g., 1208-1) of the representation of the field-of-view of the one or more cameras other than a subject. Displaying a visual effects control concurrently with the indication of an option to initiate a process for changing an appearance of a portion of the representation of the field-of-view of the one or more cameras other than a subject provides feedback to a user of the computer system that the visual effects control and the option for changing the appearance of the representation of the field-of-view are applicable to the representation of the camera preview (and an outgoing video feed) without cluttering the UI with additional content to describe operation of the controls. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system (e.g., 600) detects a selection of the visual effects control and, in response, enables (or disables) the mode for displaying the representation of the field-of-view of the one or more cameras with one or more visual effects.

In some embodiments, displaying the live video communication interface (e.g., 1205) includes: displaying, via the one or more output generation components (e.g., 601), a camera zoom control (e.g., 1260) (e.g., a camera zoom affordance) that is selectable to change a zoom level (e.g., a digital zoom and/or optical zoom) of the representation of the field-of-view of the one or more cameras (e.g., 1208). In some embodiments, the camera zoom control is displayed concurrently with the indication (e.g., 611) of an option to initiate a process for changing an appearance of a portion (e.g., 1208-1) of the representation of the field-of-view of the one or more cameras other than a subject. Displaying a camera zoom control concurrently with the indication of an option to initiate a process for changing an appearance of a portion of the representation of the field-of-view of the one or more cameras other than a subject provides feedback to a user of the computer system that the camera zoom control and the option for changing the appearance of the representation of the field-of-view are applicable to the representation of the camera preview (and an outgoing video feed) without cluttering the UI with additional content to describe operation of the controls. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the camera zoom control and, in response, changes the zoom level of the representation of the field-of-view of the one or more cameras.

In some embodiments, displaying the live video communication interface (e.g., 1205) includes: displaying, via the one or more output generation components (e.g., 601), a camera framing control (e.g., 610) (e.g., a framing mode option) that is selectable to enable (and/or disable) a mode (e.g., automatic framing mode) for automatically adjusting the representation of the field-of-view of the one or more cameras (e.g., 1208) (e.g., during a live video communication session) based on a change in position of a subject detected in the field-of-view of the one or more cameras (e.g., 602) (e.g., as discussed with respect to FIGS. 6A-6Q and FIGS. 7A-7B). In some embodiments, the camera framing control is displayed concurrently with the indication (e.g., 611) of an option to initiate a process for changing an appearance of a portion (e.g., 1208-1) of the representation of the field-of-view of the one or more cameras other than a subject. Displaying a camera framing control concurrently with the indication of an option to initiate a process for changing an appearance of a portion of the representation of the field-of-view of the one or more cameras other than a subject provides feedback to a user of the computer system that the camera framing control and the option for changing the appearance of the representation of the field-of-view are applicable to the representation of the camera preview (and an outgoing video feed) without cluttering the UI with additional content to describe operation of the controls. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the framing mode option is selectable to enable/disable a mode for: 1) tracking (e.g., during a live video communication session) a position and/or location of one or more subjects detected within a field-of-view of the one or more cameras, and 2) automatically adjusting a displayed view of the subject(s) (e.g., during the live video communication session) based on the tracking of the subject. In some embodiments, the computer system detects a selection of the camera framing control and, in response, enables (or disables) the mode for automatically adjusting the representation of the field-of-view of the one or more cameras based on a change in position of a subject detected in the field-of-view of the one or more cameras.

In some embodiments, while displaying the live video communication interface (e.g., 1205) for the live video communication session with the indication (e.g., 1216) of an option to initiate a process for changing an appearance of a portion of the representation of the field-of-view of the one or more cameras (e.g., 1208) other than a subject, wherein the indication (e.g., 1216) has a first displayed state (e.g., shown in FIG. 12J) (e.g., a non-expanded state; a state that includes a single visual effect control (e.g., visual effects affordance)), the computer system (e.g., 600) detects, via the one or more input devices (e.g., 601), a first input (e.g., 1258) (e.g., an input on the camera preview (the representation of the field-of-view of the one or more cameras)). In response to detecting the first input, the computer system displays the indication of an option to initiate a process for changing an appearance of a portion of the representation of the field-of-view of the one or more cameras other than a subject, wherein the indication (e.g., 1262) has a second displayed state (e.g., an expanded state (e.g., shown in FIG. 12K)) that includes a plurality of visual effect controls (e.g., 1262-1) (e.g., graphical visual effect controls (e.g., avatar effect controls, filter effect controls, text effect controls, and/or sticker effect controls) that are each selectable to enable display of a visual effect that is displayed in the camera preview, but is not part of the image data that is obtained using the camera) displayed (e.g., concurrently) adjacent (e.g., below, above, to a side of) the representation of the field-of-view of the one or more cameras of the computer system (e.g., 1208). Displaying, in response to the first input, the indication of an option to initiate a process for changing an appearance of a portion of the representation of the field-of-view of the one or more cameras other than a subject, wherein the indication has a second displayed state that includes a plurality of visual effect controls displayed adjacent the representation of the field-of-view of the one or more cameras, provides additional visual effect controls without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first displayed state of the indication is an affordance that is selectable to enable or disable display of visual effects in general, whereas the second displayed state of the indication includes a plurality of affordances that are individually selectable to enable or disable display of individual types of visual effects. For example, the first displayed state is a visual effects affordance that enables display of filters, text, avatars, stickers, and the like, and the second displayed state includes a filter affordance that is selectable to enable display of a filter, a text affordance that is selectable to enable display of text, an avatar affordance that is selectable to enable display of an avatar, and/or a sticker affordance that is selectable to enable display of a sticker.

In some embodiments, displaying the live video communication interface (e.g., 1205) for the live video communication session with the indication (e.g., 611) of an option to initiate a process for changing an appearance of a portion (e.g., 1208-1) of the representation of the field-of-view of the one or more cameras other than a subject includes concurrently displaying: the representation of a field-of-view of the one or more cameras of the computer system (e.g., 1208) (in some embodiments, the representation of the field-of-view of the camera is displayed having a first displayed size (e.g., a reduced or small size)); a camera control (e.g., 1217) (e.g., a camera flip affordance) that is selectable to change the representation of the field-of-view of the one or more cameras from a representation of a field-of-view of a third camera (e.g., 602) (e.g., a camera preview for a camera (e.g., a camera on a front side of the computer system (e.g., 600))) to a representation of a field-of-view of a fourth camera different from the third camera (e.g., a camera preview for a different camera (e.g., a camera on a back side of the computer system)) (in some embodiments, the computer system detects a selection of the camera control and, in response, changes the representation of the field-of-view of the one or more cameras from a representation of a field-of-view from the third camera to a representation of a field-of-view of the fourth camera); and a visual effects control (e.g., 1216) (e.g., a visual effects affordance) that is selectable to enable (and/or disable) a mode for displaying the representation of the field-of-view of the one or more cameras with one or more visual effects (e.g., graphical visual effects (e.g., avatar effects, filter effects, text effects, and/or sticker effects) that are displayed in the camera preview, but are not part of the image data that is obtained using the camera) (In some embodiments, the computer system detects a selection of the visual effects control and, in response, enables the mode for displaying the representation of the field-of-view of the one or more cameras with one or more visual effects). Displaying the representation of the field-of-view of the one or more cameras with a camera control and visual effects control provides feedback to a user of the computer system that the camera control and the visual effects control are applicable to the representation of the camera preview (and an outgoing video feed) without cluttering the UI with additional content to describe operation of the controls. Providing improved feedback and avoiding cluttering the user interface with additional displayed content enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting an input (e.g., an input on the camera preview), the representation of the field-of-view of the one or more cameras is displayed having an enlarged size with the camera control and the visual effects control (and, optionally, one or more additional controls (e.g., a zoom control, a background blur control, a framing mode control)). In some embodiments, when the representation of the field-of-view of the one or more cameras is enlarged, the visual effects control is displayed having an expanded state.

In some embodiments, while displaying the live video communication interface (e.g., 1205) for the live video communication session and a first mode is enabled for displaying one or more visual effects (e.g., the representation of the field-of-view of the one or more cameras of the computer system is displayed with visual effects such as avatar effects, sticker effects, etc.): the computer system (e.g., 600) detects an input (e.g., 1268) corresponding to a request to enable a second mode (e.g., automatic framing mode) for automatically adjusting the representation of the field-of-view of the one or more cameras (e.g., during a live video communication session) based on a change in position of a subject detected in the field-of-view of the one or more cameras (e.g., 602). In response to detecting the input corresponding to the request to enable the second mode, the computer system disables the first mode for displaying one or more visual effects (e.g., ceasing display of the visual effects (e.g., indicated by greying out of effects option 1262-1 in FIG. 12N)) and enables the second mode for automatically adjusting the representation of the field-of-view of the one or more cameras based on a change in position of a subject detected in the field-of-view of the one or more cameras. Disabling the first mode and enabling the second mode in response to detecting the input corresponding to the request to enable the second mode conserves computational resources by eliminating processes performed when the first mode is enabled. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the visual effects are effects that are displayed using depth data and enabling the second mode disables use of one or more sensors (e.g., depth sensors, depth cameras, multiple cameras that are spaced apart on the device, etc.) that are used to obtain the depth data.

In some embodiments, while displaying the live video communication interface (e.g., 1205) for the live video communication session: the computer system (e.g., 600) receives, via the one or more input devices (e.g., 601), a set of one or more inputs that includes a request (e.g., 1258) to adjust a displayed size of the representation of the field-of-view of the one or more cameras (e.g., 1208) (e.g., an input for resizing the camera preview). In response to receiving the set of one or more inputs that includes a request to adjust a displayed size of the representation of the field-of-view of the one or more cameras, the computer system adjusts a displayed size of the representation of the field-of-view of the one or more cameras (e.g., as shown in FIG. 12K), including: in accordance with a determination that the representation of the field-of-view of the one or more cameras has a first displayed size (e.g., a reduced size (e.g., shown in FIG. 12J)) (e.g., when the request to adjust the displayed size is received), displaying the representation of the field-of-view of the one or more cameras having a second displayed size (e.g., an enlarged size (e.g., shown in FIG. 12K)) different from (e.g., larger than) the first displayed size and displaying a selectable control (e.g., 611) (e.g., a background blur affordance) (e.g., the indication includes a background blur affordance) for changing an appearance of a portion (e.g., 1208-1) of the representation of the field-of-view of the one or more cameras other than a subject, wherein the selectable control is visually associated with the representation of the field-of-view of the one or more cameras having the second displayed size (e.g., the background blur affordance is displayed on the camera preview) (in some embodiments, the computer system detects a selection of the selectable control and, in response, changes an appearance of the portion of the representation of the field-of-view of the one or more cameras other than a subject); and in accordance with a determination that the representation of the field-of-view of the one or more cameras has the second displayed size (e.g., an enlarged size (e.g., 12K)) (e.g., when the request to adjust the displayed size is received), displaying the representation of the field-of-view of the one or more cameras having the first displayed size (e.g., a reduced size (e.g., 12J)) and forgoing displaying the selectable control (e.g., a background blur affordance) (e.g., the indication does not include a background blur affordance) for changing an appearance of a portion of the representation of the field-of-view of the one or more cameras other than a subject. Displaying the selectable control visually associated with the representation of the field-of-view of the one or more cameras when the representation of the field-of-view of the one or more cameras has the second displayed size, and forgoing displaying the selectable control when the representation of the field-of-view of the one or more cameras has the first displayed size, provides additional controls for changing an appearance of the representation of the field-of-view of the one or more cameras without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the live video communication interface (e.g., 1205) for the live video communication session: the computer system (e.g., 600) detects, via the one or more input devices (e.g., 601), a tap gesture (e.g., 1258) directed to the representation of the field-of-view of the one or more cameras (e.g., 1208) (e.g., a tap gesture on the representation of the field-of-view of the one or more cameras). In response to detecting the tap gesture directed to the representation of the field-of-view of the one or more cameras, the computer system adjusts the representation of the field-of-view of the one or more cameras from a third displayed size to a fourth displayed size larger than the third displayed size (e.g., enlarging the camera preview in response to the tap gesture (e.g., FIG. 12K)). Adjusting the representation of the field-of-view of the one or more cameras from the third displayed size to the fourth displayed size in response to detecting a tap gesture directed to the representation of the field-of-view of the one or more cameras provides feedback to a user of the computer system that the tap gesture was received by enlarging the representation of the field-of-view of the one or more cameras. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the live video communication interface (e.g., 1205) for the live video communication session: the computer system (e.g., 600) detects, via the one or more input devices (e.g., 601), a de-pinch gesture directed to the representation of the field-of-view of the one or more cameras (e.g., 1208) (e.g., a de-pinch gesture that is initiated on the representation of the field-of-view of the one or more cameras). In response to detecting the de-pinch gesture directed to the representation of the field-of-view of the one or more cameras, the computer system adjusts the representation of the field-of-view of the one or more cameras from a fifth displayed size to a sixth displayed size larger than the fifth displayed size (e.g., enlarging the camera preview in response to the de-pinch gesture). Adjusting the representation of the field-of-view of the one or more cameras from the fifth displayed size to the sixth displayed size in response to detecting a de-pinch gesture directed to the representation of the field-of-view of the one or more cameras provides feedback to a user of the computer system that the de-pinch gesture was received by enlarging the representation of the field-of-view of the one or more cameras. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the adjustment of the representation of the field-of-view of the one or more cameras is based on a magnitude of the de-pinch gesture. For example, when the de-pinch gesture is a first magnitude, the computer system adjusts the representation of the field-of-view of the one or more cameras by a first amount (e.g., the camera preview is resized (e.g., enlarged) by a first amount), and when the de-pinch gesture is a second magnitude different from the first magnitude, the computer system adjusts the representation of the field-of-view of the one or more cameras by a second amount different from the first amount (e.g., the camera preview is resized (e.g., enlarged) by a second amount).

In some embodiments, after changing the appearance of the portion (e.g., 1208-1) of the representation of the field-of-view of the one or more cameras other than a subject that is displayed in the representation of the field-of-view of the one or more cameras (e.g., 1208): the computer system (e.g., 600) displays, via the one or more output generation components (e.g., 601), an indication (e.g., 1265) (e.g., a banner, a notification, an alert, text) of the changed appearance of the portion of the representation of the field-of-view of the one or more cameras other than a subject that is displayed in the representation of the field-of-view of the one or more cameras; and after expiration of a predetermined amount of time (e.g., after displaying the indication of the changed appearance for a predetermined amount of time), the computer system ceases displaying the indication of the changed appearance of the portion of the representation of the field-of-view of the one or more cameras other than a subject that is displayed in the representation of the field-of-view of the one or more cameras (e.g., while continuing to display the portion of the representation of the field-of-view of the one or more cameras other than a subject having the changed appearance). Displaying the indication of the changed appearance of the portion of the representation of the field-of-view of the one or more cameras other than a subject provides feedback to a user of the computer system that the appearance was changed. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, prior to displaying the live video communication interface (e.g., 1205) for a live video communication session: the computer system (e.g., 600) displays, via the one or more output generation components (e.g., 601), a user interface for a request to join a first live video communication session (e.g., 1201), wherein the user interface includes a camera control (e.g., 611) (e.g., a background blur affordance) that is selectable to enable (or disable) a mode (e.g., a background blur mode) for applying a visual effect (e.g., a blurring, darkening, shading, obscuring, desaturating, or otherwise deemphasizing effect) to a portion (e.g., 1208-1) of a representation of the field-of-view of the one or more cameras other than a subject during the first live video communication session (e.g., the background portion of the camera preview). In some embodiments, the user interface includes a second camera control (e.g., a framing mode affordance) that is selectable to enable (or disable) a mode (e.g., an automatic framing mode) for automatically adjusting a representation of a field-of-view of the one or more cameras (e.g., during a live video communication session) based on a change in position of a subject detected in the field-of-view of the one or more cameras. In some embodiments, the background blur mode is enabled while the automatic framing mode is disabled. In some embodiments, automatic framing mode is enabled while the background blur mode is disabled. In some embodiments, both the automatic framing mode and the background blur mode are enabled concurrently (e.g., during the live video communication session). In some embodiments, the method further comprises: receiving a set of one or more inputs that includes a request to join the first video communication session; and in response to receiving the set of one or more inputs that includes a request to join the first video communication session, displaying the live video communication interface, including: in accordance with a determination that the set of one or more inputs includes a selection of the camera control (e.g., the camera control is in a selected state when the request to join the first video communication session is received), displaying the portion of the representation of the field-of-view of the one or more cameras other than a subject having the visual effect (e.g., the changed appearance; the blurred appearance) (e.g., the visual effect is applied to the background of the camera preview); in accordance with a determination that the set of one or more inputs does not include a selection of the camera control (e.g., the camera control is in a deselected state when the request to join the first video communication session is received), displaying the portion of the representation of the field-of-view of the one or more cameras other than a subject without displaying the visual effect (e.g., the visual effect is not applied to the background of the camera preview); in accordance with a determination that the set of one or more inputs includes a selection of the second camera control (e.g., the second camera control is in a selected state when the request to join the first video communication session is received), displaying the live video communication interface with the mode enabled for automatically adjusting a representation of a field-of-view of the one or more cameras based on a change in position of a subject detected in the field-of-view of the one or more cameras (e.g., in some embodiments, while concurrently displaying the portion of the representation of the field-of-view of the one or more cameras other than a subject having the visual effect); and in accordance with a determination that the set of one or more inputs does not include a selection of the second camera control (e.g., the second camera control is in a deselected state when the request to join the first video communication session is received), displaying the live video communication interface with the mode disabled for automatically adjusting a representation of a field-of-view of the one or more cameras based on a change in position of a subject detected in the field-of-view of the one or more cameras (e.g., in some embodiments, while displaying the portion of the representation of the field-of-view of the one or more cameras other than a subject having the visual effect).

In some embodiments, the indication (e.g., 611) of an option to initiate a process for changing an appearance of a portion (e.g., 1208-1) of the representation of the field-of-view of the one or more cameras other than a subject that is displayed in the representation of the field-of-view of the one or more cameras during the live video communication session is displayed concurrently with one or more controls (e.g., 1212, 1213, 1214) for the live video communication session (e.g., a microphone mute control, a call end control, and/or a camera on/off control) while the live video communication session is currently active (e.g., an ongoing call).

In some embodiments, the indication (e.g., 611) of an option to initiate a process for changing an appearance of a portion (e.g., 1208-1) of the representation of the field-of-view of the one or more cameras other than a subject that is displayed in the representation of the field-of-view of the one or more cameras during the live video communication session includes a camera control (e.g., 611) (e.g., a background blur affordance) that is selectable to apply a visual effect (e.g., a blurring, darkening, shading, obscuring, desaturating, or otherwise deemphasizing effect) to the portion of the representation of the field-of-view of the one or more cameras other than a subject during the live video communication session. Displaying the indication of an option to initiate a process for changing an appearance of a portion of the representation of the field-of-view of the one or more cameras during the live video communication session including a camera control that is selectable to apply a visual effect to the portion of the representation of the field-of-view of the one or more cameras other than a subject during the live video communication session provides additional controls for quickly and easily changing an appearance of a background portion of a field-of-view of a camera. Easily changing the appearance of (e.g., hiding) the background provides privacy benefits to the user of the computer system by preventing the display of the background (e.g., to other participants of the live video communication session and, in some embodiments, to the application hosting the live video communication session). Providing privacy benefits and additional control options without cluttering the user interface with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system detects a selection of the camera control and, in response, applies a visual effect to the portion of the representation of the field-of-view of the one or more cameras other than a subject during the live video communication session.

In some embodiments, the computer system (e.g., 600, 600a) displays, via the one or more output generation components (e.g., 601, 601a), a representation of a first portion (e.g., 1220-1b) of a field-of-view of one or more cameras of a respective device of a respective participant in the live video communication session (e.g., a portion of the field-of-view of a camera of a remote participant in the live video communication session that includes a detected face of a remote participant) (e.g., a portion of the field-of-view of the one or more cameras of the computer system that includes a detected face of the subject) and a representation of a second portion (e.g., 1220-1a) of the field-of-view of one or more cameras of the respective device of the respective participant (e.g., a portion of the field-of-view of the camera of the remote participant that does not include a detected face of a remote participant) (e.g., a portion of the field-of-view of the one or more cameras of the computer system that does not include a detected face of the subject), including displaying the representation of the first portion of the field-of-view of one or more cameras of the respective device of the respective participant with a reduced degree of compression (e.g., a higher video quality) than the representation of the second portion of the field-of-view of one or more cameras of the respective device of the respective participant in accordance with a determination that the first portion of the field-of-view of one or more cameras includes a detected feature of a respective type (e.g., a face; multiple different faces) while a detected feature of the respective type is not detected in the second portion of the field-of-view of one or more cameras of the respective device of the respective participant (e.g., when a face (or multiple different faces) is detected in the first portion of the field-of-view and not in the second portion of the field-of-view, the second portion is compressed (e.g., by the sending device (e.g., the device of the remote participant; the computer system of the subject)) at a greater degree than the first portion such that the first portion of the field-of-view can be displayed (e.g., at the receiving device (e.g., the computer system; the device of the remote participant)) at a higher video quality than the second portion of the field-of-view when a face is detected in the first portion and not in the second portion). Displaying the representation of the first portion of the field-of-view of one or more cameras of the respective device of the respective participant in the live video communication session with a reduced degree of compression than the representation of the second portion of the field-of-view of one or more cameras of the respective device of the respective participant in accordance with a determination that the first portion of the field-of-view of the one or more cameras includes a detected feature of a respective type while a detected feature of the respective type is not detected in the second portion of the field-of-view of one or more cameras conserves computational resources by conserving bandwidth and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the set of one or more inputs enable a dynamic video quality mode for outputting (e.g., transmitting to a recipient device, optionally while displaying at the sending device) the camera field-of-view with portions having different degrees of video compression. In some embodiments, the computer system compresses portions of the camera field-of-view that do not include one or more faces more than portions of the camera field-of-view that do include one or more faces. In some embodiments, the computer system optionally displays the compressed video feed in the camera preview. In some embodiments, the computer system transmits the video feed having the different degrees of compression during the live video communication session such that a recipient device (e.g., a remote participant) can display the video feed received from the sending device (e.g., the computer system) having higher-video-quality portions concurrently displayed with lower-video-quality portions, wherein the higher-video-quality portions of the video feed include the face(s) and the lower-video-quality portions of the video feed do not include the face(s). Similarly, in some embodiments, the computer system receives compressed video data from a remote device (e.g., a device of a remote participant of the live video communication session) and displays the video feed from the remote device having the different degrees of compression such that the video feed of the remote device can be displayed with a higher-video-quality portion that includes the face of the remote participant and a lower-video-quality portion (displayed concurrently with the higher-quality portion) that does not include the face of the remote participant. In some embodiments, the different degrees of compression can be applied to a video feed where multiple faces are detected. For example, the video feed can have multiple higher-quality (less compressed) portions, each corresponding to a location of one of the detected faces. In some embodiments, the dynamic video quality mode is independent of the automatic framing mode and background blur mode such that the dynamic video quality mode can be enabled and disabled separate from the automatic framing mode and the background blur mode. In some embodiments, the dynamic video quality mode is implemented with the automatic framing mode such that the dynamic video quality mode is enabled when the automatic framing mode is enabled and is disabled when the automatic framing mode is disabled. In some embodiments, the dynamic video quality mode is implemented with the background blur mode such that the dynamic video quality mode is enabled when the background blur mode is enabled and is disabled when the background blur mode is disabled.

In some embodiments, after the feature of the respective type has moved from the first portion of the field-of-view of one or more cameras of the respective device of the respective participant to the second portion of the field-of-view of one or more cameras of the respective device of the respective participant (e.g., detecting the movement of the feature of the respective type from the first portion of the field-of-view of the one or more cameras to the second portion of the field-of-view of the one or more cameras; and, in response to detecting the movement of the feature of the respective type from the first portion of the field-of-view of the one or more cameras to the second portion of the field-of-view of the one or more cameras), the computer system (e.g., 600, 600a) displays, via the one or more output generation components (e.g., 601, 601a), the representation of the first portion (e.g., 1220-1a) of the field-of-view of one or more cameras of the respective device of the respective participant and the representation of the second portion (e.g., 1220-1b) of the field-of-view of one or more cameras of the respective device of the respective participant (e.g., a portion of the field-of-view that includes a detected face), including displaying the representation of the first portion the field-of-view of one or more cameras of the respective device of the respective participant with an increased degree of compression (e.g., a lower video quality) than the representation of the second portion of the field-of-view of one or more cameras of the respective device of the respective participant in accordance with a determination that the second portion of the field-of-view of one or more cameras of the respective device of the respective participant includes a detected feature of the respective type while a detected feature of the respective type is not detected in the first portion of the field-of-view of one or more cameras of the respective device of the respective participant (e.g., as the face moves within the field-of-view of the one or more cameras, the degrees of compression of respective portions of the field-of-view of the one or more cameras change such that the face (e.g., a portion of the field-of-view that includes the face) is (e.g., remains) output (e.g., transmitted and, optionally, displayed) having a lower degree of compression than portions of the field-of-view that do not include the face). Displaying, after the feature of the respective type has moved from the first portion of the field-of-view of one or more cameras of the respective device of the respective participant to the second portion of the field-of-view of one or more cameras of the respective device of the respective participant, the representation of the first portion of the field-of-view of one or more cameras of the respective device of the respective participant in the live video communication session with an increased degree of compression than the representation of the second portion of the field-of-view of one or more cameras of the respective device of the respective participant in accordance with a determination that the second portion of the field-of-view of the one or more cameras includes a detected feature of the respective type while a detected feature of the respective type is not detected in the first portion of the field-of-view of one or more cameras conserves computational resources by conserving bandwidth and decreasing the amount of image data that is processed for display and/or transmission at a high image quality as a face moves within the scene. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the feature of the respective type is a detected face (e.g., a face detected within a field-of-view of one or more cameras; a face of a remote participant; a face of the subject). In some embodiments, displaying the representation of the second portion (e.g., 1220-1*a*) of the field-of-view of one or more cameras of the respective device of the respective participant includes displaying the representation of the second portion of the field-of-view of one or more cameras of the respective device of the respective participant having a lesser video quality than the representation of the first portion of the field-of-view of one or more cameras of the respective device of the respective participant (e.g., due to a reduced compression of the representation of the first portion of the field-of-view of the one or more cameras) in accordance with a determination that the first portion of the field-of-view of one or more cameras includes the detected face while a face is not detected in the second portion of the field-of-view of one or more cameras of the respective device of the respective participant. Displaying the representation of the second portion of the field-of-view of one or more cameras of the respective device of the respective participant having a lesser video quality than the representation of the first portion of the field-of-view in accordance with a determination that the first portion of the field-of-view includes the detected face while a face is not detected in the second portion of the field-of-view of one or more cameras of the respective device of the respective participant conserves computational resources by conserving bandwidth and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, portions of the camera field-of-view that do not include a detected face are output (e.g., transmitted and, optionally, displayed) having a lesser image quality than portions of the camera field-of-view that do include a detected face (due to the increased compression of the portions that do not include a detected face). In some embodiments, when no faces are detected in the field-of-view of the one or more cameras, the computer system applies a uniform or substantially uniform degree of compression to the first and second portions of the field-of-view of the one or more cameras such that the video feed (e.g., both the first and second portions) can be output having a uniform or substantially uniform video quality. In some embodiments, when multiple faces are detected in the camera field-of-view (e.g., multiple participants of the live video communication session are detected), the computer system applies the reduced compression concurrently to the portions of the field-of-view that correspond to the detected faces such that the faces can be displayed concurrently (e.g., at a recipient device) having the higher image quality. In some embodiments, the computer system applies the increased compression to the representation of the second portion of the field-of-view of the one or more cameras, even if a face is detected in the second portion. For example, the computer system can determine that the face in the second portion is not a participant of the live video communication session (e.g., the person is a bystander in the background) and, therefore, does not reduce the degree of compression of the second portion having the face.

In some embodiments, after (e.g., in response to detecting) a change in bandwidth for transmitting a representation (e.g., 1208, 1220-1) of the field-of-view of one or more cameras of the respective device of the respective participant occurs (e.g., is detected), while a feature of the respective type (e.g., a face) is detected in the first portion (e.g., 1220-1*b*) of the field-of-view of one or more cameras of the respective device of the respective participant and while a feature of the respective type is not detected in the second portion (e.g., 1220-1*a*) of the field-of-view of one or more cameras of the respective device of the respective participant, a degree of compression (e.g., an amount of compression) of the representation of the first portion of the field-of-view of one or more cameras of the respective device of the respective participant is changed by an amount that is less than an amount of change of a degree of compression of the representation of the second portion of the field-of-view of one or more cameras of the respective device of the respective participant (e.g., when a face is detected in the first portion of the field-of-view of one or more cameras, and a face is not detected in the second portion of the field-of-view of one or more cameras, the rate of change in compression (in response to a change in bandwidth (e.g., a decrease in bandwidth)) is less for the first portion of the field-of-view than for the second portion of the field-of-view). Changing a degree of compression of the representation of the first portion of the field-of-view of one or more cameras of the respective device of the respective participant by an amount that is less than an amount of change of a degree of compression of the representation of the second portion while a feature of the respective type is detected in the first portion and a feature of the respective type is not detected in the second portion conserves computational resources by conserving bandwidth for the first portion of the representation of the field-of-view of the one or more cameras that includes the feature of the respective type and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after (e.g., in response to detecting) a change in bandwidth for transmitting a representation (e.g., 1208, 1220-1) of the field-of-view of one or more cameras of the respective device (e.g., 600) of the respective participant occurs (e.g., is detected), while a feature of the respective type is not detected in the first portion (e.g., 1220-1a) of the field-of-view of one or more cameras of the respective device of the respective participant and while a feature of the respective type is detected in the second portion (e.g., 1220-1b) of the field-of-view of one or more cameras of the respective device of the respective participant, a degree of compression (e.g., an amount of compression) of the representation of the first portion of the field-of-view of one or more cameras of the respective device of the respective participant is changed by an amount that is more than an amount of change of a degree of compression of the representation of the second portion of the field-of-view of one or more cameras of the respective device of the respective participant (e.g., when a face is detected in the second portion of the field-of-view of one or more cameras, and a face is not detected in the first portion of the field-of-view of one or more cameras, the rate of change in compression (in response to a change in bandwidth (e.g., a decrease in bandwidth)) is greater for the first portion of the field-of-view than for the second portion of the field-of-view). Changing a degree of compression of the representation of the first portion of the field-of-view of one or more cameras of the respective device of the respective participant by an amount that is more than an amount of change of a degree of compression of the representation of the second portion while a feature of the respective type is not detected in the first portion and a feature of the respective type is detected in the second portion conserves computational resources by conserving bandwidth for the second portion of the representation of the field-of-view of the one or more cameras that includes the feature of the respective type and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to a change in bandwidth for transmitting a representation (e.g., 1208, 1220-1) of the field-of-view of one or more cameras of the respective device (e.g., 600) of the respective participant occurring (e.g., being detected), a quality (e.g., a video quality) (e.g., due to a change in the amount of video compression) of the representation of the second portion (e.g., 1220-1a) of the field-of-view of one or more cameras of the respective device of the respective participant is changed by an amount that is greater than an amount of change of quality (in some embodiments, the representation of the first portion does not change in quality or has a nominal amount of change in quality) of the representation of the first portion (e.g., 1220-1b) of the field-of-view of one or more cameras of the respective device of the respective participant (e.g., when a face is detected in the first portion of the field-of-view of one or more cameras, and a face is not detected in the second portion of the field-of-view of one or more cameras, the image quality of the second portion varies more than the image quality of the first portion in response to a change in bandwidth (e.g., a decrease in bandwidth)). Changing a quality of the representation of the second portion of the field-of-view of one or more cameras of the respective device of the respective participant by an amount that is greater than an amount of change of quality of the representation of the first portion conserves computational resources by conserving bandwidth for the first portion of the representation of the field-of-view of the one or more cameras and decreasing the amount of image data that is processed for display and/or transmission at a high image quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, while a face is detected in the first portion of the field-of-view of one or more cameras, and is not detected in the second portion of the field-of-view, the computer system detects a change in available bandwidth (e.g., an increase in bandwidth; a decrease in bandwidth) and, in response, adjusts (e.g., increases; decreases) the compression of the second portion of the representation of the field-of-view of the one or more cameras without adjusting the compression of the first portion of the representation of the field-of-view of the one or more cameras. In some embodiments, when detecting a change in bandwidth, the computer system adjusts the compression of the first portion at a lesser rate than the adjustment to the second portion. In some embodiments, the method includes detecting (e.g., at the respective device of the respective participant) a change in bandwidth for transmitting a representation of the field-of-view of one or more cameras of the respective device of the respective participant while a feature of the respective type (e.g., a face) is detected in the first portion of the field-of-view of one or more cameras of the respective device of the respective participant and while a feature of the respective type is not detected in the second portion of the field-of-view of one or more cameras of the respective device of the respective participant.

Note that details of the processes described above with respect to method 1400 (e.g., FIG. 14) are also applicable in an analogous manner to the methods described above. For example, method 700, method 900, method 1100, and/or method 1300 optionally includes one or more of the characteristics of the various methods described above with reference to method 1400. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to enhance a user's video conferencing experience. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize user profiles for a video conference experience. Accordingly, use of such personal information data enables users to have calculated control of the video conference experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video conference interfaces, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, general user profiles can be created for video conference applications based on non-personal information data or a bare minimum amount of personal information, such as the content being requested by the device associated with a user, other non-personal information available to the video conference provider, or publicly available information.

What is claimed is:

1. A method, comprising:
   at a computer system that is in communication with a display generation component, one or more cameras, and one or more input devices:
   displaying, via the display generation component, a live video communication interface for a live video communication session, the live video communication interface including concurrently displaying:
   a representation of one or more participants in the live video communication session other than participants visible via the one or more cameras; and
   a representation of a field-of-view of the one or more cameras that is visually associated with a visual indication of an option to change the representation of the field-of-view of the one or cameras during the live video communication session; and
   while displaying the live video communication interface for the live video communication session, detecting, via the one or more input devices, a set of one or more inputs that corresponds to a request to initiate a process for adjusting a field-of-view of content displayed in the representation of the field-of-view of the one or more cameras during the live video communication session; and in response to detecting the set of one or more inputs, initiating the process for adjusting the field-of-view of the content displayed in the representation of the field-of-view of the one or more cameras during the live video communication session.

2. The method of claim 1, wherein:
the visual indication of the option to change the representation of the field-of-view of the one or more cameras during the live video communication session includes a set of one or more controls for adjusting a zoom level of the content displayed in the representation of the field-of-view of the one or more cameras.

3. The method of claim 2, further comprising:
detecting, via the one or more input devices, a first input directed to the set of one or more controls for adjusting a zoom level of the content displayed in the representation of the field-of-view of the one or more cameras;
in response to detecting the first input directed to the set of one or more controls, displaying the set of one or more controls such that a first control option is displayed separately from a second control option;
while displaying the set of one or more controls, detecting a second input corresponding to a selection of the first control option or the second control option; and
in response to detecting the second input, adjusting the zoom level of the content displayed in the representation of the field-of-view of the one or more cameras during the live video communication session based on the selection of the first control option or the second control option.

4. The method of claim 2, wherein the set of one or more controls for adjusting a zoom level of the representation of the field-of-view of the one or more cameras includes a first zoom control having a first fixed position and a second zoom control having a second fixed position, the method further comprising:
detecting, via the one or more input devices, a third input corresponding to a selection of the first zoom control or the second zoom control; and
while continuing to display the first zoom control having the first fixed position and the second zoom control having the second fixed position, and in response to detecting the third input, adjusting the zoom level of the content displayed in the representation of the field-of-view of the one or more cameras during the live video communication session based on the selection of the first zoom control or the second zoom control.

5. The method of claim 1, wherein the process for adjusting the field-of-view of the content displayed in the representation of the field-of-view of the one or more cameras during the live video communication session includes:
detecting a number of subjects within the field-of-view of the one or more cameras during the live video communication session; and
adjusting the representation of the field-of-view of the one or more cameras based on the number of subjects detected in the field-of-view of the one or more cameras during the live video communication session.

6. The method of claim 1, wherein the process for adjusting the field-of-view of the content displayed in the representation of the field-of-view of the one or more cameras during the live video communication session includes:
adjusting a zoom level of the content displayed in the representation of the field-of-view of the one or more cameras during the live video communication session based on one or more characteristics of a scene in the field-of-view of the one or more cameras.

7. The method of claim 1, wherein the visual indication of the option to change the representation of the field-of-view of the one or more cameras during the live video communication session is selectable to enable a first camera mode or a second camera mode, the method further comprising:
while displaying the live video communication interface for the live video communication session, detecting a change in a scene in the field-of-view of the one or more cameras, including detecting a change in a number of subjects in the scene;
in response to detecting the change in the scene in the field-of-view of the one or more cameras:
in accordance with a determination that the first camera mode is enabled, adjusting the representation of the field-of-view of the one or more cameras based on the change in the number of subjects in the scene; and
in accordance with a determination that the second camera mode is enabled, forgoing adjusting the representation of the field-of-view of the one or more cameras based on the change in the number of subjects in the scene.

8. The method of claim 1, wherein the live video communication interface includes:
a first representation of a first participant in the live video communication session, the first representation corresponding to a first portion of the field-of-view of the one or more cameras; and
a second representation of a second participant in the live video communication session different from the first participant, the second representation corresponding to a second portion of the field-of-view of the one or more cameras, where the second portion of the field-of-view of the one or more cameras is different from the first portion of the field-of-view of the one or more cameras, and wherein the second representation is separate from the first representation.

9. The method of claim 8, wherein the first representation of the first participant and the second representation of the second participant are displayed in response to detecting an input on the live video communication interface for the live video communication session.

10. The method of claim 1, wherein the representation of the field-of-view of the one or more cameras includes a graphical indication of whether the option to change the representation of the field-of-view of the one or more cameras during the live video communication session is enabled.

11. The method of claim 10, further comprising:
while displaying the representation of the field-of-view of the one or more cameras, detecting an input directed to the representation of the field-of-view of the one or more cameras; and
in response to detecting the input directed to the representation of the field-of-view of the one or more cameras, displaying, via the display generation component, a selectable graphical user interface object that is selectable to enable the option to change the representation of the field-of-view of the one or more cameras during the live video communication session to a different framing option for the field-of-view of the one or more cameras.

12. The method of claim 10, wherein:
the graphical indication of whether the option to change the representation of the field-of-view of the one or more cameras during the live video communication session is enabled has a first appearance when the option to change the representation of the field-of-view of the one or more cameras during the live video communication session is available to be used, and the graphical indication of whether the option to change the representation of the field-of-view of the one or more cameras during the live video communication session is enabled has a second appearance different from the first appearance when the option to change the representation of the field-of-view of the one or more cameras during the live video communication session is unavailable to be used.

13. The method of claim 1, wherein the representation of the field-of-view of the one or more cameras includes:
a first displayed region of the representation of the field-of-view of the one or more cameras corresponding to a first portion of the field-of-view of the one or more cameras; and
a second displayed region of the representation of the field-of-view of the one or more cameras corresponding to a second portion of the field-of-view of the one or more cameras different from the first portion of the field-of-view, wherein the second displayed region is visually distinguished from the first displayed region.

14. The method of claim 13, further comprising:
in accordance with a determination that the first portion of the field-of-view of the one or more cameras is selected for the live video communication session, displaying the first displayed region having a visually unobscured appearance and displaying the second displayed region of the representation of the field-of-view with an obscured appearance; and
in accordance with a determination that the second portion of the field-of-view of the one or more cameras is selected for the live video communication session, displaying the second displayed region having a visually unobscured appearance.

15. The method of claim 13, wherein the representation of the field-of-view of the one or more cameras includes a graphical element displayed to separate the first displayed region from the second displayed region.

16. The method of claim 13, further comprising:
displaying one or more indications of one or more faces in the second portion of the field-of-view of the one or more cameras, wherein the one or more indications are selectable to initiate a process for adjusting the field-of-view of the content displayed in the representation of the field-of-view of the one or more cameras during the live video communication session.

17. The method of claim 16, wherein:
the one or more indications of the one or more faces in the second portion of the field-of-view of the one or more cameras are displayed while a face of a first subject is detected in the field-of-view of the one or more cameras and the first portion of the field-of-view of the one or more cameras is selected for the live video communication session, and
the one or more indications of the one or more faces are displayed in response to detecting the one or more faces of subjects other than the first subject in the second portion of the field-of-view of the one or more cameras.

18. The method of claim 16, further comprising:
while the first portion of the field-of-view of the one or more cameras is selected for the live video communication session:
detecting a selection of one or more of the indications of the one or more faces in the second portion of the field-of-view of the one or more cameras; and
in response to detecting the selection of one or more of the indications, initiating a process for adjusting the field-of-view of the content displayed in the representation of the field-of-view of the one or more cameras during the live video communication session to include one or more representations of the one or more faces corresponding to the selected indications.

19. The method of claim 1, wherein:
the representation of the field-of-view of the one or more cameras includes a representation of a first subject detected in the field-of-view of the one or more cameras, and
initiating the process for adjusting the field-of-view of the content displayed in the representation of the field-of-view of the one or more cameras during the live video communication session includes automatically adjusting the field-of-view of the content displayed in the representation of the field-of-view of the one or more cameras to include a representation of a second subject detected in the field-of-view of the one or more cameras that meet a set of criteria, wherein the representation of the second subject is displayed concurrently with the representation of the first subject.

20. The method of claim 1, further comprising:
while displaying the representation of the field-of-view of the one or more cameras having a first displayed state, and while a face of a subject is detected in a first region of the field-of-view of the one or more cameras, detecting a second subject in a second region of the field-of-view of the one or more cameras;
in response to detecting the second subject in the second region of the field-of-view of the one or more cameras, displaying a second selectable graphical user interface object;
detecting a selection of the second selectable graphical user interface object; and
in response to detecting the selection of the second selectable graphical user interface object, adjusting the representation of the field-of-view of the one or more cameras from having the first displayed state to having a second displayed state that is different from the first displayed state and includes a representation of the second subject.

21. The method of claim 1, further comprising:
while a mode is enabled for automatically adjusting the field-of-view of the content displayed in the representation of the field-of-view of the one or more cameras during the live video communication session based on a change in position of a subject detected in the field-of-view of the one or more cameras:
detecting a selection of an option for changing a zoom level of the content displayed in the representation of the field-of-view of the one or more cameras during the live video communication session; and
in response to detecting the selection of the option for changing the zoom level, disabling the mode for automatically adjusting the field-of-view of the content displayed in the representation of the field-of-view of the one or more cameras during the live video communication session and adjusting a zoom level of the content displayed in the representation of the field-of-view of the one or more cameras.

22. A non-transitory computer-readable storage medium storing one or more programs configured to be executed by one or more processors of a computer system that is in communication with a display generation component, one or more cameras, and one or more input devices, the one or more programs including instructions for:
  displaying, via the display generation component, a live video communication interface for a live video communication session, the live video communication interface including concurrently displaying:
    a representation of one or more participants in the live video communication session other than participants visible via the one or more cameras; and
    a representation of a field-of-view of the one or more cameras that is visually associated with a visual indication of an option to change the representation of the field-of-view of the one or cameras during the live video communication session; and
  while displaying the live video communication interface for the live video communication session, detecting, via the one or more input devices, a set of one or more inputs that corresponds to a request to initiate a process for adjusting a field-of-view of the content displayed in the representation of the field-of-view of the one or more cameras during the live video communication session; and
  in response to detecting the set of one or more inputs, initiating the process for adjusting the field-of-view of the content displayed in the representation of the field-of-view of the one or more cameras during the live video communication session.

23. A computer system configured to communicate with a display generation component, one or more cameras, and one or more input devices, the computer system comprising:
  one or more processors; and
  memory storing one or more programs configured to be executed by the one or more processors, the one or more programs including instructions for:
    displaying, via the display generation component, a live video communication interface for a live video communication session, the live video communication interface including concurrently displaying:
      a representation of one or more participants in the live video communication session other than participants visible via the one or more cameras; and
      a representation of a field-of-view of the one or more cameras that is visually associated with a visual indication of an option to change the representation of the field-of-view of the one or cameras during the live video communication session; and
    while displaying the live video communication interface for the live video communication session, detecting, via the one or more input devices, a set of one or more inputs that corresponds to a request to initiate a process for adjusting a field-of-view of the content displayed in the representation of the field-of-view of the one or more cameras during the live video communication session; and
    in response to detecting the set of one or more inputs, initiating the process for adjusting the field-of-view of the content displayed in the representation of the field-of-view of the one or more cameras during the live video communication session.

24. The non-transitory computer-readable storage medium of claim 22, wherein:
  the visual indication of the option to change the representation of the field-of-view of the one or more cameras during the live video communication session includes a set of one or more controls for adjusting a zoom level of the content displayed in the representation of the field-of-view of the one or more cameras.

25. The non-transitory computer-readable storage medium of claim 24, the one or more programs further including instructions for:
  detecting, via the one or more input devices, a first input directed to the set of one or more controls for adjusting a zoom level of the content displayed in the representation of the field-of-view of the one or more cameras;
  in response to detecting the first input directed to the set of one or more controls, displaying the set of one or more controls such that a first control option is displayed separately from a second control option;
  while displaying the set of one or more controls, detecting a second input corresponding to a selection of the first control option or the second control option; and
  in response to detecting the second input, adjusting the zoom level of the content displayed in the representation of the field-of-view of the one or more cameras during the live video communication session based on the selection of the first control option or the second control option.

26. The non-transitory computer-readable storage medium of claim 24, wherein the set of one or more controls for adjusting a zoom level of the representation of the field-of-view of the one or more cameras includes a first zoom control having a first fixed position and a second zoom control having a second fixed position, and the one or more programs further include instructions for:
  detecting, via the one or more input devices, a third input corresponding to a selection of the first zoom control or the second zoom control; and
  while continuing to display the first zoom control having the first fixed position and the second zoom control having the second fixed position, and in response to detecting the third input, adjusting the zoom level of the content displayed in the representation of the field-of-view of the one or more cameras during the live video communication session based on the selection of the first zoom control or the second zoom control.

27. The non-transitory computer-readable storage medium of claim 22, wherein the visual indication of the option to change the representation of the field-of-view of the one or more cameras during the live video communication session is selectable to enable a first camera mode or a second camera mode, and the one or more programs further include instructions for:
  while displaying the live video communication interface for the live video communication session, detecting a change in a scene in the field-of-view of the one or more cameras, including detecting a change in a number of subjects in the scene;
  in response to detecting the change in the scene in the field-of-view of the one or more cameras:
    in accordance with a determination that the first camera mode is enabled, adjusting the representation of the field-of-view of the one or more cameras based on the change in the number of subjects in the scene; and
    in accordance with a determination that the second camera mode is enabled, forgoing adjusting the representation of the field-of-view of the one or more cameras based on the change in the number of subjects in the scene.

28. The non-transitory computer-readable storage medium of claim 22, wherein the representation of the field-of-view of the one or more cameras includes a graphical indication of whether the option to change the representation of the field-of-view of the one or more cameras during the live video communication session is enabled.

29. The non-transitory computer-readable storage medium of claim 28, the one or more programs further including instructions for:
   while displaying the representation of the field-of-view of the one or more cameras, detecting an input directed to the representation of the field-of-view of the one or more cameras; and
   in response to detecting the input directed to the representation of the field-of-view of the one or more cameras, displaying, via the display generation component, a selectable graphical user interface object that is selectable to enable the option to change the representation of the field-of-view of the one or more cameras during the live video communication session to a different framing option for the field-of-view of the one or more cameras.

30. The non-transitory computer-readable storage medium of claim 28, wherein:
   the graphical indication of whether the option to change the representation of the field-of-view of the one or more cameras during the live video communication session is enabled has a first appearance when the option to change the representation of the field-of-view of the one or more cameras during the live video communication session is available to be used, and
   the graphical indication of whether the option to change the representation of the field-of-view of the one or more cameras during the live video communication session is enabled has a second appearance different from the first appearance when the option to change the representation of the field-of-view of the one or more cameras during the live video communication session is unavailable to be used.

31. The non-transitory computer-readable storage medium of claim 22, wherein:
   the representation of the field-of-view of the one or more cameras includes:
      a first displayed region of the representation of the field-of-view of the one or more cameras corresponding to a first portion of the field-of-view of the one or more cameras; and
      a second displayed region of the representation of the field-of-view of the one or more cameras corresponding to a second portion of the field-of-view of the one or more cameras different from the first portion of the field-of-view, wherein the second displayed region is visually distinguished from the first displayed region; and
   the one or more programs further include instructions for:
      in accordance with a determination that the first portion of the field-of-view of the one or more cameras is selected for the live video communication session, displaying the first displayed region having a visually unobscured appearance and displaying the second displayed region of the representation of the field-of-view with an obscured appearance; and
      in accordance with a determination that the second portion of the field-of-view of the one or more cameras is selected for the live video communication session, displaying the second displayed region having a visually unobscured appearance.

32. The non-transitory computer-readable storage medium of claim 22, wherein:
   the representation of the field-of-view of the one or more cameras includes:
      a first displayed region of the representation of the field-of-view of the one or more cameras corresponding to a first portion of the field-of-view of the one or more cameras; and
      a second displayed region of the representation of the field-of-view of the one or more cameras corresponding to a second portion of the field-of-view of the one or more cameras different from the first portion of the field-of-view, wherein the second displayed region is visually distinguished from the first displayed region; and
   the one or more programs further include instructions for:
      displaying one or more indications of one or more faces in the second portion of the field-of-view of the one or more cameras, wherein the one or more indications are selectable to initiate a process for adjusting the field-of-view of the content displayed in the representation of the field-of-view of the one or more cameras during the live video communication session.

33. The non-transitory computer-readable storage medium of claim 32, wherein:
   the one or more indications of the one or more faces in the second portion of the field-of-view of the one or more cameras are displayed while a face of a first subject is detected in the field-of-view of the one or more cameras and the first portion of the field-of-view of the one or more cameras is selected for the live video communication session, and
   the one or more indications of the one or more faces are displayed in response to detecting the one or more faces of subjects other than the first subject in the second portion of the field-of-view of the one or more cameras.

34. The non-transitory computer-readable storage medium of claim 32, the one or more programs further including instructions for:
   while the first portion of the field-of-view of the one or more cameras is selected for the live video communication session:
      detecting a selection of one or more of the indications of the one or more faces in the second portion of the field-of-view of the one or more cameras; and
      in response to detecting the selection of one or more of the indications, initiating a process for adjusting the field-of-view of the content displayed in the representation of the field-of-view of the one or more cameras during the live video communication session to include one or more representations of the one or more faces corresponding to the selected indications.

35. The non-transitory computer-readable storage medium of claim 22, the one or more programs further including instructions for:
   while displaying the representation of the field-of-view of the one or more cameras having a first displayed state, and while a face of a subject is detected in a first region of the field-of-view of the one or more cameras, detecting a second subject in a second region of the field-of-view of the one or more cameras;
   in response to detecting the second subject in the second region of the field-of-view of the one or more cameras, displaying a second selectable graphical user interface object;

detecting a selection of the second selectable graphical user interface object; and in response to detecting the selection of the second selectable graphical user interface object, adjusting the representation of the field-of-view of the one or more cameras from having the first displayed state to having a second displayed state that is different from the first displayed state and includes a representation of the second subject.

36. The non-transitory computer-readable storage medium of claim 22, the one or more programs further including instructions for:

while a mode is enabled for automatically adjusting the field-of-view of the content displayed in the representation of the field-of-view of the one or more cameras during the live video communication session based on a change in position of a subject detected in the field-of-view of the one or more cameras:

detecting a selection of an option for changing a zoom level of the content displayed in the representation of the field-of-view of the one or more cameras during the live video communication session; and in response to detecting the selection of the option for changing the zoom level, disabling the mode for automatically adjusting the field-of-view of the content displayed in the representation of the field-of-view of the one or more cameras during the live video communication session and adjusting a zoom level of the content displayed in the representation of the field-of-view of the one or more cameras.

37. The computer system of claim 23, wherein:

the visual indication of the option to change the representation of the field-of-view of the one or more cameras during the live video communication session includes a set of one or more controls for adjusting a zoom level of the content displayed in the representation of the field-of-view of the one or more cameras.

38. The computer system of claim 37, the one or more programs further including instructions for:

detecting, via the one or more input devices, a first input directed to the set of one or more controls for adjusting a zoom level of the content displayed in the representation of the field-of-view of the one or more cameras;

in response to detecting the first input directed to the set of one or more controls, displaying the set of one or more controls such that a first control option is displayed separately from a second control option;

while displaying the set of one or more controls, detecting a second input corresponding to a selection of the first control option or the second control option; and in response to detecting the second input, adjusting the zoom level of the content displayed in the representation of the field-of-view of the one or more cameras during the live video communication session based on the selection of the first control option or the second control option.

39. The computer system of claim 37, wherein the set of one or more controls for adjusting a zoom level of the representation of the field-of-view of the one or more cameras includes a first zoom control having a first fixed position and a second zoom control having a second fixed position, and the one or more programs further include instructions for:

detecting, via the one or more input devices, a third input corresponding to a selection of the first zoom control or the second zoom control; and while continuing to display the first zoom control having the first fixed position and the second zoom control having the second fixed position, and in response to detecting the third input, adjusting the zoom level of the content displayed in the representation of the field-of-view of the one or more cameras during the live video communication session based on the selection of the first zoom control or the second zoom control.

40. The computer system of claim 23, wherein the visual indication of the option to change the representation of the field-of-view of the one or more cameras during the live video communication session is selectable to enable a first camera mode or a second camera mode, and the one or more programs further include instructions for:

while displaying the live video communication interface for the live video communication session, detecting a change in a scene in the field-of-view of the one or more cameras, including detecting a change in a number of subjects in the scene;

in response to detecting the change in the scene in the field-of-view of the one or more cameras:

in accordance with a determination that the first camera mode is enabled, adjusting the representation of the field-of-view of the one or more cameras based on the change in the number of subjects in the scene; and in accordance with a determination that the second camera mode is enabled, forgoing adjusting the representation of the field-of-view of the one or more cameras based on the change in the number of subjects in the scene.

41. The computer system of claim 23, wherein the representation of the field-of-view of the one or more cameras includes a graphical indication of whether the option to change the representation of the field-of-view of the one or more cameras during the live video communication session is enabled.

42. The computer system of claim 41, the one or more programs further including instructions for:

while displaying the representation of the field-of-view of the one or more cameras, detecting an input directed to the representation of the field-of-view of the one or more cameras; and in response to detecting the input directed to the representation of the field-of-view of the one or more cameras, displaying, via the display generation component, a selectable graphical user interface object that is selectable to enable the option to change the representation of the field-of-view of the one or more cameras during the live video communication session to a different framing option for the field-of-view of the one or more cameras.

43. The computer system of claim 41, wherein:

the graphical indication of whether the option to change the representation of the field-of-view of the one or more cameras during the live video communication session is enabled has a first appearance when the option to change the representation of the field-of-view of the one or more cameras during the live video communication session is available to be used, and the graphical indication of whether the option to change the representation of the field-of-view of the one or more cameras during the live video communication session is enabled has a second appearance different from the first appearance when the option to change the representation of the field-of-view of the one or more cameras during the live video communication session is unavailable to be used.

44. The computer system of claim 23, wherein:
the representation of the field-of-view of the one or more cameras includes:
  a first displayed region of the representation of the field-of-view of the one or more cameras corresponding to a first portion of the field-of-view of the one or more cameras; and
  a second displayed region of the representation of the field-of-view of the one or more cameras corresponding to a second portion of the field-of-view of the one or more cameras different from the first portion of the field-of-view, wherein the second displayed region is visually distinguished from the first displayed region; and
the one or more programs further include instructions for:
  in accordance with a determination that the first portion of the field-of-view of the one or more cameras is selected for the live video communication session, displaying the first displayed region having a visually unobscured appearance and displaying the second displayed region of the representation of the field-of-view with an obscured appearance; and
  in accordance with a determination that the second portion of the field-of-view of the one or more cameras is selected for the live video communication session, displaying the second displayed region having a visually unobscured appearance.

45. The computer system of claim 23, wherein:
the representation of the field-of-view of the one or more cameras includes:
  a first displayed region of the representation of the field-of-view of the one or more cameras corresponding to a first portion of the field-of-view of the one or more cameras; and
  a second displayed region of the representation of the field-of-view of the one or more cameras corresponding to a second portion of the field-of-view of the one or more cameras different from the first portion of the field-of-view, wherein the second displayed region is visually distinguished from the first displayed region; and
the one or more programs further include instructions for:
  displaying one or more indications of one or more faces in the second portion of the field-of-view of the one or more cameras, wherein the one or more indications are selectable to initiate a process for adjusting the field-of-view of the content displayed in the representation of the field-of-view of the one or more cameras during the live video communication session.

46. The computer system of claim 45, wherein:
the one or more indications of the one or more faces in the second portion of the field-of-view of the one or more cameras are displayed while a face of a first subject is detected in the field-of-view of the one or more cameras and the first portion of the field-of-view of the one or more cameras is selected for the live video communication session, and
the one or more indications of the one or more faces are displayed in response to detecting the one or more faces of subjects other than the first subject in the second portion of the field-of-view of the one or more cameras.

47. The computer system of claim 45, the one or more programs further including instructions for:
  while the first portion of the field-of-view of the one or more cameras is selected for the live video communication session:
    detecting a selection of one or more of the indications of the one or more faces in the second portion of the field-of-view of the one or more cameras; and
    in response to detecting the selection of one or more of the indications, initiating a process for adjusting the field-of-view of the content displayed in the representation of the field-of-view of the one or more cameras during the live video communication session to include one or more representations of the one or more faces corresponding to the selected indications.

48. The computer system of claim 23, the one or more programs further including instructions for:
  while displaying the representation of the field-of-view of the one or more cameras having a first displayed state, and while a face of a subject is detected in a first region of the field-of-view of the one or more cameras, detecting a second subject in a second region of the field-of-view of the one or more cameras;
  in response to detecting the second subject in the second region of the field-of-view of the one or more cameras, displaying a second selectable graphical user interface object;
  detecting a selection of the second selectable graphical user interface object; and
  in response to detecting the selection of the second selectable graphical user interface object, adjusting the representation of the field-of-view of the one or more cameras from having the first displayed state to having a second displayed state that is different from the first displayed state and includes a representation of the second subject.

49. The computer system of claim 23, the one or more programs further including instructions for:
  while a mode is enabled for automatically adjusting the field-of-view of the content displayed in the representation of the field-of-view of the one or more cameras during the live video communication session based on a change in position of a subject detected in the field-of-view of the one or more cameras:
    detecting a selection of an option for changing a zoom level of the content displayed in the representation of the field-of-view of the one or more cameras during the live video communication session; and
    in response to detecting the selection of the option for changing the zoom level, disabling the mode for automatically adjusting the field-of-view of the content displayed in the representation of the field-of-view of the one or more cameras during the live video communication session and adjusting a zoom level of the content displayed in the representation of the field-of-view of the one or more cameras.

50. The method of claim 1, wherein the process for adjusting the field-of-view of the content displayed in the representation of the field-of-view of the one or more cameras during the live video communication session includes:
  panning the content displayed in the representation of the field-of-view of the one or more cameras during the live video communication session based on one or more conditions detected in a scene in the field-of-view of the one or more cameras.

51. The non-transitory computer-readable storage medium of claim 22, wherein the process for adjusting the field-of-view of the content displayed in the representation of the field-of-view of the one or more cameras during the live video communication session includes:
- panning the content displayed in the representation of the field-of-view of the one or more cameras during the live video communication session based on one or more conditions detected in a scene in the field-of-view of the one or more cameras.

52. The computer system of claim 23, wherein the process for adjusting the field-of-view of the content displayed in the representation of the field-of-view of the one or more cameras during the live video communication session includes:
- panning the content displayed in the representation of the field-of-view of the one or more cameras during the live video communication session based on one or more conditions detected in a scene in the field-of-view of the one or more cameras.

* * * * *

UNITED STATES PATENT AND TRADEMARK OFFICE
CERTIFICATE OF CORRECTION

PATENT NO. : 12,301,979 B2
APPLICATION NO. : 18/138348
DATED : May 13, 2025
INVENTOR(S) : Fiona Paula O'Leary et al.

Page 1 of 1

It is certified that error appears in the above-identified patent and that said Letters Patent is hereby corrected as shown below:

In the Claims

Column 157, Line 23: In Claim 22, delete "of the" and insert -- of --.

Column 157, Line 55: In Claim 23, delete "of the" and insert -- of --.

Signed and Sealed this
Twenty-fourth Day of June, 2025

Coke Morgan Stewart
*Acting Director of the United States Patent and Trademark Office*